US012131500B2

(12) United States Patent
Woods et al.

(10) Patent No.: US 12,131,500 B2
(45) Date of Patent: Oct. 29, 2024

(54) SYSTEMS AND METHODS FOR AUGMENTED REALITY

(71) Applicant: Magic Leap, Inc., Plantation, FL (US)

(72) Inventors: Michael Janusz Woods, Mountain View, CA (US); Andrew Rabinovich, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/455,459

(22) Filed: Aug. 24, 2023

(65) Prior Publication Data

US 2023/0401743 A1 Dec. 14, 2023

Related U.S. Application Data

(63) Continuation of application No. 17/522,561, filed on Nov. 9, 2021, now Pat. No. 11,790,554, which is a (Continued)

(51) Int. Cl.
*G06T 7/70* (2017.01)
*G06F 3/01* (2006.01)
(Continued)

(52) U.S. Cl.
CPC ................ *G06T 7/74* (2017.01); *G06F 3/011* (2013.01); *G06F 3/012* (2013.01); *G06F 3/013* (2013.01);
(Continued)

(58) Field of Classification Search
CPC .. G06T 7/74; G06T 7/277; G06T 7/73; G06T 19/006; G06T 3/18; G06T 2207/10016;
(Continued)

(56) References Cited

U.S. PATENT DOCUMENTS 4,344,092 A 8/1982 Miller
4,652,930 A 3/1987 Crawford
(Continued)

FOREIGN PATENT DOCUMENTS

CN 100416340 C 9/2008
CN 101449270 A 6/2009
(Continued)

OTHER PUBLICATIONS

Leydon, "Sensing the Position & Orientation of Hand-Held Objects: An Overview of Techniques", UL-CSIS-03-02 IDC Dec. 3, 2001 (Year: 2001).*
(Continued)

*Primary Examiner* — Qian Yang
(74) *Attorney, Agent, or Firm* — Stephen M. De Klerk

(57) ABSTRACT

Systems and methods for reducing error from noisy data received from a high frequency sensor by fusing received input with data received from a low frequency sensor by collecting a first set of dynamic inputs from the high frequency sensor, collecting a correction input point from the low frequency sensor, and adjusting a propagation path of a second set of dynamic inputs from the high frequency sensor based on the correction input point either by full translation to the correction input point or dampened approach towards the correction input point.

15 Claims, 131 Drawing Sheets

Related U.S. Application Data continuation of application No. 16/833,093, filed on Mar. 27, 2020, now Pat. No. 11,210,808, which is a continuation of application No. 15/859,277, filed on Dec. 29, 2017, now Pat. No. 10,650,552.

(60) Provisional application No. 62/440,320, filed on Dec. 29, 2016.

(51) Int. Cl.

| | |
|---|---|
| ***G06F 3/0346*** | (2013.01) |
| ***G06F 3/0481*** | (2022.01) |
| ***G06F 3/04815*** | (2022.01) |
| ***G06F 3/0482*** | (2013.01) |
| ***G06F 3/0483*** | (2013.01) |
| ***G06F 3/0484*** | (2022.01) |
| ***G06F 3/04842*** | (2022.01) |
| ***G06T 7/277*** | (2017.01) |
| ***G06T 7/73*** | (2017.01) |
| ***G06T 19/00*** | (2011.01) |
| *G06T 3/18* | (2024.01) |

(52) U.S. Cl.

CPC ............ *G06F 3/014* (2013.01); *G06F 3/0346* (2013.01); *G06F 3/0481* (2013.01); *G06F 3/04815* (2013.01); *G06F 3/0482* (2013.01); *G06F 3/0483* (2013.01); *G06F 3/0484* (2013.01); *G06F 3/04842* (2013.01); *G06T 7/277* (2017.01); *G06T 7/73* (2017.01); *G06T 19/006* (2013.01); *G06T 3/18* (2024.01); *G06T 2207/10016* (2013.01); *G06T 2207/10024* (2013.01)

(58) Field of Classification Search

CPC ........... G06T 2207/10024; G06F 3/011; G06F 3/012; G06F 3/013; G06F 3/014; G06F 3/0346; G06F 3/0481; G06F 3/04815; G06F 3/0482; G06F 3/0483; G06F 3/0484; G06F 3/04842

See application file for complete search history.

(56) References Cited

U.S. PATENT DOCUMENTS 4,810,080 A 3/1989 Grendol et al.
4,997,268 A 3/1991 Dauvergne
5,007,727 A 4/1991 Kahaney et al.
5,074,295 A 12/1991 Willis
5,240,220 A 8/1993 Elberbaum
5,251,635 A 10/1993 Dumoulin et al.
5,410,763 A 5/1995 Bolle
5,455,625 A 10/1995 Englander
5,495,286 A 2/1996 Adair
5,497,463 A 3/1996 Stein et al.
5,659,701 A 8/1997 Amit et al.
5,682,255 A 10/1997 Friesem et al.
5,689,669 A 11/1997 Lynch
5,826,092 A 10/1998 Flannery
5,854,872 A 12/1998 Tai
5,864,365 A 1/1999 Sramek et al.
5,937,202 A 8/1999 Crosetto
6,002,853 A 12/1999 de Hond
6,012,811 A 1/2000 Chao et al.
6,016,160 A 1/2000 Coombs et al.
6,064,749 A 5/2000 Hirota et al.
6,076,927 A 6/2000 Owens
6,079,982 A 6/2000 Meader
6,117,923 A 9/2000 Amagai et al.
6,119,147 A 9/2000 Toomey et al.
6,124,977 A 9/2000 Takahashi
6,179,619 B1 1/2001 Tanaka
6,191,809 B1 2/2001 Hori et al.
6,219,045 B1 4/2001 Leahy et al.
6,243,091 B1 6/2001 Berstis
6,271,843 B1 8/2001 Lection et al.
6,362,817 B1 3/2002 Powers et al.
6,375,369 B1 4/2002 Schneider et al.
6,385,735 B1 5/2002 Wilson
6,396,522 B1 5/2002 Vu
6,414,679 B1 7/2002 Miodonski et al.
6,538,655 B1 3/2003 Kubota
6,541,736 B1 4/2003 Huang et al.
6,570,563 B1 5/2003 Honda
6,573,903 B2 6/2003 Gantt
6,590,593 B1 7/2003 Robertson et al.
6,621,508 B1 9/2003 Shiraishi et al.
6,690,393 B2 2/2004 Heron et al.
6,757,068 B2 6/2004 Foxlin
6,784,901 B1 8/2004 Harvfey et al.
6,961,055 B2 11/2005 Doak
7,046,515 B1 5/2006 Wyatt
7,051,219 B2 5/2006 Hwang
7,076,674 B2 7/2006 Cervantes
7,111,290 B1 9/2006 Yates, Jr.
7,119,819 B1 10/2006 Robertson et al.
7,211,986 B1 * 5/2007 Flowerdew ............ H02J 50/70
320/108
7,219,245 B1 5/2007 Raghuvanshi
7,382,288 B1 6/2008 Wilson
7,414,629 B2 8/2008 Santodomingo
7,431,453 B2 10/2008 Hogan
7,467,356 B2 12/2008 Gettman et al.
7,542,040 B2 6/2009 Templeman
7,573,640 B2 8/2009 Nivon et al.
7,653,877 B2 1/2010 Matsuda
7,663,625 B2 2/2010 Chartier et al.
7,724,980 B1 5/2010 Shenzhi
7,746,343 B1 6/2010 Charaniya et al.
7,751,662 B2 7/2010 Kleemann
7,758,185 B2 7/2010 Lewis
7,788,323 B2 8/2010 Greenstein et al.
7,804,507 B2 9/2010 Yang et al.
7,814,429 B2 10/2010 Buffet et al.
7,817,150 B2 10/2010 Reichard et al.
7,844,724 B2 11/2010 Van Wie et al.
8,060,759 B1 11/2011 Arnan et al.
8,120,851 B2 2/2012 Iwasa
8,214,660 B2 7/2012 Capps, Jr.
8,246,408 B2 8/2012 Elliot
8,353,594 B2 1/2013 Lewis
8,360,578 B2 1/2013 Nummela et al.
8,508,676 B2 8/2013 Silverstein et al.
8,547,638 B2 10/2013 Levola
8,605,764 B1 10/2013 Rothaar et al.
8,619,365 B2 12/2013 Harris et al.
8,696,113 B2 4/2014 Lewis
8,698,701 B2 4/2014 Margulis
8,733,927 B1 5/2014 Lewis
8,736,636 B2 5/2014 Kang
8,759,929 B2 6/2014 Shiozawa et al.
8,793,770 B2 7/2014 Lim
8,823,855 B2 9/2014 Hwang
8,847,988 B2 9/2014 Geisner et al.
8,874,673 B2 10/2014 Kim
9,010,929 B2 4/2015 Lewis
9,015,501 B2 4/2015 Gee
9,086,537 B2 7/2015 Iwasa et al.
9,095,437 B2 8/2015 Boyden et al.
9,239,473 B2 1/2016 Lewis
9,244,293 B2 1/2016 Lewis
9,244,533 B2 1/2016 Friend et al.
9,285,872 B1 3/2016 Raffle et al.
9,383,823 B2 7/2016 Geisner et al.
9,489,027 B1 11/2016 Ogletree
9,519,305 B2 12/2016 Wolfe
9,581,820 B2 2/2017 Robbins
9,582,060 B2 2/2017 Balatsos
9,658,473 B2 5/2017 Lewis
9,671,566 B2 6/2017 Abovitz et al.
9,671,615 B1 6/2017 Vallius et al.
9,696,795 B2 7/2017 Marcolina et al.

(56) References Cited

U.S. PATENT DOCUMENTS

| | | | |
|---|---|---|---|
| 9,798,144 | B2 | 10/2017 | Sako et al. |
| 9,874,664 | B2 | 1/2018 | Stevens et al. |
| 9,880,441 | B1 | 1/2018 | Osterhout |
| 9,918,058 | B2 | 3/2018 | Takahasi et al. |
| 9,955,862 | B2 | 5/2018 | Freeman et al. |
| 9,978,118 | B1 | 5/2018 | Ozgumer et al. |
| 9,996,797 | B1 | 6/2018 | Holz et al. |
| 10,018,844 | B2 | 7/2018 | Levola et al. |
| 10,082,865 | B1 | 9/2018 | Raynal et al. |
| 10,151,937 | B2 | 12/2018 | Lewis |
| 10,185,147 | B2 | 1/2019 | Lewis |
| 10,218,679 | B1 | 2/2019 | Jawahar |
| 10,241,545 | B1 | 3/2019 | Richards et al. |
| 10,317,680 | B1 | 6/2019 | Richards et al. |
| 10,436,594 | B2 | 10/2019 | Belt et al. |
| 10,516,853 | B1 | 12/2019 | Gibson et al. |
| 10,551,879 | B1 | 2/2020 | Richards et al. |
| 10,578,870 | B2 | 3/2020 | Kimmel |
| 10,698,202 | B2 | 6/2020 | Kimmel et al. |
| 10,856,107 | B2 | 10/2020 | Mycek et al. |
| 10,825,424 | B2 | 11/2020 | Zhang |
| 10,987,176 | B2 | 4/2021 | Poltaretskyi et al. |
| 11,190,681 | B1 | 11/2021 | Brook et al. |
| 11,209,656 | B1 | 12/2021 | Choi et al. |
| 11,236,993 | B1 | 2/2022 | Hall et al. |
| 2001/0010598 | A1 | 8/2001 | Aritake et al. |
| 2001/0018667 | A1 | 8/2001 | Kim |
| 2002/0007463 | A1 | 1/2002 | Fung |
| 2002/0108064 | A1 | 2/2002 | Nunally |
| 2002/0063913 | A1 | 5/2002 | Nakamura et al. |
| 2002/0071050 | A1 | 6/2002 | Homberg |
| 2002/0095463 | A1 | 7/2002 | Matsuda |
| 2002/0113820 | A1 | 8/2002 | Robinson et al. |
| 2002/0122648 | A1 | 9/2002 | Mule'et al. |
| 2002/0140848 | A1 | 10/2002 | Cooper et al. |
| 2003/0028816 | A1 | 2/2003 | Bacon |
| 2003/0048456 | A1 | 3/2003 | Hill |
| 2003/0067685 | A1 | 4/2003 | Niv |
| 2003/0077458 | A1 | 4/2003 | Korenaga et al. |
| 2003/0115494 | A1 | 6/2003 | Cervantes |
| 2003/0218614 | A1 | 11/2003 | Lavelle et al. |
| 2003/0219992 | A1 | 11/2003 | Schaper |
| 2003/0226047 | A1 | 12/2003 | Park |
| 2004/0001533 | A1 | 1/2004 | Tran et al. |
| 2004/0021600 | A1 | 2/2004 | Wittenberg |
| 2004/0025069 | A1 | 2/2004 | Gary et al. |
| 2004/0042377 | A1 | 3/2004 | Nikoloai et al. |
| 2004/0073822 | A1 | 4/2004 | Greco |
| 2004/0073825 | A1 | 4/2004 | Itoh |
| 2004/0111248 | A1 | 6/2004 | Granny et al. |
| 2004/0113887 | A1 | 6/2004 | Pair et al. |
| 2004/0174496 | A1 | 9/2004 | Ji et al. |
| 2004/0186902 | A1 | 9/2004 | Stewart |
| 2004/0193441 | A1 | 9/2004 | Altieri |
| 2004/0201857 | A1 | 10/2004 | Foxlin |
| 2004/0238732 | A1 | 12/2004 | State et al. |
| 2004/0240072 | A1 | 12/2004 | Schindler et al. |
| 2004/0246391 | A1 | 12/2004 | Travis |
| 2004/0268159 | A1 | 12/2004 | Aasheim et al. |
| 2005/0001977 | A1 | 1/2005 | Zelman |
| 2005/0034002 | A1 | 2/2005 | Flautner |
| 2005/0093719 | A1 | 5/2005 | Okamoto et al. |
| 2005/0128212 | A1 | 6/2005 | Edecker et al. |
| 2005/0157159 | A1 | 7/2005 | Komiya et al. |
| 2005/0177385 | A1 | 8/2005 | Hull |
| 2005/0231599 | A1 | 10/2005 | Yamasaki |
| 2005/0273792 | A1 | 12/2005 | Inohara et al. |
| 2006/0013435 | A1 | 1/2006 | Rhoads |
| 2006/0015821 | A1 | 1/2006 | Jacques Parker et al. |
| 2006/0019723 | A1 | 1/2006 | Vorenkamp |
| 2006/0038880 | A1 | 2/2006 | Starkweather et al. |
| 2006/0050224 | A1 | 3/2006 | Smith |
| 2006/0090092 | A1 | 4/2006 | Verhulst |
| 2006/0126181 | A1 | 6/2006 | Levola |
| 2006/0129852 | A1 | 6/2006 | Bonola |
| 2006/0132914 | A1 | 6/2006 | Weiss et al. |
| 2006/0179329 | A1 | 8/2006 | Terechko |
| 2006/0221448 | A1 | 10/2006 | Nivon et al. |
| 2006/0228073 | A1 | 10/2006 | Mukawa et al. |
| 2006/0250322 | A1 | 11/2006 | Hall et al. |
| 2006/0259621 | A1 | 11/2006 | Ranganathan |
| 2006/0268220 | A1 | 11/2006 | Hogan |
| 2007/0058248 | A1 | 3/2007 | Nguyen et al. |
| 2007/0103836 | A1 | 5/2007 | Oh |
| 2007/0124730 | A1 | 5/2007 | Pytel |
| 2007/0159673 | A1 | 7/2007 | Freeman et al. |
| 2007/0185398 | A1* | 8/2007 | Kimura .................. A61B 5/062 128/899 |
| 2007/0188837 | A1 | 8/2007 | Shimizu et al. |
| 2007/0198886 | A1 | 8/2007 | Saito |
| 2007/0204672 | A1 | 9/2007 | Huang et al. |
| 2007/0213952 | A1 | 9/2007 | Cirelli |
| 2007/0283247 | A1 | 12/2007 | Brenneman et al. |
| 2008/0002259 | A1 | 1/2008 | Ishizawa et al. |
| 2008/0002260 | A1 | 1/2008 | Arrouy et al. |
| 2008/0030429 | A1 | 2/2008 | Hailpern |
| 2008/0043334 | A1 | 2/2008 | Itzkovitch et al. |
| 2008/0046773 | A1 | 2/2008 | Ham |
| 2008/0063802 | A1 | 3/2008 | Maula et al. |
| 2008/0068557 | A1 | 3/2008 | Menduni et al. |
| 2008/0125218 | A1 | 5/2008 | Collins |
| 2008/0146942 | A1 | 6/2008 | Dala-Krishna |
| 2008/0173036 | A1 | 7/2008 | Willaims |
| 2008/0177506 | A1 | 7/2008 | Kim |
| 2008/0183190 | A1 | 7/2008 | Adcox et al. |
| 2008/0205838 | A1 | 8/2008 | Crippa et al. |
| 2008/0215907 | A1 | 9/2008 | Wilson |
| 2008/0225393 | A1 | 9/2008 | Rinko |
| 2008/0235570 | A1 | 9/2008 | Sawada et al. |
| 2008/0246693 | A1 | 10/2008 | Hailpern et al. |
| 2008/0316768 | A1 | 12/2008 | Travis |
| 2009/0076791 | A1 | 3/2009 | Rhoades et al. |
| 2009/0091583 | A1 | 4/2009 | McCoy |
| 2009/0153797 | A1 | 6/2009 | Allon et al. |
| 2009/0177445 | A1 | 7/2009 | Capps, Jr. et al. |
| 2009/0224416 | A1 | 9/2009 | Laakkonen et al. |
| 2009/0245730 | A1 | 10/2009 | Kleemann |
| 2009/0287728 | A1 | 11/2009 | Martine et al. |
| 2009/0300528 | A1 | 12/2009 | Stambaugh |
| 2009/0310633 | A1 | 12/2009 | Ikegami |
| 2010/0005326 | A1 | 1/2010 | Archer |
| 2010/0019962 | A1 | 1/2010 | Fujita |
| 2010/0056274 | A1 | 3/2010 | Uusitalo et al. |
| 2010/0063854 | A1 | 3/2010 | Purvis et al. |
| 2010/0070378 | A1 | 3/2010 | Trotman et al. |
| 2010/0079841 | A1 | 4/2010 | Levola |
| 2010/0115428 | A1 | 5/2010 | Shuping et al. |
| 2010/0153934 | A1 | 6/2010 | Lachner |
| 2010/0194632 | A1 | 8/2010 | Raento et al. |
| 2010/0205541 | A1 | 8/2010 | Rappaport et al. |
| 2010/0214284 | A1 | 8/2010 | Rieffel et al. |
| 2010/0232016 | A1 | 9/2010 | Landa et al. |
| 2010/0232031 | A1 | 9/2010 | Batchko et al. |
| 2010/0244168 | A1 | 9/2010 | Shiozawa et al. |
| 2010/0274567 | A1 | 10/2010 | Carlson et al. |
| 2010/0274627 | A1 | 10/2010 | Carlson |
| 2010/0277803 | A1 | 11/2010 | Pockett et al. |
| 2010/0284085 | A1 | 11/2010 | Laakkonen |
| 2010/0296163 | A1 | 11/2010 | Sarikko |
| 2010/0306715 | A1 | 12/2010 | Geisner et al. |
| 2010/0309687 | A1 | 12/2010 | Sampsell et al. |
| 2011/0010636 | A1 | 1/2011 | Hamilton, II et al. |
| 2011/0021263 | A1 | 1/2011 | Anderson et al. |
| 2011/0022870 | A1 | 1/2011 | Mcgrane |
| 2011/0041083 | A1 | 2/2011 | Gabai et al. |
| 2011/0050640 | A1 | 3/2011 | Lundback et al. |
| 2011/0050655 | A1 | 3/2011 | Mukawa |
| 2011/0122240 | A1 | 5/2011 | Becker |
| 2011/0145617 | A1 | 6/2011 | Thomson et al. |
| 2011/0170801 | A1 | 7/2011 | Lu et al. |
| 2011/0218733 | A1 | 9/2011 | Hamza et al. |
| 2011/0286735 | A1 | 11/2011 | Temblay |
| 2011/0291969 | A1 | 12/2011 | Rashid et al. |
| 2012/0011389 | A1 | 1/2012 | Driesen |

(56) References Cited

U.S. PATENT DOCUMENTS

2012/0050535 A1 3/2012 Densham et al.
2012/0075501 A1 3/2012 Oyagi et al.
2012/0081392 A1 4/2012 Arthur
2012/0089854 A1 4/2012 Breakstone
2012/0113235 A1 5/2012 Shintani
2012/0127062 A1 5/2012 Bar-Zeev et al.
2012/0154557 A1 6/2012 Perez et al.
2012/0215094 A1 8/2012 Rahimian et al.
2012/0218301 A1 8/2012 Miller
2012/0246506 A1 9/2012 Knight
2012/0249416 A1 10/2012 Maciocci et al.
2012/0249741 A1 10/2012 Maciocci et al.
2012/0260083 A1 10/2012 Andrews
2012/0307075 A1 12/2012 Margalit
2012/0307362 A1 12/2012 Silverstein et al.
2012/0314959 A1 12/2012 White et al.
2012/0320460 A1 12/2012 Levola
2012/0326948 A1 12/2012 Crocco et al.
2013/0021486 A1 1/2013 Richardon
2013/0050258 A1 2/2013 Liu et al.
2013/0050642 A1 2/2013 Lewis et al.
2013/0050833 A1 2/2013 Lewis et al.
2013/0051730 A1 2/2013 Travers et al.
2013/0061240 A1 3/2013 Yan et al.
2013/0077049 A1 3/2013 Bohn
2013/0077170 A1 3/2013 Ukuda
2013/0094148 A1 4/2013 Sloane
2013/0129282 A1 5/2013 Li
2013/0162940 A1 6/2013 Kurtin et al.
2013/0169923 A1 7/2013 Schnoll et al.
2013/0205126 A1 8/2013 Kruglick
2013/0222386 A1 8/2013 Tannhauser et al.
2013/0268257 A1 10/2013 Hu
2013/0278633 A1 10/2013 Ahn et al.
2013/0314789 A1 11/2013 Saarikko et al.
2013/0318276 A1 11/2013 Dalal
2013/0336138 A1 12/2013 Venkatraman et al.
2013/0342564 A1 12/2013 Kinnebrew et al.
2013/0342570 A1 12/2013 Kinnebrew et al.
2013/0342571 A1 12/2013 Kinnebrew et al.
2013/0343408 A1 12/2013 Cook
2014/0002329 A1 1/2014 Nishimaki et al.
2014/0013098 A1 1/2014 Yeung
2014/0016821 A1 1/2014 Arth et al.
2014/0022819 A1 1/2014 Oh et al.
2014/0078023 A1 3/2014 Ikeda et al.
2014/0082526 A1 3/2014 Park et al.
2014/0119598 A1 5/2014 Ramachandran et al.
2014/0123015 A1 5/2014 Sako et al.
2014/0126769 A1 5/2014 Reitmayr et al.
2014/0140653 A1 5/2014 Brown et al.
2014/0149573 A1 5/2014 Tofighbakhsh et al.
2014/0168260 A1 6/2014 O'Brien et al.
2014/0244983 A1 8/2014 McDonald et al.
2014/0266987 A1 9/2014 Magyari
2014/0267419 A1 9/2014 Ballard et al.
2014/0274391 A1 9/2014 Stafford
2014/0282105 A1 9/2014 Nordstrom
2014/0313228 A1 10/2014 Kasahara
2014/0340498 A1 11/2014 Plagemann et al.
2014/0359589 A1 12/2014 Kodsky et al.
2014/0375680 A1 12/2014 Ackerman et al.
2015/0005785 A1 1/2015 Olson
2015/0009099 A1 1/2015 Queen
2015/0077312 A1 3/2015 Wang
2015/0097719 A1 4/2015 Balachandreswaran et al.
2015/0123966 A1 5/2015 Newman
2015/0130790 A1 5/2015 Vazquez, II et al.
2015/0134995 A1 5/2015 Park et al.
2015/0138248 A1 5/2015 Schrader
2015/0155939 A1 6/2015 Oshima et al.
2015/0168221 A1 6/2015 Mao et al.
2015/0205126 A1 7/2015 Schowengerdt
2015/0235427 A1 8/2015 Nobori et al.
2015/0235431 A1 8/2015 Schowengerdt
2015/0253651 A1 9/2015 Russell et al.
2015/0256484 A1 9/2015 Cameron
2015/0269784 A1 9/2015 Miyawaki et al.
2015/0294483 A1 10/2015 Wells et al.
2015/0301955 A1 10/2015 Yakovenko et al.
2015/0310657 A1 10/2015 Eden
2015/0338915 A1 11/2015 Publicover et al.
2015/0355481 A1 12/2015 Hilkes et al.
2016/0004102 A1 1/2016 Nisper et al.
2016/0015470 A1 1/2016 Border
2016/0027215 A1 1/2016 Burns et al.
2016/0033770 A1 2/2016 Fujimaki et al.
2016/0051217 A1 2/2016 Douglas et al.
2016/0077338 A1 3/2016 Robbins et al.
2016/0085285 A1 3/2016 Mangione-Smith
2016/0085300 A1 3/2016 Robbins et al.
2016/0091720 A1 3/2016 Stafford et al.
2016/0093099 A1 3/2016 Bridges
2016/0093269 A1 3/2016 Buckley et al.
2016/0103326 A1 4/2016 Kimura et al.
2016/0123745 A1 5/2016 Cotier et al.
2016/0139402 A1 5/2016 Lapstun
2016/0139411 A1 5/2016 Kang et al.
2016/0155273 A1 6/2016 Lyren et al.
2016/0163063 A1 6/2016 Ashman
2016/0180596 A1 6/2016 Gonzalez del Rosario
2016/0187654 A1 6/2016 Border et al.
2016/0191887 A1 6/2016 Casas
2016/0202496 A1 7/2016 Billetz et al.
2016/0217624 A1 7/2016 Finn et al.
2016/0266412 A1 9/2016 Yoshida
2016/0267708 A1 9/2016 Nistico et al.
2016/0274733 A1 9/2016 Hasegawa et al.
2016/0287337 A1 10/2016 Aram et al.
2016/0300388 A1 10/2016 Stafford et al.
2016/0321551 A1 11/2016 Priness et al.
2016/0327798 A1 11/2016 Xiao et al.
2016/0334279 A1 11/2016 Mittleman et al.
2016/0357255 A1 12/2016 Lindh et al.
2016/0370404 A1 12/2016 Quadrat et al.
2016/0370510 A1 12/2016 Thomas
2017/0038607 A1 2/2017 Camara
2017/0060225 A1 3/2017 Zha et al.
2017/0061696 A1 3/2017 Li et al.
2017/0064066 A1 3/2017 Das et al.
2017/0100664 A1 4/2017 Osterhout et al.
2017/0102544 A1 4/2017 Vallius et al.
2017/0115487 A1 4/2017 Travis
2017/0122725 A1 5/2017 Yeoh et al.
2017/0123526 A1 5/2017 Trail et al.
2017/0127295 A1 5/2017 Black et al.
2017/0131569 A1 5/2017 Aschwanden et al.
2017/0147066 A1 5/2017 Katz et al.
2017/0160518 A1 6/2017 Lanman et al.
2017/0161951 A1 6/2017 Fix et al.
2017/0172409 A1* 6/2017 Cavin .................... A61B 3/113
2017/0185261 A1 6/2017 Perez et al.
2017/0192239 A1 7/2017 Nakamura et al.
2017/0201709 A1 7/2017 Igarashi et al.
2017/0205903 A1 7/2017 Miller et al.
2017/0206668 A1 7/2017 Poulos et al.
2017/0213388 A1 7/2017 Margolis et al.
2017/0214907 A1 7/2017 Lapstun
2017/0219841 A1 8/2017 Popovich et al.
2017/0232345 A1 8/2017 Rofougaran et al.
2017/0235126 A1 8/2017 DiDomenico
2017/0235129 A1 8/2017 Kamakura
2017/0235142 A1 8/2017 Wall et al.
2017/0235144 A1 8/2017 Piskunov et al.
2017/0235147 A1 8/2017 Kamakura
2017/0243403 A1 8/2017 Daniels et al.
2017/0246070 A1 8/2017 Osterhout et al.
2017/0254832 A1 9/2017 Ho et al.
2017/0256096 A1 9/2017 Faaborg et al.
2017/0258526 A1 9/2017 Lang
2017/0266529 A1 9/2017 Reikmoto
2017/0270712 A1 9/2017 Tyson et al.
2017/0281054 A1 10/2017 Stever et al.
2017/0287376 A1 10/2017 Bakar et al.

(56) References Cited

U.S. PATENT DOCUMENTS

| | | | |
|---|---|---|---|
| 2017/0293141 | A1 | 10/2017 | Schowengerdt et al. |
| 2017/0307886 | A1 | 10/2017 | Stenberg et al. |
| 2017/0307891 | A1 | 10/2017 | Bucknor et al. |
| 2017/0312032 | A1 | 11/2017 | Amanatullah et al. |
| 2017/0322418 | A1 | 11/2017 | Liu et al. |
| 2017/0322426 | A1 | 11/2017 | Tervo |
| 2017/0329137 | A1 | 11/2017 | Tervo |
| 2017/0332098 | A1 | 11/2017 | Rusanovskyy et al. |
| 2017/0336636 | A1 | 11/2017 | Amitai et al. |
| 2017/0336867 | A1 | 11/2017 | Wilairat et al. |
| 2017/0357332 | A1 | 12/2017 | Balan et al. |
| 2017/0363871 | A1 | 12/2017 | Vallius |
| 2017/0371394 | A1 | 12/2017 | Chan |
| 2017/0371661 | A1 | 12/2017 | Sparling |
| 2018/0014266 | A1 | 1/2018 | Chen |
| 2018/0024289 | A1 | 1/2018 | Fattal |
| 2018/0044173 | A1 | 2/2018 | Netzer |
| 2018/0052007 | A1 | 2/2018 | Teskey et al. |
| 2018/0052501 | A1 | 2/2018 | Jones, Jr. et al. |
| 2018/0059305 | A1 | 3/2018 | Popovich et al. |
| 2018/0067779 | A1 | 3/2018 | Pillalamarri et al. |
| 2018/0070855 | A1 | 3/2018 | Eichler |
| 2018/0082480 | A1 | 3/2018 | White et al. |
| 2018/0084245 | A1 | 3/2018 | Lapstun |
| 2018/0088185 | A1 | 3/2018 | Woods et al. |
| 2018/0101214 | A1 | 4/2018 | Mahindru et al. |
| 2018/0102981 | A1 | 4/2018 | Kurtzman et al. |
| 2018/0108179 | A1 | 4/2018 | Tomlin et al. |
| 2018/0114298 | A1 | 4/2018 | Malaika et al. |
| 2018/0129112 | A1 | 5/2018 | Osterhout |
| 2018/0131907 | A1 | 5/2018 | Schmirler et al. |
| 2018/0136466 | A1 | 5/2018 | Ko |
| 2018/0144691 | A1 | 5/2018 | Choi et al. |
| 2018/0150971 | A1 | 5/2018 | Adachi et al. |
| 2018/0151796 | A1 | 5/2018 | Akahane |
| 2018/0172995 | A1 | 6/2018 | Lee et al. |
| 2018/0188115 | A1 | 7/2018 | Hsu et al. |
| 2018/0189568 | A1 | 7/2018 | Powderly et al. |
| 2018/0190017 | A1 | 7/2018 | Mendez et al. |
| 2018/0191990 | A1 | 7/2018 | Motoyama et al. |
| 2018/0196084 | A1 | 7/2018 | Tustaniwskyj |
| 2018/0217395 | A1 | 8/2018 | Lin et al. |
| 2018/0218545 | A1 | 8/2018 | Garcia et al. |
| 2018/0250589 | A1 | 9/2018 | Cossairt et al. |
| 2018/0260218 | A1 | 9/2018 | Gopal |
| 2018/0284877 | A1 | 10/2018 | Klein |
| 2018/0292654 | A1 | 10/2018 | Wall et al. |
| 2018/0299678 | A1 | 10/2018 | Singer et al. |
| 2018/0357472 | A1 | 12/2018 | Dreessen |
| 2019/0005069 | A1 | 1/2019 | Filgueiras de Araujo et al. |
| 2019/0011691 | A1 | 1/2019 | Peyman |
| 2019/0056591 | A1 | 2/2019 | Tervo et al. |
| 2019/0087015 | A1 | 3/2019 | Lam et al. |
| 2019/0101758 | A1 | 4/2019 | Zhu et al. |
| 2019/0107723 | A1 | 4/2019 | Lee et al. |
| 2019/0137788 | A1 | 5/2019 | Suen |
| 2019/0155034 | A1 | 5/2019 | Singer et al. |
| 2019/0155439 | A1 | 5/2019 | Mukherjee et al. |
| 2019/0158926 | A1 | 5/2019 | Kang et al. |
| 2019/0162950 | A1 | 5/2019 | Lapstun |
| 2019/0167095 | A1 | 6/2019 | Krueger |
| 2019/0172216 | A1 | 6/2019 | Ninan et al. |
| 2019/0178654 | A1 | 6/2019 | Hare |
| 2019/0182415 | A1 | 6/2019 | Sivan |
| 2019/0196690 | A1 | 6/2019 | Chong et al. |
| 2019/0206116 | A1 | 7/2019 | Xu et al. |
| 2019/0219815 | A1 | 7/2019 | Price et al. |
| 2019/0243123 | A1 | 8/2019 | Bohn |
| 2019/0287270 | A1 | 9/2019 | Nakamura et al. |
| 2019/0318502 | A1 | 10/2019 | He et al. |
| 2019/0318540 | A1 | 10/2019 | Piemonte et al. |
| 2019/0321728 | A1 | 10/2019 | Imai et al. |
| 2019/0347853 | A1 | 11/2019 | Chen et al. |
| 2019/0380792 | A1 | 12/2019 | Poltaretskyi et al. |
| 2019/0388182 | A1 | 12/2019 | Kumar et al. |
| 2020/0066045 | A1 | 2/2020 | Stahl et al. |
| 2020/0098188 | A1 | 3/2020 | Bar-Zeev et al. |
| 2020/0100057 | A1 | 3/2020 | Galon et al. |
| 2020/0110928 | A1 | 4/2020 | Al Jazaery et al. |
| 2020/0117267 | A1 | 4/2020 | Gibson et al. |
| 2020/0117270 | A1 | 4/2020 | Gibson et al. |
| 2020/0184217 | A1 | 6/2020 | Faulkner |
| 2020/0184653 | A1 | 6/2020 | Faulker |
| 2020/0202759 | A1 | 6/2020 | Ukai et al. |
| 2020/0242848 | A1 | 7/2020 | Ambler et al. |
| 2020/0309944 | A1 | 10/2020 | Thoresen et al. |
| 2020/0356161 | A1 | 11/2020 | Wagner |
| 2020/0368616 | A1 | 11/2020 | Delamont |
| 2020/0391115 | A1 | 12/2020 | Leeper et al. |
| 2020/0409528 | A1 | 12/2020 | Lee |
| 2021/0008413 | A1 | 1/2021 | Asikainen et al. |
| 2021/0033871 | A1 | 2/2021 | Jacoby et al. |
| 2021/0041951 | A1 | 2/2021 | Gibson et al. |
| 2021/0053820 | A1 | 2/2021 | Gurin et al. |
| 2021/0093391 | A1 | 4/2021 | Poltaretskyi et al. |
| 2021/0093410 | A1 | 4/2021 | Gaborit et al. |
| 2021/0093414 | A1 | 4/2021 | Moore et al. |
| 2021/0097886 | A1 | 4/2021 | Kuester et al. |
| 2021/0132380 | A1 | 5/2021 | Wieczorek |
| 2021/0141225 | A1 | 5/2021 | Meynen et al. |
| 2021/0142582 | A1 | 5/2021 | Jones et al. |
| 2021/0158627 | A1 | 5/2021 | Cossairt et al. |
| 2021/0173480 | A1 | 6/2021 | Osterhout et al. |
| 2022/0366598 | A1 | 11/2022 | Azimi et al. |

FOREIGN PATENT DOCUMENTS

| | | | |
|---|---|---|---|
| CN | 102448566 | A | 5/2012 |
| CN | 104040410 | A | 9/2014 |
| CN | 104603675 | A | 5/2015 |
| CN | 105938426 | A | 9/2016 |
| CN | 106662754 | A | 5/2017 |
| CN | 107004303 | A | 8/2017 |
| CN | 107683497 | A1 | 2/2018 |
| CN | 109223121 | A | 1/2019 |
| CN | 105190427 | B | 11/2019 |
| EP | 0504930 | A1 | 3/1992 |
| EP | 0535402 | A1 | 4/1993 |
| EP | 0632360 | A1 | 1/1995 |
| EP | 1215522 | A2 | 6/2002 |
| EP | 1494110 | A2 | 1/2005 |
| EP | 1938141 | A1 | 7/2008 |
| EP | 1943556 | A2 | 7/2008 |
| EP | 2290428 | A2 | 3/2011 |
| EP | 2350774 | A1 | 8/2011 |
| EP | 1237067 | B1 | 1/2016 |
| EP | 3139245 | A1 | 3/2017 |
| EP | 3164776 | B1 | 5/2017 |
| EP | 3236211 | A1 | 10/2017 |
| EP | 2723240 | B1 | 8/2018 |
| EP | 2896986 | B1 | 2/2021 |
| GB | 2499635 | A | 8/2013 |
| GB | 2542853 | A | 4/2017 |
| IN | 938/DEL/2004 | | 6/2006 |
| JP | H03-036974 | U | 4/1991 |
| JP | H10-333094 | A | 12/1998 |
| JP | 2002-015222 | A | 1/2002 |
| JP | 2002-529806 | | 9/2002 |
| JP | 2003-029198 | A | 1/2003 |
| JP | 2003-141574 | A | 5/2003 |
| JP | 2003-228027 | A | 8/2003 |
| JP | 2003-329873 | A | 11/2003 |
| JP | 2005-303843 | A | 10/2005 |
| JP | 2007-012530 | A | 1/2007 |
| JP | 2007-86696 | A | 4/2007 |
| JP | 2007-273733 | A | 10/2007 |
| JP | 2008-257127 | A | 10/2008 |
| JP | 2009-090689 | A | 4/2009 |
| JP | 2009-244869 | A | 10/2009 |
| JP | 2010-014443 | A | 1/2010 |
| JP | 2010-139575 | | 6/2010 |
| JP | 2010-146030 | A | 7/2010 |
| JP | 2011-033993 | A | 2/2011 |
| JP | 2011-257203 | A | 12/2011 |

(56) References Cited

FOREIGN PATENT DOCUMENTS

| | | | |
|---|---|---|---|
| JP | 2012-015774 | A | 1/2012 |
| JP | 2012-235036 | A | 11/2012 |
| JP | 2013-525872 | A1 | 6/2013 |
| JP | 2014-500522 | A | 1/2014 |
| JP | 2014-90386 | A | 5/2014 |
| JP | 2014-192550 | A | 10/2014 |
| JP | 2015-191032 | A | 11/2015 |
| JP | 2016-502120 | A | 1/2016 |
| JP | 2016-85463 | A | 5/2016 |
| JP | 2016-516227 | A | 6/2016 |
| JP | 2016-126134 | A | 7/2016 |
| JP | 2017-015697 | A | 1/2017 |
| JP | 2017-108444 | A | 6/2017 |
| JP | 2017-153498 | | 9/2017 |
| JP | 2017-531840 | A | 10/2017 |
| JP | 2017-535825 | A | 11/2017 |
| JP | 6232763 | B2 | 11/2017 |
| JP | 2018-503165 | A | 2/2018 |
| JP | 6333965 | B2 | 5/2018 |
| JP | 2018-173739 | A | 11/2018 |
| KR | 2005-0010775 | A | 1/2005 |
| KR | 10-2006-0059992 | A | 6/2006 |
| KR | 10-1372623 | B1 | 3/2014 |
| TW | 201219829 | A | 5/2012 |
| TW | 201803289 | A | 1/2018 |
| WO | 1991/000565 | A2 | 1/1991 |
| WO | 2000/030368 | A1 | 6/2000 |
| WO | 2002/071315 | A2 | 9/2002 |
| WO | 2004095248 | A | 11/2004 |
| WO | 2006132614 | A1 | 12/2006 |
| WO | 2007041678 | A2 | 4/2007 |
| WO | 2007/037089 | A1 | 5/2007 |
| WO | 2007/085628 | A1 | 8/2007 |
| WO | 2007/085682 | A1 | 8/2007 |
| WO | 2007/102144 | A1 | 9/2007 |
| WO | 2008148927 | A1 | 12/2008 |
| WO | 2009/101238 | A1 | 8/2009 |
| WO | 2014203440 | A1 | 12/2010 |
| WO | 2012030787 | A2 | 3/2012 |
| WO | 2013/049012 | A1 | 4/2013 |
| WO | 2013062701 | A1 | 5/2013 |
| WO | 2014033306 | A1 | 3/2014 |
| WO | 2015/143641 | A1 | 10/2015 |
| WO | 2016/054092 | A1 | 4/2016 |
| WO | 2017004695 | A1 | 1/2017 |
| WO | 2017044761 | A1 | 3/2017 |
| WO | 2017049163 | A1 | 3/2017 |
| WO | 2017051595 | A1 | 3/2017 |
| WO | 2017120475 | A1 | 7/2017 |
| WO | 2017176861 | A1 | 10/2017 |
| WO | 2017/203201 | A1 | 11/2017 |
| WO | 2018008232 | A1 | 1/2018 |
| WO | 2018/031261 | A1 | 2/2018 |
| WO | 2018022523 | A1 | 2/2018 |
| WO | 2018/044537 | A1 | 3/2018 |
| WO | 2018039273 | A1 | 3/2018 |
| WO | 2018057564 | A1 | 3/2018 |
| WO | 2018085287 | A1 | 5/2018 |
| WO | 2018087408 | A1 | 5/2018 |
| WO | 2018097831 | A1 | 5/2018 |
| WO | 2018/166921 | A | 9/2018 |
| WO | 2018166921 | A1 | 9/2018 |
| WO | 2018236587 | A1 | 12/2018 |
| WO | 2019040493 | A1 | 2/2019 |
| WO | 2019148154 | A1 | 8/2019 |
| WO | 2020010226 | A1 | 1/2020 |

OTHER PUBLICATIONS

Bachmann et al., "An Investigation of the Effects of Magnetic Variations on Inertial/Magnetic Orientation Sensors", Proceedings of the 2004 IEEE, International Conference on Robotics & Automation, New Orleans, LA. Apr. 2004 (Year: 2004).*

Xu et al., "Magnetic Actuation Based Motion Control for Microrobots: An Overview", Micromachines 2015, 6, 1346-1364; (Year: 2015).*

"ARToolKit: Hardware",https://web.archive.org/web/20051013062315/http://www.hitl.washington.edu:80/artoolkit/documentation/hardware.htm (downloaded Oct. 26, 2020), Oct. 13, 2015, (3 pages).

"Communication according to Rule 164(1) EPC mailed on Feb. 23, 2022", European Patent Application No. 20753144.3, (11 pages).

"Communication Pursuant to Article 94(3) EPC mailed on Sep. 4, 2019", European Patent Application No. 10793707.0, (4 pages).

"Communication Pursuant to Article 94(3) EPC mailed on Apr. 25, 2022", European Patent Application No. 18885707.2, (5 pages).

"Communication Pursuant to Article 94(3) EPC mailed on Jan. 4, 2022", European Patent Application No. 20154070.5, (8 pages).

"Communication Pursuant to Article 94(3) EPC mailed on May 30, 2022", European Patent Application No. 19768418.6, (6 pages).

"Communication Pursuant to Article 94(3) EPC mailed on Oct. 21, 2021", European Patent Application No. 16207441.3, (4 pages).

"Communication Pursuant to Rule 164(1) EPC mailed on Jul. 27, 2021", European Patent Application No. 19833664.6, (11 pages).

"Decision of Rejection mailed on Jan. 5, 2023 with English translation", Chinese Patent Application No. 201880079474.6, (10 pages).

"European Search Report mailed on Oct. 15, 2020", European Patent Application No. 20180623.9, (10 pages).

"Extended European Search Report issued on Apr. 5, 2023", European Patent Application No. 20888716.6, (11 pages).

"Extended European Search Report issued on Dec. 14, 2022", European Patent Application No. 20886547.7, (8 pages).

"Extended European Search Report issued on Jul. 20, 2022", European Patent Application No. 19885958.9, (9 pages).

"Extended European Search Report issued on May 20, 2020", European Patent Application No. 20154070.5, (7 pages).

"Extended European Search Report issued on Jan. 22, 2021", European Patent Application No. 18890390.0, (11 pages).

"Extended European Search Report issued on Nov. 3, 2020", European Patent Application No. 18885707.2, (7 pages).

"Extended European Search Report issued on Jun. 30, 2021", European Patent Application No. 19811971.1, (9 pages).

"Extended European Search Report issued on Mar. 4, 2021", European Patent Application No. 19768418.6, (9 pages).

"Extended European Search Report issued on Nov. 4, 2020", European Patent Application No. 20190980.1, (14 pages).

"Extended European Search Report issued on Aug. 24, 2022", European Patent Application No. 20846338.0, (13 pages).

"Extended European Search Report issued on Aug. 8, 2022", European Patent Application No. 19898874.3, (8 pages).

"Extended European Search Report issued on Sep. 8, 2022", European Patent Application No. 20798769.4, (13 pages).

"Extended European Search Report mailed on Nov. 3, 2022", European Patent Application No. 20770244.0, (23 pages).

"Extended European Search Report mailed on Jun. 12, 2017", European Patent Application No. 16207441.3, (8 pages).

"Extended European Search Report mailed on Jan. 28, 2022", European Patent Application No. 19815876.8, (9 pages).

"Extended European Search Report mailed on Jan. 4, 2022", European Patent Application No. 19815085.6, (9 pages).

"Extended European Search Report mailed on Jul. 16, 2021", European Patent Application No. 19810142.0, (14 pages).

"Extended European Search Report mailed on Jul. 30, 2021", European Patent Application No. 19839970.1, (7 pages).

"Extended European Search Report mailed on Jun. 19, 2020", European Patent Application No. 20154750.2, (10 pages).

"Extended European Search Report mailed on Mar. 22, 2022", European Patent Application No. 19843487.0, (14 pages).

"Extended European Search Report mailed on May 16, 2022", European Patent Application No. 19871001.4, (9 pages).

"Extended European Search Report mailed on May 30, 2022", European Patent Application No. 20753144.3, (10 pages).

"Extended European Search Report mailed on Oct. 27, 2021", European Patent Application No. 19833664.6, (10 pages).

"Extended European Search Report mailed on Sep. 20, 2021", European Patent Application No. 19851373.1, (8 pages).

"Extended European Search Report mailed on Sep. 28, 2021", European Patent Application No. 19845418.3, (13 pages).

(56) References Cited

OTHER PUBLICATIONS

"Final Office Action mailed on Aug. 10, 2020", U.S. Appl. No. 16/225,961, (13 pages).
"Final Office Action mailed on Dec. 29, 2022", U.S. Appl. No. 17/098,059, (32 pages).
"Final Office Action mailed on Dec. 4, 2019", U.S. Appl. No. 15/564,517, (15 pages).
"Final Office Action mailed on Feb. 19, 2020", U.S. Appl. No. 15/552,897, (17 pages).
"Final Office Action mailed on Feb. 23, 2022", U.S. Appl. No. 16/748,193, (23 pages).
"Final Office Action mailed on Feb. 3, 2022", U.S. Appl. No. 16/864,721, (36 pages).
"Final Office Action mailed on Jul. 13, 2022", U.S. Appl. No. 17/262,991, (18 pages).
"Final Office Action mailed on Jun. 15, 2021", U.S. Appl. No. 16/928,313, (42 pages).
"Final Office Action mailed on Mar. 1, 2021", U.S. Appl. No. 16/214,575, (29 pages).
"Final Office Action mailed on Mar. 10, 2023", U.S. Appl. No. 17/357,795, (15 pages).
"Final Office Action mailed on Mar. 19, 2021", U.S. Appl. No. 16/530,776, (25 pages).
"Final Office Action mailed on Nov. 24, 2020", U.S. Appl. No. 16/435,933, (44 pages).
"Final Office Action mailed on Sep. 17, 2021", U.S. Appl. No. 16/938,782, (44 pages).
"First Examination Report Mailed on Aug. 8, 2023", Australian Patent Application No. 2018379105, (3 pages).
"First Examination Report Mailed on Dec. 8, 2022", Australian Patent Application No. 2018392482, (3 pages).
"First Examination Report Mailed on Jul. 27, 2022", Chinese Patent Application No. 201980036675.2, (5 pages).
"First Examination Report Mailed on Jul. 28, 2022", Indian Patent Application No. 202047024232, (6 pages).
"First Examination Report Mailed on May 13, 2022", Indian Patent Application No. 202047026359, (8 pages).
"First Office Action mailed Apr. 21, 2023 with English translation", Japanese Patent Application No. 2021-509779, (26 pages).
"First Office Action mailed Jul. 4, 2023 with English translation", Japanese Patent Application No. 2021-505669, (6 pages).
"First Office Action mailed on Apr. 13, 2023 with English Translation", Japanese Patent Application No. 2020-567766, (7 pages).
"First Office Action mailed on Dec. 22, 2022 with English translation", Chinese Patent Application No. 201980061450.2, (11 pages).
"First Office Action mailed on Feb. 11, 2022 with English translation", Chinese Patent Application No. 201880089255.6, (17 pages).
"First Office Action mailed on Jan. 24, 2023 with English translation", Japanese Patent Application No. 2020-549034, (7 pages).
"First Office Action mailed on Jan. 30, 2023 with English translation", Chinese Patent Application No. 201980082951.9, (5 pages).
"First Office Action mailed on Jun. 13, 2023 with English translation", Japanese Patent Application No. 2020-567853, (7 pages).
"First Office Action mailed on Mar. 14, 2022 with English translation", Chinese Patent Application No. 201880079474.6, (11 pages).
"First Office Action mailed on Mar. 27, 2023 with English translation", Japanese Patent Application No. 2020-566617, (6 pages).
"First Office Action mailed on Mar. 6, 2023 with English translation", Korean Patent Application No. 10-2020-7019685, (7 pages).
"First Office Action mailed on May 26, 2023 with English translation", Japanese Patent Application No. 2021-500607, (6 pages).
"First Office Action mailed on May 30, 2023", Israeli Patent Application No. 275065, (4 pages).
"First Office Action mailed on May 30, 2023 with English translation", Japanese Patent Application No. 2021-519873, (8 pages).
"First Office Action mailed on Sep. 16, 2022 with English translation", Chinese Patent Application No. 201980063642.7, (7 pages).
"FS_XR5G: Permanent document, v0.4.0", Qualcomm Incorporated, 3GPP TSG-SA 4 Meeting 103 retrieved from the Internet: URL:http://www.3gpp.org/ftp/Meetings%5F3GPP%5FSYNC/SA4/Docs/S4%2DI90526%2Ezip [retrieved on Apr. 12, 2019] , Apr. 12, 2019 , (98 pages).
"International Search Report and Written Opinion mailed on Feb. 12, 2021", International PCT Application No. PCT/US20/60555, (25 pages).
"International Search Report and Written Opinion mailed on Mar. 12, 2020", International PCT Patent Application No. PCT/US19/67919, (14 pages).
"International Search Report and Written Opinion mailed on Aug. 15, 2019", International PCT Patent Application No. PCT/US19/33987, (20 pages).
"International Search Report and Written Opinion mailed on Jun. 15, 2020", International PCT Patent Application No. PCT/US2020/017023, (13 pages).
"International Search Report and Written Opinion mailed on Oct. 16, 2019", International PCT Patent Application No. PCT/US19/43097, (10 pages).
"International Search Report and Written Opinion mailed on Oct. 16, 2019", International PCT Patent Application No. PCT/US19/36275, (10 pages).
"International Search Report and Written Opinion mailed on Oct. 16, 2019", International PCT Patent Application No. PCT/US19/43099, (9 pages).
"International Search Report and Written Opinion mailed on Jun. 17, 2016", International PCT Patent Application No. PCT/FI2016/050172, (9 pages).
"International Search Report and Written Opinion mailed on Feb. 2, 2021", International PCT Patent Application No. PCT/US20/60550, (9 pages).
"International Search Report and Written Opinion mailed on Oct. 22, 2019", International PCT Patent Application No. PCT/US19/43751, (9 pages).
"International Search Report and Written Opinion mailed on Dec. 23, 2019", International PCT Patent Application No. PCT/US19/44953, (11 pages).
"International Search Report and Written Opinion mailed on May 23, 2019", International PCT Patent Application No. PCT/US18/66514, (17 pages).
"International Search Report and Written Opinion mailed on Sep. 26, 2019", International PCT Patent Application No. PCT/US19/40544, (12 pages).
"International Search Report and Written Opinion mailed on Aug. 27, 2019", International PCT Application No. PCT/US2019/035245, (8 pages).
"International Search Report and Written Opinion mailed on Dec. 27, 2019", International PCT Application No. PCT/US19/47746, (16 pages).
"International Search Report and Written Opinion mailed on Dec. 3, 2020", International PCT Patent Application No. PCT/US20/43596, (25 pages).
"International Search Report and Written Opinion mailed on Sep. 30, 2019", International PCT Patent Application No. PCT/US19/40324, (7 pages).
"International Search Report and Written Opinion mailed on Sep. 4, 2020", International PCT Patent Application No. PCT/US20/31036, (13 pages).
"International Search Report and Written Opinion mailed on Jun. 5, 2020", International PCT Patent Application No. PCT/US20/19871, (9 pages).
"International Search Report and Written Opinion mailed on Aug. 8, 2019", International PCT Patent Application No. PCT/US2019/034763, (8 pages).
"International Search Report and Written Opinion mailed on Oct. 8, 2019", International PCT Patent Application No. PCT/US19/41151, (7 pages).
"International Search Report and Written Opinion mailed on Jan. 9, 2020", International PCT Application No. PCT/US19/55185, (10 pages).
"International Search Report and Written Opinion mailed on Feb. 28, 2019", International PCT Patent Application No. PCT/US18/64686, (8 pages).

(56) References Cited

OTHER PUBLICATIONS

"International Search Report and Written Opinion mailed on Feb. 7, 2020", International PCT Patent Application No. PCT/US2019/061265, (11 pages).
"International Search Report and Written Opinion mailed on Jun. 11, 2019", International PCT Application No. PCT/US19/22620, (7 pages).
"Invitation to Pay Additional Fees mailed Aug. 15, 2019", International PCT Patent Application No. PCT/US19/36275, (2 pages).
"Invitation to Pay Additional Fees mailed Sep. 24, 2020", International PCT Patent Application No. PCT/US2020/043596, (3 pages).
"Invitation to Pay Additional Fees mailed on Oct. 22, 2019", International PCT Patent Application No. PCT/US19/47746, (2 pages).
"Invitation to Pay Additional Fees mailed on Apr. 3, 2020", International PCT Patent Application No. PCT/US20/17023, (2 pages).
"Invitation to Pay Additional Fees mailed on Oct. 17, 2019", International PCT Patent Application No. PCT/US19/44953, (2 pages).
"multi-core processor", TechTarget , 2013 , (1 page).
"Non Final Office Action mailed on Apr. 1, 2022", U.S. Appl. No. 17/256,961, (65 pages).
"Non Final Office Action mailed on Apr. 11, 2022", U.S. Appl. No. 16/938,782, (52 pages).
"Non Final Office Action mailed on Apr. 12, 2022", U.S. Appl. No. 17/262,991, (60 pages).
"Non Final Office Action mailed on Apr. 13, 2023", U.S. Appl. No. 17/098,043, (7 pages).
"Non Final Office Action mailed on Aug. 2, 2023", U.S. Appl. No. 17/807,600, (25 pages).
"Non Final Office Action mailed on Aug. 21, 2019", U.S. Appl. No. 15/564,517, (14 pages).
"Non Final Office Action mailed on Aug. 4, 2021", U.S. Appl. No. 16/864,721, (21 pages).
"Non Final Office Action mailed on Dec. 7, 2022", U.S. Appl. No. 17/357,795, (63 pages).
"Non Final Office Action mailed on Feb. 2, 2022", U.S. Appl. No. 16/783,866, (8 pages).
"Non Final Office Action mailed on Feb. 3, 2023", U.S. Appl. No. 17/429,100, (16 pages).
"Non Final Office Action mailed on Feb. 3, 2023", U.S. Appl. No. 17/497,965, (32 pages).
"Non Final Office Action mailed on Jan. 24, 2023", U.S. Appl. No. 17/497,940, (10 pages).
"Non Final Office Action mailed on Jan. 26, 2021", U.S. Appl. No. 16/928,313, (33 pages).
"Non Final Office Action mailed on Jan. 27, 2021", U.S. Appl. No. 16/225,961, (15 pages).
"Non Final Office Action mailed on Jul. 20, 2023", U.S. Appl. No. 17/650,188, (11 pages).
"Non Final Office Action mailed on Jul. 26, 2022", U.S. Appl. No. 17/098,059, (28 pages).
"Non Final Office Action mailed on Jul. 27, 2020", U.S. Appl. No. 16/435,933, (16 pages).
"Non Final Office Action mailed on Jul. 9, 2021", U.S. Appl. No. 17/002,663, (43 pages).
"Non Final Office Action mailed on Jul. 9, 2021", U.S. Appl. No. 16/833,093, (47 pages).
"Non Final Office Action mailed on Jun. 10, 2021", U.S. Appl. No. 16/938,782, (40 Pages).
"Non Final Office Action mailed on Jun. 14, 2023", U.S. Appl. No. 17/516,483, (10 pages).
"Non Final Office Action mailed on Jun. 17, 2020", U.S. Appl. No. 16/682,911, (22 pages).
"Non Final Office Action mailed on Jun. 19, 2020", U.S. Appl. No. 16/225,961, (35 pages).
"Non Final Office Action mailed on Jun. 29, 2021", U.S. Appl. No. 16/698,588, (58 pages).
"Non Final Office Action mailed on Mar. 1, 2023", U.S. Appl. No. 18/046,739, (34 pages).
"Non Final Office Action mailed on Mar. 3, 2021", U.S. Appl. No. 16/427,337, (41 pages).
"Non Final Office Action mailed on Mar. 31, 2022", U.S. Appl. No. 17/257,814, (60 pages).
"Non Final Office Action mailed on Mar. 9, 2022", U.S. Appl. No. 16/870,676, (57 pages).
"Non Final Office Action mailed on May 10, 2022", U.S. Appl. No. 17/140,921, (25 pages).
"Non Final Office Action mailed on May 11, 2023", U.S. Appl. No. 17/822,279, (24 pages).
"Non Final Office Action mailed on May 17, 2022", U.S. Appl. No. 16/748,193, (11 pages).
"Non Final Office Action mailed on May 26, 2021", U.S. Appl. No. 16/214,575, (19 pages).
"Non Final Office Action mailed on Nov. 19, 2019", U.S. Appl. No. 16/355,611, (31 pages).
"Non Final Office Action mailed on Nov. 5, 2020", U.S. Appl. No. 16/530,776, (45 pages).
"Non Final Office Action mailed on Oct. 22, 2019", U.S. Appl. No. 15/859,277, (15 pages).
"Non Final Office Action mailed on Sep. 1, 2020", U.S. Appl. No. 16/214,575, (40 pages).
"Non Final Office Action mailed on Sep. 19, 2022", U.S. Appl. No. 17/263,001, (14 pages).
"Non Final Office Action mailed on Sep. 20, 2021", U.S. Appl. No. 17/105,848, (56 pages).
"Non Final Office Action mailed on Sep. 29, 2021", U.S. Appl. No. 16/748,193, (62 pages).
"Notice of Allowance mailed on Jul. 27, 2023 with English translation", Korean Patent Application No. 10-2020-7019685, (4 pages).
"Notice of Allowance mailed on Mar. 25, 2020", U.S. Appl. No. 15/564,517, (11 pages).
"Notice of Allowance mailed on Oct. 5, 2020", U.S. Appl. No. 16/682,911, (27 pages).
"Notice of Reason for Rejection mailed on Oct. 28, 2022 with English translation", Japanese Patent Application No. 2020-531452, (3 pages).
"Notice of Reason of Refusal mailed on Sep. 11, 2020 with English translation", Japanese Patent Application No. 2019-140435, (6 pages).
"Office Action mailed May 31, 2023", Israeli Patent Application No. 275373, (5 pages).
"Office Action mailed on Apr. 13, 2023 with English translation", Japanese Patent Application No. 2020-533730, (13 pages).
"Office Action mailed on Jul. 20, 2023 with English translation", Japanese Patent Application No. 2021-505884, (6 pages).
"Office Action mailed on Jun. 8, 2023 with English translation", Japanese Patent Application No. 2021-503762, (6 pages).
"Office Action mailed on Mar. 30, 2023 with English translation", Japanese Patent Application No. 2020-566620, (10 pages).
"Office Action mailed on Nov. 24, 2022 with English Translation", Japanese Patent Application No. 2020-533730, (11 pages).
"Phototourism Challenge", CVPR 2019 Image Matching Workshop. https://image matching-workshop. github.io., (16 pages).
"Second Office Action mailed on Jul. 13, 2022 with English Translation", Chinese Patent Application No. 201880079474.6, (10 pages).
"Second Office Action mailed on Jun. 20, 2022 with English Translation", Chinese Patent Application No. 201880089255.6, (14 pages).
"Second Office Action mailed on May 2, 2023 with English Translation", Japanese Patent Application No. 2020-549034, (6 pages).
"Summons to attend oral proceedings pursuant to Rule 115(1) EPC mailed on Jul. 15, 2019", European Patent Application No. 15162521.7, (7 pages).
Aarik, J. , et al. , "Effect of crystal structure on optical properties of TiO2 films grown by atomic layer deposition", Thin Solid Films; Publication [online). May 19, 1998 [retrieved Feb. 19, 2020]. Retrieved from the Internet: <URL: https://www.sciencedirect.com/science/article/pii/S0040609097001351 ?via%3Dihub>; DOI: 10.1016/S0040-6090(97)00135-1; see entire document, (2 pages).

(56) References Cited

OTHER PUBLICATIONS

Altwaijry , et al. , "Learning to Detect and Match Keypoints with Deep Architectures", Proceedings of the British Machine Vision Conference (BMVC), BMVA Press, Sep. 2016, [retrieved on Jan. 8, 2021 (Jan. 8, 2021 )] < URL: http://www.bmva.org/bmvc/2016/papers/paper049/index.html >, en lire document, especially Abstract.
Anonymous, "Koi Pond: Top iPhone App Store Paid App", https://web.archive.org/web/20080904061233/https://www.iphoneincanada.ca/reviews /koi-pond-top-iphone-app-store-paid-app/—[retrieved on Aug. 9, 2022].
Arandjelović, Relja , et al. , "Three things everyone should know to improve object retrieval", CVPR, 2012, (8 pages).
Azom, "Silica-Silicon Dioxide (SiO2)", AZO Materials; Publication [Online]. Dec. 13, 2001 [retrieved Feb. 19, 2020]. Retrieved from the Internet: <URL: https://www.azom.com/article.aspx?Article1D=1114>.
Azuma, Ronald T. , "A Survey of Augmented Reality", Presence: Teleoperators and Virtual Environments 6, 4 (Aug. 1997), 355-385; https://web.archive.org/web/20010604100006/http://www.cs.unc.edu/~azuma/ARpresence.pdf (downloaded Oct. 26, 2020).
Azuma, Ronald T. , "Predictive Tracking for Augmented Reality", Department of Computer Science, Chapel Hill NC; TR95-007, Feb. 1995, 262 pages.
Battaglia, Peter W, et al. , "Relational inductive biases, deep learning, and graph networks", arXiv:1806.01261, Oct. 17, 2018, pp. 1-40.
Berg, Alexander C , et al. , "Shape matching and object recognition using low distortion correspondences", In CVPR, 2005, (8 pages).
Bian, Jiawang , et al. , "GMS: Grid-based motion statistics for fast, ultra-robust feature correspondence.", In CVPR (Conference on Computer Vision and Pattern Recognition), 2017, (10 pages).
Bimber, Oliver , et al. , "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007), (393 pages).
Brachmann, Eric , et al. , "Neural-Guided RANSAC: Learning Where to Sample Model Hypotheses", In ICCV (International Conference on Computer Vision ), arXiv:1905.04132v2 [cs.CV] Jul. 31, 2019, (17 pages).
Butail , et al. , "Putting the fish in the fish tank: Immersive VR for animal behavior experiments", In: 2012 IEEE International Conference on Robotics and Automation. May 18, 2012 (May 18, 2012) Retrieved on Nov. 14, 2020 (Nov. 14, 2020) from <http:/lcdcl.umd.edu/papers/icra2012.pdf> entire document.
Caetano, Tibério S , et al. , "Learning graph matching", IEEE TPAMI, 31(6):1048-1058, 2009.
Cech, Jan , et al. , "Efficient sequential correspondence selection by cosegmentation", IEEE TPAMI, 32(9):1568-1581, Sep. 2010.
Chittineni, C., et al. , "Single filters for combined image geometric manipulation and enhancement", Proceedings of SPIE vol. 1903, Image and Video Processing, Apr. 8, 1993, San Jose, CA. (Year: 1993), pp. 111-121.
Cuturi, Marco, "Sinkhorn distances: Lightspeed computation of optimal transport", NIPS, 2013, (9 pages).
Dai, Angela , et al. , "ScanNet: Richly-annotated 3d reconstructions of indoor scenes", In CVPR, arXiv:1702.04405v2 [cs.CV] Apr. 11, 2017, (22 pages).
Deng, Haowen , et al. , "PPFnet: Global context aware local features for robust 3d point matching", In CVPR, arXiv:1802.02669v2 [cs.CV] Mar. 1, 2018, (12 pages).
Detone, Daniel , et al. , "Deep image homography estimation", In RSS Work-shop: Limits and Potentials of Deep Learning in Robotics, arXiv:1606.03798v1 [cs.CV] Jun. 13, 2016, (6 pages).
Detone, Daniel , et al. , "Self-improving visual odometry", arXiv:1812.03245, Dec. 8, 2018, (9 pages).
Detone, Daniel , et al. , "SuperPoint: Self-supervised interest point detection and description", In CVPR Workshop on Deep Learning for Visual SLAM, arXiv:1712.07629v4 [cs.CV] Apr. 19, 2018, (13 pages).
Dusmanu, Mihai , et al. , "D2-net: A trainable CNN for joint detection and description of local features", CVPR, arXiv:1905.03561v1 [cs.CV] May 9, 2019, (16 pages).
Ebel, Patrick , et al. , "Beyond cartesian representations for local descriptors", ICCV, arXiv:1908.05547v1 [cs.CV] Aug. 15, 2019, (11 pages).
Fischler, Martin A , et al. , "Random sample consensus: a paradigm for model fitting with applications to image analysis and automated cartography", Communications of the ACM, 24(6): 1981, pp. 381-395.
Gilmer, Justin , et al. , "Neural message passing for quantum chemistry", In ICML, arXiv:1704.01212v2 [cs.LG] Jun. 12, 2017, (14 pages).
Giuseppe, Donato , et al. , "Stereoscopic helmet mounted system for real time 3D environment reconstruction and indoor ego—motion estimation", Proc. SPIE 6955, Head- and Helmet-Mounted Displays XIII: Design and Applications, SPIE Defense and Security Symposium, 2008, Orlando, Florida, United States, 69550P.
Goodfellow, "Titanium Dioxide-Titania (TiO2)", AZO Materials; Publication [online]. Jan. 11, 2002 [retrieved Feb. 19, 2020]. Retrieved from the Internet: <URL: https://www.azom.com/article.aspx?Article1D=1179>.
Hartley, Richard , et al. , "Multiple View Geometry in Computer Vision", Cambridge University Press, 2003, pp. 1-673.
Jacob, Robert J.K. , "Eye Tracking in Advanced Interface Design", Human-Computer Interaction Lab, Naval Research Laboratory, Washington, D.C., date unknown. 2003, pp. 1-50.
Lee , et al. , "Self-Attention Graph Pooling", Cornell University Library/Computer Science/Machine Learning, Apr. 17, 2019 [retrieved on Jan. 8, 2021 from the Internet< URL: https://arxiv.org/abs/1904.08082 >, entire document.
Lee, Juho , et al. , "Set transformer: A frame-work for attention-based permutation-invariant neural networks", ICML, arXiv:1810.00825v3 [cs.LG] May 26, 2019, (17 pages).
Leordeanu, Marius , et al. , "A spectral technique for correspondence problems using pairwise constraints", Proceedings of (ICCV) International Conference on Computer Vision, vol. 2, pp. 1482-1489, Oct. 2005, (8 pages).
Levola, T., "Diffractive Optics for Virtual Reality Displays", Journal of the SID Eurodisplay 14/05, 2005, XP008093627, chapters 2-3, Figures 2 and 10, pp. 467-475.
Levola, Tapani, "Invited Paper: Novel Diffractive Optical Components for Near to Eye Displays—Nokia Research Center", SID 2006 Digest, 2006 SID International Symposium, Society for Information Display, vol. XXXVII, May 24, 2005, chapters 1-3, figures 1 and 3, pp. 64-67.
Li, Yujia , et al. , "Graph Matching Networks for Learning the Similarity of Graph Structured Objects", arxiv.org, Cornell University Library, 201 Olin Library Cornell University Ithaca, NY 14853, XP081268608.
Li, Yujia , et al. , "Graph matching networks for learning the similarity of graph structured objects", ICML, arXiv:1904.12787v2 [cs.LG] May 12, 2019, (18 pages).
Li, Zhengqi , et al. , "Megadepth: Learning single-view depth prediction from internet photos", In CVPR, fromarXiv: 1804.00607v4 [cs.CV] Nov. 28, 2018, (10 pages).
Libovicky , et al. , "Input Combination Strategies for Multi-Source Transformer Decoder", Proceedings of the Third Conference on Machine Translation (WMT). vol. 1: Research Papers, Belgium, Brussels, Oct. 31-Nov. 1, 2018; retrieved on Jan. 8, 2021 (Jan. 8, 2021 ) from < URL: https://doi.org/10.18653/v1/W18-64026 >, entire document.
Loiola, Eliane Maria, et al. , "A survey for the quadratic assignment problem", European journal of operational research, 176(2): 2007, pp. 657-690.
Lowe, David G , "Distinctive image features from scale-invariant keypoints", International Journal of Computer Vision, 60(2): 91-110, 2004, (28 pages).
Luo, Zixin , et al. , "ContextDesc: Local descriptor augmentation with cross-modality context", CVPR, arXiv:1904.04084v1 [cs.CV] Apr. 8, 2019, (14 pages).
Luo, Zixin , et al. , "ContextDesc: Local Descriptor Augmentation With Cross-Modality Context", 2019 IEEE/CVF Conference on

(56) References Cited

OTHER PUBLICATIONS

Computer Vision and Pattern Recognition (CVPR), IEEE, XP033686823, DOI: 10.1109/CVPR.2019.00263 [retrieved on Jan. 8, 2020], pp. 2522-2531.
Memon, F. , et al. , "Synthesis, Characterization and Optical Constants of Silicon Oxycarbide", EPJ Web of Conferences; Publication [online). Mar. 23, 2017 [retrieved Feb. 19, 2020) .<URL: https://www.epj-conferences.org/articles/epjconf/pdf/2017/08/epjconf_nanop2017 _00002.pdf>; DOI: 10.1051/epjconf/201713900002, (8 pages).
Molchanov, Pavlo , et al. , "Short-range FMCW monopulse radar for hand-gesture sensing", 2015 IEEE Radar Conference (RadarCon) (2015), pp. 1491-1496.
Mrad , et al. , "A framework for System Level Low Power Design Space Exploration", 1991.
Munkres, James, "Algorithms for the assignment and transportation problems", Journal of the Society for Industrial and Applied Mathematics, 5(1): 1957, pp. 32-38.
Ono, Yuki , et al. , "LF-Net: Learning local features from images", 32nd Conference on Neural Information Processing Systems (NIPS 2018), arXiv:1805.09662v2 [cs.CV] Nov. 22, 2018, (13 pages).
Paszke, Adam , et al. , "Automatic differentiation in Pytorch", 31st Conference on Neural Information Processing Systems (NIPS 2017), Long Beach, CA, USA, (4 pages).
Peyré, Gabriel , et al. , "Computational Optimal Transport", Foundations and Trends in Machine Learning, 11(5-6):355-607, 2019; arXiv:1803.00567v4 [stat.ML] Mar. 18, 2020, (209 pages).
Qi, Charles Ruizhongtai, et al. , "Pointnet++: Deep hierarchical feature learning on point sets in a metric space.", 31st Conference on Neural Information Processing Systems (NIPS 2017), Long Beach, CA, USA., Jun. 7, 2017, (10 pages).
Qi, Charles R , et al. , "Pointnet: Deep Learning on Point Sets for 3D Classification and Segmentation", CVPR, arXiv:1612.00593v2 [cs.CV] Apr. 10, 2017, (19 pages).
Radenović, Filip , et al. , "Revisiting Oxford and Paris: Large-Scale Image Retrieval Benchmarking", CVPR, arXiv:1803.11285v1 [cs.CV] Mar. 29, 2018, (10 pages).
Raguram, Rahul , et al. , "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I, (15 pages).
Ranftl, René , et al. , "Deep fundamental matrix estimation", European Conference on Computer Vision (ECCV), 2018, (17 pages).
Revaud, Jerome , et al. , "R2D2: Repeatable and Reliable Detector and Descriptor", In NeurIPS, arXiv:1906.06195v2 [cs.CV] Jun. 17, 2019, (12 pages).
Rocco, Ignacio , et al. , "Neighbourhood Consensus Networks", 32nd Conference on Neural Information Processing Systems (NeurIPS 2018), Montreal, Canada, arXiv:1810.10510v2 [cs.CV] Nov. 29, 2018, (20 pages).
Rublee, Ethan , et al. , "ORB: An efficient alternative to SIFT or SURF", Proceedings of the IEEE International Conference on Computer Vision. 2564-2571. 2011; 10.1109/ICCV.2011.612654, (9 pages).
Sarlin , et al. , "SuperGlue: Learning Feature Matching with Graph Neural Networks", Cornell University Library/Computer Science/Computer Vision and Pattern Recognition, Nov. 26, 2019 [retrieved on Jan. 8, 2021 from the Internet< URL: https://arxiv.org/abs/1911.11763 >, entire document.
Sattler, Torsten , et al. , "SCRAMSAC: Improving RANSAC's efficiency with a spatial consistency filter", ICCV, 2009: 2090-2097., (8 pages).
Schonberger, Johannes Lutz, et al. , "Pixelwise view selection for un-structured multi-view stereo", Computer Vision—ECCV 2016: 14th European Conference, Amsterdam, the Netherlands, Oct. 11-14, 2016, Proceedings, Part III, pp. 501-518, 2016.
Schonberger, Johannes Lutz, et al. , "Structure-from-motion revisited", Proceedings of the IEEE Conference on Computer Vision and Pattern Recognition (CVPR), 2016, pp. 4104-4113, (11 pages).
Sheng, Liu , et al. , "Time-multiplexed dual-focal plane head-mounted display with a liquid lens", Optics Letters, Optical Society of Amer i ca, US, vol. 34, No. 11, Jun. 1, 2009 (Jun. 1, 2009), XP001524475, ISSN: 0146-9592, pp. 1642-1644.
Sinkhorn, Richard , et al. , "Concerning nonnegative matrices and doubly stochastic matrices.", Pacific Journal of Mathematics, 1967, pp. 343-348.
Spencer, T. , et al. , "Decomposition of poly(propylene carbonate) with UV sensitive iodonium 11 salts", Polymer Degradation and Stability; (online]. Dec. 24, 2010 (retrieved Feb. 19, 2020]., (17 pages).
Tanriverdi, Vildan , et al. , "Interacting With Eye Movements in Virtual Environments", Department of Electrical Engineering and Computer Science, Tufts University; Proceedings of the SIGCHI conference on Human Factors in Computing Systems, Apr. 2000, pp. 1-8.
Thomee, Bart , et al. , "YFCC100m: The new data in multimedia research", Communications of the ACM, 59(2):64-73, 2016; arXiv:1503.01817v2 [cs.MM] Apr. 25, 2016, (8 pages).
Torresani, Lorenzo , et al. , "Feature correspondence via graph matching: Models and global optimization", Computer Vision—ECCV 2008, 10th European Conference on Computer Vision, Marseille, France, Oct. 12-18, 2008, Proceedings, Part II, (15 pages).
Tuytelaars, Tinne , et al. , "Wide baseline stereo matching based on local, affinely invariant regions", BMVC, 2000, pp. 1-14.
Ulyanov, Dmitry , et al. , "Instance normalization: The missing ingredient for fast stylization", arXiv:1607.08022v3 [cs.CV] Nov. 6, 2017, (6 pages).
Vaswani, Ashish , et al. , "Attention is all you need", 31st Conference on Neural Information Processing Systems (NIPS 2017), Long Beach, CA, USA; arXiv:1706.03762v5 [cs.CL] Dec. 6, 2017, (15 pages).
Veličković, Petar , et al. , "Graph attention networks", ICLR, arXiv:1710.10903v3 [stat.ML] Feb. 4, 2018, (12 pages).
Mllani, Cédric, "Optimal transport: old and new", vol. 338. Springer Science & Business Media, Jun. 2008, pp. 1-998.
Wang, Xiaolong , et al. , "Non-local neural networks", CVPR, arXiv:1711.07971v3 [cs.CV] Apr. 13, 2018, (10 pages).
Wang, Yue , et al. , "Deep Closest Point: Learning representations for point cloud registration", ICCV, arXiv:1905.03304v1 [cs.CV] May 8, 2019, (10 pages).
Wang, Yue , et al. , "Dynamic Graph CNN for learning on point clouds", ACM Transactions on Graphics, arXiv:1801.07829v2 [cs.CV] Jun. 11, 2019, (13 pages).
Weissel , et al. , "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/10.1145/581630.581668>.
Yi, Kwang Moo, et al. , "Learning to find good correspondences", CVPR, arXiv:1711.05971v2 [cs.CV] May 21, 2018, (13 pages).
Yi, Kwang Moo , et al. , "Lift: Learned invariant feature transform", ECCV, arXiv:1603.09114v2 [cs.CV] Jul. 29, 2016, (16 pages).
Zaheer, Manzil , et al. , "Deep Sets", 31st Conference on Neural Information Processing Systems (NIPS 2017), Long Beach, CA, USA; arXiv:1703.06114v3 [cs.LG] Apr. 14, 2018, (29 pages).
Zhang, Jiahui , et al. , "Learning two-view correspondences and geometry using order-aware network", ICCV; aarXiv:1908.04964v1 [cs.CV] Aug. 14, 2019, (11 pages).
Zhang, Li , et al. , "Dual graph convolutional net-work for semantic segmentation", BMVC, 2019; arXiv:1909.06121v3 [cs.CV] Aug. 26, 2020, (18 pages).
Zhang, Zen , et al. , "Deep Graphical Feature Learning for the Feature Matching Problem", 2019 IEEE/CVF International Conference on Computer Vision (ICCV), IEEE, XP033723985, DOI: 10.1109/ICCV.2019.00519 [retrieved on Feb. 24, 2020], pp. 5086-5095.

(56) References Cited

OTHER PUBLICATIONS

"Communication Pursuant to Article 94(3) EPC mailed on Feb. 28, 2023", European Patent Application No. 19845418.3, (6 Pages).
"Communication Pursuant to Article 94(3) EPC mailed on Jul. 28, 2023", European Patent Application No. 19843487.0, (15 pages).
"Communication Pursuant to Article 94(3) EPC mailed on May 23, 2023", European Patent Application No. 18890390.0, (5 pages).
"Communication Pursuant to Article 94(3) EPC mailed on Oct. 6, 2023", European Patent Application No. 19851373.1, (6 pages).
"Communication Pursuant to Rule 164(1) EPC mailed on Feb. 23, 2022", European Patent Application No. 20753144.3, (11 pages).
"Final Office Action mailed Oct. 16, 2023", U.S. Appl. No. 17/098,043, (7 pages).
"Final Office Action mailed on Dec. 1, 2023", U.S. Appl. No. 17/357,795, (18 pages).
"Final Office Action mailed on Sep. 8, 2023 with English translation", Japanese Patent Application No. 2020-566620, (18 pages).
"First Office Action mailed Nov. 2, 2023 with English translation", Chinese Patent Application No. 201980090867.1, (16 pages).
"First Office Action mailed Sep. 29, 2023 with English translation", Japanese Patent Application No. 2023-10887, (5 pages).
"Non Final Office Action mailed on Nov. 22, 2023", U.S. Appl. No. 17/268,376, (8 pages).
"Non Final Office Action mailed on Nov. 3, 2023", U.S. Appl. No. 17/416,248, (17 pages).
"Non Final Office Action mailed on Oct. 11, 2023", U.S. Appl. No. 17/357,795, (14 pages).
"Non Final Office Action mailed on Oct. 24, 2023", U.S. Appl. No. 17/259,020, (21 pages).
"Office Action mailed Nov. 21, 2023 with English Translation", Japanese Patent Application No. 2021-535716, (15 pages).
"Office Action mailed on Nov. 7, 2023 with English translation", Korean Patent Application No. 10-2023-7036734, (5 pages).
"Penultimate Office Action mailed on Oct. 19, 2023 with English translation", Japanese Patent Application No. 2021-509779, (5 pages).
"Second Office Action mailed on Sep. 25, 2023 with English translation", Japanese Patent Application No. 2020-567853, (8 pages).
"Wikipedia Dioptre", Jun. 22, 2018 (Jun. 22, 2018), XP093066995, Retrieved from the Internet: URL:https://en.wikipedia.org/w/index.php? title=Dioptre&direction=next&oldid=846451540 [retrieved on Jul. 25, 2023], (3 pages).
"Extended European Search Report issued on Aug. 6, 2024", European Patent Application No. 24184599.9, (14 pages).
"Extended European Search Report issued on Jul. 9, 2024", European Patent Application No. 24166847.4, (8 pages).
"First Office Action mailed Jun. 20, 2024 with English translation", Japanese Patent Application No. 2021-564496, (14 pages).
"First Office Action mailed Jun. 24, 2024 with English translation", Japanese Patent Application No. 2022-504602, (7 pages).
"Second Office Action with English translation mailed on Jul. 2, 2024", Chinese Patent Application No. 201980032005.3, (15 pages).

* cited by examiner

Receiver with time domain multiplexing

FIG. 20B
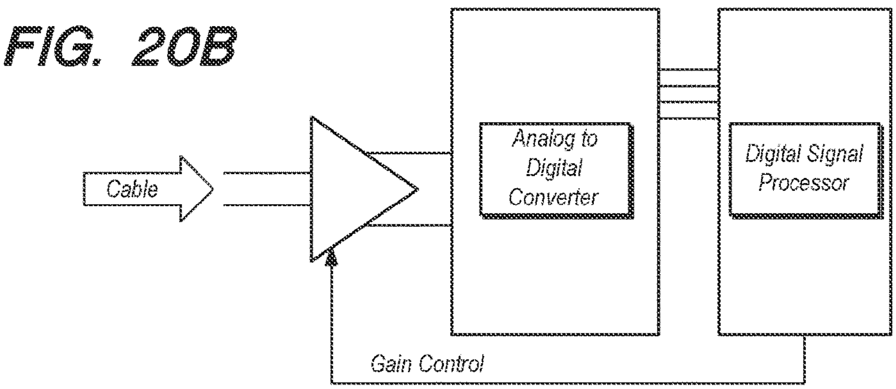
FIG. 20C
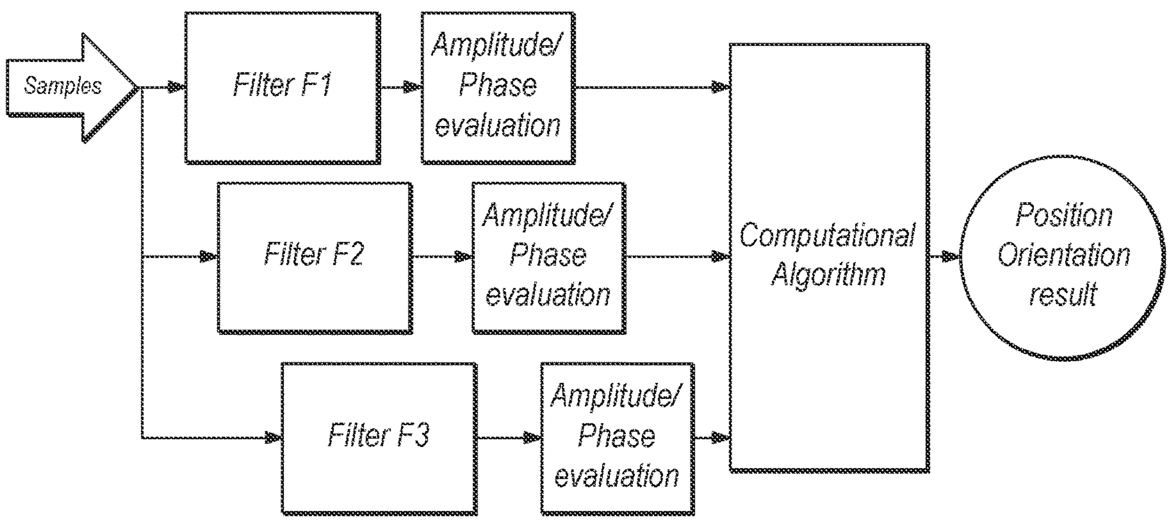
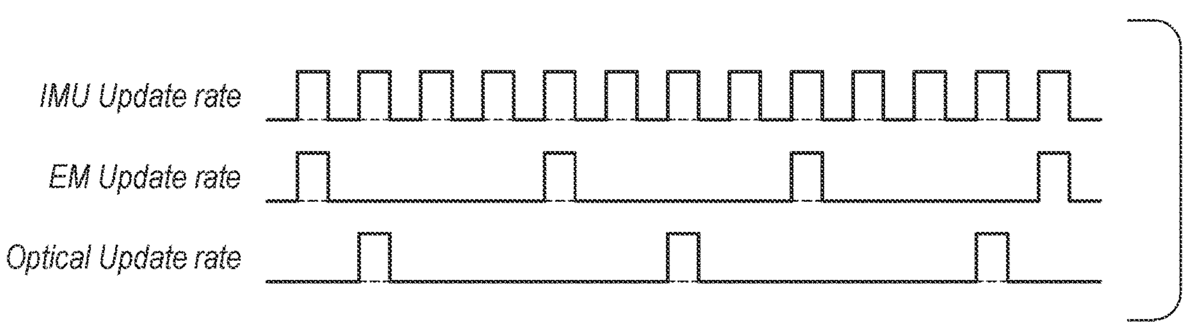
FIG. 21

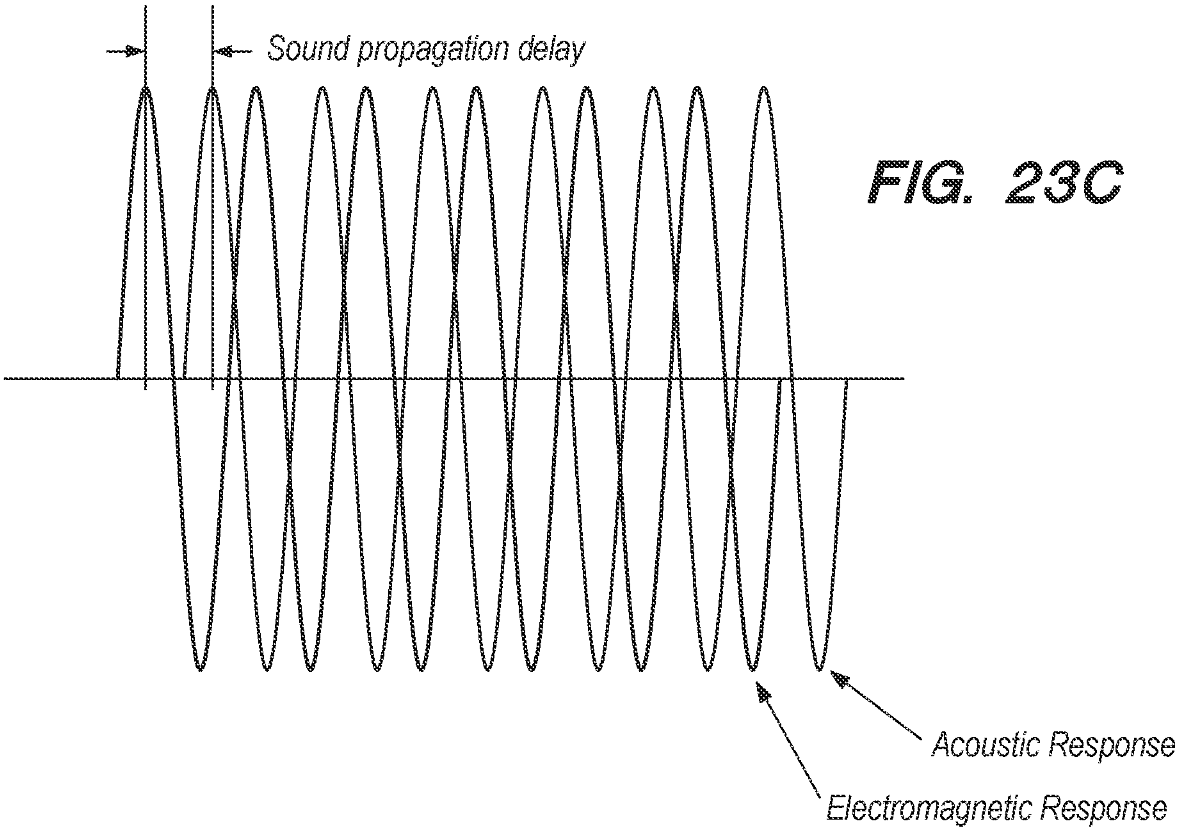
FIG. 23C
FIG. 24A
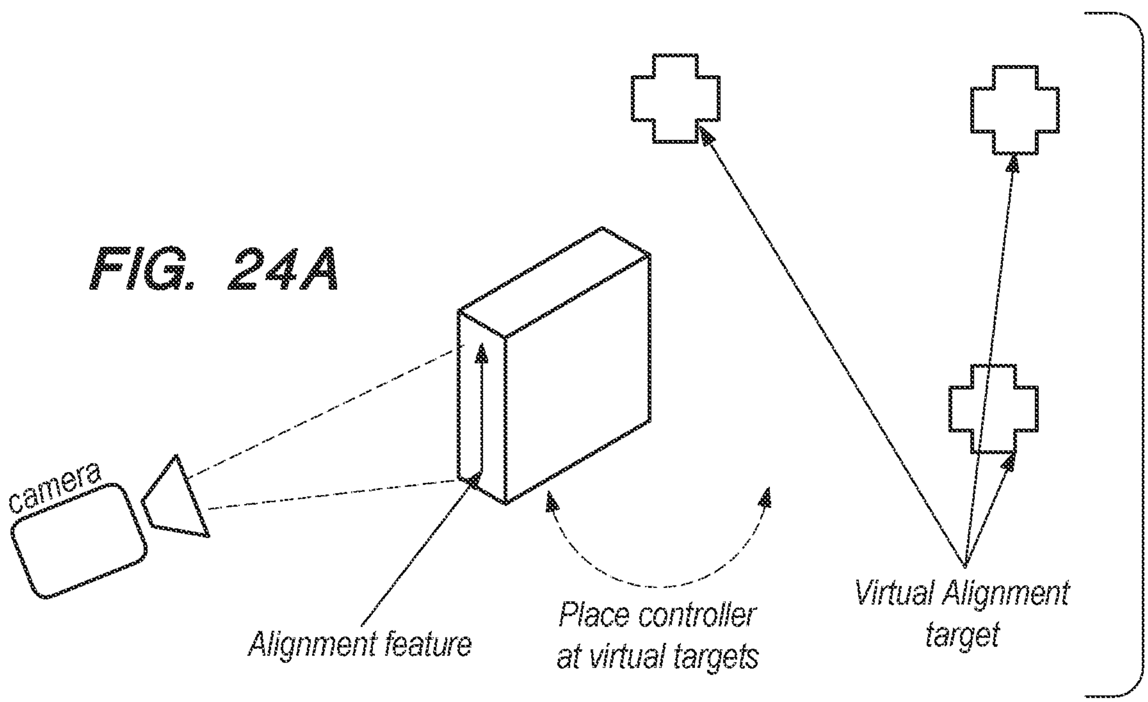

FIG. 24B
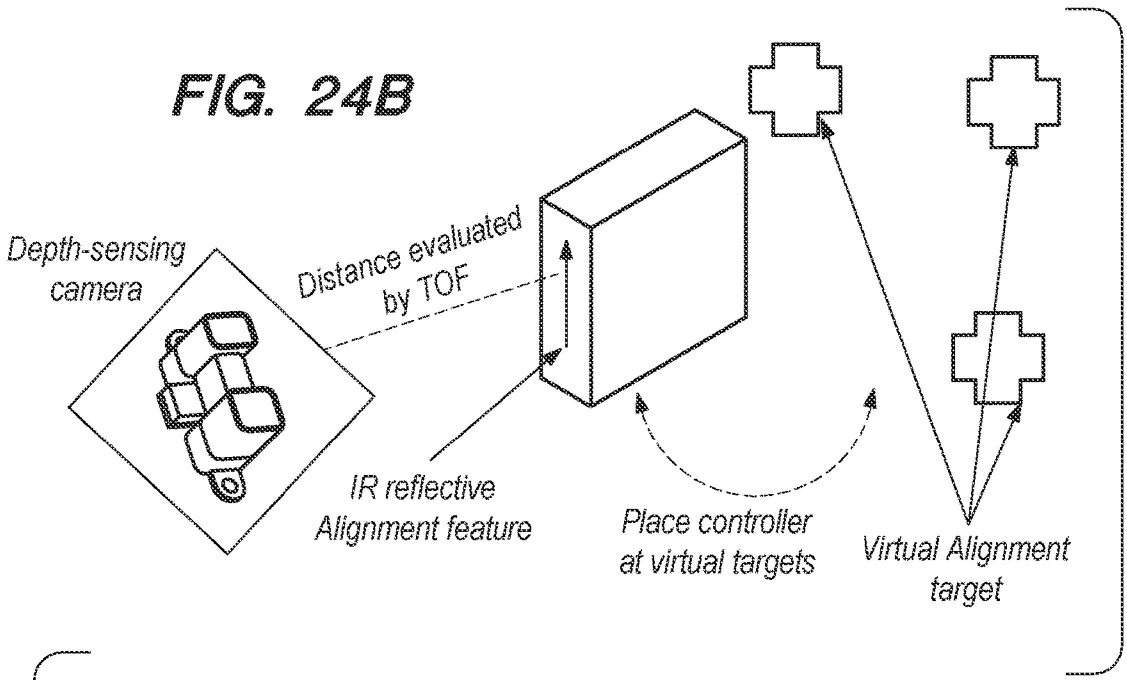
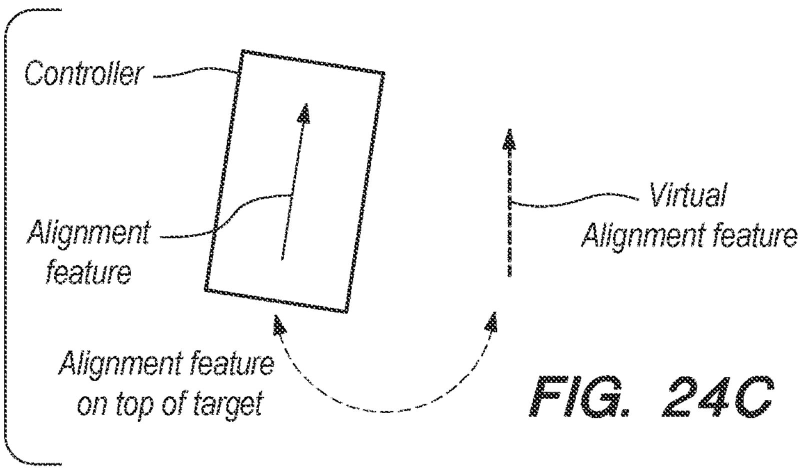
FIG. 24C
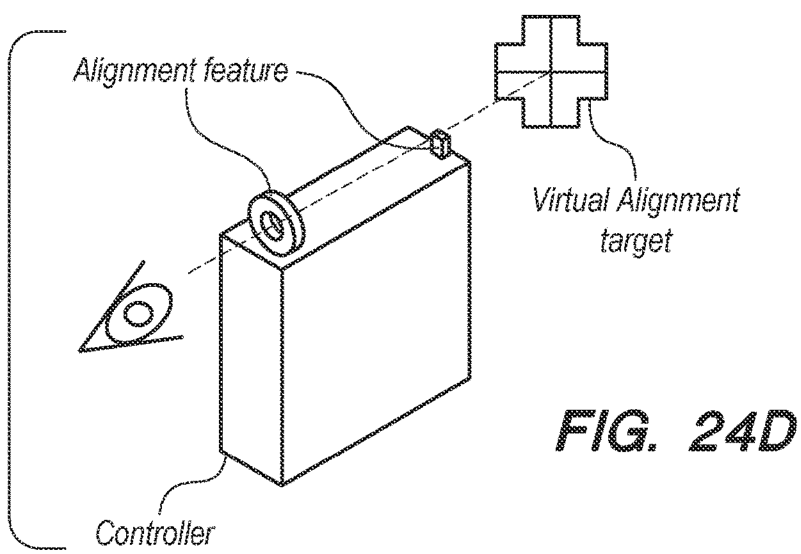
FIG. 24D

SYSTEMS AND METHODS FOR AUGMENTED REALITY

CROSS-REFERENCE TO RELATED APPLICATIONS

This is a continuation of U.S. patent application Ser. No. 17/522,561 filed on Nov. 9, 2021, which is a continuation of U.S. patent application Ser. No. 16/833,093, filed on Mar. 27, 2020 now U.S. Pat. No. 11,210,808, which is a continuation of U.S. patent application Ser. No. 15/859,277, filed on Dec. 29, 2017 now U.S. Pat. No. 10,650,552, which claims the benefit of priority to U.S. Provisional Patent Application No. 62/440,320, filed on Dec. 29, 2016, entitled "Systems and Methods for Augmented Reality," all of which are incorporated herein by reference in their entirety.

FIELD OF THE INVENTION

The present disclosure relates to systems and methods to localize position and orientation of one or more objects in the context of augmented reality systems.

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user.

For example, referring to FIG. 1, an augmented reality scene (4) is depicted wherein a user of an AR technology sees a real-world park-like setting (6) featuring people, trees, buildings in the background, and a concrete platform (1120). In addition to these items, the user of the AR technology also perceives that he "sees" a robot statue (1110) standing upon the real-world platform (1120), and a cartoon-like avatar character (2) flying by which seems to be a personification of a bumble bee, even though these elements (2, 1110) do not exist in the real world. As it turns out, the human visual perception system is very complex, and producing a VR or AR technology that facilitates a comfortable, natural-feeling, rich presentation of virtual image elements amongst other virtual or real-world imagery elements is challenging.

For instance, head-worn AR displays (or helmet-mounted displays, or smart glasses) typically are at least loosely coupled to a user's head, and thus move when the user's head moves. If the user's head motions are detected by the display system, the data being displayed can be updated to take the change in head pose into account.

As an example, if a user wearing a head-worn display views a virtual representation of a three-dimensional (3D) object on the display and walks around the area where the 3D object appears, that 3D object can be re-rendered for each viewpoint, giving the user the perception that he or she is walking around an object that occupies real space. If the head-worn display is used to present multiple objects within a virtual space (for instance, a rich virtual world), measurements of head pose (i.e., the location and orientation of the user's head) can be used to re-render the scene to match the user's dynamically changing head location and orientation and provide an increased sense of immersion in the virtual space.

In AR systems, detection or calculation of head pose can facilitate the display system to render virtual objects such that they appear to occupy a space in the real world in a manner that makes sense to the user. In addition, detection of the position and/or orientation of a real object, such as handheld device (which also may be referred to as a "totem"), haptic device, or other real physical object, in relation to the user's head or AR system may also facilitate the display system in presenting display information to the user to enable the user to interact with certain aspects of the AR system efficiently. As the user's head moves around in the real world, the virtual objects may be re-rendered as a function of head pose, such that the virtual objects appear to remain stable relative to the real world. At least for AR applications, placement of virtual objects in spatial relation to physical objects (e.g., presented to appear spatially proximate a physical object in two- or three-dimensions) may be a non-trivial problem.

For example, head movement may significantly complicate placement of virtual objects in a view of an ambient environment. Such is true whether the view is captured as an image of the ambient environment and then projected or displayed to the end user, or whether the end user perceives the view of the ambient environment directly. For instance, head movement will likely cause a field of view of the end user to change, which will likely require an update to where various virtual objects are displayed in the field of the view of the end user.

Additionally, head movements may occur within a large variety of ranges and speeds. Head movement speed may vary not only between different head movements, but within or across the range of a single head movement. For instance, head movement speed may initially increase (e.g., linearly or not) from a starting point, and may decrease as an ending point is reached, obtaining a maximum speed somewhere between the starting and ending points of the head movement. Rapid head movements may even exceed the ability of the particular display or projection technology to render images that appear uniform and/or as smooth motion to the end user.

Head tracking accuracy and latency (i.e., the elapsed time between when the user moves his or her head and the time when the image gets updated and displayed to the user) have been challenges for VR and AR systems. Especially for display systems that fill a substantial portion of the user's visual field with virtual elements, it is critical that the accuracy of head-tracking is high and that the overall system latency is very low from the first detection of head motion to the updating of the light that is delivered by the display to the user's visual system. If the latency is high, the system can create a mismatch between the user's vestibular and visual sensory systems, and generate a user perception scenario that can lead to motion sickness or simulator sickness. If the system latency is high, the apparent location of virtual objects will appear unstable during rapid head motions.

In addition to head-worn display systems, other display systems can benefit from accurate and low latency head pose detection. These include head-tracked display systems in which the display is not worn on the user's body, but is, e.g., mounted on a wall or other surface. The head-tracked display acts like a window onto a scene, and as a user moves his head relative to the "window" the scene is re-rendered to match the user's changing viewpoint. Other systems include a head-worn projection system, in which a head-worn display projects light onto the real world.

Additionally, in order to provide a realistic augmented reality experience, AR systems may be designed to be interactive with the user. For example, multiple users may play a ball game with a virtual ball and/or other virtual objects. One user may "catch" the virtual ball, and throw the ball back to another user. In another embodiment, a first user may be provided with a totem (e.g., a real bat communicatively coupled to the AR system) to hit the virtual ball. In other embodiments, a virtual user interface may be presented to the AR user to allow the user to select one of many options. The user may use totems, haptic devices, wearable components, or simply touch the virtual screen to interact with the system.

Detecting head pose and orientation of the user, and detecting a physical location of real objects in space enable the AR system to display virtual content in an effective and enjoyable manner. However, although these capabilities are key to an AR system, they are difficult to achieve. In other words, the AR system must recognize a physical location of a real object (e.g., user's head, totem, haptic device, wearable component, user's hand, etc.) and correlate the physical coordinates of the real object to virtual coordinates corresponding to one or more virtual objects being displayed to the user. This requires highly accurate sensors and sensor recognition systems that track a position and orientation of one or more objects at rapid rates. Current approaches do not perform localization at satisfactory speed or precision standards.

There, thus, is a need for a better localization system in the context of AR and VR devices.

SUMMARY

The present invention relates to systems and methods to optimally interpret data input from multiple sensors; in other words, embodiments described herein refine multiple inputs into a common coherent output with less computational resources than to correct a single sensor input.

In some embodiments, data input from a first sensor is updated by a correction data input point from a second sensor. As noisy data is collected, such as by a high frequency IMU, it is periodically updated or adjusted to prevent excessive error or drift from negatively affecting system performance or interpretation of that data.

In some embodiments, a first sensor's inputs are reset to originate from a corrective input point as provided by a lower frequency and more accurate second sensor, such as radar or vision system. These more accurate sensors are operated at lower frequency to preserve computing cycles otherwise necessary to operate them at full capacity, as their input need only be to periodically ground, or update and correct the noisier data the lower frequency operation does not affect system performance.

In some embodiments, noisy data is adjusted by a coefficient value to pre-emptively adjust incoming data points a sensor provides. As a corrective data point is received, the system "steers" the incoming noisy data towards the corrective input point rather than completely adjusting the noisy data to the corrective input point. These embodiments are particularly beneficial when there are large changes in both sensor inputs, as a noisy datastream that steers towards a corrective input will not originate from a corrective input point in the past that is substantially different than a current measurement would indicate. In other words, the noisy datastream will not originate from an obsolete corrective input point.

In some embodiments, pose prediction is made by estimating a future position of a user and accessing features and points expected at that future position. For example, if a user is walking around a square table, features such as corners of the table or lines of objects on the table are "fetched" by the system based on where the system estimates the user will be at a future time. When the user is at that location, an image is collected and the fetched features are projected onto that image to determine a correlation and determine a specific pose. This is beneficial as it avoids feature mapping concurrent with receiving an image and reduces computational cycles by completing pre-processing of the fetched features (such as warping) prior to the image being received, so that when the image of current pose is collected the points can be more quickly applied and estimated pose is refined rather than generated, allowing virtual content to either render at that new pose more quickly or with less jitter.

Additional embodiments, advantages, and details are described in greater detail below with specific reference to the following figures as appropriate.

BRIEF DESCRIPTION OF THE DRAWINGS

FIGS. 20A-20C illustrate various summing amplifier configurations as between multiple subsystems.

FIG. 21 illustrates signal overlap of multiple inputs with various signal frequencies.

FIGS. 23A-23C illustrate recalibration of sensors with a given known input according to some embodiments.

FIGS. 24A-24D illustrate determining a variable in a calibration protocol according to some embodiments.

DETAILED DESCRIPTION

Referring to FIGS. 2A-2D, some general componentry options are illustrated. In the portions of the detailed description which follow the discussion of FIGS. 2A-2D, various systems, subsystems, and components are presented for addressing the objectives of providing a high-quality, comfortably-perceived display system for human VR and/or AR.

Figure 2A:
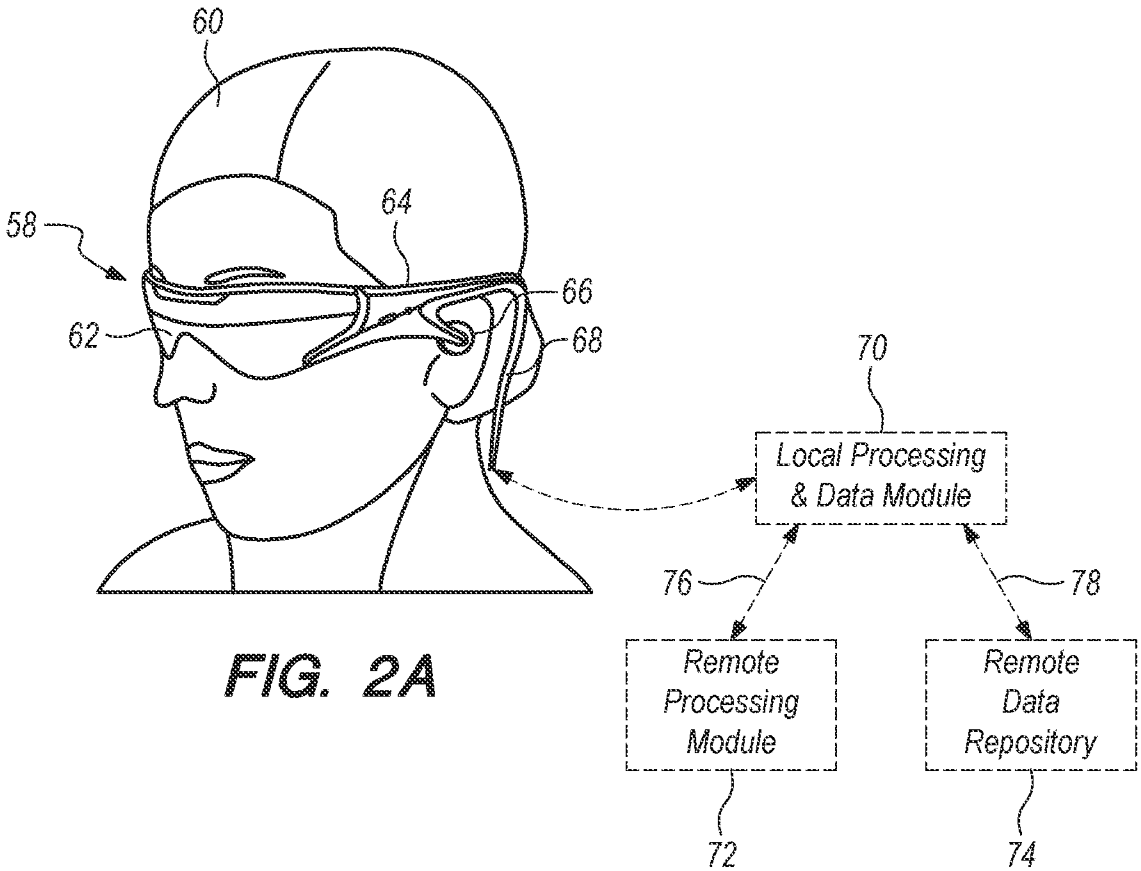
FIGS. 2A-2D illustrates various configurations of components comprising a visual display system according to some embodiments.
Figure 2B:
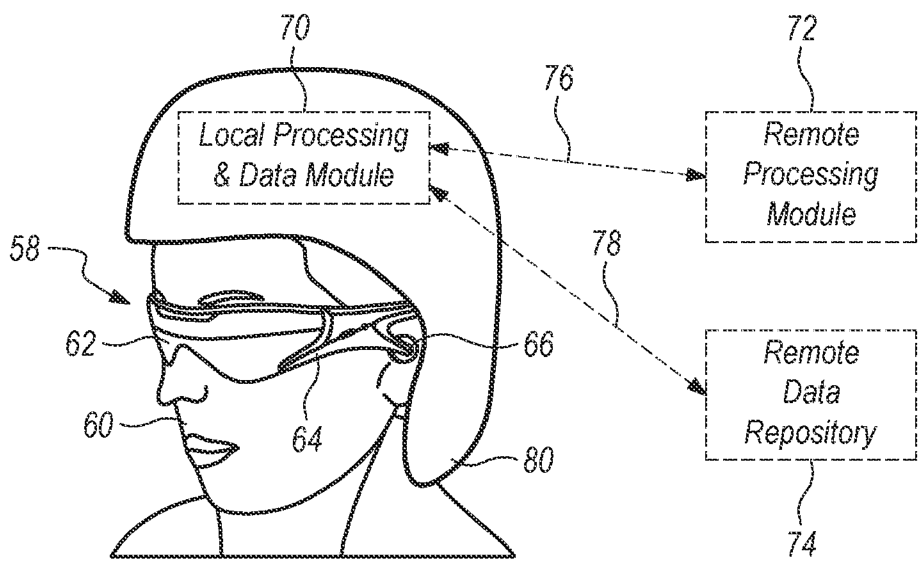
Figure 2C:
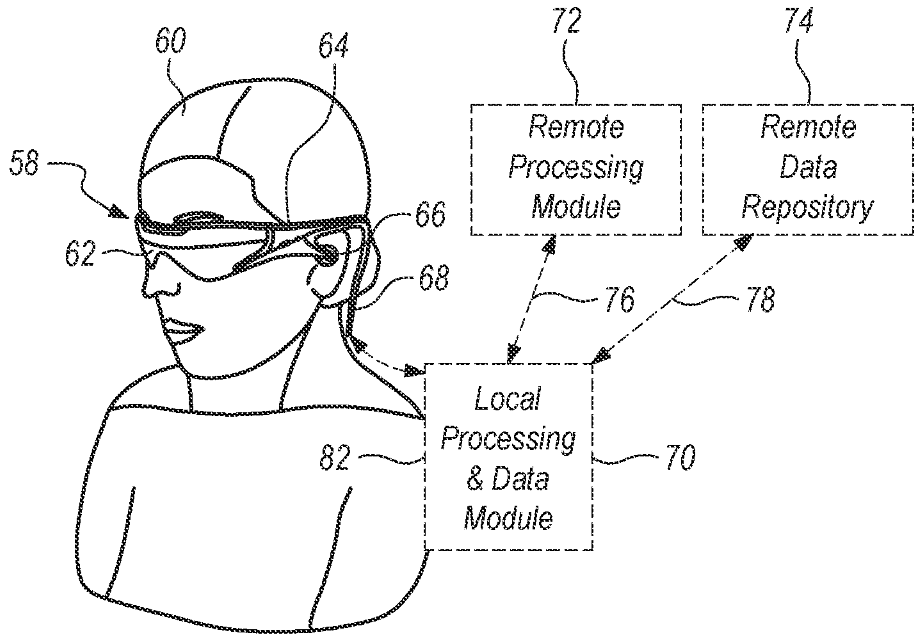
Figure 2D:
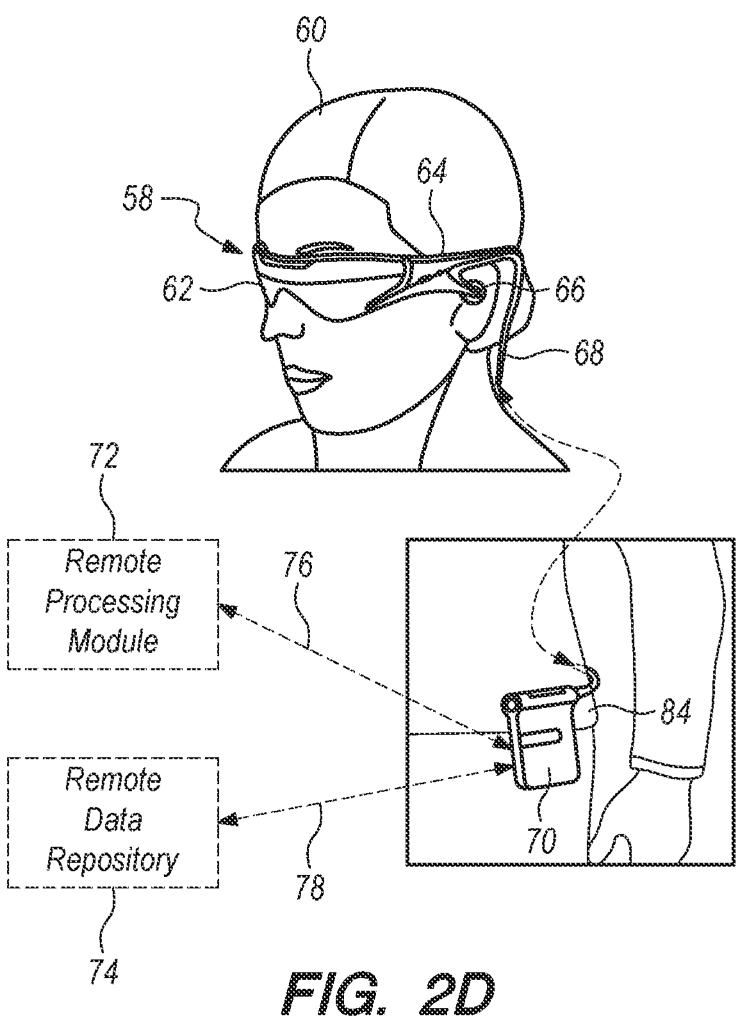

As shown in FIG. 2A, an AR system user (60) is depicted wearing head mounted component (58) featuring a frame (64) structure coupled to a display system (62) positioned in front of the eyes of the user. A speaker (66) is coupled to the frame (64) in the depicted configuration and positioned adjacent the ear canal of the user (in one embodiment, another speaker, not shown, is positioned adjacent the other ear canal of the user to provide for stereo/shapeable sound control). The display (62) is operatively coupled (68), such as by a wired lead or wireless connectivity, to a local processing and data module (70) which may be mounted in a variety of configurations, such as fixedly attached to the frame (64), fixedly attached to a helmet or hat (80) as shown in the embodiment of FIG. 2B, embedded in headphones, removably attached to the torso (82) of the user (60) in a backpack-style configuration as shown in the embodiment of FIG. 2C, or removably attached to the hip (84) of the user (60) in a belt-coupling style configuration as shown in the embodiment of FIG. 2D.

The local processing and data module (70) may comprise a power-efficient processor or controller, as well as digital memory, such as flash memory, both of which may be utilized to assist in the processing, caching, and storage of data a) captured from sensors which may be operatively coupled to the frame (64), such as image capture devices (such as cameras), microphones, inertial measurement units, accelerometers, compasses, GPS units, radio devices, and/or gyros; and/or b) acquired and/or processed using the remote processing module (72) and/or remote data repository (74), possibly for passage to the display (62) after such processing or retrieval.

The local processing and data module (70) may be operatively coupled (76, 78), such as via a wired or wireless communication links, to the remote processing module (72) and remote data repository (74) such that these remote modules (72, 74) are operatively coupled to each other and available as resources to the local processing and data module (70).

In one embodiment, the remote processing module (72) may comprise one or more relatively powerful processors or controllers configured to analyze and process data and/or image information. In one embodiment, the remote data repository (74) may comprise a relatively large-scale digital data storage facility, which may be available through the internet or other networking configuration in a "cloud" resource configuration. In one embodiment, all data is stored and all computation is performed in the local processing and data module, allowing fully autonomous use from any remote modules.

Figure 3:
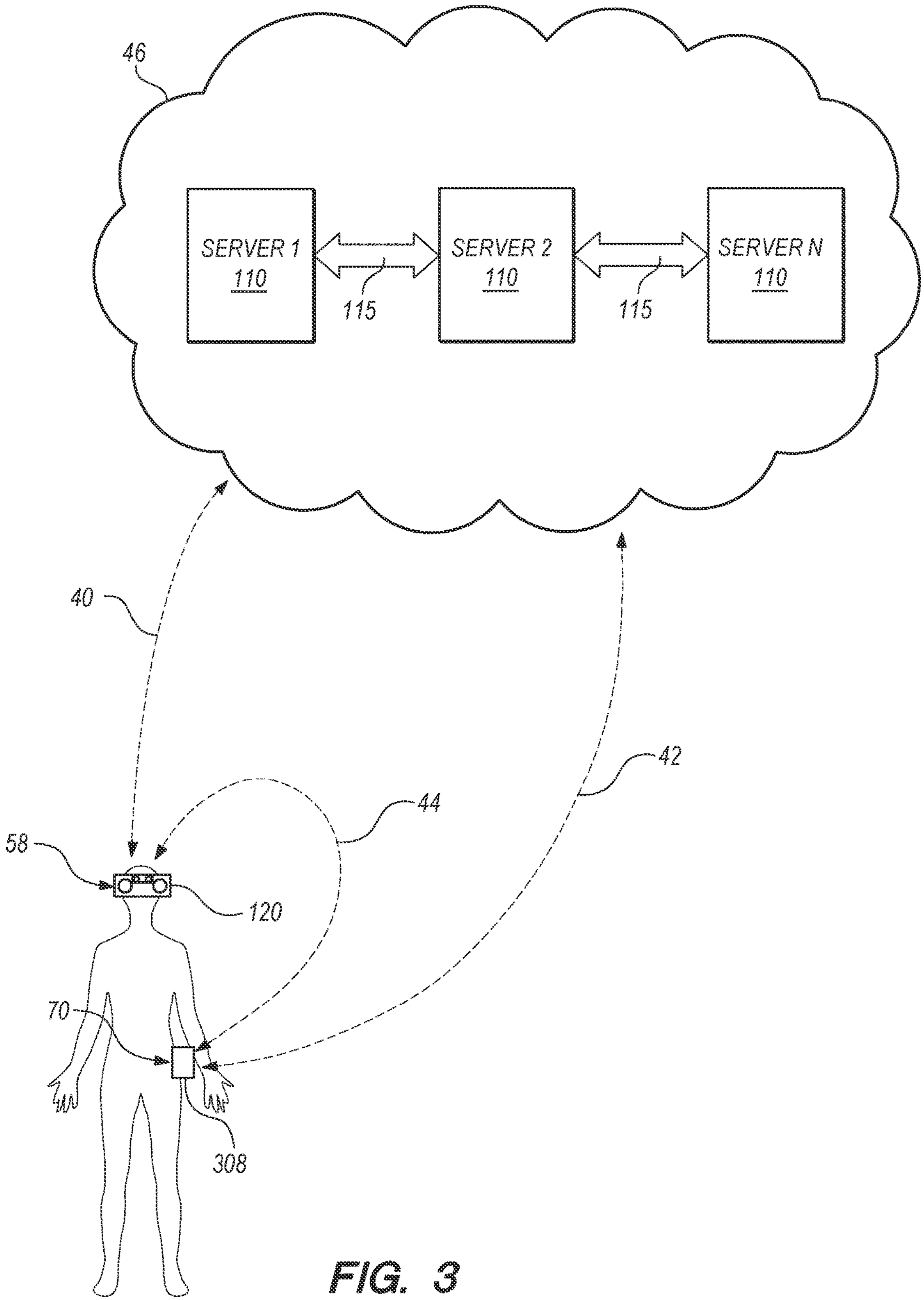
FIG. 3 illustrates remote interaction with cloud computing assets according to some embodiments.

Referring now to FIG. 3, a schematic illustrates coordination between the cloud computing assets (46) and local processing assets, which may, for example reside in head mounted componentry (58) coupled to the user's head (120) and a local processing and data module (70), coupled to the user's belt (308; therefore the component 70 may also be termed a "belt pack" 70), as shown in FIG. 3. In one embodiment, the cloud (46) assets, such as one or more server systems (110) are operatively coupled (115), such as via wired or wireless networking (wireless being preferred for mobility, wired being preferred for certain high-bandwidth or high-data-volume transfers that may be desired), directly to (40, 42) one or both of the local computing assets, such as processor and memory configurations, coupled to the user's head (120) and belt (308) as described above. These computing assets local to the user may be operatively coupled to each other as well, via wired and/or wireless connectivity configurations (44), such as the wired coupling (68) discussed below in reference to FIG. 8. In one embodiment, to maintain a low-inertia and small-size subsystem mounted to the user's head (120), primary transfer between the user and the cloud (46) may be via the link between the subsystem mounted at the belt (308) and the cloud, with the head mounted (120) subsystem primarily data-tethered to the belt-based (308) subsystem using wireless connectivity, such as ultra-wideband ("UWB") connectivity, as is currently employed, for example, in personal computing peripheral connectivity applications.

With efficient local and remote processing coordination, and an appropriate display device for a user, such as the user interface or user display system (62) shown in FIG. 2A, or variations thereof, aspects of one world pertinent to a user's current actual or virtual location may be transferred or "passed" to the user and updated in an efficient fashion. In other words, a map of the world may be continually updated at a storage location which may partially reside on the user's AR system and partially reside in the cloud resources. The map (also referred to as a "passable world model") may be a large database comprising raster imagery, 3-D and 2-D points, parametric information and other information about the real world. As more and more AR users continually capture information about their real environment (e.g., through cameras, sensors, IMUs, etc.), the map becomes more and more accurate and complete.

Figure 1:
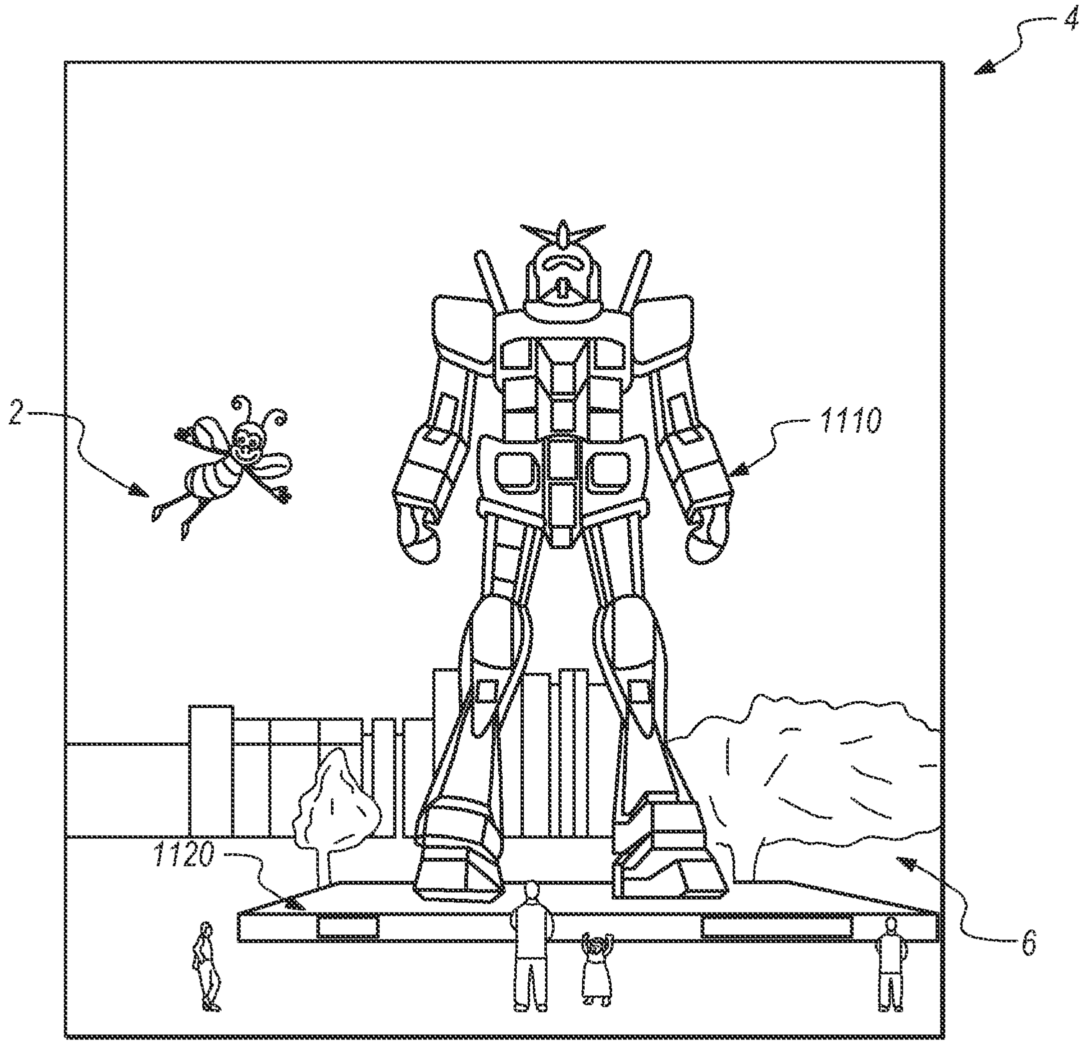
FIG. 1 illustrates an augmented reality scenario with certain virtual reality object according to some embodiments.

With a configuration as described above, wherein there is one world model that can reside on cloud computing resources and be distributed from there, such world can be "passable" to one or more users in a relatively low bandwidth form preferable to trying to pass around real-time video data or the like. The augmented experience of the person standing near the statue (i.e., as shown in FIG. 1) may be informed by the cloud-based world model, a subset of which may be passed down to them and their local display device to complete the view. A person sitting at a remote display device, which may be as simple as a personal computer sitting on a desk, can efficiently download that same section of information from the cloud and have it rendered on their display. Indeed, one person actually present in the park near the statue may take a remotely-located friend for a walk in that park, with the friend joining through virtual and augmented reality. The system will need to know where the street is, wherein the trees are, where the statue is—but with that information on the cloud, the joining friend can download from the cloud aspects of the scenario, and then start walking along as an augmented reality local relative to the person who is actually in the park.

3-D points may be captured from the environment, and the pose (i.e., vector and/or origin position information relative to the world) of the cameras that capture those images or points may be determined, so that these points or images may be "tagged", or associated, with this pose information. Then points captured by a second camera may be utilized to determine the pose of the second camera. In other words, one can orient and/or localize a second camera based upon comparisons with tagged images from a first camera. Then this knowledge may be utilized to extract textures, make maps, and create a virtual copy of the real world (because then there are two cameras around that are registered).

So at the base level, in one embodiment a person-worn system can be utilized to capture both 3-D points and the 2-D images that produced the points, and these points and images may be sent out to a cloud storage and processing resource. They may also be cached locally with embedded pose information (i.e., cache the tagged images); so the cloud may have on the ready (i.e., in available cache) tagged 2-D images (i.e., tagged with a 3-D pose), along with 3-D points. If a user is observing something dynamic, he may also send additional information up to the cloud pertinent to the motion (for example, if looking at another person's face, the user can take a texture map of the face and push that up at an optimized frequency even though the surrounding world is otherwise basically static). More information on object recognizers and the passable world model may be found in U.S. patent application Ser. No. 14/205,126, entitled "System and method for augmented and virtual reality", which is incorporated by reference in its entirety herein, along with the following additional disclosures, which related to augmented and virtual reality systems such as those developed by Magic Leap, Inc. of Fort Lauderdale, Florida; U.S. patent application Ser. No. 14/641,376; U.S. patent application Ser. No. 14/555,585; U.S. patent application Ser. No. 14/212,961; U.S. patent application Ser. No. 14/690,401; U.S. patent application Ser. No. 13/663,466; patent application Ser. No. 13/684,489 and U.S.GPS and other localization information may be utilized as inputs to such processing. Highly accurate localization of the user's head, totems, hand gestures, haptic devices etc. are crucial in displaying appropriate virtual content to the user.

One approach to achieve high precision localization may involve the use of an electromagnetic field coupled with electromagnetic sensors that are strategically placed on the user's AR head set, belt pack, and/or other ancillary devices (e.g., totems, haptic devices, gaming instruments, etc.).

Electromagnetic tracking systems typically comprise at least an electromagnetic field emitter and at least one electromagnetic field sensor. The sensors may measure electromagnetic fields with a known distribution. Based on these measurements a position and orientation of a field sensor relative to the emitter is determined.

Figure 4:
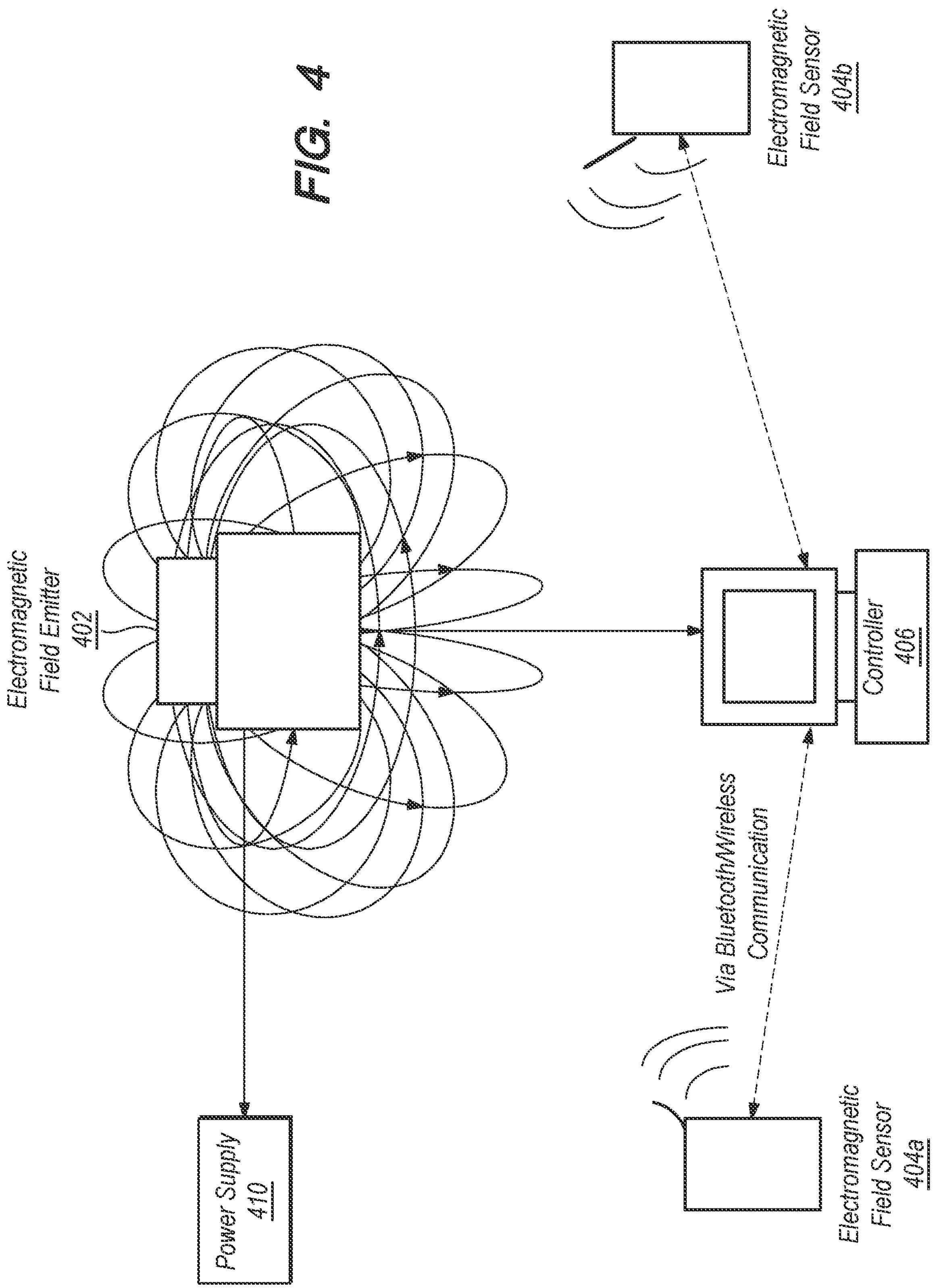
FIG. 4 illustrates an electromagnetic tracking system according to some embodiments.

Referring now to FIG. 4, an example system diagram of an electromagnetic tracking system (e.g., such as those developed by organizations such as the Biosense® division of Johnson & Johnson Corporation, Polhemus®, Inc. of Colchester, Vermont, manufactured by Sixense® Entertainment, Inc. of Los Gatos, California, and other tracking companies) is illustrated. In one or more embodiments, the electromagnetic tracking system comprises an electromagnetic field emitter 402 which is configured to emit a known magnetic field. As shown in FIG. 4, the electromagnetic field emitter may be coupled to a power supply 410 (e.g., electric current, batteries, etc.) to provide power to the emitter 402.

In one or more embodiments, the electromagnetic field emitter 402 comprises several coils (e.g., at least three coils positioned perpendicular to each other to produce field in the x, y and z directions) that generate magnetic fields. This magnetic field is used to establish a coordinate space. This allows the system to map a position of the sensors in relation to the known magnetic field, and helps determine a position and/or orientation of the sensors. In one or more embodiments, the electromagnetic sensors 404*a*, 404*b*, etc. may be attached to one or more real objects. The electromagnetic sensors 404 may comprise smaller coils in which current may be induced through the emitted electromagnetic field.

Generally the "sensor" components (404) may comprise small coils or loops, such as a set of three differently-oriented (i.e., such as orthogonally oriented relative to each other) coils coupled together within a small structure such as a cube or other container, that are positioned/oriented to capture incoming magnetic flux from the magnetic field emitted by the emitter (402), and by comparing currents induced through these coils, and knowing the relative positioning and orientation of the coils relative to each other, relative position and orientation of a sensor relative to the emitter may be calculated.

One or more parameters pertaining to a behavior of the coils and inertial measurement unit ("IMU") components operatively coupled to the electromagnetic tracking sensors may be measured to detect a position and/or orientation of the sensor (and the object to which it is attached to) relative to a coordinate system to which the electromagnetic field emitter is coupled. In one or more embodiments, multiple sensors may be used in relation to the electromagnetic emitter to detect a position and orientation of each of the sensors within the coordinate space. The electromagnetic tracking system may provide positions in three directions (i.e., X, Y and Z directions), and further in two or three orientation angles. In one or more embodiments, measurements of the IMU may be compared to the measurements of the coil to determine a position and orientation of the sensors. In one or more embodiments, both electromagnetic (EM) data and IMU data, along with various other sources of data, such as cameras, depth sensors, and other sensors, may be combined to determine the position and orientation. This information may be transmitted (e.g., wireless communication, Bluetooth, etc.) to the controller 406. In one or more embodiments, pose (or position and orientation) may be reported at a relatively high refresh rate in conventional systems.

Figure 6:
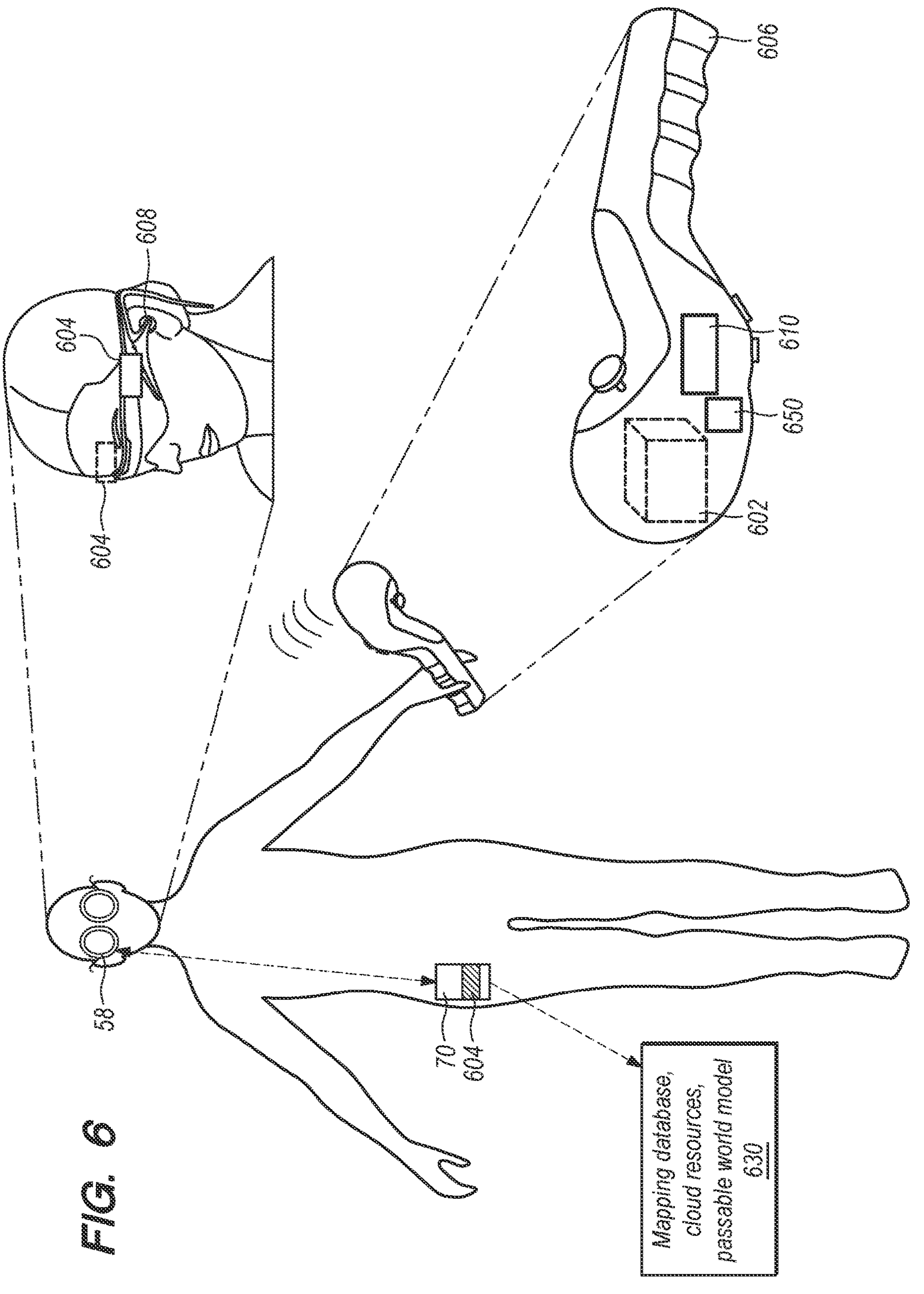
FIG. 6 illustrates an electromagnetic tracking system coupled to a visual display system according to some embodiments.

Conventionally an electromagnetic emitter is coupled to a relatively stable and large object, such as a table, operating table, wall, or ceiling, and one or more sensors are coupled to smaller objects, such as medical devices, handheld gaming components, or the like. Alternatively, as described below in reference to FIG. 6, various features of the electromagnetic tracking system may be employed to produce a configuration wherein changes or deltas in position and/or orientation between two objects that move in space relative to a more stable global coordinate system may be tracked; in other words, a configuration is shown in FIG. 6 wherein a variation of an electromagnetic tracking system may be utilized to track position and orientation delta between a head-mounted component and a hand-held component, while head pose relative to the global coordinate system (say of the room environment local to the user) is determined otherwise, such as by simultaneous localization and mapping ("SLAM") techniques using outward-capturing cameras which may be coupled to the head mounted component of the system.

The controller 406 may control the electromagnetic field generator 402, and may also capture data from the various electromagnetic sensors 404. It should be appreciated that the various components of the system may be coupled to each other through any electro-mechanical or wireless/Bluetooth means. The controller 406 may also comprise data regarding the known magnetic field, and the coordinate space in relation to the magnetic field. This information is then used to detect the position and orientation of the sensors in relation to the coordinate space corresponding to the known electromagnetic field.

One advantage of electromagnetic tracking systems is that they produce highly accurate tracking results with minimal latency and high resolution. Additionally, the electromagnetic tracking system does not necessarily rely on optical trackers, and sensors/objects not in the user's line-of-vision may be easily tracked.

It should be appreciated that the strength of the electromagnetic field v drops as a cubic function of distance r from a coil transmitter (e.g., electromagnetic field emitter 402). Thus, an algorithm may be required based on a distance away from the electromagnetic field emitter. The controller 406 may be configured with such algorithms to determine a position and orientation of the sensor/object at varying distances away from the electromagnetic field emitter.

Given the rapid decline of the strength of the electromagnetic field as one moves farther away from the electromagnetic emitter, best results, in terms of accuracy, efficiency and low latency, may be achieved at closer distances. In typical electromagnetic tracking systems, the electromagnetic field emitter is powered by electric current (e.g., plug-in power supply) and has sensors located within 20 ft radius away from the electromagnetic field emitter. A shorter radius between the sensors and field emitter may be more desirable in many applications, including AR applications.

Figure 5:
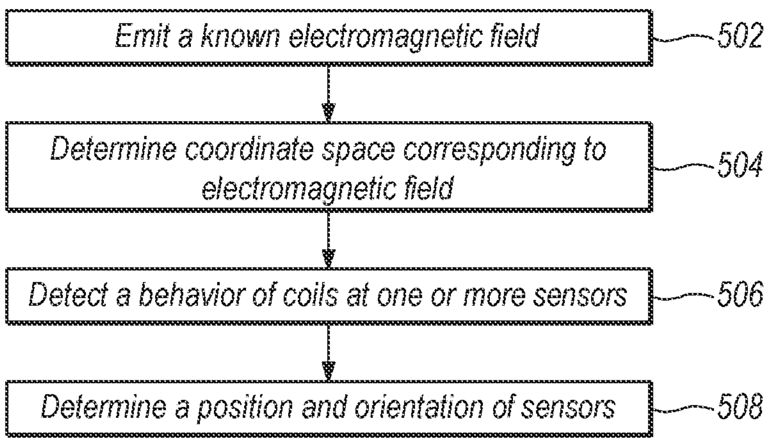
FIG. 5 depicts a method of electromagnetic tracking according to some embodiments.

Referring now to FIG. 5, an example flowchart describing a functioning of a typical electromagnetic tracking system is briefly described. At 502, a known electromagnetic field is emitted. In one or more embodiments, the magnetic field emitter may generate magnetic fields each coil may generate an electric field in one direction (e.g., x, y or z). The magnetic fields may be generated with an arbitrary waveform.

In one or more embodiments, each of the axes may oscillate at a slightly different frequency. At 504, a coordinate space corresponding to the electromagnetic field may be determined. For example, the control 406 of FIG. 4 may automatically determine a coordinate space around the emitter based on the electromagnetic field.

At 506, a behavior of the coils at the sensors (which may be attached to a known object) may be detected. For example, a current induced at the coils may be calculated. In other embodiments, a rotation of coils, or any other quantifiable behavior may be tracked and measured. At 508, this behavior may be used to detect a position and orientation of the sensor(s) and/or known object. For example, the controller 406 may consult a mapping table that correlates a behavior of the coils at the sensors to various positions or orientations. Based on these calculations, the position in the coordinate space along with the orientation of the sensors may be determined.

In the context of AR systems, one or more components of the electromagnetic tracking system may need to be modified to facilitate accurate tracking of mobile components. As described above, tracking the user's head pose and orientation is crucial in many AR applications. Accurate determination of the user's head pose and orientation allows the AR system to display the right virtual content to the user. For example, the virtual scene may comprise a monster hiding behind a real building. Depending on the pose and orientation of the user's head in relation to the building, the view of the virtual monster may need to be modified such that a realistic AR experience is provided. Or, a position and/or orientation of a totem, haptic device or some other means of interacting with a virtual content may be important in enabling the AR user to interact with the AR system. For example, in many gaming applications, the AR system must detect a position and orientation of a real object in relation to virtual content. Or, when displaying a virtual interface, a position of a totem, user's hand, haptic device or any other real object configured for interaction with the AR system must be known in relation to the displayed virtual interface in order for the system to understand a command, etc. Conventional localization methods including optical tracking and other methods are typically plagued with high latency and low resolution problems, which makes rendering virtual content challenging in many augmented reality applications.

In one or more embodiments, the electromagnetic tracking system, discussed in relation to FIGS. 4 and 5 may be adapted to the AR system to detect position and orientation of one or more objects in relation to an emitted electromagnetic field.

Typical electromagnetic systems tend to have a large and bulky electromagnetic emitters (e.g., 402 in FIG. 4), which is problematic for AR devices. However, smaller electromagnetic emitters (e.g., in the millimeter range) may be used to emit a known electromagnetic field in the context of the AR system.

Referring now to FIG. 6, an electromagnetic tracking system may be incorporated with an AR system as shown, with an electromagnetic field emitter 602 incorporated as part of a hand-held controller 606. In one or more embodiments, the hand-held controller may be a totem to be used in a gaming scenario. In other embodiments, the hand-held controller may be a haptic device. In yet other embodiments, the electromagnetic field emitter may simply be incorporated as part of the belt pack 70. The hand-held controller 606 may comprise a battery 610 or other power supply that powers that electromagnetic field emitter 602. It should be appreciated that the electromagnetic field emitter 602 may also comprise or be coupled to an IMU 650 component configured to assist in determining positioning and/or orientation of the electromagnetic field emitter 602 relative to other components. This may be especially important in cases where both the field emitter 602 and the sensors (604) are mobile. Placing the electromagnetic field emitter 602 in the hand-held controller rather than the belt pack, as shown in the embodiment of FIG. 6, ensures that the electromagnetic field emitter is not competing for resources at the belt pack, but rather uses its own battery source at the hand-held controller 606.

In one or more embodiments, the electromagnetic sensors 604 may be placed on one or more locations on the user's headset, along with other sensing devices such as one or more IMUs or additional magnetic flux capturing coils 608. For example, as shown in FIG. 6, sensors (604, 608) may be placed on either side of the head set (58). Since these sensors are engineered to be rather small (and hence may be less sensitive, in some cases), having multiple sensors may improve efficiency and precision.

In one or more embodiments, one or more sensors may also be placed on the belt pack 70 or any other part of the user's body. The sensors (604, 608) may communicate wirelessly or through Bluetooth to a computing apparatus that determines a pose and orientation of the sensors (and the AR headset to which it is attached). In one or more embodiments, the computing apparatus may reside at the belt pack 70. In other embodiments, the computing apparatus may reside at the headset itself, or even the hand-held controller 606. The computing apparatus may in turn comprise a mapping database (e.g., passable world model, coordinate space, etc.) to detect pose, to determine the coordinates of real objects and virtual objects, and may even connect to cloud resources and the passable world model, in one or more embodiments.

As described above, conventional electromagnetic emitters may be too bulky for AR devices. Therefore the electromagnetic field emitter may be engineered to be compact, using smaller coils compared to traditional systems. However, given that the strength of the electromagnetic field decreases as a cubic function of the distance away from the field emitter, a shorter radius between the electromagnetic sensors 604 and the electromagnetic field emitter 602 (e.g., about 3-3.5 ft) may reduce power consumption when compared to conventional systems such as the one detailed in FIG. 4.

This aspect may either be utilized to prolong the life of the battery 610 that may power the controller 606 and the electromagnetic field emitter 602, in one or more embodiments. Or, in other embodiments, this aspect may be utilized to reduce the size of the coils generating the magnetic field at the electromagnetic field emitter 602. However, in order to get the same strength of magnetic field, the power may be need to be increased. This allows for a compact electromagnetic field emitter unit 602 that may fit compactly at the hand-held controller 606.

Several other changes may be made when using the electromagnetic tracking system for AR devices. Although this pose reporting rate is rather good, AR systems may require an even more efficient pose reporting rate. To this end, IMU-based pose tracking may be used in the sensors. Crucially, the IMUs must remain as stable as possible in order to increase an efficiency of the pose detection process. The IMUs may be engineered such that they remain stable up to 50-100 milliseconds. It should be appreciated that some embodiments may utilize an outside pose estimator module (i.e., IMUs may drift over time) that may enable pose updates to be reported at a rate of 10-20 Hz. By keeping the IMUs stable at a reasonable rate, the rate of pose updates may be dramatically decreased to 10-20 Hz (as compared to higher frequencies in conventional systems).

If the electromagnetic tracking system can be run at a 10% duty cycle (e.g., only pinging for ground truth every 100 milliseconds), this would be another way to save power at the AR system. This would mean that the electromagnetic tracking system wakes up every 10 milliseconds out of every 100 milliseconds to generate a pose estimate. This directly translates to power consumption savings, which may, in turn, affect size, battery life and cost of the AR device.

In one or more embodiments, this reduction in duty cycle may be strategically utilized by providing two hand-held controllers (not shown) rather than just one. For example, the user may be playing a game that requires two totems, etc. Or, in a multi-user game, two users may have their own totems/hand-held controllers to play the game. When two controllers (e.g., symmetrical controllers for each hand) are used rather than one, the controllers may operate at offset duty cycles. The same concept may also be applied to controllers utilized by two different users playing a multi-player game, for example.

Figure 7:
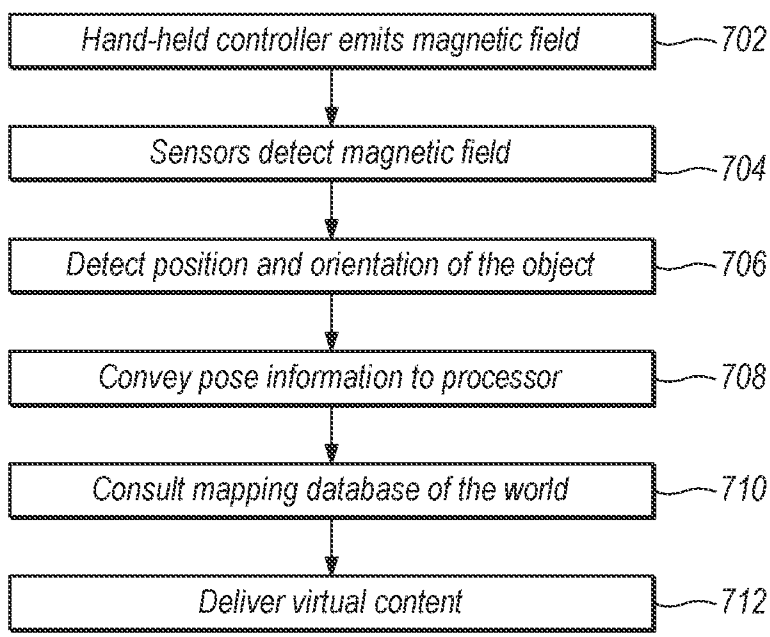
FIG. 7 depicts a method of determining metrics of a visual display system coupled to an electromagnetic emitter according to some embodiments.

Referring now to FIG. 7, an example flow chart describing the electromagnetic tracking system in the context of AR devices is described. At 702, the hand-held controller emits a magnetic field. At 704, the electromagnetic sensors (placed on headset, belt pack, etc.) detect the magnetic field. At 706, a position and orientation of the headset/belt is determined based on a behavior of the coils/IMUs at the sensors. At 708, the pose information is conveyed to the computing apparatus (e.g., at the belt pack or headset). At 710, optionally, a mapping database (e.g., passable world model) may be consulted to correlate the real world coordinates with the virtual world coordinates. At 712, virtual content may be delivered to the user at the AR headset. It should be appreciated that the flowchart described above is for illustrative purposes only, and should not be read as limiting.

Advantageously, using an electromagnetic tracking system similar to the one outlined in FIG. 6 enables pose tracking (e.g., head position and orientation, position and orientation of totems, and other controllers). This allows the AR system to project virtual content with a higher degree of accuracy, and very low latency when compared to optical tracking techniques.

Figure 8:
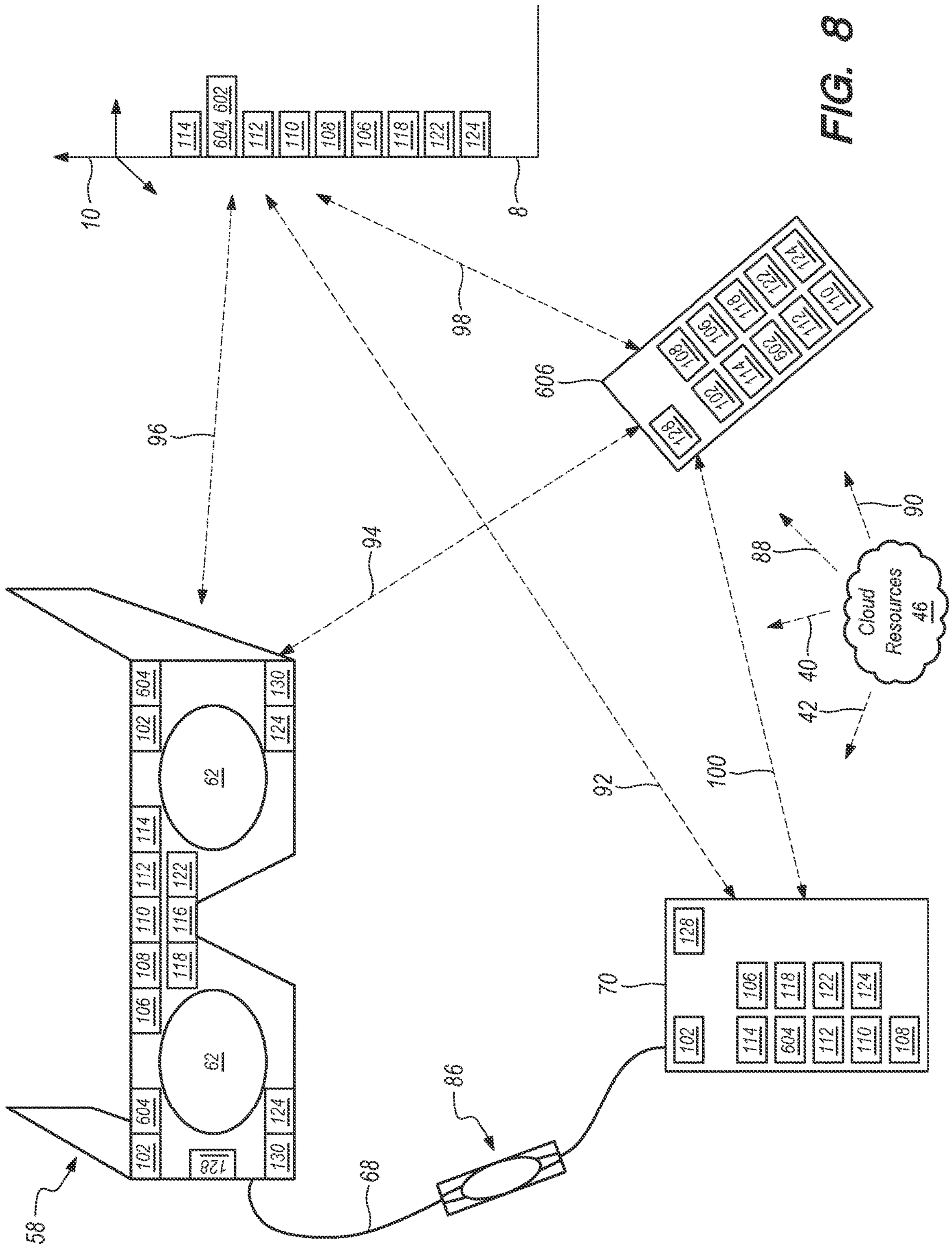
FIG. 8 illustrates a visual display system comprising various sensing components and accessories according to some embodiments.

Referring to FIG. 8, a system configuration is illustrated wherein featuring many sensing components. A head mounted wearable component (58) is shown operatively coupled (68) to a local processing and data module (70), such as a belt pack, here using a physical multicore lead which also features a control and quick release module (86) as described below in reference to FIGS. 9A-9F. The local processing and data module (70) is operatively coupled (100) to a hand held component (606), here by a wireless connection such as low power Bluetooth; the hand held component (606) may also be operatively coupled (94) directly to the head mounted wearable component (58), such as by a wireless connection such as low power Bluetooth. Generally where IMU data is passed to coordinate pose detection of various components, a high-frequency connection is desirable, such as in the range of hundreds or thousands of cycles/second or higher; tens of cycles per second may be adequate for electromagnetic localization sensing, such as by the sensor (604) and transmitter (602) pairings. Also shown is a global coordinate system (10), representative of fixed objects in the real world around the user, such as a wall (8). Cloud resources (46) also may be operatively coupled (42, 40, 88, 90) to the local processing and data module (70), to the head mounted wearable component (58), to resources which may be coupled to the wall (8) or other item fixed relative to the global coordinate system (10), respectively. The resources coupled to the wall (8) or having known positions and/or orientations relative to the global coordinate system (10) may include a WiFi transceiver (114), an electromagnetic emitter (602) and/or receiver (604), a beacon or reflector (112) configured to emit or reflect a given type of radiation, such as an infrared LED beacon, a cellular network transceiver (110), a RADAR emitter or detector (108), a LIDAR emitter or detector (106), a GPS transceiver (118), a poster or marker having a known detectable pattern (122), and a camera (124). The head mounted wearable component (58) features similar components, as illustrated, in addition to lighting emitters (130) configured to assist the camera (124) detectors, such as infrared emitters (130) for an infrared camera (124); also featured on the head mounted wearable component (58) are one or more strain gauges (116), which may be fixedly coupled to the frame or mechanical platform of the head mounted wearable component (58) and configured to determine deflection of such platform in between components such as electromagnetic receiver sensors (604) or display elements (62), wherein it may be valuable to understand if bending of the platform has occurred, such as at a thinned portion of the platform, such as the portion above the nose on the eyeglasses-like platform depicted in FIG. 8. The head mounted wearable component (58) also features a processor (128) and one or more IMUs (102). Each of the components preferably are operatively coupled to the processor (128).

The hand held component (606) and local processing and data module (70) are illustrated featuring similar components. As shown in FIG. 8, with so many sensing and connectivity means, such a system is likely to be heavy, power hungry, large, and relatively expensive. However, for illustrative purposes, such a system may be utilized to provide a very high level of connectivity, system component integration, and position/orientation tracking. For example, with such a configuration, the various main mobile components (58, 70, 606) may be localized in terms of position relative to the global coordinate system using WiFi, GPS, or Cellular signal triangulation; beacons, electromagnetic tracking (as described above), RADAR, and LIDIR systems may provide yet further location and/or orientation information and feedback. Markers and cameras also may be utilized to provide further information regarding relative and absolute position and orientation. For example, the various camera components (124), such as those shown coupled to the head mounted wearable component (58), may be utilized to capture data which may be utilized in simultaneous localization and mapping protocols, or "SLAM", to determine where the component (58) is and how it is oriented relative to other components.

Figure 9A:
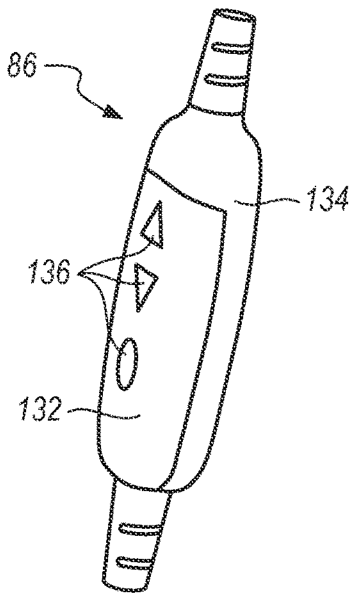
FIGS. 9A-9F illustrate various control modules according to various embodiments.
Figure 9B:
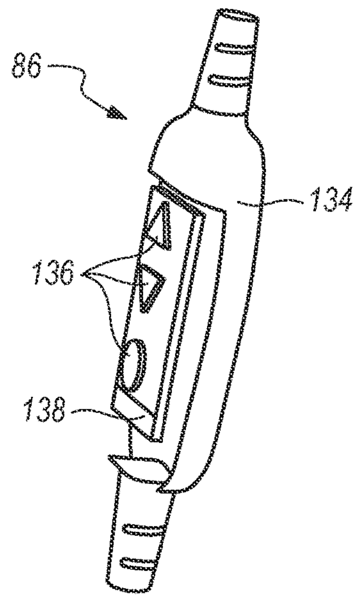
Figure 9C:
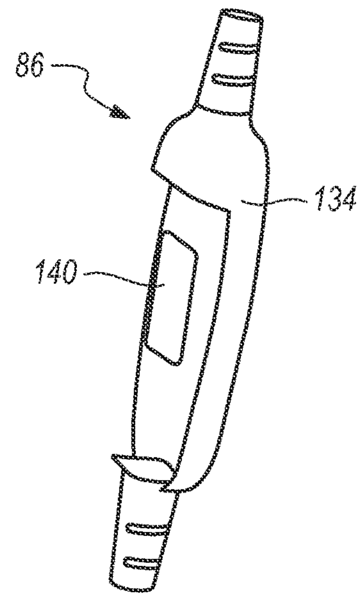
Figure 9D:
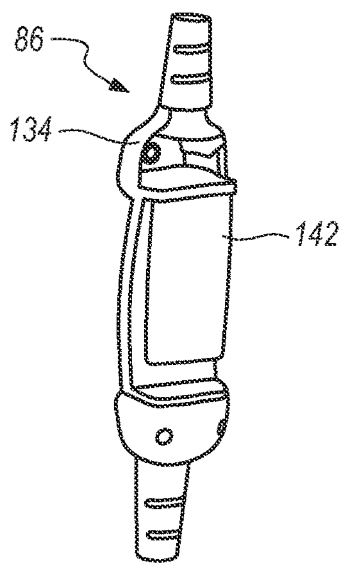
Figure 9E:
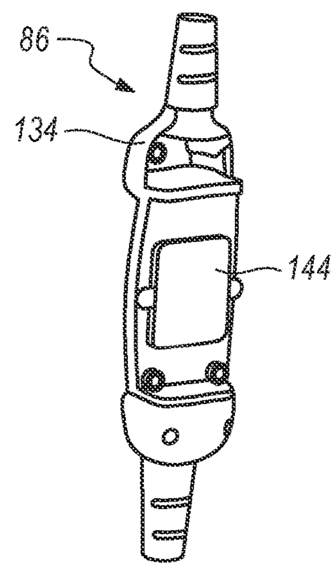
Figure 9F:
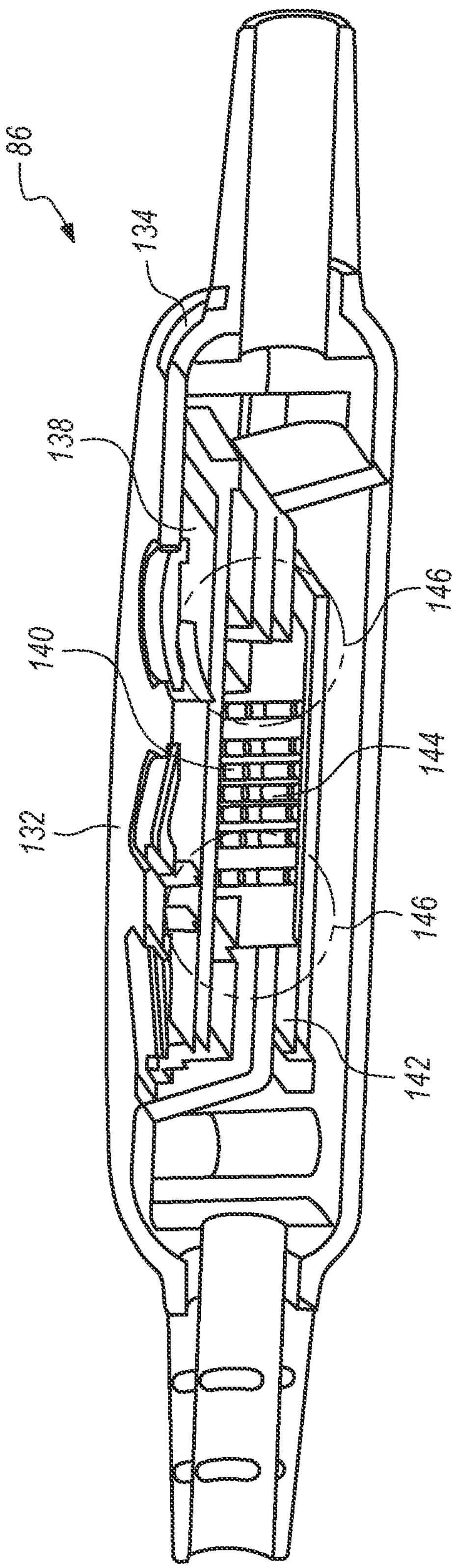

Referring to FIGS. 9A-9F, various aspects of the control and quick release module (86) are depicted. Referring to FIG. 9A, two outer housing components are coupled together using a magnetic coupling configuration which may be enhanced with mechanical latching. Buttons (136) for operation of the associated system may be included. FIG. 9B illustrates a partial cutaway view with the buttons (136) and underlying top printed circuit board (138) shown. Referring to FIG. 9C, with the buttons (136) and underlying top printed circuit board (138) removed, a female contact pin array (140) is visible. Referring to FIG. 9D, with an opposite portion of housing (134) removed, the lower printed circuit board (142) is visible. With the lower printed circuit board (142) removed, as shown in FIG. 9E, a male contact pin array (144) is visible. Referring to the cross-sectional view of FIG. 9F, at least one of the male pins or female pins are configured to be spring-loaded such that they may be depressed along each pin's longitudinal axis; the pins may be termed "pogo pins" and generally comprise a highly conductive material, such as copper or gold. When assembled, the illustrated configuration mates 46 male pins with female pins, and the entire assembly may be quick-release decoupled in half by manually pulling it apart and overcoming a magnetic interface (146) load which may be developed using north and south magnets oriented around the perimeters of the pin arrays (140, 144). In one embodiment, an approximate 2 kg load from compressing the 46 pogo pins is countered with a closure maintenance force of about 4 kg. The pins in the array may be separated by about 1.3 mm, and the pins may be operatively coupled to conductive lines of various types, such as twisted pairs or other combinations to support USB 3.0, HDMI 2.0, I2S signals, GPIO, and MIPI configurations, and high current analog lines and grounds configured for up to about 4 amps/5 volts in one embodiment.

Figure 10:
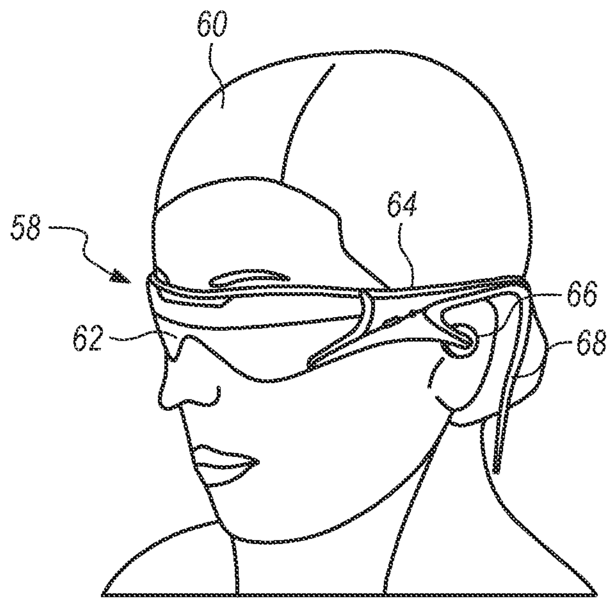
FIG. 10 illustrates a head mounted visual display with a minimized form factor according to some embodiments.

Referring to FIG. 10, it is helpful to have a minimized component/feature set to be able to minimize the weight and bulk of the various components, and to arrive at a relatively slim head mounted component, for example, such as that (58) featured in FIG. 10. Thus various permutations and combinations of the various components shown in FIG. 8 may be utilized.

Figure 11A:
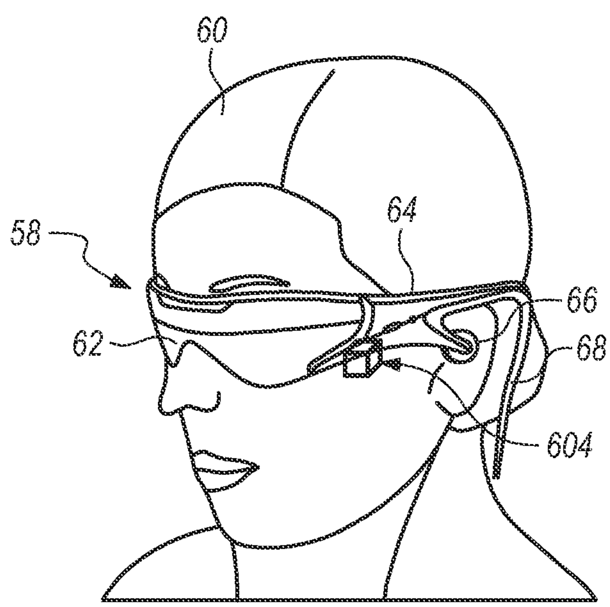
FIGS. 11A-11B illustrate various configurations of electromagnetic sensing modules.
Figure 11B:
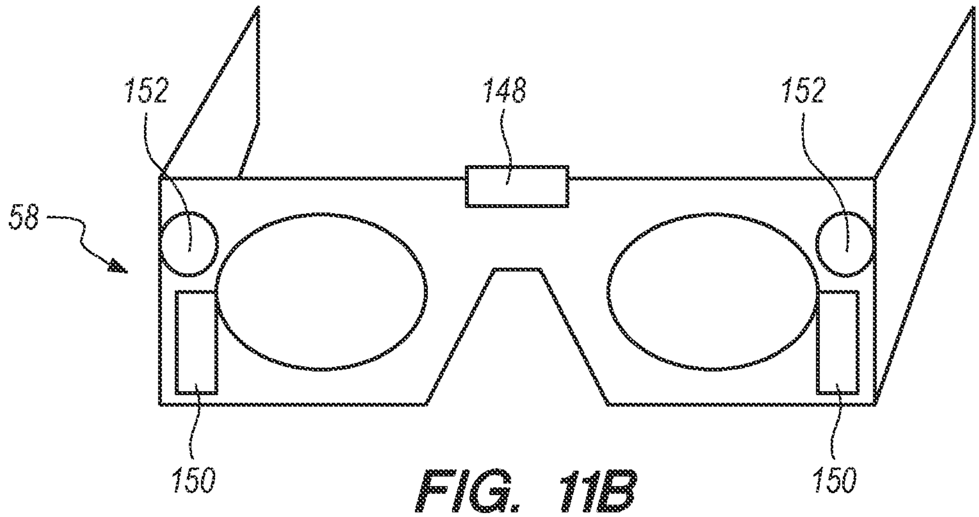
Figure 12A:
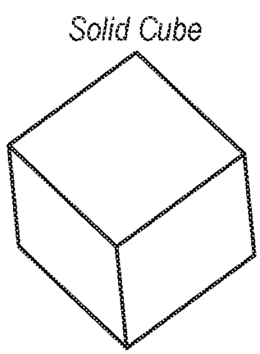
FIGS. 12A-12E illustrate various configurations for electromagnetic sensor cores according to some embodiments.
Figure 12B:
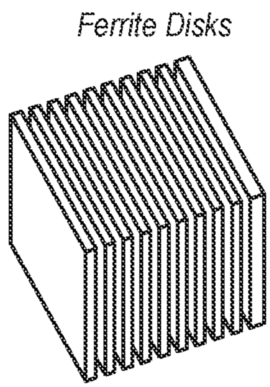
Figure 12C:
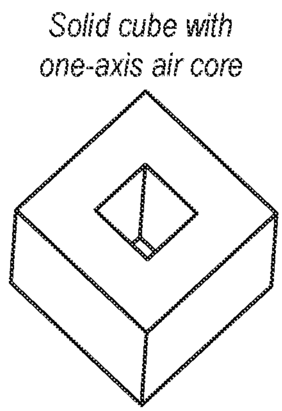
Figure 12D:
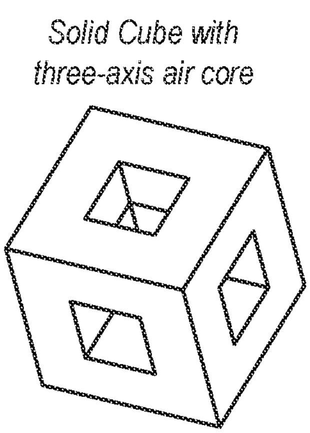
Figure 12E:
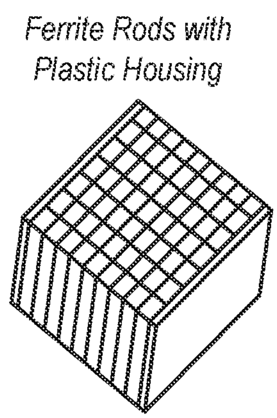

Referring to FIG. 11A, an electromagnetic sensing coil assembly (604, i.e., 3 individual coils coupled to a housing) is shown coupled to a head mounted component (58); such a configuration adds additional geometry to the overall assembly which may not be desirable. Referring to FIG. 11B, rather than housing the coils in a box or single housing as in the configuration of FIG. 11A, the individual coils may be integrated into the various structures of the head mounted component (58), as shown in FIG. 11B. FIGS. 12A-12E illustrate various configurations for featuring a ferrite core coupled to an electromagnetic sensor to increase field sensitivity; the embodiments of FIGS. 12B-12E are lighter in weight than the solid core configuration of FIG. 12A and may be utilized to save mass.

Figure 13A:
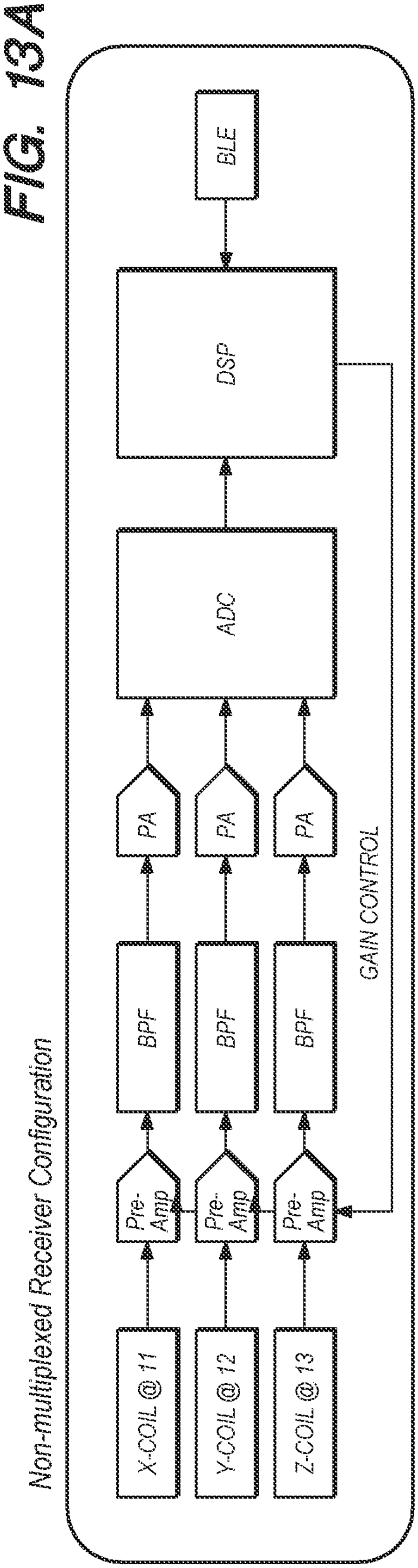
FIGS. 13A-13C illustrate various time division multiplexing of electromagnetic sensing according to some embodiments.
Figure 13B:
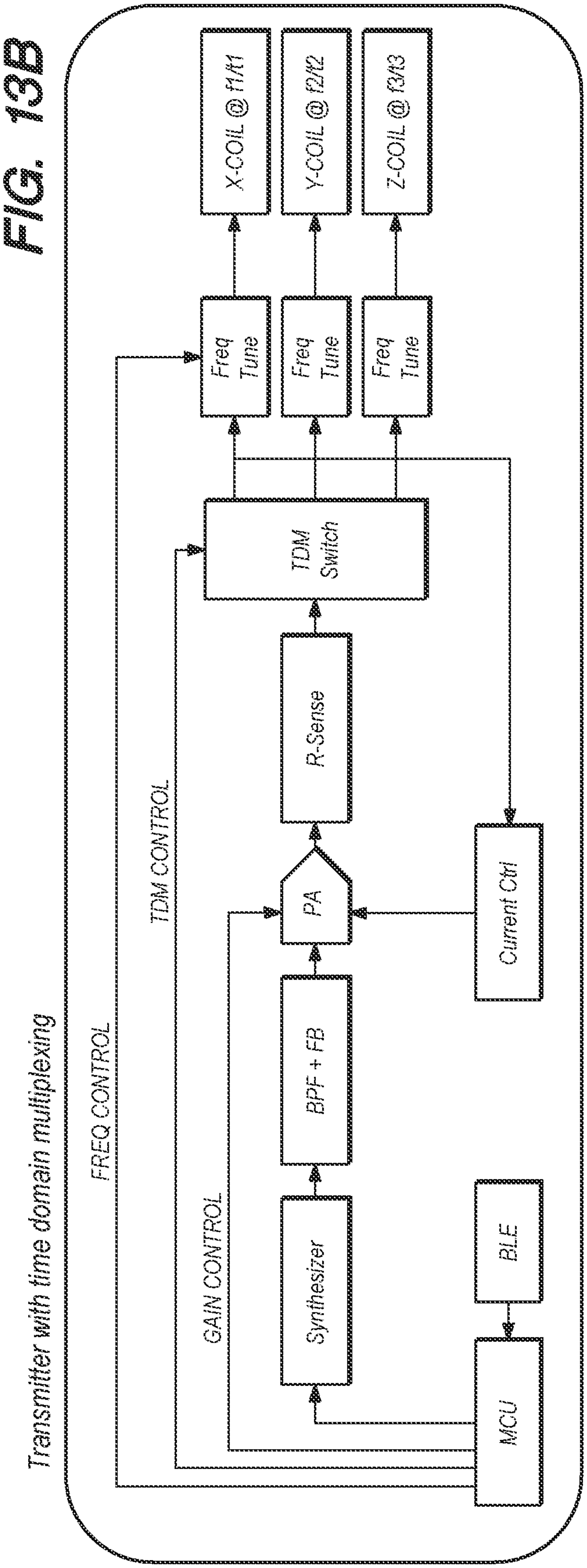
Figure 13C:
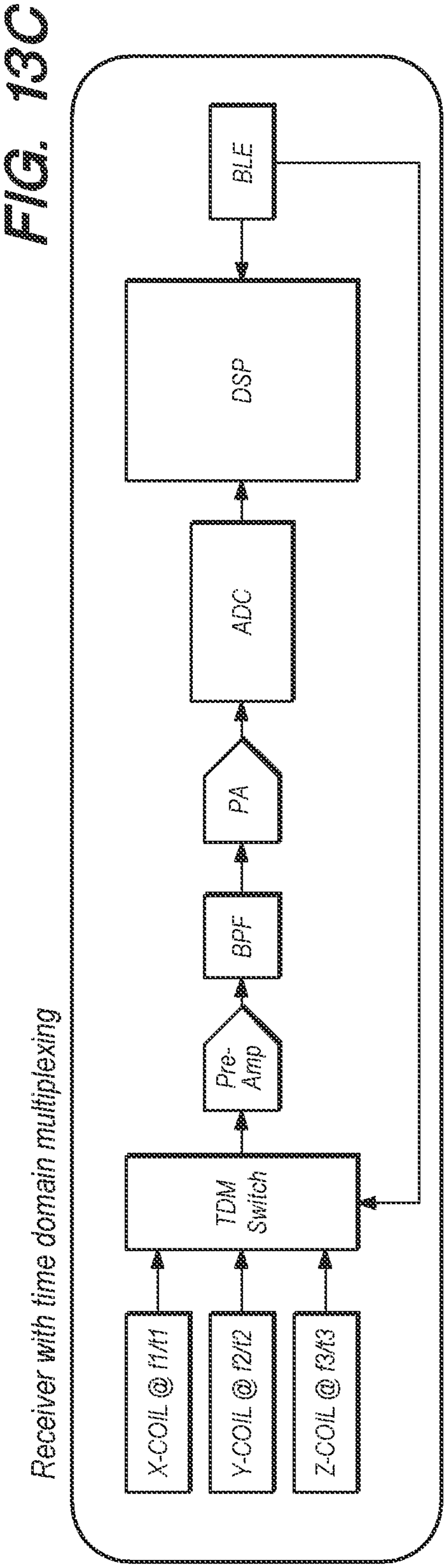

Referring to FIGS. 13A-13C, time division multiplexing ("TDM") may be utilized to save mass as well. For example, referring to FIG. 13A, a conventional local data processing configuration is shown for a 3-coil electromagnetic receiver sensor, wherein analog currents come in from each of the X, Y, and Z coils, go into a pre-amplifier, go into a band pass filter, through analog-to-digital conversion, and ultimately to a digital signal processor. Referring to the transmitter configuration of FIG. 13B, and the receiver configuration of FIG. 13C, time division multiplexing may be utilized to share hardware, such that each coil sensor chain doesn't require its own amplifiers, etc. In addition to removing sensor housings, and multiplexing to save on hardware overhead, signal to noise ratios may be increased by having more than one set of electromagnetic sensors, each set being relatively small relative to a single larger coil set; also the low-side frequency limits, which generally are needed to have multiple sensing coils in close proximity, may be improved to facilitate bandwidth requirement improvements. Also, there is a tradeoff with multiplexing, in that multiplexing generally spreads out the reception of radiofrequency signals in time, which results in generally dirtier signals; thus larger coil diameter may be required for multiplexed systems. For example, where a multiplexed system may require a 9 mm-side dimension cubic coil sensor box, a nonmultiplexed system may only require a 7 mm-side dimension cubic coil box for similar performance; thus there are tradeoffs in minimizing geometry and mass.

In another embodiment wherein a particular system component, such as a head mounted component (58) features two or more electromagnetic coil sensor sets, the system may be configured to selectively utilize the sensor and emitter pairing that are closest to each other to optimize the performance of the system.

Figure 14:
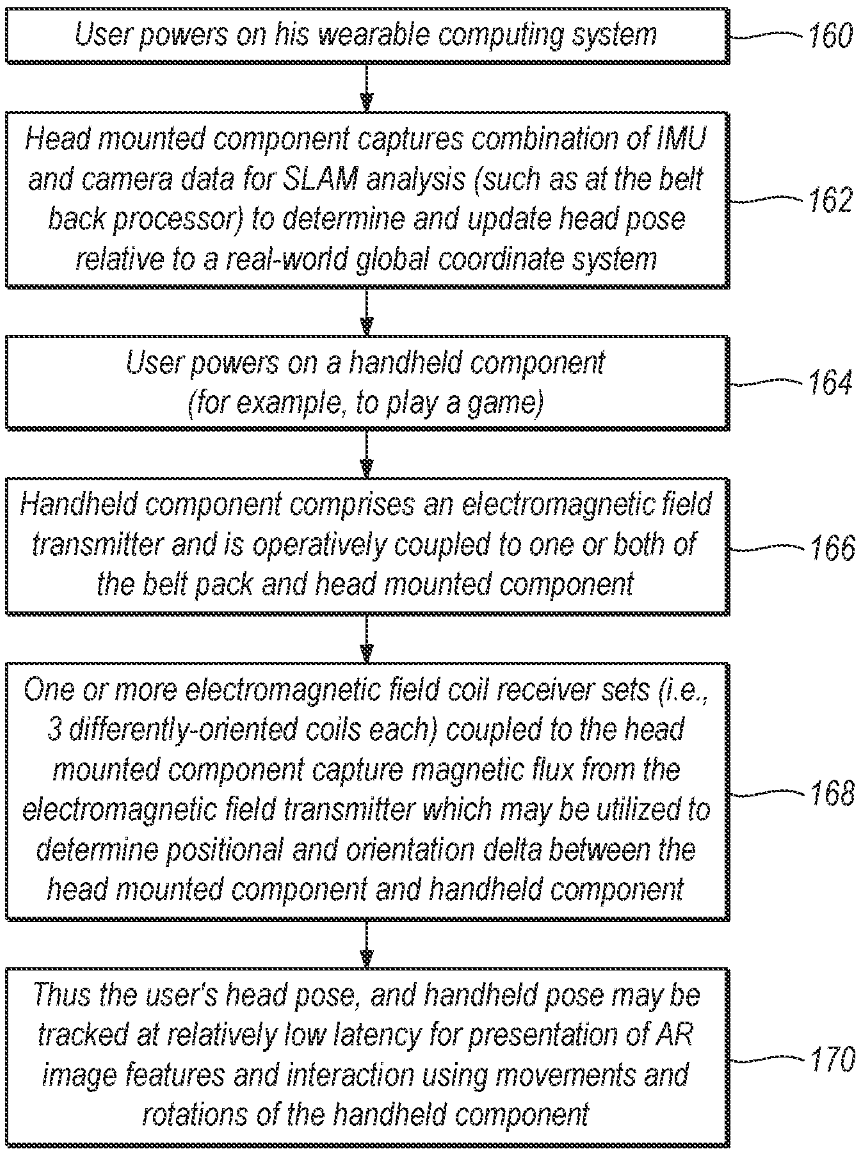
FIGS. 14-15 depict methods of combining various sensor data upon initiation of a visual display system according to some embodiments.

Referring to FIG. 14, in one embodiment, after a user powers up his or her wearable computing system (160), a head mounted component assembly may capture a combination of IMU and camera data (the camera data being used, for example, for SLAM analysis, such as at the belt pack processor where there may be more raw processing horsepower present) to determine and update head pose (i.e., position and orientation) relative to a real world global coordinate system (162). The user may also activate a handheld component to, for example, play an augmented reality game (164), and the handheld component may comprise an electromagnetic transmitter operatively coupled to one or both of the belt pack and head mounted component (166). One or more electromagnetic field coil receiver sets (i.e., a set being 3 differently-oriented individual coils) coupled to the head mounted component to capture magnetic flux from the transmitter, which may be utilized to determine positional or orientational difference (or "delta"), between the head mounted component and handheld component (168). The combination of the head mounted component assisting in determining pose relative to the global coordinate system, and the hand held assisting in determining relative location and orientation of the handheld relative to the head mounted component, allows the system to generally determine where each component is relative to the global coordinate system, and thus the user's head pose, and handheld pose may be tracked, preferably at relatively low latency, for presentation of augmented reality image features and interaction using movements and rotations of the handheld component (170).

Figure 15:
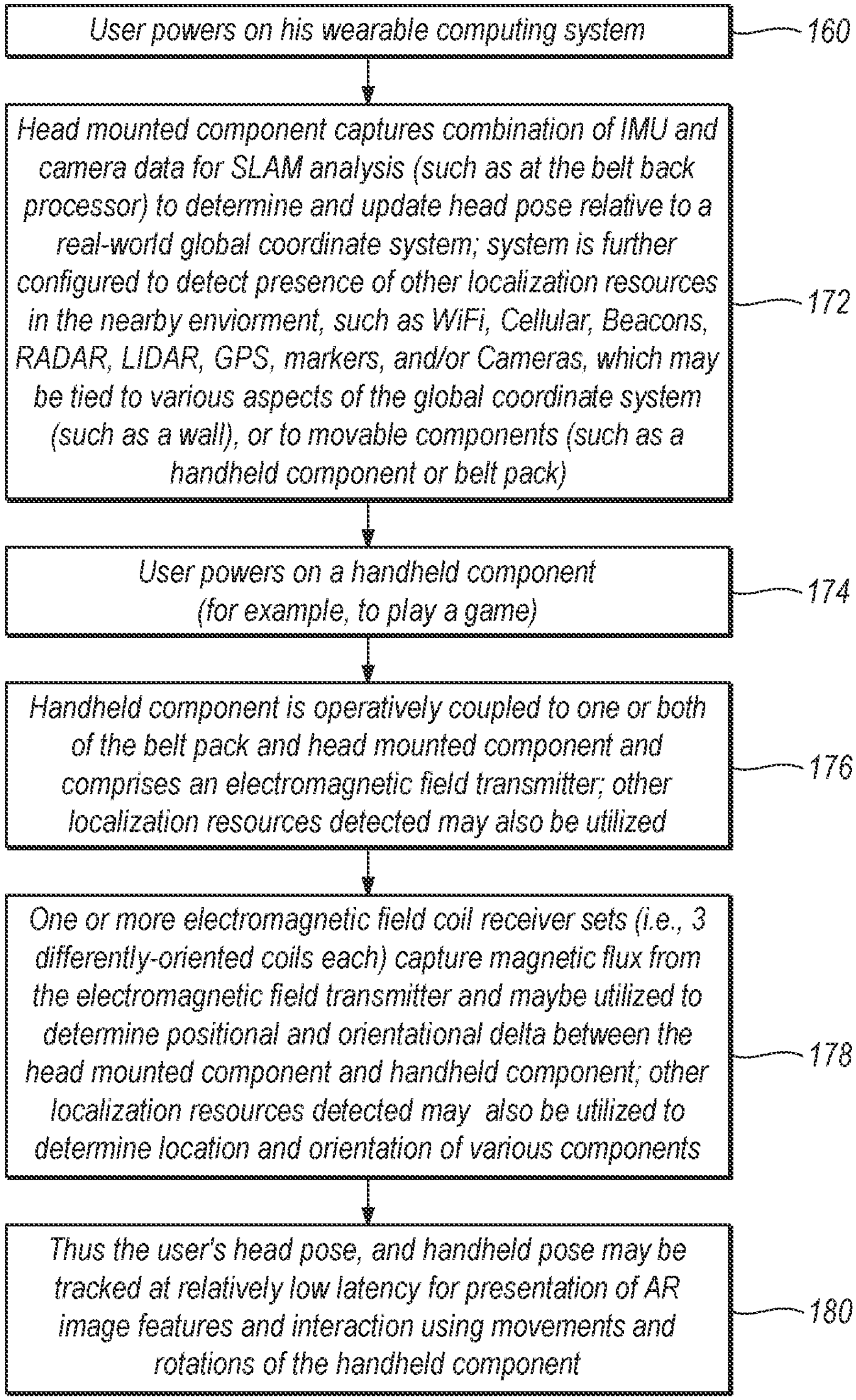

Referring to FIG. 15, an embodiment is illustrated that is somewhat similar to that of FIG. 14, with the exception that the system has many more sensing devices and configurations available to assist in determining pose of both the head mounted component (172) and a hand held component (176, 178), such that the user's head pose, and handheld pose may be tracked, preferably at relatively low latency, for presentation of augmented reality image features and interaction using movements and rotations of the handheld component (180).

Figure 16A:
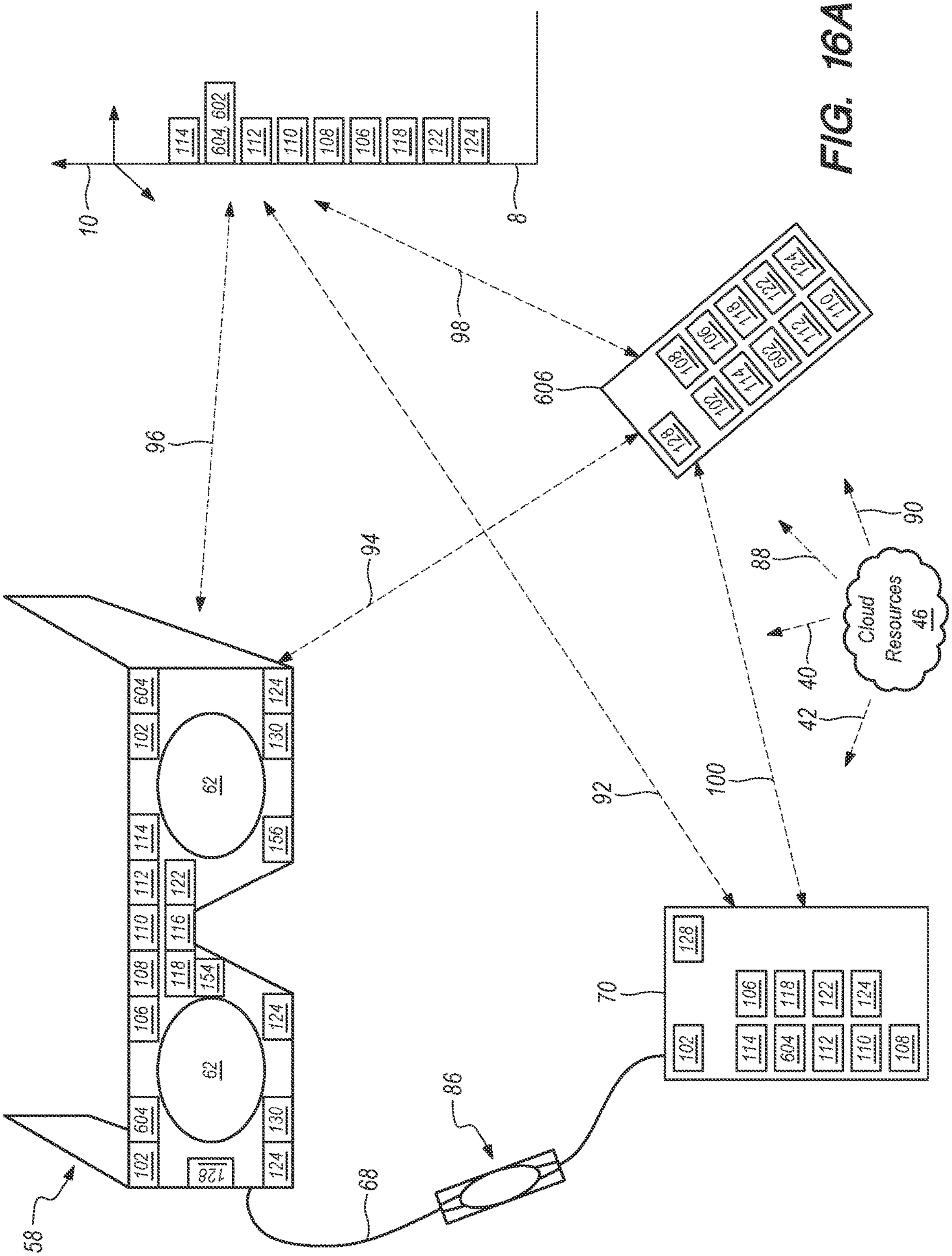
FIGS. 16A-16B illustrate a visual display system comprising various sensing and imaging components and accessories according to some embodiments.
Figure 16B:
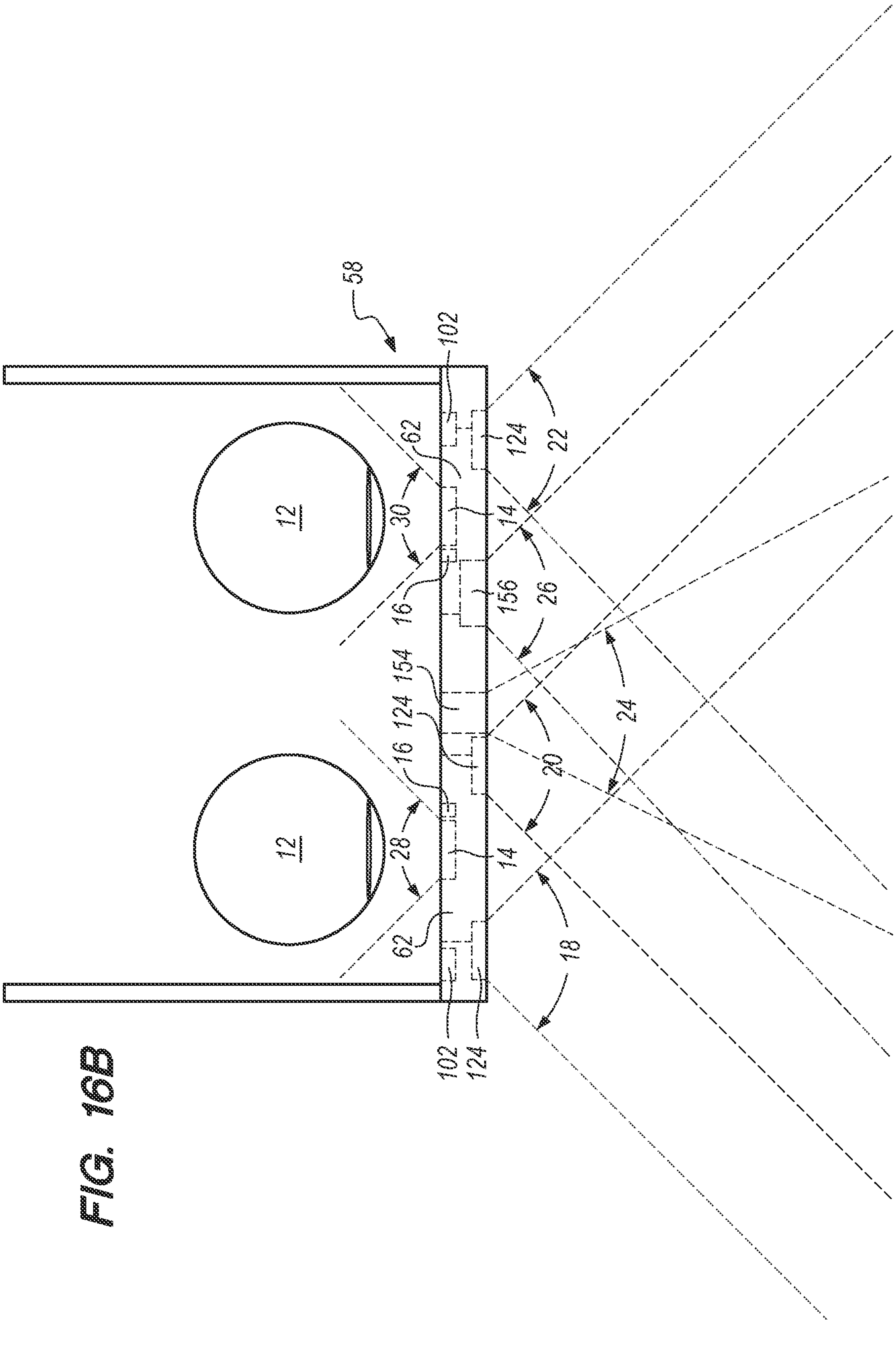

Referring to FIGS. 16A and 16B, various aspects of a configuration similar to that of FIG. 8 are shown. The configuration of FIG. 16A differs from that of FIG. 8 in that in addition to a LIDAR (106) type of depth sensor, the configuration of FIG. 16A features a generic depth camera or depth sensor (154) for illustrative purposes, which may, for example, be either a stereo triangulation style depth sensor (such as a passive stereo depth sensor, a texture projection stereo depth sensor, or a structured light stereo depth sensor) or a time or flight style depth sensor (such as a LIDAR depth sensor or a modulated emission depth sensor); further, the configuration of FIG. 16A has an additional forward facing "world" camera (124, which may be a grayscale camera, having a sensor capable of 720p range resolution) as well as a relatively high-resolution "picture camera" (156, which may be a full color camera, having a sensor capable of 2 megapixel or higher resolution, for example). FIG. 16B shows a partial orthogonal view of the configuration of FIG. 16A for illustrative purposes, as described further below in reference to FIG. 16B.

Referring back to FIG. 16A and the stereo vs time-of-flight style depth sensors mentioned above, each of these depth sensor types may be employed with a wearable computing solution as disclosed herein, although each has various advantages and disadvantages. For example, many depth sensors have challenges with black surfaces and shiny or reflective surfaces. Passive stereo depth sensing is a relatively simplistic way of getting triangulation for calculating depth with a depth camera or sensor, but it may be challenged if a wide field of view ("FOV") is required, and may require relatively significant computing resource; further, such a sensor type may have challenges with edge detection, which may be important for the particular use case at hand. Passive stereo may have challenges with textureless walls, low light situations, and repeated patterns. Passive stereo depth sensors are available from manufacturers such as Intel® and Aquifi®. Stereo with texture projection (also known as "active stereo") is similar to passive stereo, but a texture projector broadcasts a projection pattern onto the environment, and the more texture that is broadcasted, the more accuracy is available in triangulating for depth calculation. Active stereo may also require relatively high compute resource, present challenges when wide FOV is required, and be somewhat suboptimal in detecting edges, but it does address some of the challenges of passive stereo in that it is effective with textureless walls, is good in low light, and generally does not have problems with repeating patterns.

Active stereo depth sensors are available from manufacturers such as Intel® and Aquifi®. Stereo with structured light, such as the systems developed by Primesense, Inc.® and available under the tradename Kinect®, as well as the systems available from Mantis Vision, Inc®, generally utilize a single camera/projector pairing, and the projector is specialized in that it is configured to broadcast a pattern of dots that is known apriori. In essence, the system knows the pattern that is broadcasted, and it knows that the variable to be determined is depth. Such configurations may be relatively efficient on compute load, and may be challenged in wide FOV requirement scenarios as well as scenarios with ambient light and patterns broadcasted from other nearby devices, but can be quite effective and efficient in many scenarios. With modulated time of flight type depth sensors, such as those available from PMD Technologies®, A.G. and SoftKinetic Inc.®, an emitter may be configured to send out a wave, such as a sine wave, of amplitude modulated light; a camera component, which may be positioned nearby or even overlapping in some configurations, receives a returning signal on each of the pixels of the camera component and depth mapping may be determined/calculated. Such configurations may be relatively compact in geometry, high in accuracy, and low in compute load, but may be challenged in terms of image resolution (such as at edges of objects), multi-path errors (such as wherein the sensor is aimed at a reflective or shiny corner and the detector ends up receiving more than one return path, such that there is some depth detection aliasing. Direct time of flight sensors, which also may be referred to as the aforementioned LIDAR, are available from suppliers such as LuminAR® and Advanced Scientific Concepts, Inc.®. With these time of flight configurations, generally a pulse of light (such as a picosecond, nanosecond, or femtosecond long pulse of light) is sent out to bathe the world oriented around it with this light ping; then each pixel on a camera sensor waits for that pulse to return, and knowing the speed of light, the distance at each pixel may be calculated. Such configurations may have many of the advantages of modulated time of flight sensor configurations (no baseline, relatively wide FOV, high accuracy, relatively low compute load, etc) and also relatively high framerates, such as into the tens of thousands of Hertz. They may also be relatively expensive, have relatively low resolution, be sensitive to bright light, and susceptible to multi-path errors; they may also be relatively large and heavy.

Referring to FIG. 16B, a partial top view is shown for illustrative purposes featuring a user's eyes (12) as well as cameras (14, such as infrared cameras) with fields of view (28, 30) and light or radiation sources (16, such as infrared) directed toward the eyes (12) to facilitate eye tracking, observation, and/or image capture. The three outward-facing world-capturing cameras (124) are shown with their FOVs (18, 20, 22), as is the depth camera (154) and its FOV (24), and the picture camera (156) and its FOV (26). The depth information garnered from the depth camera (154) may be bolstered by using the overlapping FOVs and data from the other forward-facing cameras. For example, the system may end up with something like a sub-VGA image from the depth sensor (154), a 720p image from the world cameras (124), and occasionally a 2 megapixel color image from the picture camera (156). Such a configuration has 4 cameras sharing common FOV, two of them with heterogeneous visible spectrum images, one with color, and the third one with relatively low-resolution depth. The system may be configured to do a segmentation in the grayscale and color images, fuse those two and make a relatively high-resolution image from them, get some stereo correspondences, use the depth sensor to provide hypotheses about stereo depth, and use stereo correspondences to get a more refined depth map, which may be significantly better than what was available from the depth sensor only. Such processes may be run on local mobile processing hardware, or can run using cloud computing resources, perhaps along with the data from others in the area (such as two people sitting across a table from each other nearby), and end up with quite a refined mapping. In another embodiment, all of the above sensors may be combined into one integrated sensor to accomplish such functionality.

Referring to FIGS. 17A-17G, aspects of a dynamic transmission coil tuning configuration are shown for electromagnetic tracking, to facilitate the transmission coil to operate optimally at multiple frequencies per orthogonal axis, which allows for multiple users to operate on the same system. Typically an electromagnetic tracking transmitter will be designed to operate at fixed frequencies per orthogonal axis. With such approach, each transmission coil is tuned with a static series capacitance that creates resonance only at the frequency of operation. Such resonance allows for the maximum possible current flow through the coil which, in turn, maximizes the magnetic flux generated.

Figure 17A:
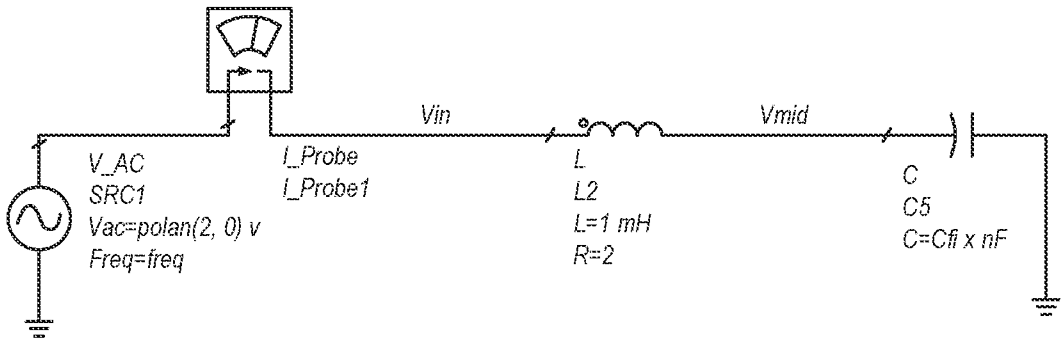
FIGS. 17A-17G illustrate various configurations of transmission coils in electromagnetic tracking systems according to some embodiments.
Figure 17B:
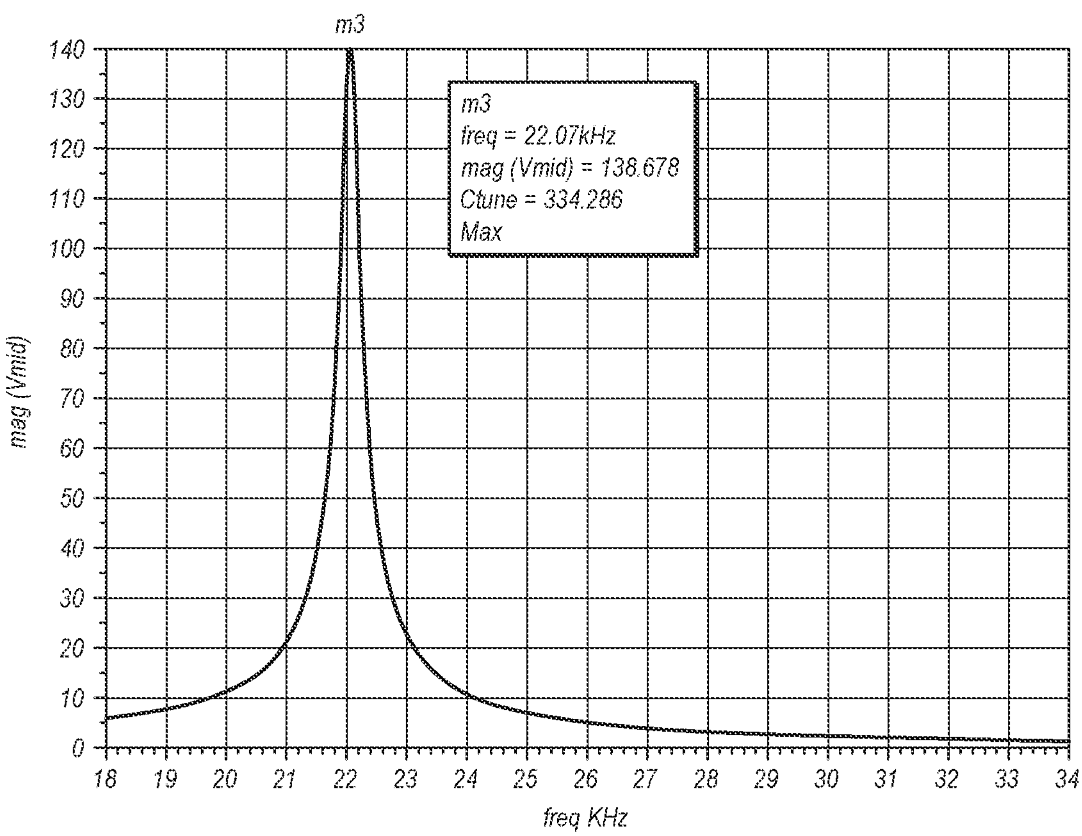

FIG. 17A illustrates a typical resonant circuit used to create resonance. Element "L1" represents a single axis transmission coil at 1 mH, and with capacitance set to 52 nF, resonance is created at 22 kHz, as shown in FIG. 17B.

Figure 17C:
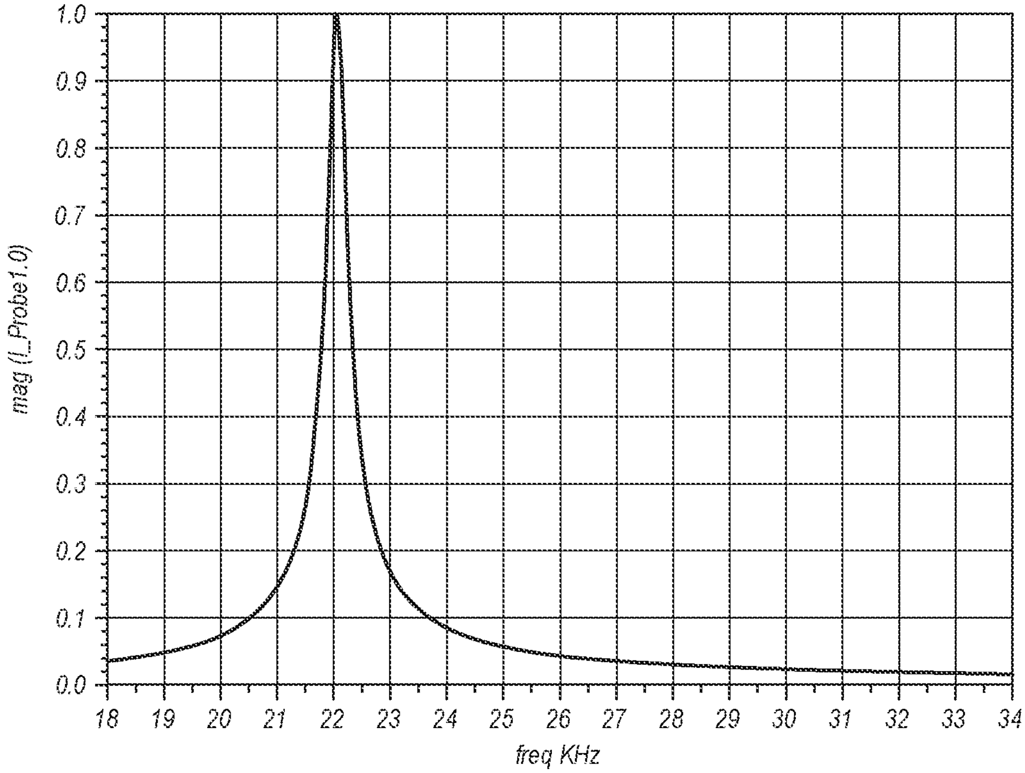
Figure 17D:
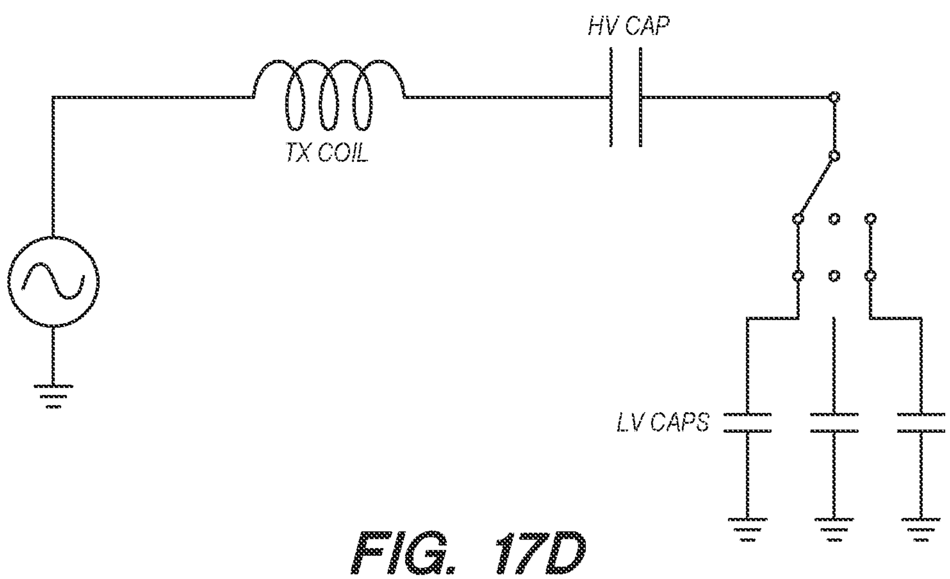
Figure 17E:
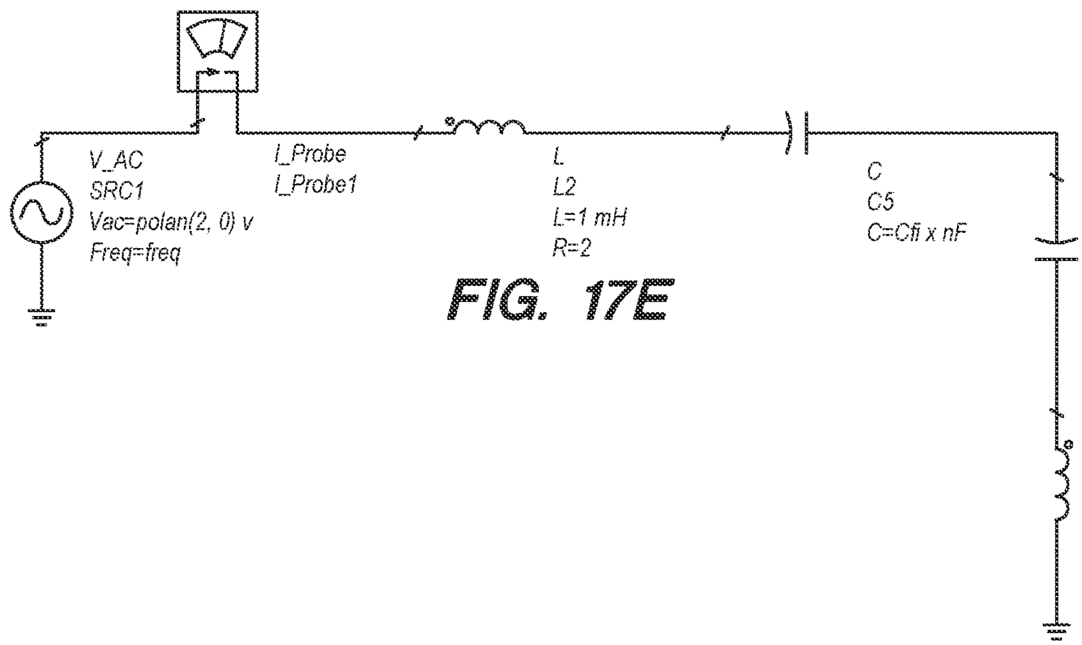
Figure 17F:
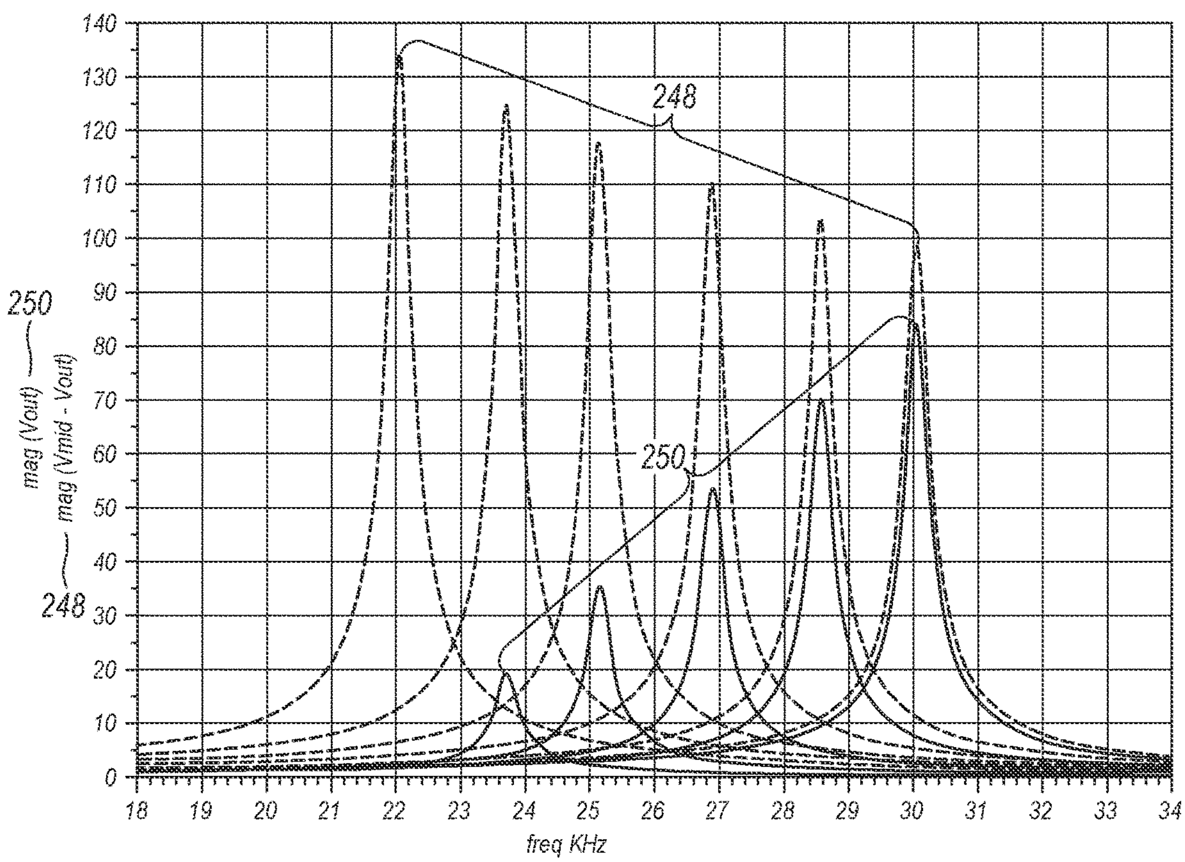
Figure 17G:
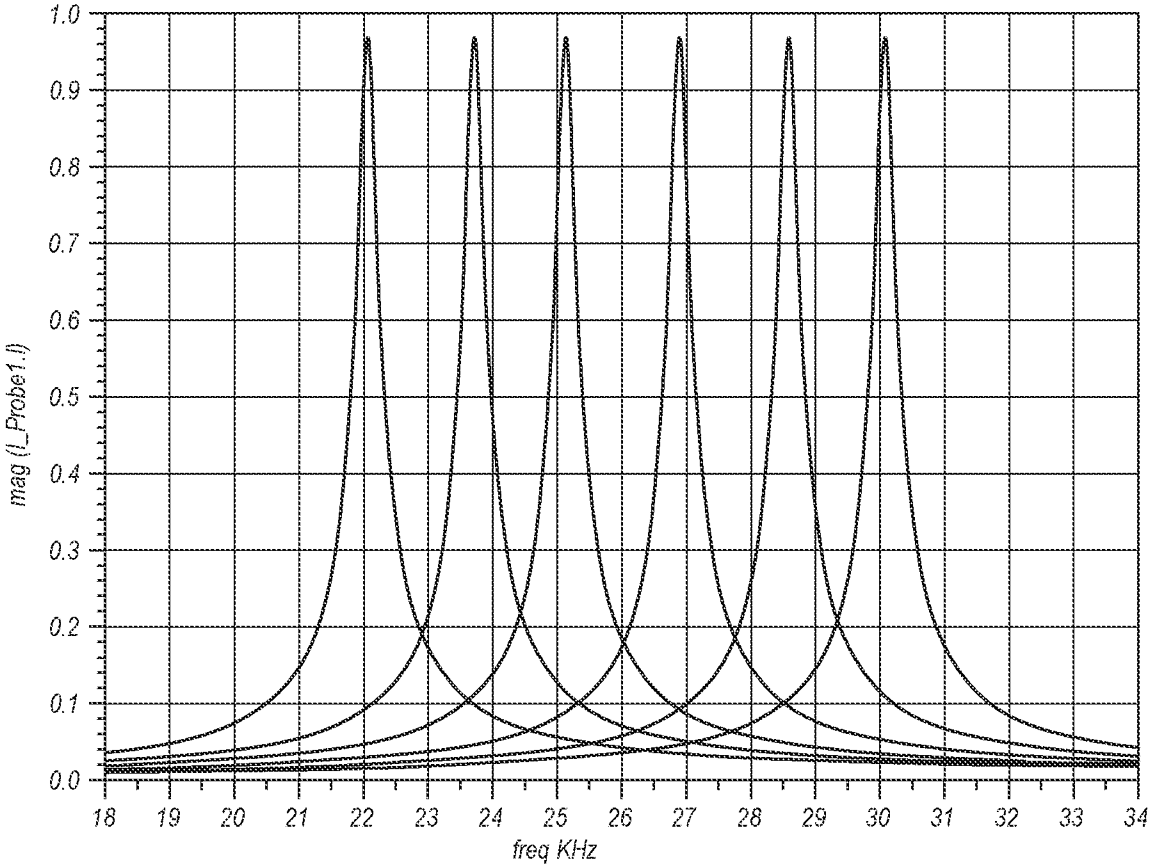

FIG. 17C shows the current through the system plotted versus frequency, and it may be seen that the current is maximum at the resonant frequency. If this system is expected to operate any other frequency, the operating circuit will not be at the possible maximum. FIG. 17D illustrates an embodiment of a dynamically tunable configuration. The dynamic frequency tuning may be set to achieve resonance on the coil to get maximum current flow; an example of a tunable circuit is shown in FIG. 17E, where one capacitor ("C4") may be tuned to produce simulated data, as shown in FIG. 17F. As shown in FIG. 17F, one of the orthogonal coils of an electromagnetic tracker is simulated as "L1" and a static capacitor ("C5") is a fixed high voltage capacitor. This high voltage capacitor will see the higher voltages due to the resonance, and so it's package size generally will be larger. C4 will be the capacitor which is dynamically switched with different values, and can thus see a lower maximum voltage and generally be a smaller geometric package to save placement space. L3 can also be utilized to fine tune the resonant frequency. FIG. 17F illustrates the resonance achieved with the higher plots (248) versus the lower plots (250); as C4 is varied in the simulation, the resonance is changed, and it is notable that the voltage across C5 (Vmid-Vout) is higher than that across C4 (Vout). This generally will allow for a smaller package part on C4 since multiples of this generally will be needed for the system, one per frequency of operation. FIG. 17G illustrates that the maximum current achieved follows the resonance regardless of voltage across capacitors.

Figure 18A:
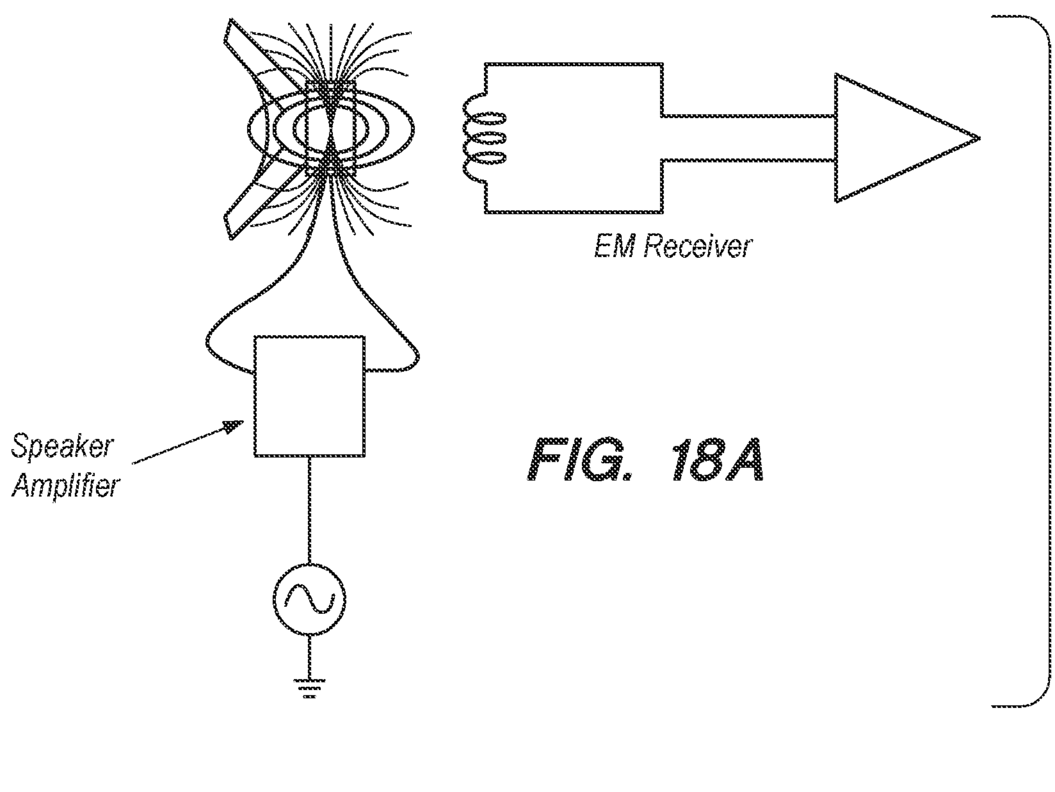
FIGS. 18A-18C illustrate signal interference effects from various system inputs according to some embodiments.
Figure 18B:
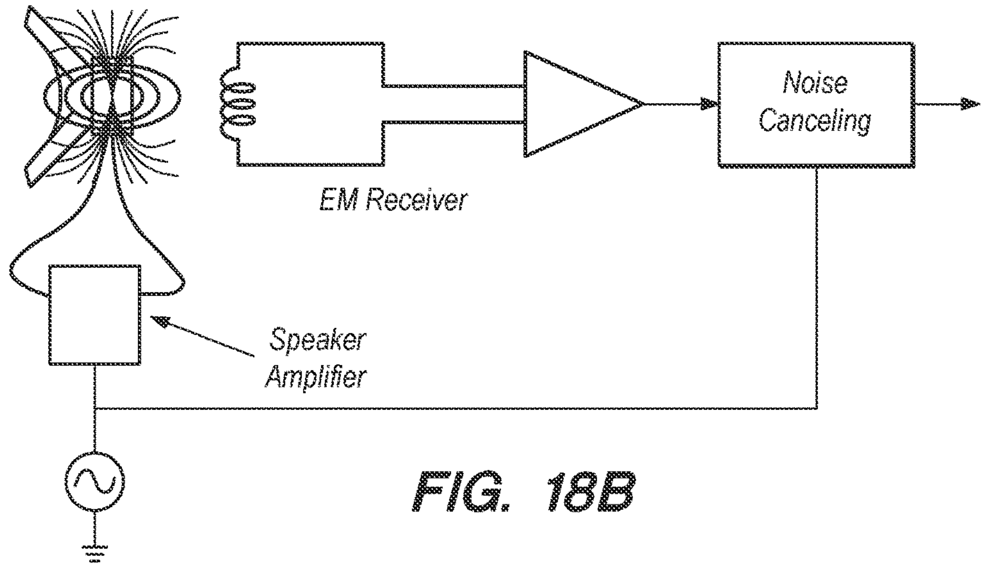
Figure 18C:
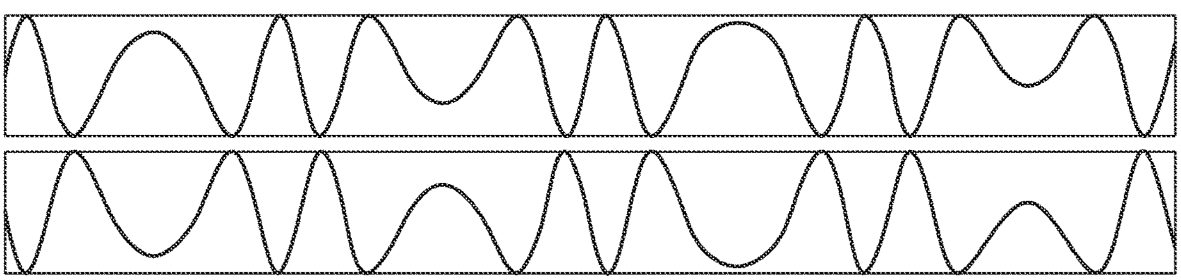

Referring to FIGS. 18A-18C, an electromagnetic tracking system may be bounded to work below about 30 KHz, which is slightly higher than the audible range for human hearing. Referring to FIG. 18A, there may be some audio systems which create noise in the usable frequencies for such electromagnetic tracking systems. Further, audio speakers typically have magnetic fields and one or more coils which also may interfere with electromagnetic tracking systems.

Figure 19:
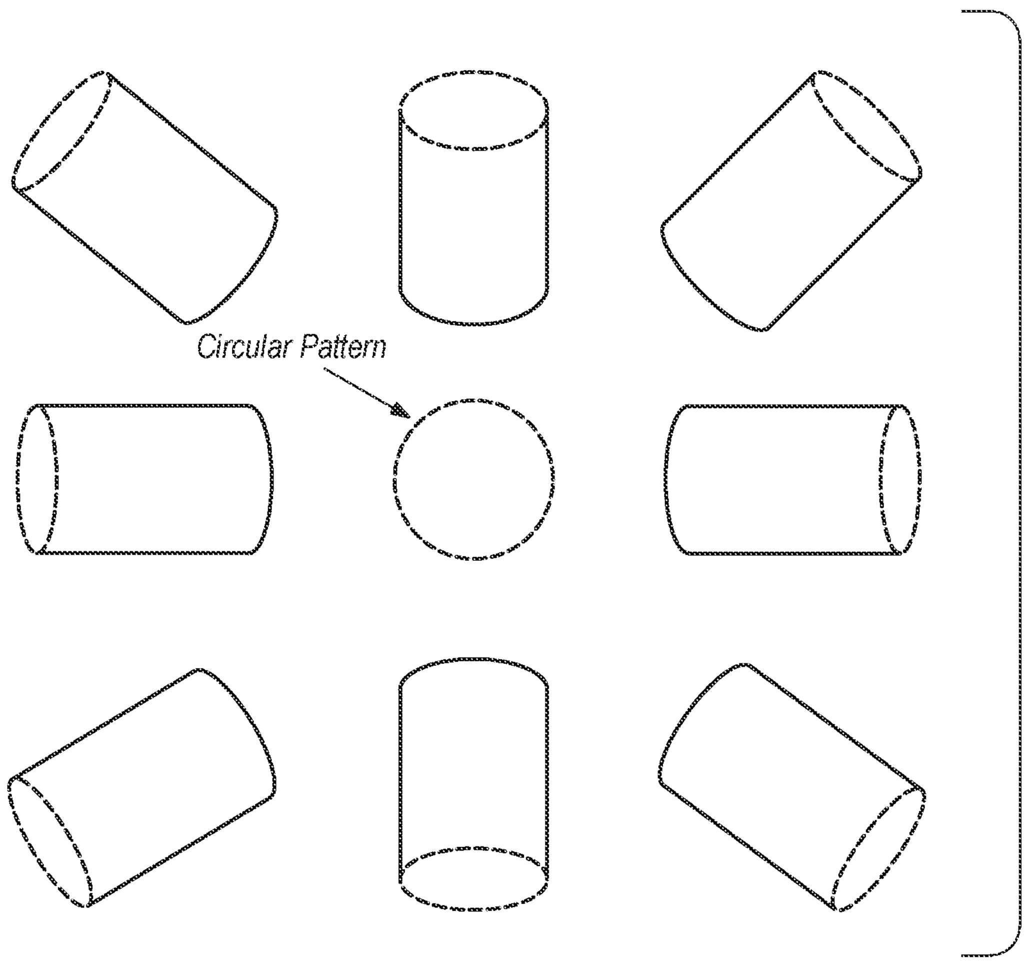
FIG. 19 illustrate a calibration configuration according to some embodiments.

Referring to FIG. 18B, a block diagram is shown for a noise cancelling configuration for electromagnetic tracking interference. Since the unintentional interference is a known entity, this knowledge can be used to cancel the interference and improve performance. In other words, the audio generated by the system may be utilized to eliminate the effects received by the receiver coil. The noise cancelling circuit may be configured to accept the corrupted signals from the EM amplifier as well as the signal from the audio system, and the noise cancelling system will cancel out the noise received from the audio speaker. FIG. 18C illustrates a plot to show an example of the how the signal can be inverted and added to cancel the interferer. V(vnoise), the top plot, is the noise added to the system by the audio speaker. Referring to FIG. 19, in one embodiment a known pattern (such as a circular pattern) of lights or other emitters may be utilized to assist in calibration of vision systems. For example, the circular pattern may be utilized as a fiducial; as a camera or other capture device with known orientation captures the shape of the pattern while the object coupled to the pattern is reoriented, the orientation of the object, such as a hand held totem device, may be determined; such orientation may be compared with that which comes from an associated IMU device for error determination and use in calibration.

Figure 20A:
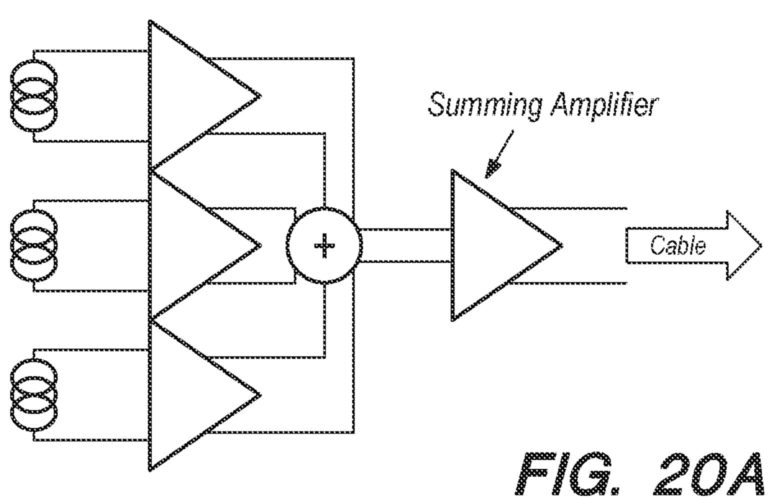

Referring to FIGS. 20A-20C, a configuration is shown with a summing amplifier to simplify circuitry between two subsystems or components of a wearable computing configuration such as a head mounted component and belt-pack component. With a conventional configuration, each of the coils (on the left of FIG. 20A) of an electromagnetic tracking sensor is associated with an amplifier, and three distinct amplified signals would be sent through the cabling to the other component. In the illustrated embodiment, the three distinct amplified signals may be directed to a summing amplifier, which produces one amplified signal that is directed down an advantageously simplified cable, each signal at a different frequency. The summing amplifier may be configured to amplify all three signals coming in; then the receiving digital signal processor, after analog-to-digital conversion, separates the signals at the other end. FIG. 20C illustrates a filter for each frequency—so the signals may be separated back out at such stage.

Referring to FIG. 21, electromagnetic ("EM") tracking updating is relatively "expensive" in terms of power for a portable system, and may not be capable of very high frequency updating. In a "sensor fusion" configuration, more frequently updated localization information or other dynamic inputs (measurable metrics that change over time) from another sensor such as an IMU may be combined, along with data from another sensor, such as an optical sensor (such as a camera or depth camera), which may or may not be at a relatively high frequency; the net of fusing all of these inputs places a lower demand upon the EM system and provides for quicker updating. With further regard to "dynamic inputs," other illustrative examples include temperature fluctuations, audio volume, sizing such as dimensions of or distance to certain objects, and not merely position or orientation of a user. A set of dynamic inputs represents a collection of those inputs as a function of a given variable (such as time).

Figure 22A:
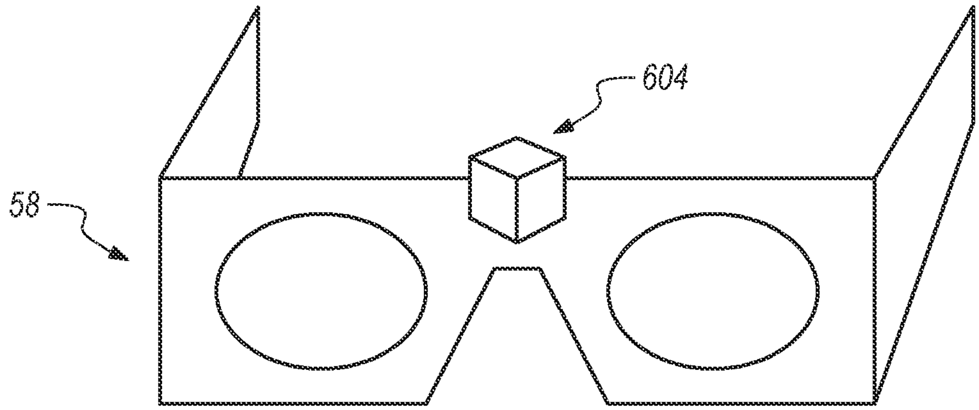
FIGS. 22A-22C illustrate various arrays of electromagnetic sensing modules according to some embodiments.
Figure 22B:
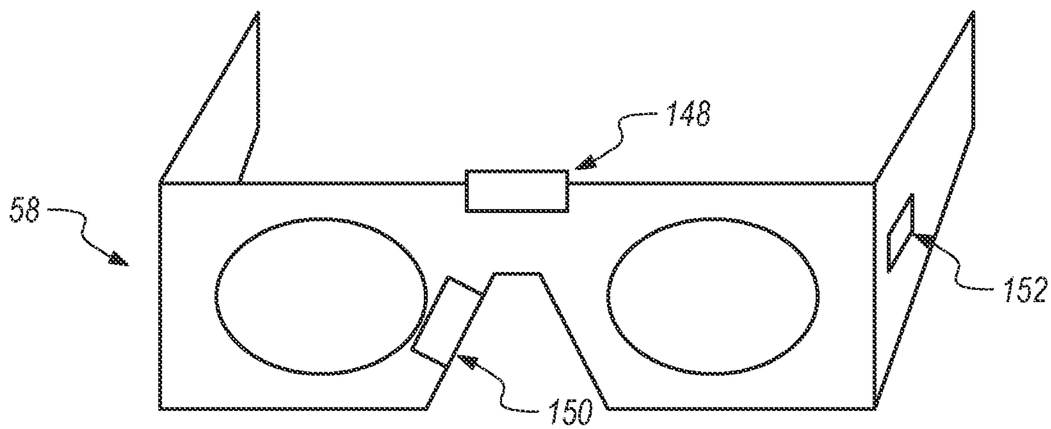
Figure 22C:
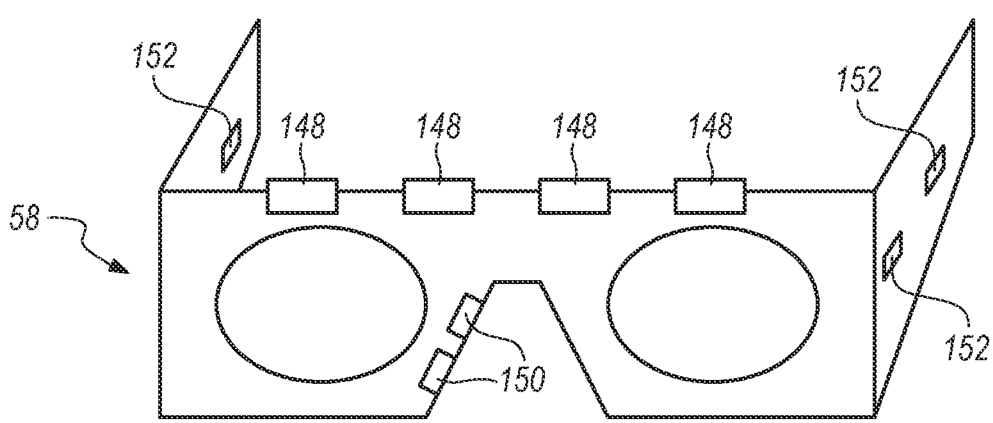

Referring back to FIG. 11B, a distributed sensor coil configuration was shown. Referring to FIG. 22A, a configuration with a single electromagnetic sensor device (604), such as a box containing three orthogonal coils, one for each direction of X, Y, Z, may be coupled to the wearable component (58) for 6 degree of freedom tracking, as described above. Also as noted above, such a device may be dis-integrated, with the three sub-portions (i.e., coils)

attached at different locations of the wearable component (58), as shown in FIG. 22B. Referring to FIG. 22C, to provide further design alternatives, each individual coil may be replaced with a group of similarly oriented coils, such that the overall magnetic flux for any given orthogonal direction is captured by the group (148, 150, 152) rather than by a single coil for each orthogonal direction. In other words, rather than one coil for each orthogonal direction, a group of smaller coils may be utilized and their signals aggregated to form the signal for that orthogonal direction.

Figure 23A:
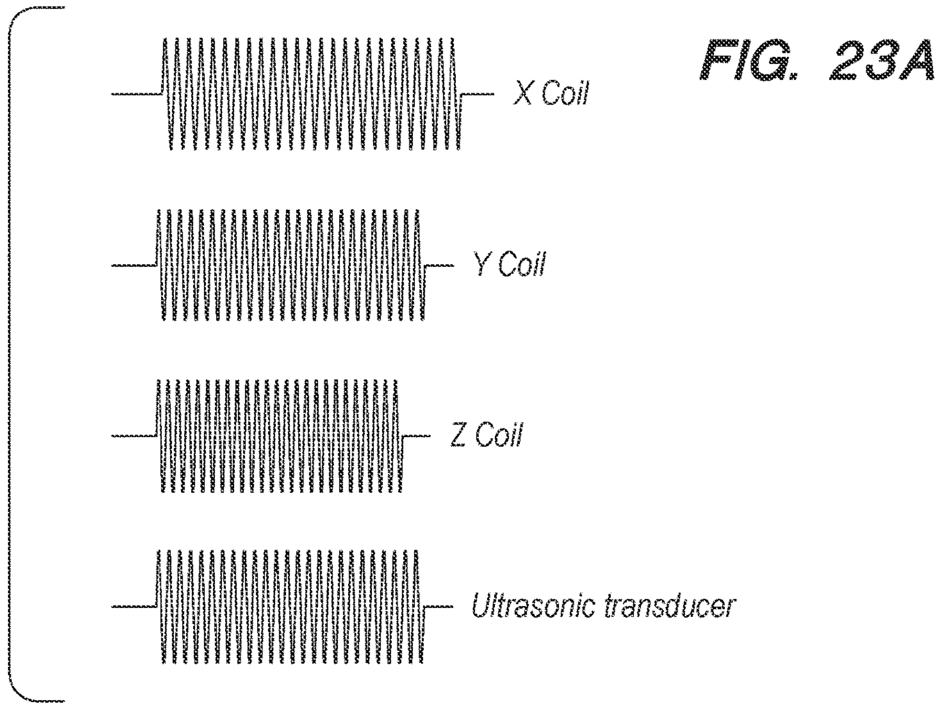
Figure 23B:
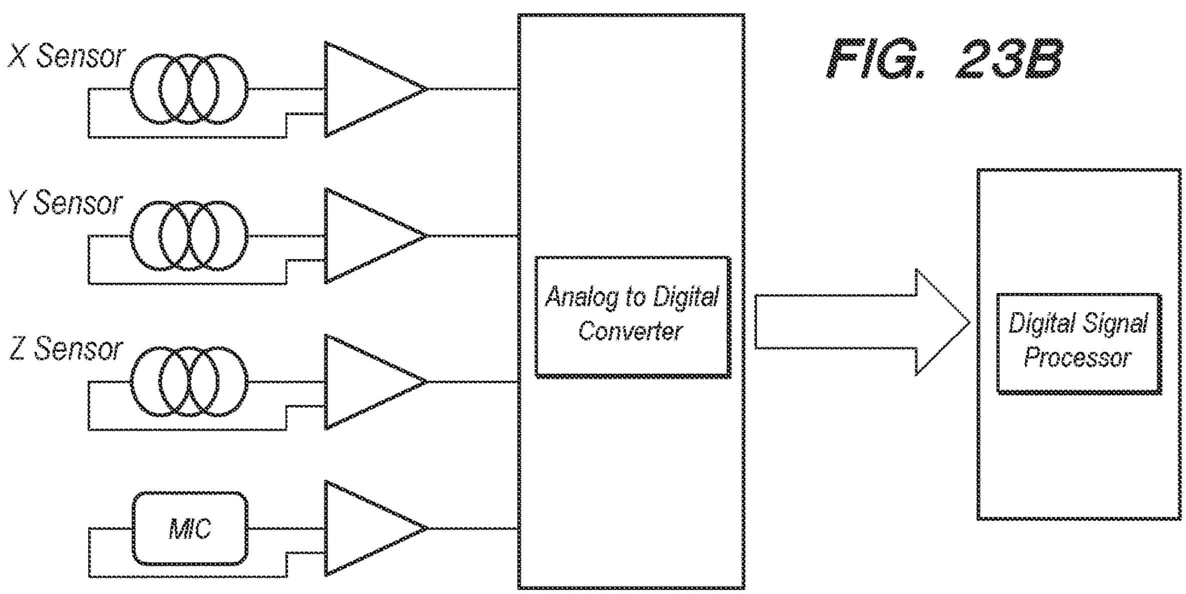

Referring to FIGS. 23A-23C, it may be useful to recalibrate a wearable computing system such as those discussed herein from time to time, and in one embodiment, ultrasonic signals at the transmitter, along with a microphone at the receiver and acoustic time of flight calculation, may be utilized to determine sound propagation delay. FIG. 23A shows that in one embodiment, 3 coils on the transmitter are energized with a burst of sinewaves, and at the same time an ultrasonic transducer may be energized with a burst of sinewave, preferably of the same frequency as one of the coils. FIG. 23B illustrates that a receiver may be configured to receive the 3 EM waves using sensor coils, and the ultrasonic wave using a microphone device. Total distance may be calculated from the amplitude of the 3 EM signals; then time of flight may be calculated by comparing the timing of the microphone response with that of the EM coils (FIG. 23C). This may be used to calculate distance and calibrate the EM correction factors.

Referring to FIG. 24A, in another embodiment, in an augmented reality system featuring a camera, the distance may be calculated by measuring the size in pixels of a known-size feature on another device such as a handheld controller.

Referring to FIG. 24B, in another embodiment, in an augmented reality system featuring a depth sensor, such as an infrared ("IR") depth sensor, the distance may be calculated by such depth sensor and reported directly to the controller.

Referring to FIGS. 24C and 24D, once total distance is known, either the camera or the depth sensor can be used to determine position in space. The augmented reality system may be configured to project one or more virtual targets to the user.

The user may align the controller to the targets, and the system calculates position from both the EM response, and from the direction of the virtual targets plus the previously calculated distance. Roll angle calibration may be done by aligning a known feature on the controller with a virtual target projected to the user; yaw and Pitch angle may be calibrated by presenting a virtual target to the user and having the user align two features on the controller with the target (much like sighting a rifle).

Figure 25A:
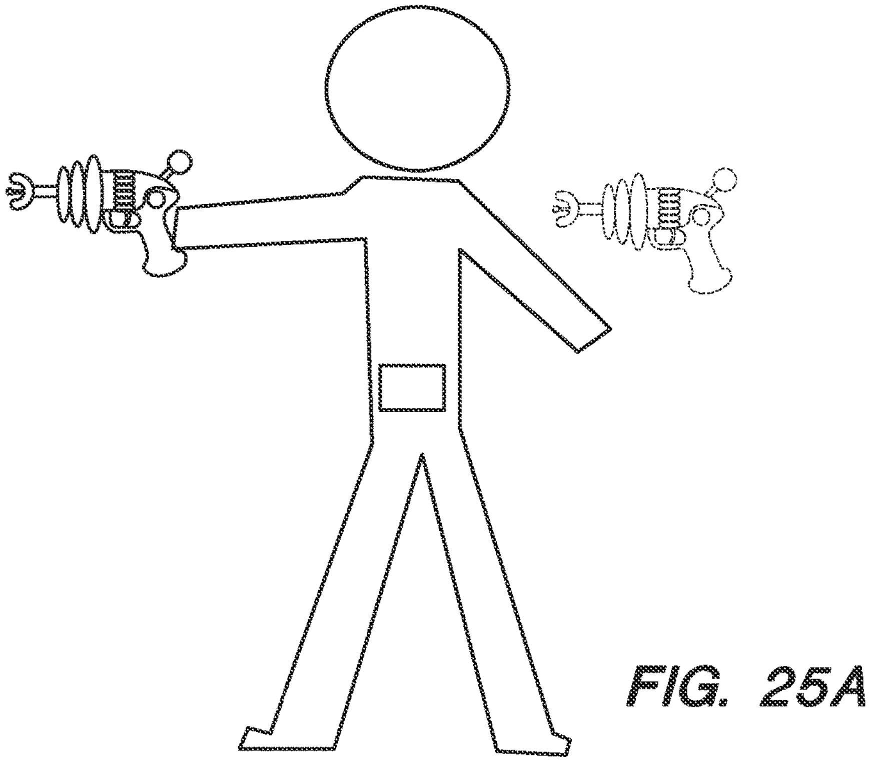
FIGS. 25A-25B illustrate potential false readings given certain sensor inputs.
Figure 25B:
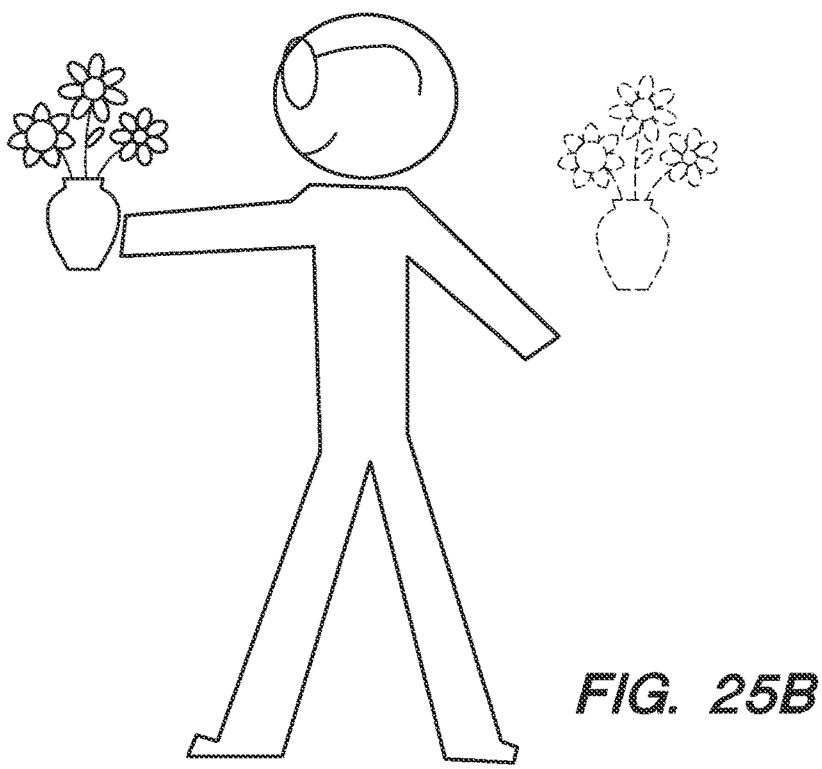

Referring to FIGS. 25A and 25B, there is an inherent ambiguity associated with EM tracking systems: a receiver would generate a similar response in two diagonally opposed locations around the transmitter. Such a challenge is particularly relevant in systems wherein both the transmitter and receiver may be mobile relative to each other.

In one embodiment, one may use an IMU sensor to see if you're on the plus or the negative side of the symmetry axis. In an embodiment such as those described above which feature world cameras and a depth camera, one can use that info to detect whether a handheld component is in the positive side or negative side of the reference axis; if the handheld is outside of the field of view of the camera and/or depth sensor, the system may be configured to decide (or the user may decide) that it must be in the 180 zone directly in back of the user, for example.

Referring back to the embodiments above wherein outward-oriented camera devices (124, 154, 156) are coupled to a system component such as a head mounted component (58), the position and orientation of the head coupled to such head mounted component (58) may be determined using information gathered from these camera devices, using techniques such as simultaneous localization and mapping, or "SLAM" techniques (also known as parallel tracking and mapping, or "PTAM" techniques).

Understanding the position and orientation of the head of the user, also known as the user's "head pose", in real or near-real time (i.e., preferably with low latency of determination and updating) is valuable in determining where the user is within the actual environment around him or her, and how to place and present virtual content relative to the user and the environment pertinent to the augmented or mixed reality experience of the user. A typical SLAM or PTAM configuration involves extracting features from incoming image information and using this to triangulate 3-D mapping points, and then tracking against those 3-D mapping points. SLAM techniques have been utilized in many implementations, such as in self-driving cars, where computing, power, and sensing resources may be relatively plentiful when compared with those which might be available on board a wearable computing device, such as a head mounted component (58).

Figure 26:
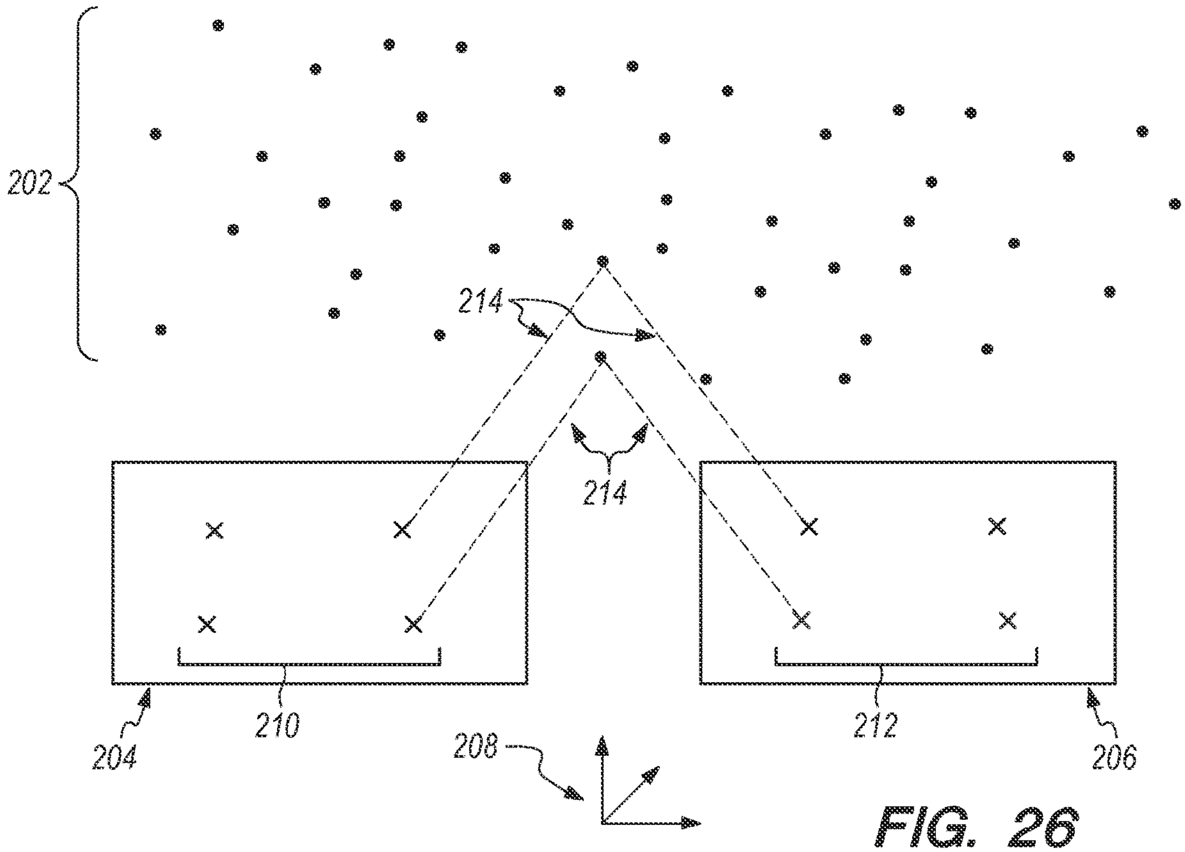
FIG. 26 illustrates feature matching as between two images according to some embodiments.

Referring to FIG. 26, in one embodiment, a wearable computing device, such as a head mounted component (58), may comprise two outward-facing cameras producing two camera images (left—204, right—206). In one embodiment a relatively lightweight, portable, and power efficient embedded processor, such as those sold by Movidius®, Intel®, Qualcomm®, or Ceva®, may comprise part of the head mounted component (58) and be operatively coupled to the camera devices. The embedded processor may be configured to first extract features (210, 212) from the camera images (204, 206). If the calibration between the two cameras is known, then the system can triangulate (214) 3-D mapping points of those features, resulting in a set of sparse 3-D map points (202). This may be stored as the "map", and these first frames may be utilized to establish the "world" coordinate system origin (208). As subsequent image information comes into the embedded processor from the cameras, the system may be configured to project the 3-D map points into the new image information, and compare with locations of 2-D features that have been detected in the image information. Thus the system may be configured to attempt to establish a 2-D to 3-D correspondence, and using a group of such correspondences, such as about six of them, the pose of the user's head (which is, of course, coupled to the head mounted device 58) may be estimated. A greater number of correspondences, such as more than six, generally means a better job of estimating the pose. Of course this analysis relies upon having some sense of where the user's head was (i.e., in terms of position and orientation) before the current images being examined. As long as the system is able to track without too much latency, the system may use the pose estimate from the most immediately previous time to estimate where the head is for the most current data. Thus is the last frame was the origin, the system may be configured to estimate that the user's head is not far from that in terms of position and/or orientation, and may search around that to find correspondences for the current time interval. Such is a basis of one embodiment of a tracking configuration.

After moving sufficiently away from the original set of map points (202), one or both camera images (204, 206) may start to lose the map points in the newly incoming images (for example, if the user's head is rotating right in space, the original map points may start to disappear to the left and may only appear in the left image, and then not at all with more rotation). Once the user has rotated too far away from the original set of map points, the system may be configured to create new map points, such as by using a process similar to that described above (detect features, create new map points)—this is how the system may be configured to keep populating the map. In one embodiment, this process may be repeated again every 10 to 20 frames, depending upon how much the user is translating and/or rotating his head relative to his environment, and thereby translating and/or rotating the associated cameras. Frames associated with newly created mapping points may be deemed "key frames," and the system may be configured to delay the feature detection process with key frames, or alternatively, feature detection may be conducted upon each frame to try to establish matches, and then when the system is ready to create a new key frame, the system already has that associated feature detection completed. Thus, in one embodiment, the basic paradigm is to start off creating a map, and then track, track, track until the system needs to create another map or additional portion thereof.

Figure 27A:
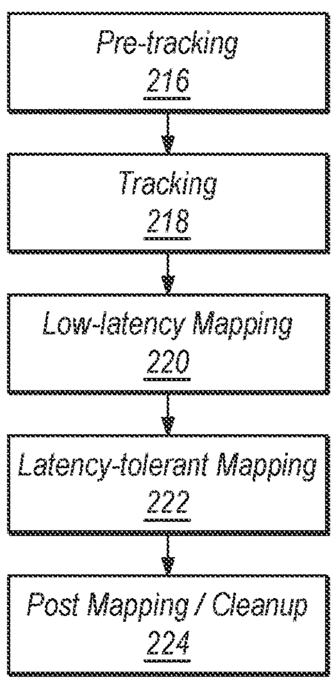
FIGS. 27A-27B depict methods of determining pose given sensor input according to some embodiments.

Referring to FIG. 27A, in one embodiment, vision based pose calculation may be split into 5 stages (pre-tracking 216, tracking 218, low-latency mapping 220, latency-tolerant mapping 222, post mapping/cleanup 224) to assist with precision and optimization for embedded processor configurations wherein computation, power, and sensing resources may be limited.

With regard to pretracking (216), the system may be configured to identify which map points project into the image before the image information arrives. In other words, the system may be configured to identify which map points would project into the image given that the system knows where the user was before, and has a sense or where the user is going.

The notion of "sensor fusion" is discussed further below, but it is worth noting here that one of the inputs that the system may get from a sensor fusion module or functionality may be "post estimation" information, at a relatively fast rate, such as at 250 Hz from an inertial measurement unit ("IMU") or other sensor or device (this is a high rate relative to, say, 30 Hz, at which the vision based pose calculation operation may be providing updates). Thus there may be a much finer temporal resolution of pose information being derived from IMU or other device relative to vision based pose calculation; but it is also noteworthy that the data from devices such as IMUs tends to be somewhat noisy and susceptible to pose estimation drift, as discussed below. For relatively short time windows, such as 10-15 milliseconds, the IMU data may be quite useful in predicting pose, and, again, when combined with other data in a sensor fusion configuration, an optimized overall result may be determined. For example, and as explained in greater detail below with reference to FIG. 28B-28G, a propagation path of collected points may be adjusted, and from that adjustment a pose at a later time may be estimated/informed by where sensor fusion determines a future point may be based on the adjusted propagation path.

Pose information coming from a sensor fusion module or functionality may be termed "pose prior", and this pose prior may be utilized by the system to estimate which sets of points are going to project into the current image. Thus in one embodiment, the system is configured in a "pre tracking" step (216) to pre-fetch those map points and conduct some pre-processing that helps to reduce latency of overall processing. Each of the 3-D map points may be associated with a descriptor, so that the system may identify them uniquely and match them to regions in the image. For example, if a given map point was created by using a feature that has a patch around it, the system may be configured to maintain some semblance of that patch along with the map point, so that when the map point is seen projected onto other images, the system can look back at the original image used to create the map, examine the patch correlation, and determine if they are the same point. Thus in pre-processing, the system may be configured to do some amount of fetching of map points, and some amount of pre-processing associated with the patches associated with those map points. Thus in pre-tracking (216), the system may be configured to pre-fetch map points, and pre-warp image patches (a "warp" of an image may be done to ensure that the system can match the patch associated with the map point with the current image; it's a way to make sure that the data being compared is compatible).

Referring back to FIG. 27A, a tracking stage may comprise several components, such as feature detection, optical flow analysis, feature matching, and pose estimation. While detecting features in the incoming image data, the system may be configured to utilize optical flow analysis to save computational time in feature detection by trying to follow features from one or more previous images. Once features have been identified in the current image, the system may be configured to try to match the features with projected map points—this may be deemed the "feature matching" portion of the configuration. In the pre-tracking stage (216), the system preferably has already identified which map points are of interest, and fetched them; in feature mapping, they are projected into the current image and the system tries to match them with the features. The output of feature mapping is the set of 2-D to 3-D correspondences, and with that in hand, the system is configured to estimate the pose.

As the user is tracking his head around, coupled to the head mounted component (58), the system preferably is configured to identify if the user is looking at a new region of the environment or not, to determine whether a new key frame is needed. In one embodiment, such analysis of whether a new key frame is needed may be almost purely based upon geometry; for example, the system may be configured to look at the distance (translational distance; also field-of-view capture reorientation—the user's head may be close translationally but re-oriented such that completely new map points are required, for example) from the current frame to the remaining key frames. Once the system has determined that a new key frame should be inserted, the mapping stage may be started. As noted above, the system may be configured to operate mapping as three different operations (low-latency mapping, latency-tolerant mapping, post/mapping or cleanup), as opposed to a single mapping operation more likely seen in a conventional SLAM or PTAM operation.

Low-latency mapping (220), which may be thought of in a simplistic form as triangulation and creation of new map points, is a critical stage, with the system preferably configured to conduct such stage immediately, because the paradigm of tracking discussed herein relies upon map points, with the system only finding a position if there are map points available to track against. The "low-latency" denomination refers to the notion that there is no tolerance for unexcused latency (in other words, this part of the mapping needs to be conducted as quickly as possible or the system has a tracking problem).

Latency-tolerant mapping (222) may be thought of in a simplistic form as an optimization stage. The overall process does not absolutely require low latency to conduct this operation known as "bundle adjustment", which provides a global optimization in the result. The system may be configured to examine the positions of 3-D points, as well as where they were observed from. There are many errors that can chain together in the process of creating map points. The bundle adjustment process may take, for example, particular points that were observed from two different view locations and use all of this information to gain a better sense of the actual 3-D geometry.

The result may be that the 3-D points and also the calculated trajectory (i.e., location, path of the capturing cameras) may be adjusted by a small amount. It is desirable to conduct these kinds of processes to not accumulate errors through the mapping/tracking process.

The post mapping/cleanup (224) stage is one in which the system may be configured to remove points on the map that do not provide valuable information in the mapping and tracking analysis. In this stage, these points that do not provide useful information about the scene are removed, and such analysis is helpful in keeping the entire mapping and tracking process scaleable.

During the vision pose calculation process, there is an assumption that features being viewed by the outward-facing cameras are static features (i.e., not moving from frame to frame relative to the global coordinate system). In various embodiments, semantic segmentation and/or object detection techniques may be utilized to remove moving objects from the pertinent field, such as humans, moving vehicles, and the like, so that features for mapping and tracking are not extracted from these regions of the various images. In one embodiment, deep learning techniques, such as those described below, may be utilized for segmenting out these non-static objects.

Figure 27B:
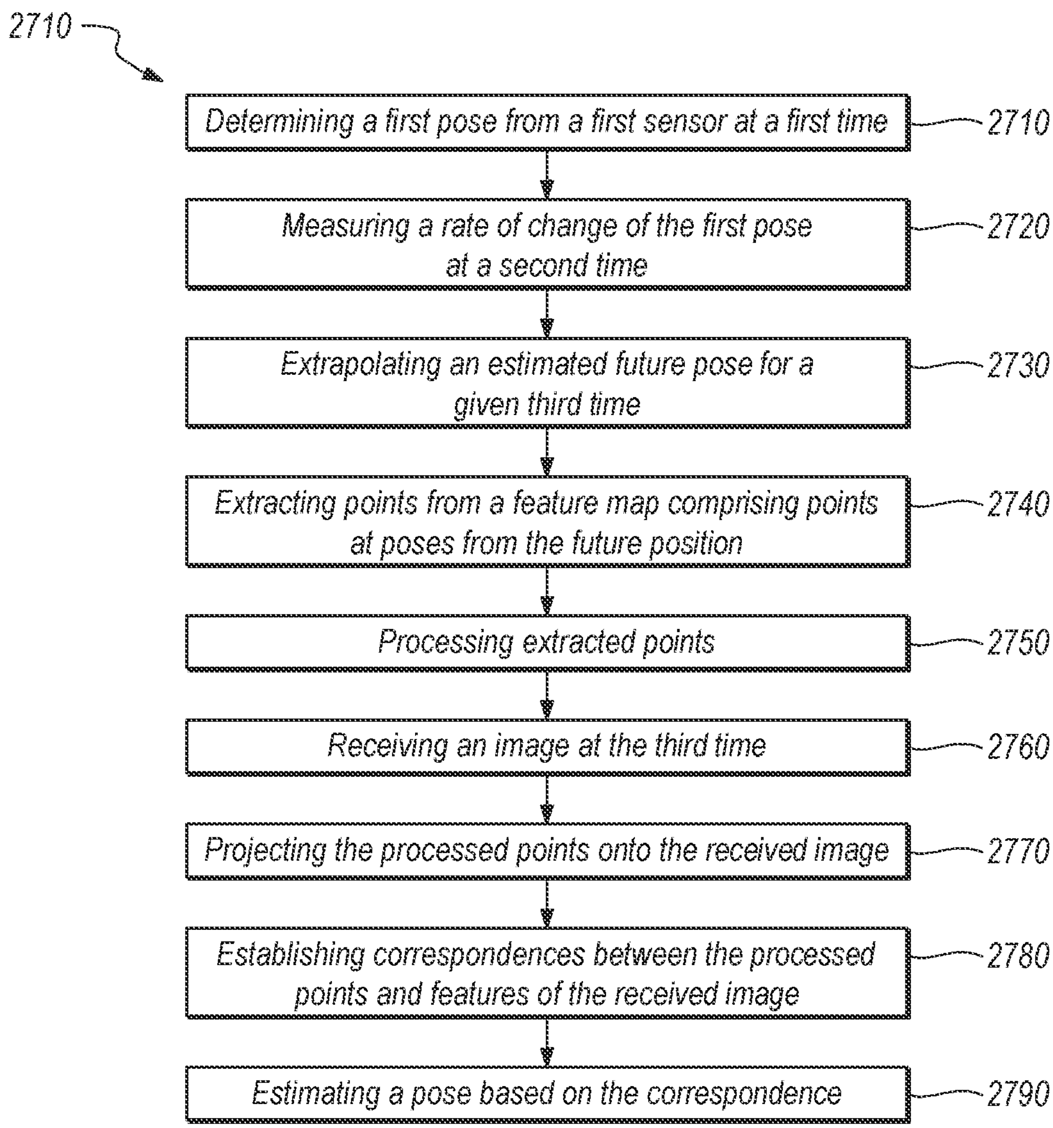

In some embodiments, a pre-fetching protocol lead to pose estimation according to method (2710) as depicted in FIG. 27B. From 2710 to 2720 pose data is received over time, such that an estimated pose at a future time may be extrapolated at 2730. Extrapolation may be simple constant value extrapolation from given inputs, or corrected extrapolation based on correction input points as described below with reference to sensor fusion.

Upon determining an estimated future pose, in some embodiments the system accesses a feature map for that position. For example, if a user is walking while wearing a head mounted component, the system may extrapolate a future position based on the pace of the user and access a feature map for that extrapolated/estimated position. In some embodiments, this step is pre-fetching as described above with reference to step (216) of FIG. 27A. At (2740) specific points of the feature map are extracted, and in some embodiments, patches surrounding the points are extracted as well. At (2750) the extracted points are processed. In some embodiments, processing comprises warping the points to match an estimated orientation or find a homography of the extracted points or patches.

At (2760) a real time image (or the current view at the estimated time) is received by the system. The processed points are projected onto the received image at (2770). At 2780 the system establishes correspondences between the received image and the processed points. In some cases, the system has made a perfect estimation and the received image and processed points align perfectly, confirming the estimated pose of (2730). In other cases, the processed points do not perfectly align with features of the received images and the system performs additional warping or adjustments to determine the correct pose based on a degree of correspondence at (2790). Of course, it is possible that none of the processed points align with features in the received image, and the system would have to revert to new tracking and feature mapping as described above with reference to FIG. 27A and steps (218)-(224).

Referring to FIGS. 28A-28F, a sensor fusion configuration may be utilized to benefit from one source of information coming from a sensor with relatively high update frequency (such as an IMU updating gyro, accelerometer, and/or magnetometer data pertinent to head pose at a frequency such as 250 Hz) and another information source updating at a lower frequency (such as a vision based head pose measurement process updating at a frequency such as 30 Hz).

Figure 28A:
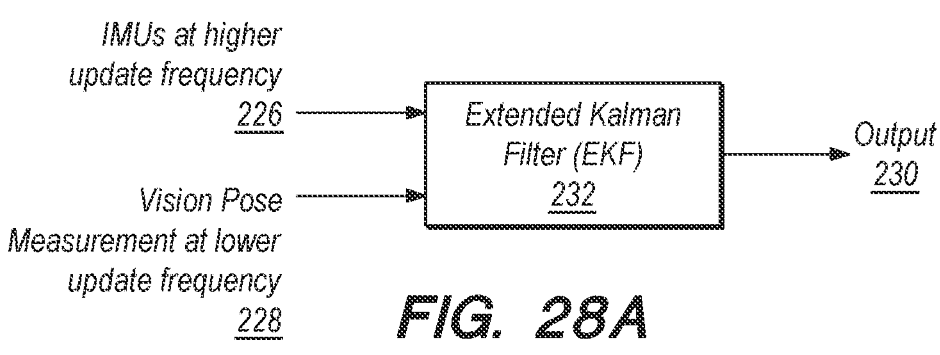
FIGS. 28A-28G illustrates various sensor fusion corrections according to some embodiments.

Referring to FIG. 28A, in one embodiment the system may be configured to use an extended Kalman filter ("EKF", 232) and to track a significant amount of information regarding the device. For example, in one embodiment, it may account for 32 states, such as angular velocity (i.e., from the IMU gyroscope), translational acceleration (i.e., from the IMU accelerometers), calibration information for the IMU itself (i.e., coordinate systems and calibration factors for the gyros and accelerometers; the IMU may also comprise one or more magnetometers). Thus the system may be configured to take in IMU measurements at a relatively high update frequency (226), such as 250 Hz, as well as data from some other source at a lower update frequency (i.e., calculated vision pose measurement, odometry data, etc), here vision pose measurement (228) at an update frequency such as 30 Hz.

Each time the EKF gets a round of IMU measurements, the system may be configured to integrate the angular velocity information to get rotational information (i.e., the integral of angular velocity (change in rotational position over change in time) is angular position (change in angular position)); likewise for translational information (in other words, by doing a double integral of the translational acceleration, the system will get position data). With such calculation the system is configured to get 6 degree-of-freedom ("DOF") pose information from the head (translation in X, Y, Z; orientation for the three rotational axes)—at the high frequency from the IMU (i.e., 250 Hz in one embodiment). Each time an integration is done, noise is accumulated in the data; doing a double integration on the translational or rotational acceleration can propagate noise.

Generally the system is configured to not rely on such data which is susceptible to "drift" due to noise for too long a time window, such as any longer than about 100 milliseconds in one embodiment. The incoming lower frequency (i.e., updated at about 30 Hz in one embodiment) data from the vision pose measurement (228) may be utilized to operate as a correction factor with the EKF (232), producing a corrected output (230).

Figures 1, 28B:
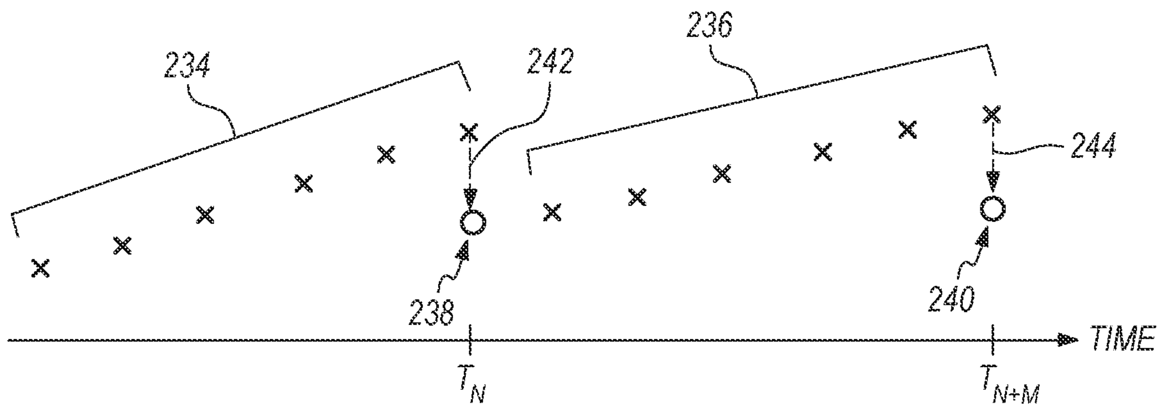

FIGS. 28B-28F illustrate how the data from one source at a higher update frequency may be combined with the data from another source at a lower update frequency. As depicted in FIG. 28B-1, a first group of dynamic input points (234), for example from a from an IMU at a higher frequency, such as 250 Hz, is shown, with a correction input point (238) coming in at a lower frequency, such as 30 Hz, such as from a vision pose calculation process. The system may be configured to correct (242) to the vision pose calculation point when such information is available, and then continue forward with a second set of dynamic input points (236) such as points from the IMU data and another correction (244) from another correction input point (240) available from the vision pose calculation process. Stated differently, the high frequency dynamic inputs collected from a first sensor may be periodically adjusted by a low frequency corrective input collected from a second sensor.

In this way, embodiments of the present invention applying corrective "updates" with the vision pose data to the "propagation path" of data coming from the IMU, using an EKF. Such update, as depicted in FIG. 28B-1, adjusts the propagation path of dynamic inputs (234) to a new origin at the correction input point (238), again at (240), and so on for future collection of points. In some embodiments, rather than adjust a propagation path to originate from a correction input point, a propagation path may adjusted by changing a rate of change (i.e. slope of points (236) in FIG. 28B) for the second set of dynamic inputs by a calculated coefficient. These adjustments may reduce jitter in the system by interpreting new data collection as less severe differences from a corrective input.

Figures 2, 28B:
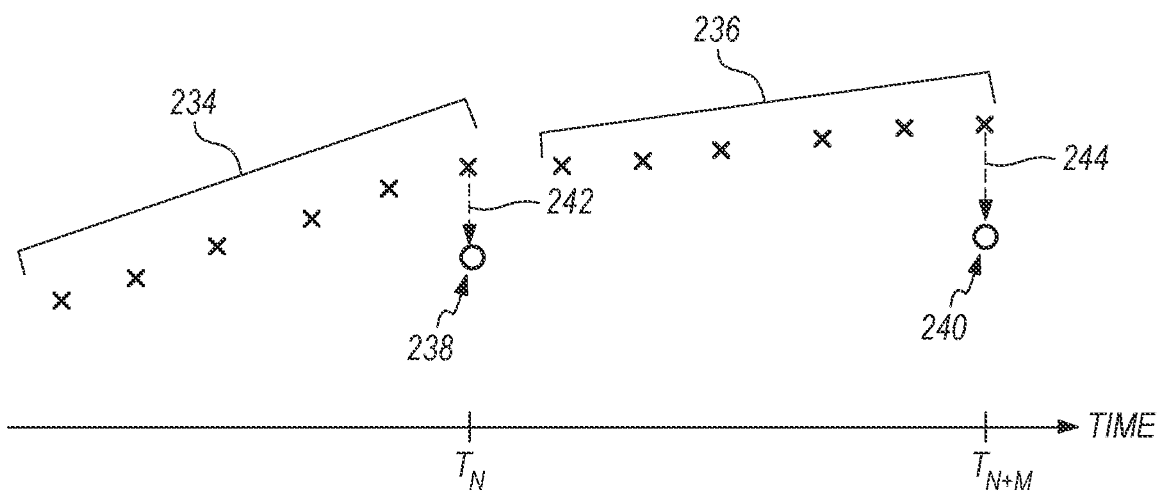

For example, as depicted in FIG. 28B-2, a coefficient is applied to second set of dynamic input points (236) such that the origin of the propagation path is the same as the last point of the propagation path of the first set of dynamic input points (234), but sloped less severe as compared to the rate of change of first set of dynamic input points (234). As depicted in FIG. 28B-2, the size of corrections (242) and (242) changes, but not as severe as if there had been no correction input at time $T_N$, and depending on the computing resource and sensor, making two full corrections at $T_N$ and $T_{N+M}$ as shown in FIG. 28B-1 may be more computationally expensive and prone to introduce jitter between the sensors than the more subtle adjustment of FIG. 28B-2. Further, as depicted in FIG. 28B-1, correction input points (238) and (240) are in the same location; if those points were also moving, a user may benefit from having a slope adjustment of dynamic input points that places the last point of propagation path (236) closer to correction input point (240), as compared to an origination adjustment.

Figure 28C:
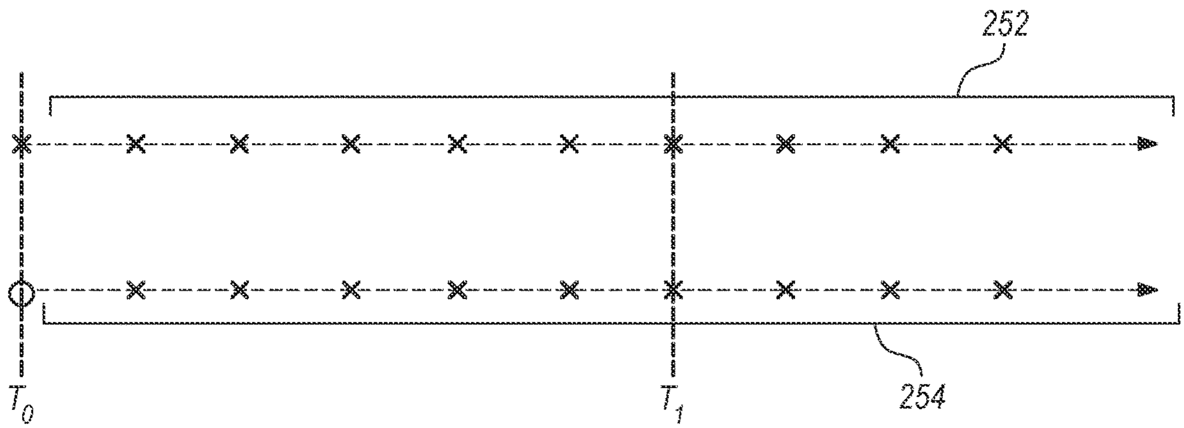
Figure 28D:
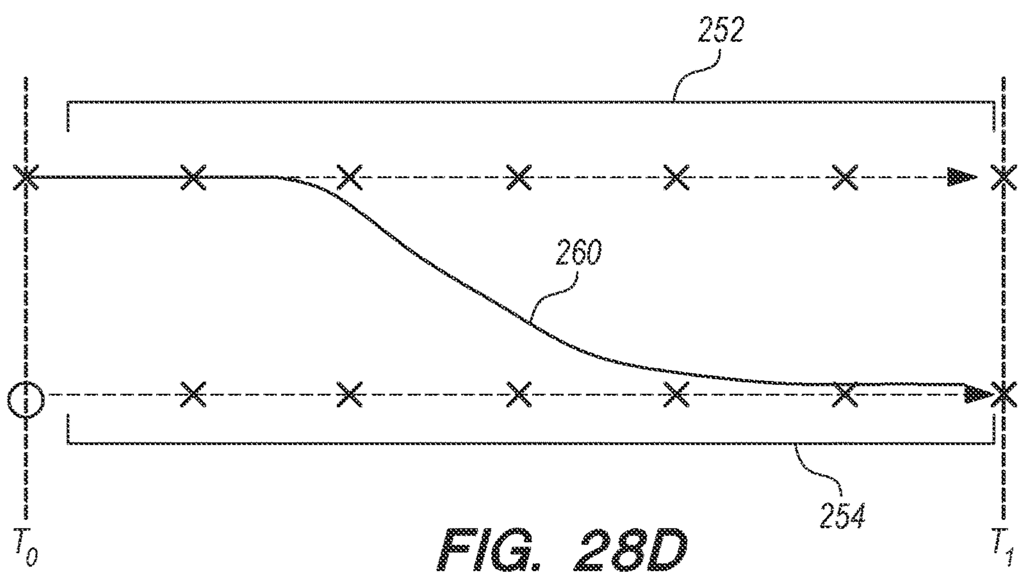
Figure 28E:
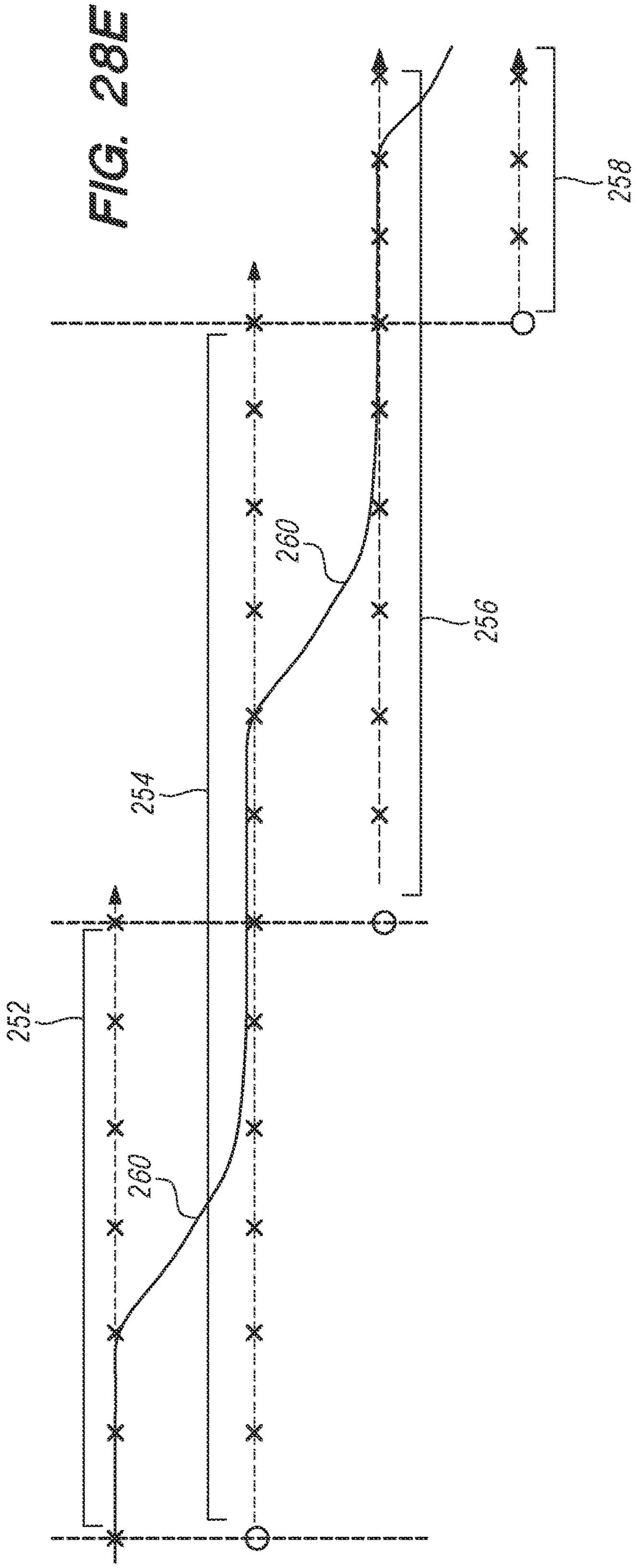
Figure 28F:
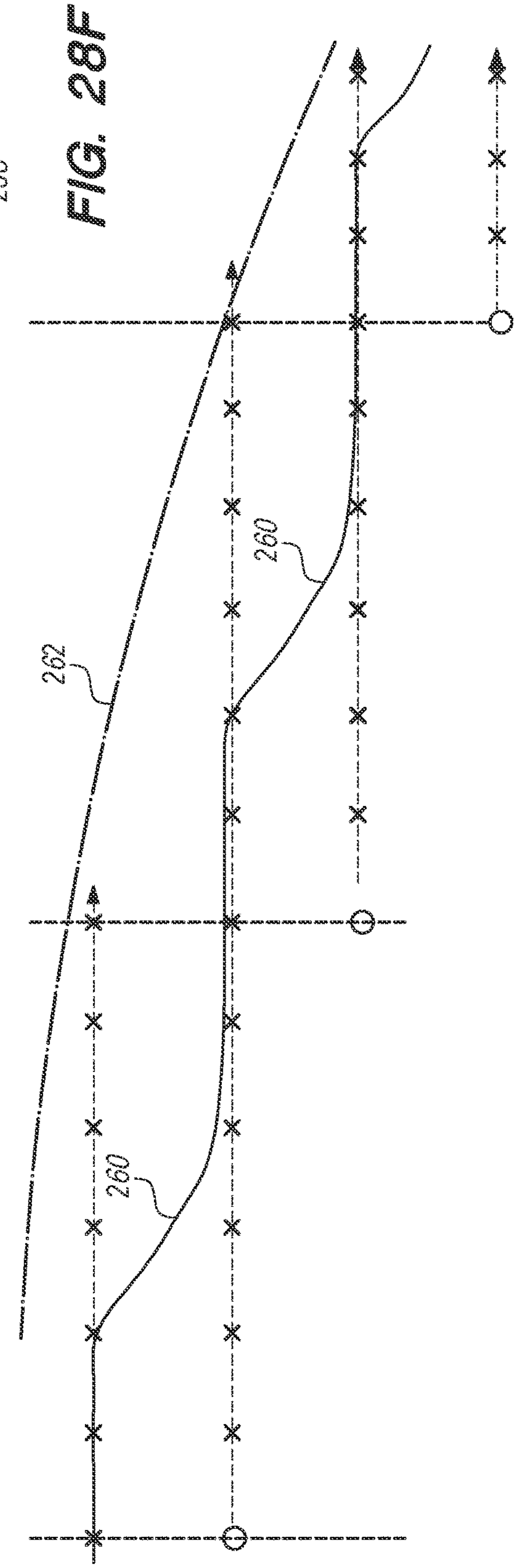
Figure 28G:
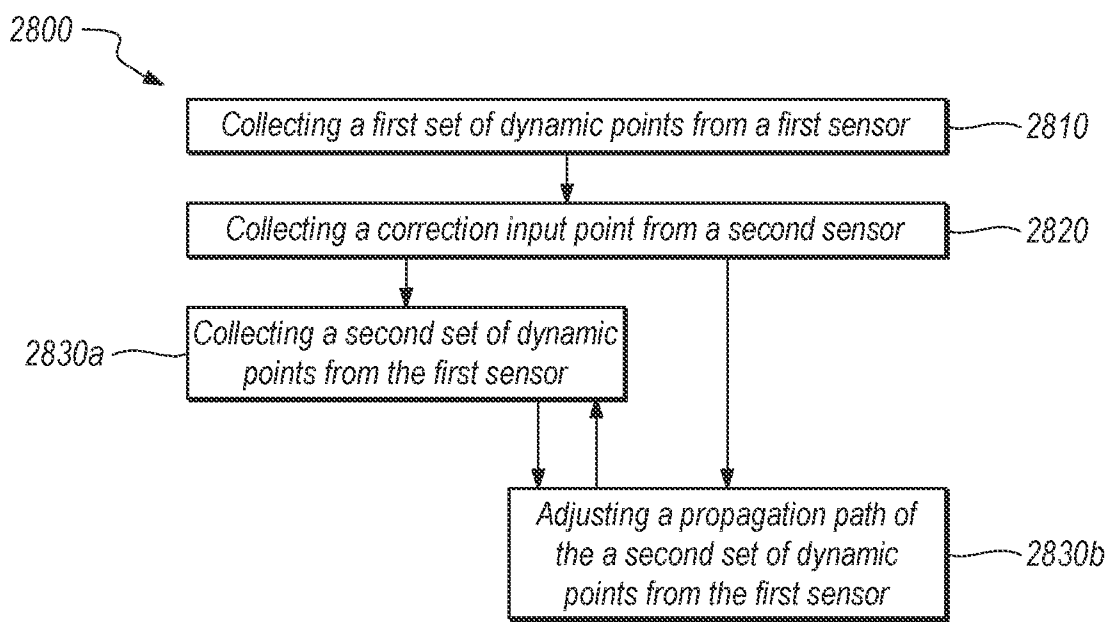

FIG. 28G depicts method 2800 of collecting a first set of dynamic points at (2810), and then collecting a correction input point at (2820). In some embodiments, method 2800 proceeds to step (2830*a*) where a second set of dynamic points is collected, and the resulting propagation path of those collected points are adjusted at (2830*b*) based on the correction input (such as by adjusting a recorded rate of change, or adjusting an origin of that propagation path). In some embodiments, after the correction input point is collected at (2820) an adjustment is determined at (2830*b*) to be applied to dynamic points collected thereafter and at (2830*a*), as second set of dynamic input points are collected the propagation path is adjusted in real time.

For systems employing sensors known to produce compounding error/noise over time and other sensors that produce low error/noise, such sensor fusion provides more economical computing resource management.

In is notable that in some embodiments, the data from the second source (i.e., such as the vision pose data) may come in not only at a lower update frequency, but also with some latency—meaning that the system preferably is configured to navigate a time domain adjustment as the information from IMU and vision pose calculation are integrated. In one embodiment, to ensure that the system is fusing in the vision pose calculation input at the correct time domain position in the IMU data, a buffer of IMU data may be maintained, to go back, to a time (say "Tx") in the IMU data to do the fusion and calculate the "update" or adjustment at the time pertinent to the input from the vision pose calculation, and then account for that in forward propagation to the current time (say "Tcurrent"), which leaves a gap between the adjusted position and/or orientation data and the most current data coming from the IMU. To ensure that there is not too much of a "jump" or "jitter" in the presentation to the user, the system may be configured to use smoothing techniques. One way to address this issue is to use weighted averaging techniques, which may be linear, nonlinear, exponential, etc., to eventually drive the fused datastream down to the adjusted path. Referring to FIG. 28C, for example, weighted averaging techniques may be utilized over the time domain between T0 and T1 to drive the signal from the unadjusted path (252; i.e., coming straight from the IMU) to the adjusted path (254; i.e., based upon data coming from the visual pose calculation process); one example is shown in FIG. 28D, wherein a fused result (260) is shown starting at the unadjusted path (252) and time T0 and moving exponentially to the adjusted path (254) by T1. Referring to FIG. 28E, a series of correction opportunities is shown with an exponential time domain correction of the fused result (260) toward the lower path from the upper path in each sequence (first correction is from the first path 252, say from the IMU, to the second path 254, say from vision based pose calculation; then continuing with the similar pattern forward, using the continued IMU data while correcting, down in this example toward successive corrected lower paths 256, 258 based upon successive points from vision pose, using each incoming vision based pose calculation point). Referring to FIG. 28F, with short enough time windows between the "updates" or corrections, the overall fused result (260) functionally may be perceived as a relatively smooth patterned result (262).

In other embodiment, rather than rely directly upon the vision pose measurement, the system may be configured to examine the derivative EKF; in other words, rather than using vision pose calculation result directly, the system uses the change in vision pose from the current time to the previous time. Such a configuration may be pursued, for example, if the amount of noise in the vision pose difference is a lot less than the amount of noise in the absolute vision pose measurement. It is preferable to not have instantaneous errors throwing off the fused result, because the output of all of this is pose, which gets sent back as the "pose prior" values to the vision system.

The external system-based "consumer" of the pose result may be termed the "Pose Service", and the system may be configured such that all other system components tap into the Pose Service when requesting a pose at any given time. The Pose Service may be configured to be a queue or stack (i.e., a buffer), with data for a sequences of time slices, one end having the most recent data. If a request of the Pose Service is the current pose, or some other pose that is in the buffer, then it may be outputted immediately; in certain configurations, the Pose Service will receive a request for: what is the pose going to be 20 milliseconds forward in time from now (for example, in a video game content rendering scenario—it may be desirable for a related service to know that it needs to be rendering something in a given position and/or orientation slightly in the future from now). In one model for producing a future pose value, the system may be configured to use a constant velocity prediction model (i.e., assume that the user's head is moving with a constant velocity and/or angular velocity); in another model for producing a future pose value, the system may be configured to use a constant acceleration prediction model (i.e. assume that the user's head is translating and/or rotating with constant acceleration).

The data in the data buffer may be utilized to extrapolate where the pose will be using such models. A constant acceleration model uses a bit longer tail into the data of the buffer for prediction than does a constant velocity model, and we have found that the subject systems can predict into the range of 20 milliseconds in the future without substantial degradation. Thus the Pose Service may be configured to have a data buffer going back in time, as well as about 20 milliseconds or more going forward, in terms of data that may be utilized to output pose.

Operationally, content operations generally will be configured to identify when the next frame draw is going to be coming in time (for example, it will either try to draw at a time T, or at a time T+N, the N being the next interval of updated data available from the Pose Service).

The use of user-facing (i.e., inward-facing, such as toward the user's eyes) cameras, such as those depicted in FIG. 16B (14) may be utilized to conduct eye tracking, as described, for example, in U.S. patent application Ser. Nos. 14/707,000 and 15/238,516, which are incorporated by reference herein in their entirety. The system may be configured to conduct several steps in eye tracking, such as first taking an image of the eye of the user; then using segmenting analysis to segment anatomy of the eye (for example, to segment the pupil, from the iris, from the sclera, from the surrounding skin); then the system may be configured to estimate the pupil center using glint locations identified in the images of the eye, the glints resulting from small illumination sources (16), such as LEDs, which may be placed around the inward-facing side of the head mounted component (58); from these steps, the system may be configured to use geometric relationships to determine an accurate estimate regarding where in space the particular eye is gazing. Such processes are fairly computationally intensive for two eyes, particularly in view of the resources available on a portable system, such as a head mounted component (58) featuring on on-board embedded processor and limited power. Deep learning techniques may be trained and utilized to address these and other computational challenges.

For example, in one embodiment, a deep learning network may be utilized to conduct the segmentation portion of the aforementioned eye tracking paradigm (i.e., a deep convolutional network may be utilized for robust pixel-wise segmentation of the left and right eye images into iris, pupil, sclera, and rest classes), with everything else remaining the same; such a configuration takes one of the large computationally intensive portions of the process and makes it significantly more efficient. In another embodiment, one joint deep learning model may be trained and utilized to conduct segmentation, pupil detection, and glint detection (i.e., a deep convolutional network may be utilized for robust pixel-wise segmentation of the left and right eye images into iris, pupil, sclera, and rest classes; eye segmentation may then be utilized to narrow down the 2-D glint locations of active inward-facing LED illumination sources); then the geometry calculations to determine gaze may be conducted. Such a paradigm also streamlines computation. In a third embodiment, a deep learning model may be trained and utilized to directly estimate gaze based upon the two images of the eyes coming from the inward-facing cameras (i.e., in such an embodiment, a deep learning model solely using the pictures of the user's eyes may be configured to tell the system where the user is gazing in three dimensional space; a deep convolutional network may be utilized for robust pixel-wise segmentation of the left and right eye images into iris, pupil, sclera, and rest classes; eye segmentation may then be utilized to narrow down the 2-D glint locations of active inward-facing LED illumination sources; the 2-D glint locations along with 3-D LED locations may be utilized to detect the cornea center in 3-D; note that all 3-D locations may be in the respective camera coordinate system; then eye segmentation may also be utilized to detect the pupil center in the 2-D image using ellipse fitting; using offline calibration information, the 2-D pupil center may be mapped to a 3-D gaze point, with depth being determined during calibration; the line connecting the cornea 3-D location and the 3-D gaze point location is the gaze vector for that eye); such a paradigm also streamlines computation, and the pertinent deep network may be trained to directly predict the 3-D gaze point given the left and right images. The loss function for such deep network to perform such a training may be a simple Euclidean loss, or also include the well-known geometric constraints of the eye model.

Further, deep learning models may be included for biometric identification using images of the user's iris from the inward-facing cameras. Such models may also be utilized to determine if a user is wearing a contact lens—because the model will jump out in the Fourier transform of the image data from the inward-facing cameras.

The use of outward-facing cameras, such as those depicted in FIG. 16A (124, 154, 156) may be utilized to conduct SLAM or PTAM analysis for the determination of pose, such as the pose of a user's head relative to the environment in which he is present wearing a head-mounted component (58), as described above. Most SLAM techniques are dependent upon tracking and matching of geometric features, as described in the embodiments above. Generally it is helpful to be in a "textured" world wherein the outward-facing cameras are able to detect corners, edges, and other features; further, certain assumptions may be made about the permanence/statics of features that are detected in scenes, and it is helpful to have significant computing and power resources available for all of this mapping and tracking analysis with SLAM or PTAM processes; such resources may be in short supply with certain systems, such as some of those which are portable or wearable, and which may have limited embedded processing capabilities and power available. Deep learning networks may be incorporated into various embodiments to observe differences in image data, and based upon training and configuration, play a key role in the SLAM analysis (in the context of SLAM, the deep networks herein may be deemed "DeepSLAM" networks) of variations of the subject system.

In one embodiment, a DeepSLAM network may be utilized to estimate pose between a pair of frames captured from cameras coupled to a component to be tracked, such as the head mounted component (58) of an augmented reality system. The system may comprise a convolutional neural network configured to learn transformation of pose (for example, the pose of a head mounted component 58) and apply this in a tracking manner. The system may be configured to start looking at a particular vector and orientation, such as straight ahead at a known origin (so 0,0,0 as X, Y, Z). Then the user's head may be moved, for example, to the right a bit, then to the left a bit between frame 0 and frame 1 with the goal of seeking the pose transform or relative pose transformation. The associated deep network may be trained on a pair of images, for example, wherein we know pose A and pose B, and image A and image B; this leads to a certain pose transformation. With the pose transformation determined, one may then integrate associated IMU data (from accelerometers, gyros, etc—as discussed above) into the pose transformation and continue tracking as the user moves away from the origin, around the room, and at whatever trajectory. Such a system may be termed a "relative pose net", which as noted above, is trained based upon pairs of frames wherein the known pose information is available (the transformation is determined from one frame to the other, and based upon the variation in the actual images, the system learns what the pose transformation is in terms of translation and rotation). Deep homography estimation, or relative pose estimation, has been discussed, for example, in U.S. Patent Application Ser. No. 62/339,799, which is incorporated by reference herein in its entirety.

When such configurations are utilized to conduct pose estimation from frame 0 to frame 1, the result generally is not perfect, and the system must have a means for dealing with drift. As the system moves forward from frame 1 to 2 to 3 to 4 and estimates relative pose, there is a small amount of error brought in between each pair of frames. This error generally accumulates and becomes a problem (for example, without addressing this error-based drift, the system can end up placing the user and his or her associated system componentry in the wrong location and orientation with pose estimation). In one embodiment, the notion of "loop closure" may be applied to solve what may be termed the "relocalization" problem. In other words, the system may be configured to determine if it has been in a particular place before—and if so, then the predicted pose information should make sense in view of the previous pose information for the same location. For example, the system may be configured such that anytime it sees a frame on the map that has been seen before, it relocalizes; if the translation is off, say by 5 mm in the X direction, and the rotation is off, say by 5 degrees in the theta direction, then the system fixes this discrepancy along with those of the other associated frames; thus the trajectory becomes the true one, as opposed to the wrong one. Relocalization is discussed in U.S. Patent Application Ser. No. 62/263,529, which is incorporated by reference herein in its entirety.

It also turns out that when pose is estimated, in particular by using IMU information (i.e., such as data from associated accelerometers, gyros, and the like, as described above), there is noise in the determined position and orientation data. If such data is directly utilized by the system without further processing to present images, for example, there is likely to be undesirable jitter and instability experienced by the user; this is why in certain techniques, such as some of those described above, Kalman filters, sensor fusion techniques, and smoothing functions may be utilized.

With deep network solutions, such as those described above using convolutional neural nets to estimate pose, the smoothing issue may be addressed using recurrent neural networks, or RNNs, which are akin to a long short term memory network. In other words, the system may be configured to build up the convolutional neural net, and on top of that, the RNN is placed. Traditional neural nets are feed forward in design, static in time; given an image or pair of images, they give you an answer. With the RNN, the output of a layer is added to the next input and fed back into the same layer again—which typically is the only layer in the net; can be envisioned as a "passage through time"—at each point in time, the same net layer is reconsidering a slightly temporally tuned input, and this cycle is repeated.

Further, unlike feed forward nets, an RNN can receive a sequence of values as an input (i.e., sequenced over time)—and can also produce a sequence of values as output. The simple structure of the RNN with built in feedback loop that allows it to behave like a forecasting engine, and the result when combined with the convolutional neural net in this embodiment is that the system can take relatively noisy trajectory data from the convolutional neural net, push it through the RNN, and it will output a trajectory that is much smoother, much more like human motion, such as motion of a user's head which may be coupled to a head mounted component (58) of a wearable computing system.

The system may also be configured to determine depth of an object from a stereo pair of images, wherein you have a deep network and left and right images are input. The convolutional neural net may be configured to output the disparity between left and right cameras (such as between left eye camera and right eye camera on a head mounted component 58); the determined disparity is the inverse of the depth if the focal distance of the cameras is known, so the system can be configured to efficiently calculate depth having the disparity information; then meshing and other processes may be conducted without involving alternative components for sensing depth, such as depth sensors, which may require relatively high computing and power resource loads.

As regards semantic analysis and the application of deep networks to various embodiments of the subject augmented reality configurations, several areas are of particular interest and applicability, including but not limited to detection of gestures and keypoints, face recognition, and 3-D object recognition.

With regard to gesture recognition, in various embodiments the system is configured to recognize certain gestures by a user's hands to control the system. In one embodiment, the embedded processor may be configured to utilize what are known as "random forests" along with sensed depth information to recognize certain gestures by the user. A random forest model is a nondeterministic model which may require a fairly large library of parameters, and may require a relatively large processing and therefore power demand.

Further, depth sensors may not always be optimally suited for reading hand gestures with certain backgrounds, such as desk or tabletops or walls which are near to the depth of the subject hand, due to noise limitations with certain depth sensors and inabilities to determine differences between, for example, 1 or 2 cm in depth accurately. In certain embodiments, random forest type of gesture recognition may be replaced with deep learning networks. One of the challenges in utilizing deep networks for such a configuration is in labelling portions of the image information, such as pixels, as "hand" or "not hand"; training and utilizing deep networks with such segmentation challenges may require doing segmentations with millions of images, which is very expensive and time consuming. To address this, in one embodiment, during training time, a thermal camera, such as those available for military or security purposes, may be coupled to the conventional outward-facing camera, such that the thermal camera essentially does the segmentation of "hand" and "no hand" itself by showing which portions of the image are hot enough to be human hand, and which are not.

With regard to face recognition, and given that the subject augmented reality system is configured to be worn in a social setting with other persons, understanding who is around the user may be of relatively high value—not only for simply identifying other nearby persons, but also for adjusting the information presented (for example, if the system identifies a nearby person as an adult friend, it may suggest that you play chess and assist in that; if the system identifies a nearby person as your child, it may suggest that you go and play soccer and may assist in that; if the system fails to identify a nearby person, or identifies them as a known danger, the user may be inclined to avoid proximity with such person).

In certain embodiments, deep neural network configurations may be utilized to assist with face recognition, in a manner similar to that discussed above in relation to deep relocalization. The model may be trained with a plurality of different faces pertinent to the user's life, and then when a face comes near the system, such as near the head mounted component (58), the system can take that face image in pixel space, translate it, for example, into a 128-dimensional vector, and then use vectors as points in high dimensional space to figure out whether this person is present in your known list of people or not. In essence, the system may be configured to do a "nearest neighbor" search in that space, and as it turns out, such a configuration can be very accurate, with false positive rates running in the 1 out of 1,000 range.

With regard to 3-D object detection, in certain embodiments, it is useful to have a deep neural network incorporated which will tell the user about the space they are in from a 3-dimensional perspective (i.e., not only walls, floors, ceiling, but also objects populating the room, such as couches, chairs, cabinets, and the like—not just from a traditional 2-dimensional sense, but from a true 3-dimensional sense). For example, in one embodiment it is desirable for a user to have a model which understands the true volumetric bounds of a couch in the room—so that the user knows what volume is occupied by the volume of the couch in the event that a virtual ball or other object is to be thrown, for example. A deep neural network model may be utilized to form a cuboid model with a high level of sophistication.

In certain embodiments, deep reinforcement networks, or deep reinforcement learning, may be utilized to learn effectively what an agent should be doing in a specific context, without the user ever having to directly tell the agent. For example, if a user wants to always have a virtual representation of his dog walking around the room that he is occupying, but he wants the dog representation to always be visible (i.e., not hidden behind a wall or cabinet), a deep reinforcement approach may turn the scenario into a game of sorts, wherein the virtual agent (here a virtual dog) is allowed to roam around in the physical space near the user, but during training time, a reward is given if the dog stays in acceptable locations from, say T0 to T1, and a penalty is given if the user's view of the dog becomes occluded, lost, or bumps into a wall or object. With such an embodiment, the deep network starts learning what it needs to do to win points rather than lose points, and pretty soon it knows what it needs to know to provide the desired function.

The system may also be configured to address lighting of the virtual world in a manner that approximates or matches the lighting of the actual world around the user. For example, to make a virtual perception blend in as optimally as possible with actual perception in augmented reality, lighting color, shadowing, and lighting vectoring is reproduced as realistically as possible with the virtual objects. In other words, if a virtual opaque coffee cup is to be positioned upon an actual tabletop in a room with yellow-ish tinted light coming from one particular corner of the room that creates shadowing from the real world objects on the real world table, then optimally the light tinting and shadowing of the virtual coffee cup would match the actual scenario. In certain embodiments, a deep learning model may be utilized to learn the illumination of an actual environment in which the system component is placed. For example, a model may be utilized that, given an image or sequences of images from the actual environment, learns the illumination of the room to determine factors such as brightness, hue, and vectoring by one or more light sources. Such a model may be trained from synthetic data, and from images captured from the user's device, such as from the user's head mounted component (58).

Figure 29:
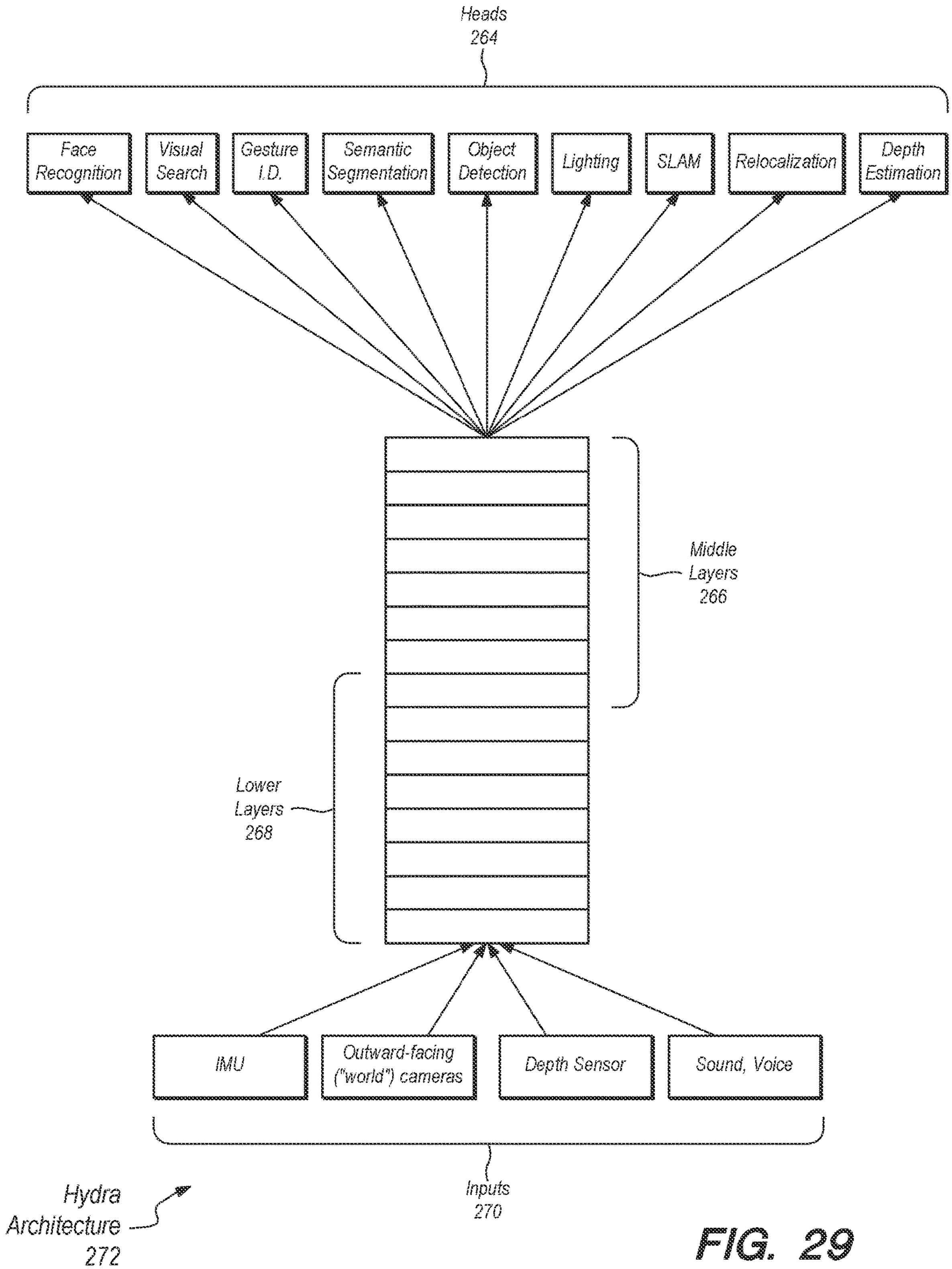
FIG. 29 illustrates a single pathway multiple layer convolutional computing architecture according to some embodiments.

Referring to FIG. 29, a deep learning network architecture which may be called a "Hydra" architecture (272) is illustrated. With such a configuration, a variety of inputs (270), such as IMU data (from accelerometers, gyros, magnetometers), outward-facing camera data, depth sensing camera data, and/or sound or voice data may be channeled to a multilayer centralized processing resource having a group of lower layers (268) which conduct a significant portion of the overall processing, pass their results to a group of middle layers (266), and ultimately to one or more of a plurality of associated "heads" (264) representing various process functionalities, such as face recognition, visual search, gesture identification, semantic segmentation, object detection, lighting detection/determination, SLAM, relocalization, and/or depth estimation (such as from stereo image information, as discussed above).

Conventionally, when using deep networks to achieve various tasks, an algorithm will be built for each task. Thus if it desired to recognize automobiles, then an algorithm will be built for that; if it is desired to recognize faces, then an algorithm will be built for that; and these algorithms may be run simultaneously. If unlimited or high levels of power and computation resource are available, then such a configuration will work well and get results; but in many scenarios, such as the scenario of a portable augmented reality system with a limited power supply and limited processing capability in an embedded processor, computing and power resources can be relatively limited, and it may be desirable to process certain aspects of the tasks together. Further, there is evidence that if one algorithm has knowledge from another, then it makes the second algorithm better. For example, if one deep network algorithm knows about dogs and cats, knowledge transfer (also termed "domain adaptation") from that may help another algorithm recognize shoes better. So there is reason to have some kind of crosstalk between algorithms during training and inference.

Further, there is a consideration related to algorithm design and modification. Preferably if further capabilities are needed relative to an initial version of an algorithm, one won't need to completely rebuild a new one from scratch. The depicted Hydra architecture (272) may be utilized to address these challenges, as well as the computing and power efficiency challenge, because as noted above, it is the case that there are common aspects of certain computing processes that can be shared. For example, in the depicted Hydra architecture (272), inputs (270), such as image information from one or more cameras, may be brought into the lower layers (268) where feature extraction on a relatively low level may be conducted. For example, Gabor functions, derivatives of Gaussians, things that basically effect lines, edges, corners, colors—these are uniform for many problems at the low level. Thus, regardless of task variation, low level feature extraction can be the same, whether it is the objective to extract cats, cars, or cows—and therefore the computation related thereto can be shared. Hydra architecture (272) is a high-level paradigm which allows knowledge sharing across algorithms to make each better, it allows for feature sharing so that computation can be shared, reduced, and not redundant, and allows one to be able to expand the suite of capabilities without having to rewrite everything—rather, new capabilities may be stacked upon the foundation with the existing capabilities.

Thus, as noted above, in the depicted embodiment, the Hydra architecture represents a deep neural network that has one unified pathway. The bottom layers (268) of the network are shared, and they extract basic units of visual primitives from input images and other inputs (270). The system may be configured to go through a few layers of convolutions to extract edges, lines, contours, junctions, and the like. The basic components that programmers used to feature-engineer, now become learned by the deep network. As it turns out, these features are useful for many algorithms, whether the algorithm is face recognition, tracking, etc. Thus once the lower computational work has been done and there is a shared representation from images or other inputs into all of the other algorithms, then there can be individual pathways, one per problem. Thus on top of this shared representation, there is a pathway that leads to face recognition that is very specific to faces, there's a pathway that leads to tracking that is very specific to SLAM, and so on for the other "heads" (264) of the architecture (272). With such an embodiment, one has all of this shared computation that allows for multiplying additions basically, and on the other hand one has very specific pathways that are on top of the general knowledge and allow one to fine tune and find answers to very specific questions.

Also of value with such a configuration is the fact that such neural networks are designed so that the lower layers (268), which are closer to the input (270), require more computation, because at each layer of computation, the system takes the original input and transforms it into some other dimensional space where typically the dimensionality of things is reduced. So once the fifth layer of the network from the bottom layer is achieved, the amount of computation may be in the range of 20 time less than what was required in the lowest level (i.e., because the input was much larger and much larger matrix multiplication was required). In one embodiment, by the time the system has extracted the shared computation, it's fairly agnostic to the problems that need to be solved. A large portion of the computation of almost any algorithm has been completed in the lower layers, so when new pathways are added for face recognition, tracking, depth, lighting, and the like, these contribute relatively little to the computational constraints—and thus such an architecture provides plenty of capability for expansion.

In one embodiment, for the first few layers, they may be no pooling to retain the highest resolution data; mid layers may have pooling processes because at that point, super high resolution is not needed (for example, super high resolution is not needed to know where the wheel of a car is in a middle layer; one really just needs to know where the nut and bolt is located from the lower levels in high resolution, and then the image data can be significantly shrunk as it is passed to the middle layers for location of the wheel of the car).

Further, once the network has all of the learned connections, everything is loosely wired and the connections are advantageously learned through the data. The middle layers (266) may be configured to start learning parts, for example—object parts, face features, and the like; so rather than simple Gabor functions, the middle layers are processing more complex constructs (i.e., squiggly shapes, shading, etc). Then as the process moves higher toward the top, there are split-offs into the unique head components (264), some of which may have many layers, and some of which may have few. Again, the scalability and efficiency is largely due to the fact that a large portion, such as 90%, of the processing flops are within the lower layers (268), then a small portion, such as 5% of the flops, are at the middle layers (266), and another 5% is in the heads (264).

Such networks may be pre-trained using information that already exists. For example, in one embodiment, ImageNet, a large group (in the range of 10 million) of images from a large group of classes (in the range of 1,000) may be utilized to train all of the classes. In one embodiment, once it's trained, the top layer that distinguishes the classes may be thrown out, but all of the weights learned in the training process are kept.

Figure 30A:
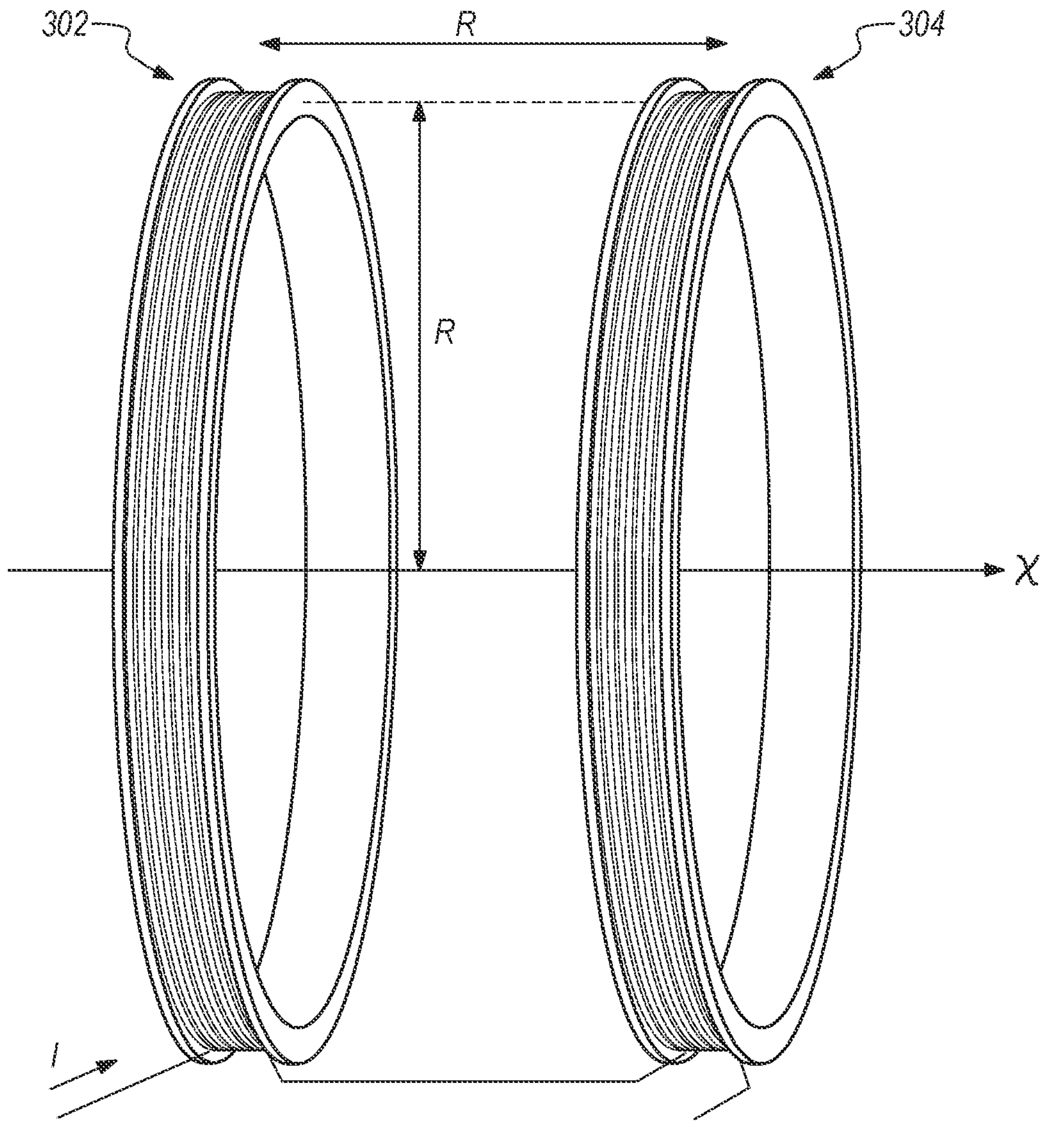
FIGS. 30A-30E illustrate various coil configurations for an electromagnetic tracking system according to some embodiments.

Referring to FIG. 30A, a pair of coils (302, 304) is shown in a configuration with a particular radius and spacing therebetween, which may be known as a "Helmholtz coil."

Figure 30B:
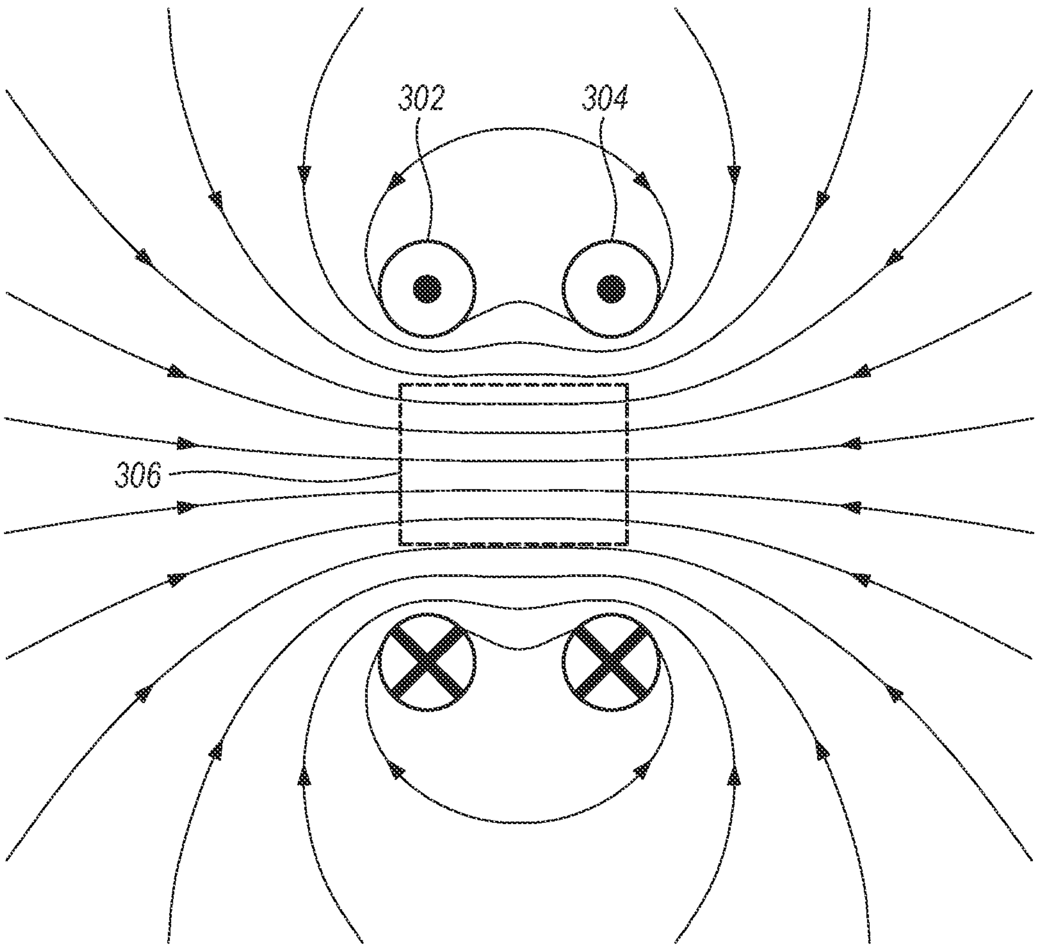
Figure 30C:
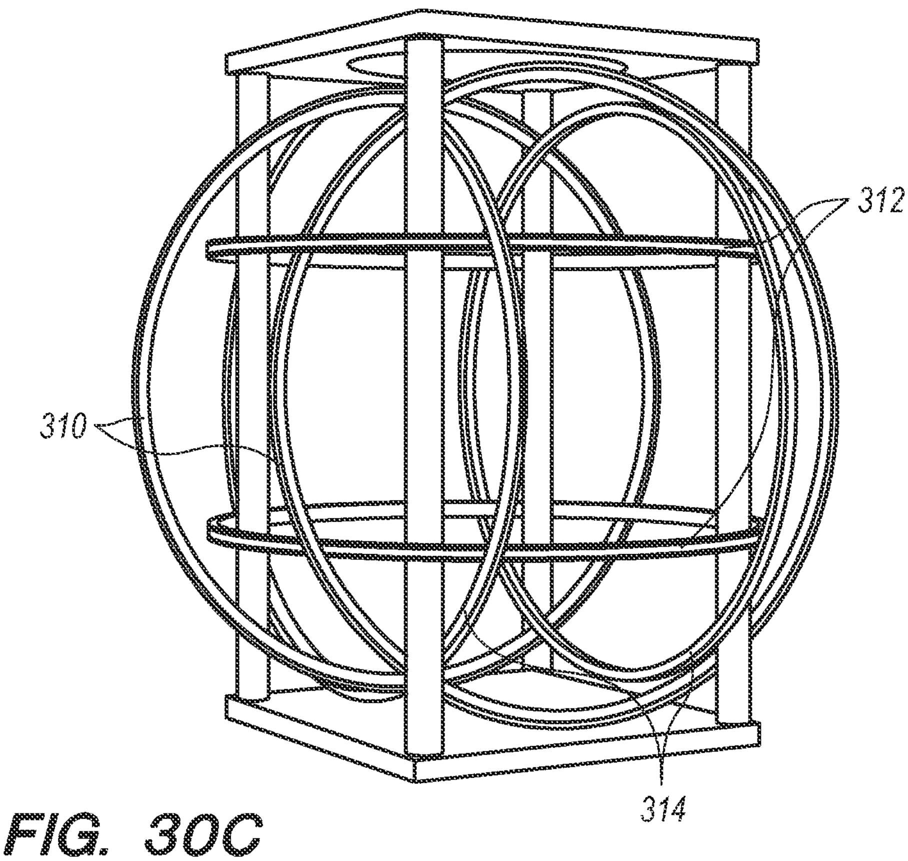
Figure 30D:
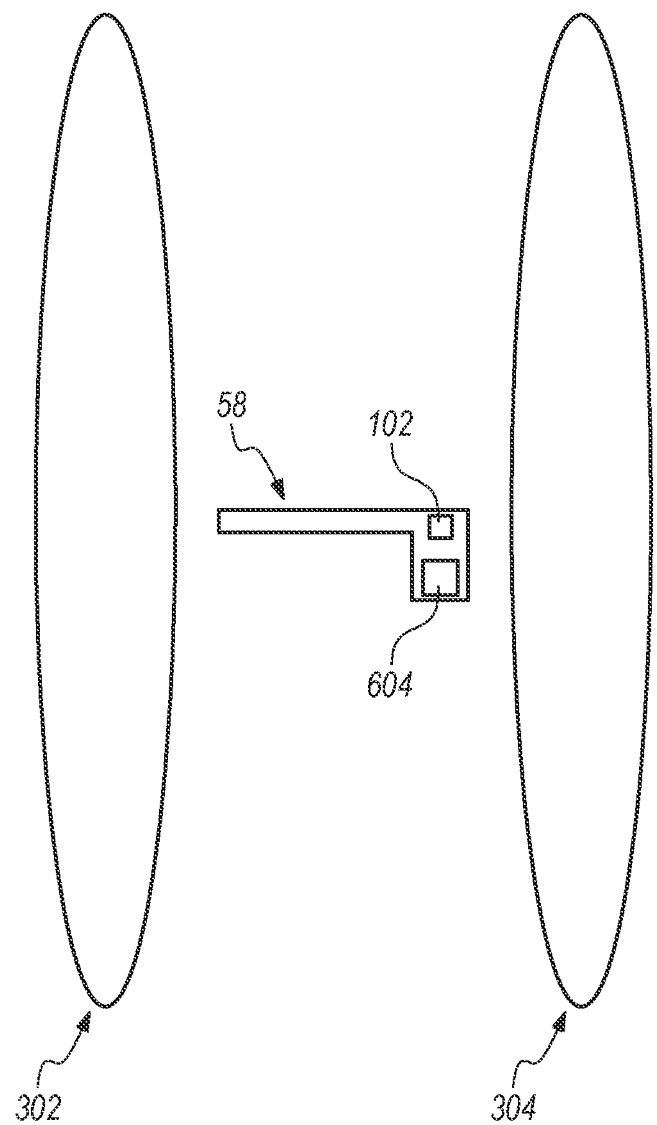

Helmholtz coils come in various configuration (here a pair a round coils are shown) and are known for producing a relatively uniform magnetic field through a given volume, such as that depicted in FIG. 30B (306); magnetic field lines are shown with arrows about the cross sectional views of the coils (302, 304) of FIG. 30B. FIG. 30C illustrates a three-axis Helmholtz coil configuration wherein three pairs (310, 312, 314) are orthogonally oriented as shown. Other variations of Helmholtz or Merritt coils, such as those featuring squared coils, also may be utilized to create predictable and relatively uniform magnetic fields through given volumes. In one embodiment, a Helmholtz type coil may be utilized to assist in calibrating the orientation determining relationship between two sensors operatively coupled to a head mounted component (58) such as those described above. For example, referring to FIG. 30D, head mounted component (58) coupled to an IMU (102) and electromagnetic field sensor (604), as described above, may be placed within a known magnetic field volume of a Helmholtz coil pair (302, 304). With current applied through the coil pair (302, 304), the coils may be configured to generate magnetic fields at selectable frequencies. In one embodiment, the system may be configured to energize the coils at a direct current level to produce a directly-readable output from the magnetometer component of the IMU (102); then the coils may be energized at an alternating current level, for example, to produce a directly-readable output from the electromagnetic localization receiver coil (604). Since those applied fields in such a configuration are generated by the same physical coils (302, 304), they are registered with each other and we know that the fields must have the same orientation. Thus we may read the values from the IMU (102) and electromagnetic field sensor (604) and directly measure a calibration which may be utilized to characterize any difference in orientation readings between the two devices (102, 604) in three dimensions—thus providing a usable calibration between the two for runtime. In one embodiment, the head mounted component (58) may be electromechanically reoriented for further testing relative to the coil set (302, 304). In another embodiment, the coil set (302, 304) may be electromechanically reoriented for further testing relative to the head mounted component (58). In another embodiment, the head mounted component (58) and coil set (302, 304) may be electromechanically reorientable relative to each other. In another embodiment, a three-axis Helmholtz coil, such as that depicted in FIG. 30C, or other more sophisticated magnetic field producing coil, may be utilized to generate magnetic fields and components without the need for reorientation of the head mounted component (58) relative to the coil set (302, 304) for additional testing data.

Figure 30E:
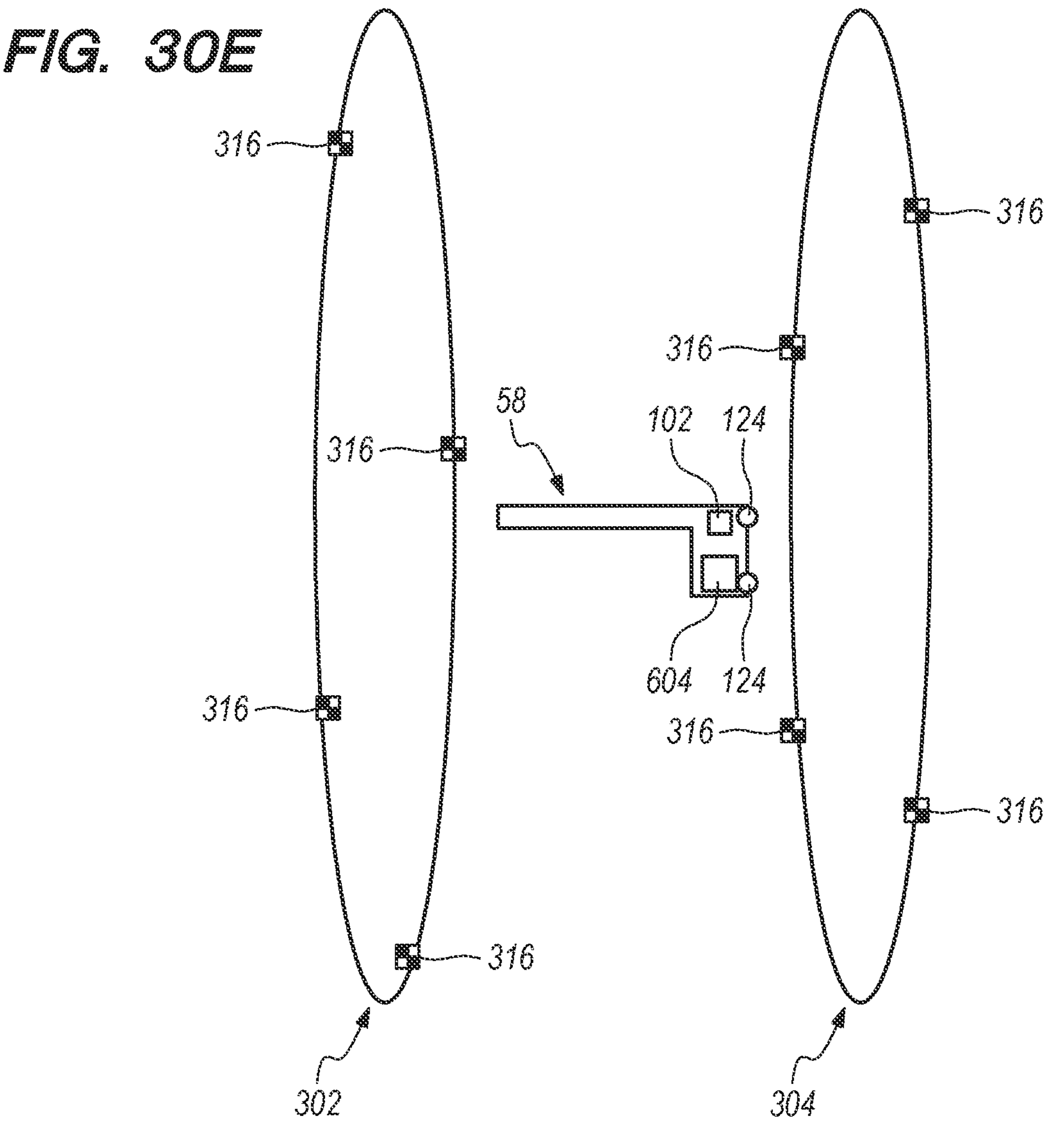

Referring to FIG. 30E, the system or subsystem being utilized in such calibration configurations to produce a predictable magnetic field, such as a pair of coils (302, 304) in a Helmholtz type of configuration, may have one or more optical fiducials (316) coupled thereto, such that the one or more cameras (124) which may comprise the head mounted component (58) may view such fiducials. Such a configuration provides an opportunity to ensure that the electromagnetic sensing subsystem is aligned in a known way with the cameras. In other words, with such a configuration, one has optical fiducials physically coupled or anchored to the magnetic field generating device in a known or measured fashion (for example, an articulated coordinate measurement machine may be utilized to establish the precise X,Y,Z coordinates of each fiducial location 316); the head mounted component (58) may be placed inside of the testing volume and exposed to the magnetic field, while the cameras (124) of the head mounted component (58) observe one or more fiducials (316) and thus calibrate the extrinsics of the magnetic field sensors and the cameras (because the magnetic field generator is attached to the fiducials that the cameras are observing). The optical fiducials (316) may comprise flat features such as checkerboards, aruco markers, textured or otherwise three-dimensional features. The optical fiducials may also be dynamic, such as in a configuration wherein small displays, such as LCD displays, are utilized; they may be static and printed out; they may be etched with lasers or chemistry into a substrate material; they may comprise coatings or anodizing or other features recognizable by the cameras (124). In a factory calibration setting, a plurality of calibration systems, such as those described herein, may be located adjacent one another, and may be timed such that adjacent systems do not produce magnetic fields that would interfere with readings at an adjacent system. In one embodiment a group of calibration stations maybe time sequenced; in another embodiment every other, or every second, or every third, and so on, may be simultaneously operated to provide functional separation.

Referring to FIGS. 31A-32C, one of the challenges with a head mounted wearable component (58) that comprises various electronic components, such as an embedded processor, is conducting heat out of the component (58) and associated subcomponents, and away from the user's head. It is also desirable to have a head mounted wearable component (58) which generally is low in mass for comfort and other ergonomic and operational advantages (for example, low inertia and moment of inertia to easily stay with the head of the user during head movement). In one embodiment, the head mounted wearable component (58) may comprise composite materials, such as carbon fiber strands and/or fabric combined with one of more matrix materials such as epoxy. Such a construct may be engineered to have specific structural moduli over various portions of the head mounted wearable component (58), and may be relatively low in mass.

Figure 31A:
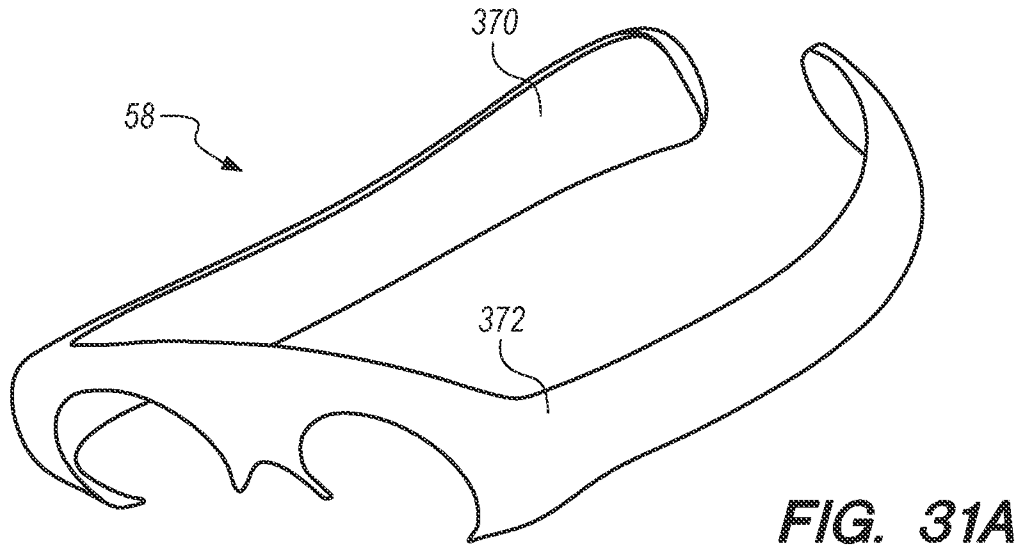
FIGS. 31A-32C illustrate various thermal management configurations according to some embodiments.
Figure 31B:
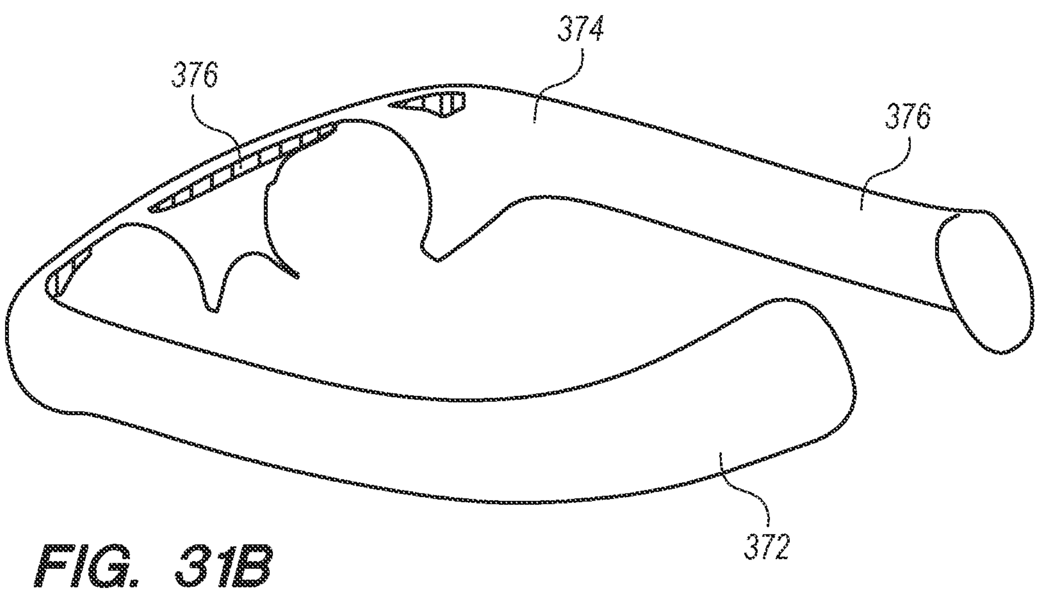

Referring to FIG. 31A, in one embodiment, a mechanical inner structure (370) may be created to serve in limiting deflection in select areas, and to provide mechanical means for transferring heat, while an outer shell component (372) may comprise a plurality of layers of composite material, such as that comprising fabric bound to epoxy or resin. Referring to FIG. 31B, mechanical inner structures (376) may be provided to serve as deflection limiters in select areas where relative stiffness is desired; these may also provide for a mechanical means of transferring heat. Strategic cuts or gaps (374) may be formed in various layers of the construct to serve in limiting deflection to certain areas or zones (such as in the case of what is known as a "living hinge" configuration across a portion of the construct), and to provide mechanical means for transferring heat away.

One of the challenges with certain composite materials is that while some of the materials, typically the fibers or fabric, may have relatively high thermal conductivity properties, matrix materials such as epoxy typically have low thermal conductivity properties, making an overall composite have a somewhat low thermal conductivity. For example, referring to FIG. 32A, with a conventional layered configuration of a composite member, layers of matrix (384) are combined with layers of fiber or fabric (386), and while the fiber or fabric (386) may have relatively high thermal conductivity, the matrix (384) typically has low thermal conductivity, thus preventing efficient escape or transfer of heat (380) due to the repeated and symmetric layering. A simplified heat profile map (382) across the composite construct from the source of heat (380), with more heat being transferred closer to the source, as would be expected.

Figure 32A:
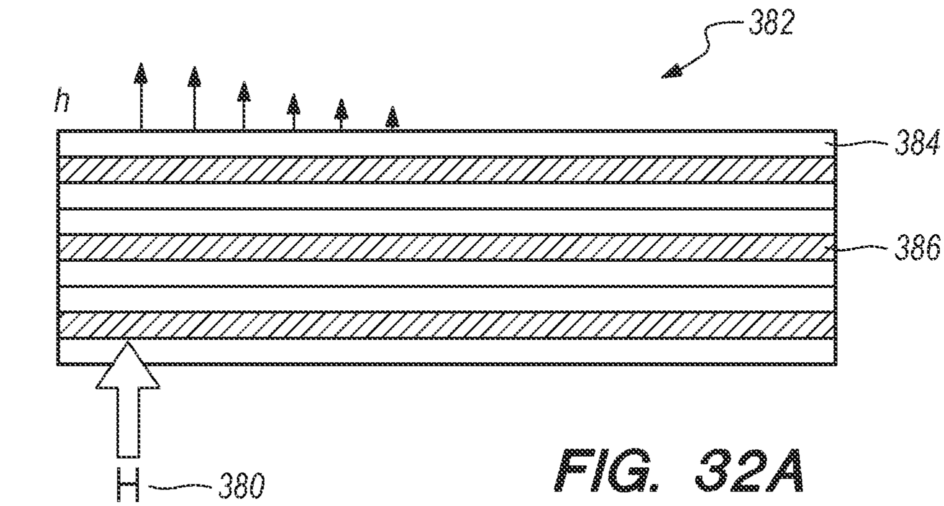
Figure 32B:
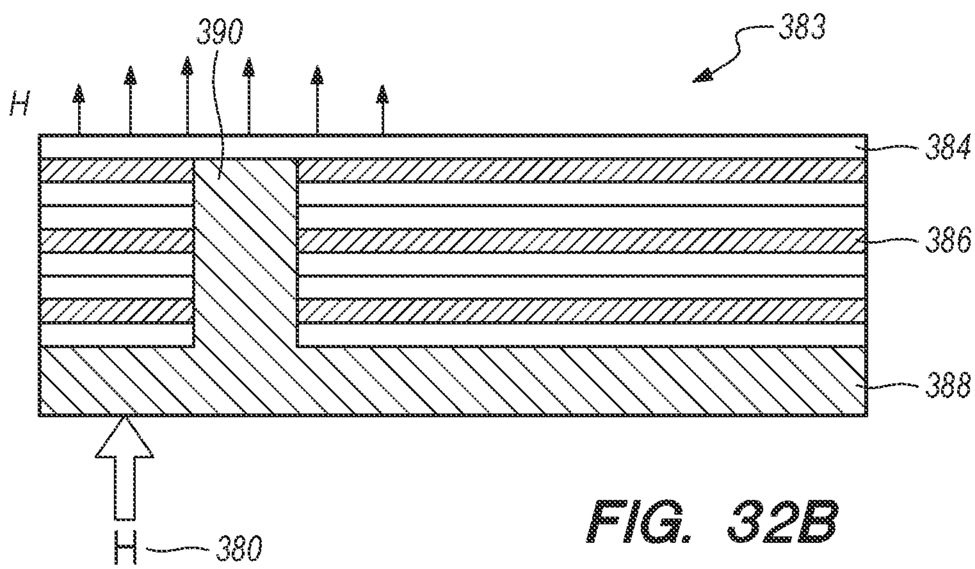
Figure 32C:
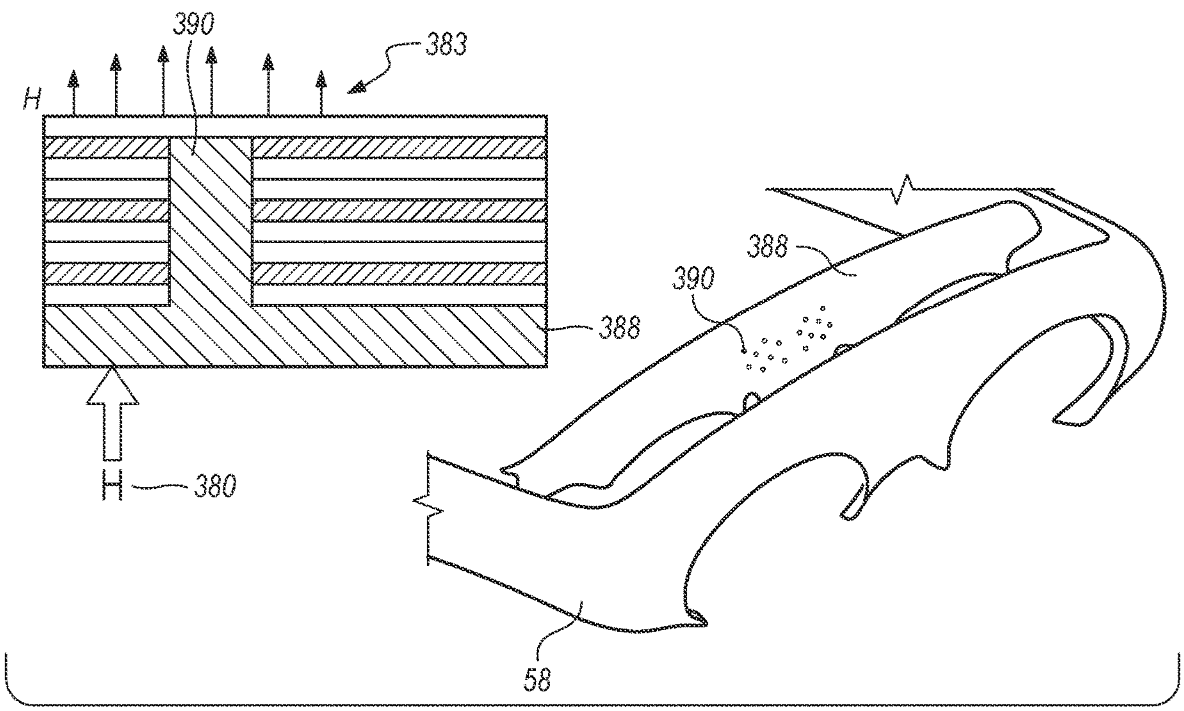

Referring to FIGS. 32B and 32C, asymmetries of various types may be engineered into composite constructs to more optimally transfer heat across, and at specified geometric positions. For example, referring to FIG. 32B, an internal mechanical structure (388) having a relatively high thermal conductivity is shown extending across a substantial portion of the composite construct at a specified "thermal via" (390) location to specifically focus heat transfer from the source (380) across the composite structure at such location (refer, for example, to the sample heat profile plot 383). FIG. 32C illustrates an implementation of such a configuration with an internal mechanical structure (388) which may be exposed to relatively high heat (380), such as from an embedded processor, camera, or other exothermic component; such heat may be directed away from such component using a thermal via (390) which may comprise a relatively high thermal conductivity material. Suitable materials for relatively high thermal conductivity fibers or fabrics include carbon fiber (thermal conductivity between about 21 and 180 W/mk, the units representing watts per meter kelvin); high modulus mesophase pitch carbon fiber, in the fiber direction (500 W/mk). Glass has a thermal conductivity of about 1 W/mk. Typical epoxy matrix materials have relatively low thermal conductivity, as noted above (between about 0.5 and 1.5 W/mk), although certain other components may be added to epoxy matrix to increase the thermal conductivity. For example, in various embodiments carbon nanotube material (theoretical thermal conductivity of 3,500 W/mk) may be added; and/or Graphene (theoretical thermal conductivity of W/mk); and/or diamond (thermal conductivity of 2,500 W/mk); and/or metallic components, such as aluminum, copper, gold, or silver (210 W/mK, 398 W/mk, 315 W/mk, 428 W/mk, respectively), may be added to a matrix material (i.e., to be combined with a fiber or fabric in a composite configuration, and/or to be utilized as a thermal via structure) to improve its over thermal conductivity to assist in moving heat away from the device and away from the user's head.

In another embodiment, strands or leads of electrically conductive material may be layered into an overall composite structure to provide not only enhanced thermal conductivity, but also electrical conductivity, to function as a power, signal, or other lead that is built or integrated into such structure. The engineered composite structures disclosed herein may be hand-manufactured layer by layer, or may be robotically constructed. In one embodiment, a mold may be created, into which the various layers of fiber and/or fabric, and matrix material, may be placed for combination and curing. In one embodiment, a powder coating layer maybe placed first against the mold, and last against the other side of the mold, such that upon removal of the cured component, both sides of such component are powder coated. Powder coating or other coating, sealing, or painting materials may be specifically selected for relatively high thermal conductivity, to facilitate in the exiting of heat away from such componentry.

As described above in reference to FIGS. 11A and 11B, and FIGS. 22A-22C, various components may be coupled to a head mounted wearable component (58). In various embodiments, such components may be physically integrated within the layers of a composite such that they are embedded within such components. For example, in one embodiment, it may be desirable to have one or more copper loop magnetic flux capturing circuits embedded at specific positions adjacent an outer surface for electromagnetic tracking. In another embodiment, it may be desirable to have one or more conductive leads functioning as a radiofrequency antenna, and it may be desirable for specific absorption rate ("SAR") reasons to position such antenna, whether it is a transmitter or receiver, on the opposite side of such component relative to the user's skin. In another embodiment, the fiber and/or fabric positioning may be specifically engineered to provide annular structural enhancement around locations of apertures to be created within a construct, such as for a camera lens or other device.

In one embodiment, the various thermal components may be specifically engineered to not only move heat away from certain components and away from the user, but also to eliminate certain conventional components such as air vents, fans, and the like.

Figure 33:
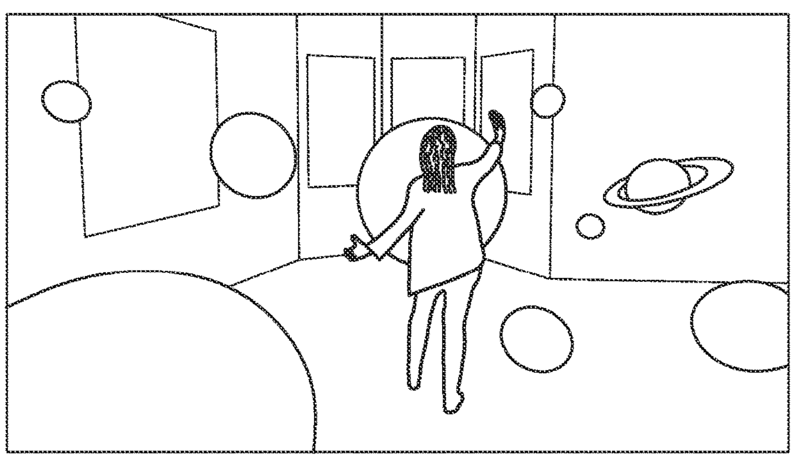
FIGS. 33-34D illustrate placement of virtual content for interaction by a user according to some embodiments.
Figure 34A:
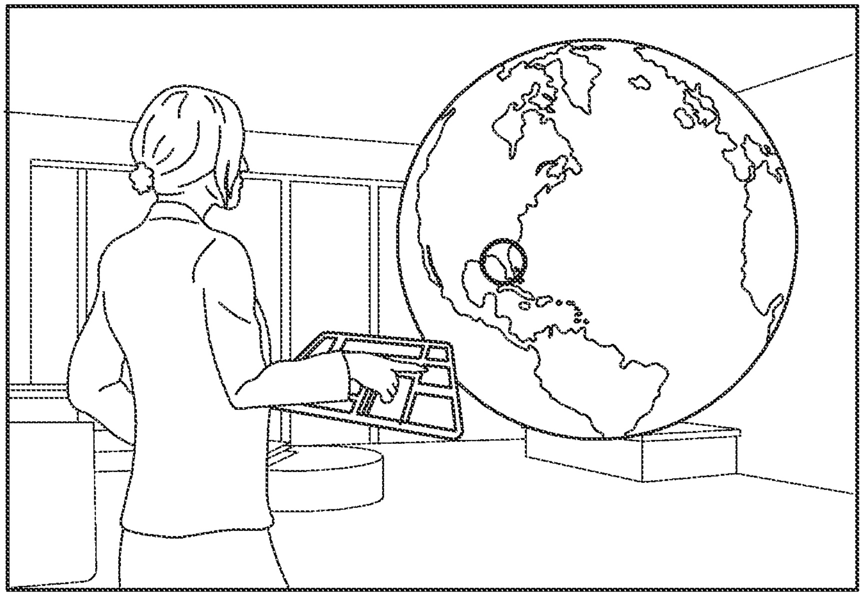
Figure 34B:
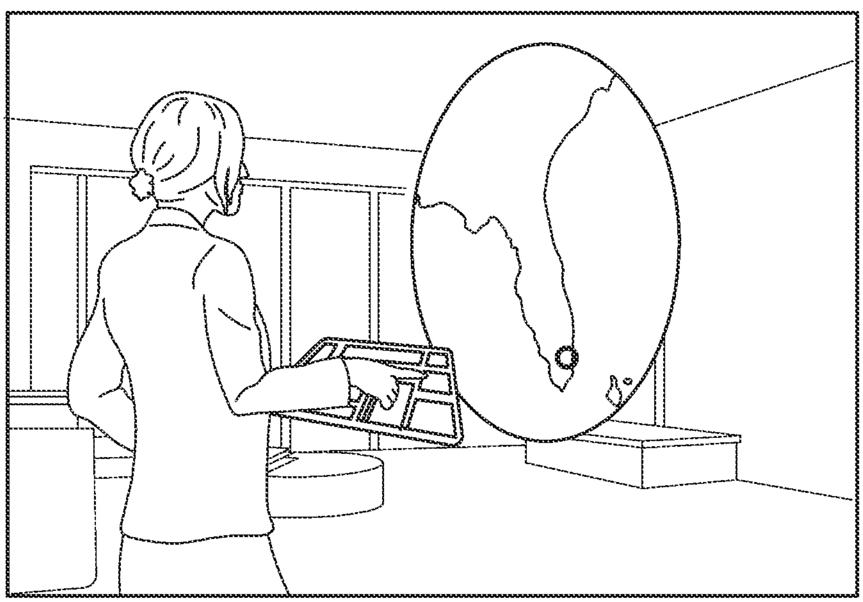
Figure 34C:
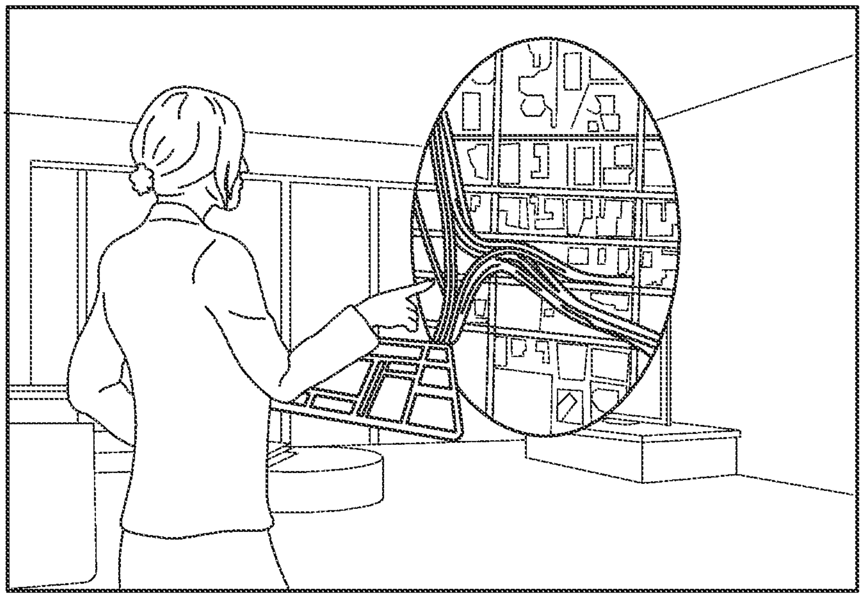
Figure 34D:
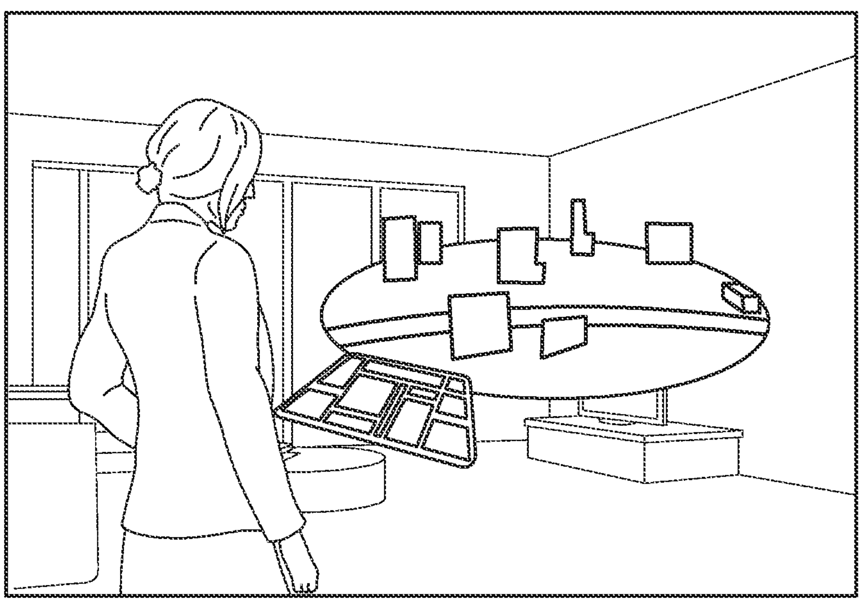
Figure 88:
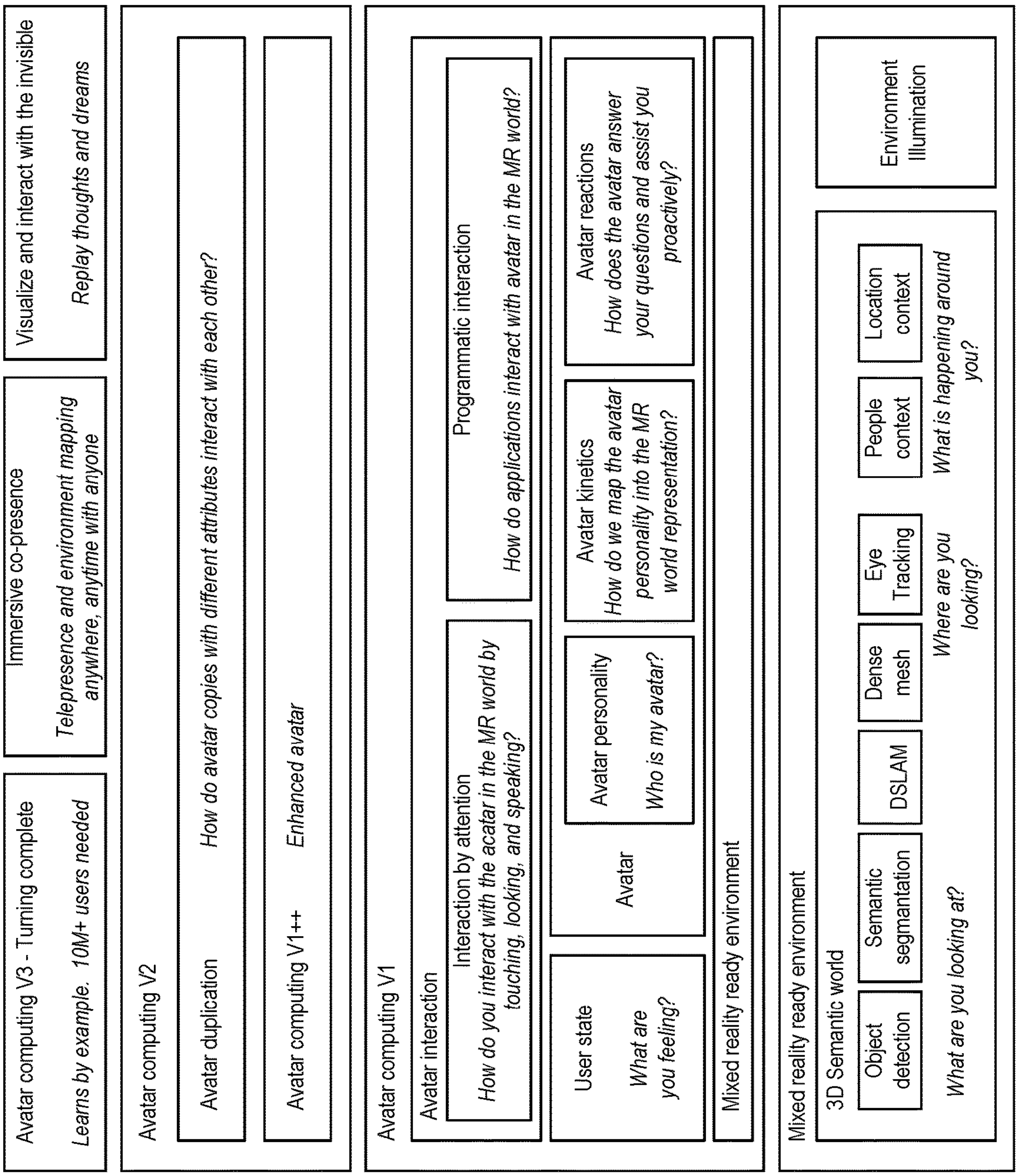
FIG. 88 illustrates an augmented reality avatar presentation protocol according to some embodiments.

Referring to FIGS. 33-88, various embodiments are illustrated featuring various aspects of the aforementioned system configurations, such that augmented reality, or "mixed reality" may be utilized to assist with various aspects of modern life of the user.

Figure 35:
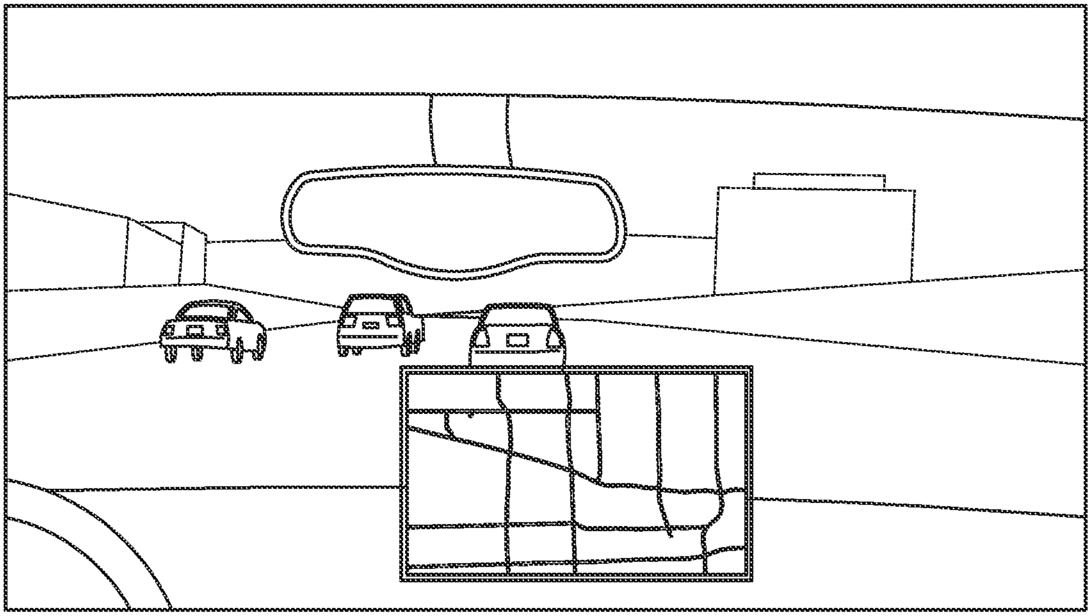
FIG. 35 illustrates driving assistance by placement of virtual content according to some embodiments.
Figure 36:
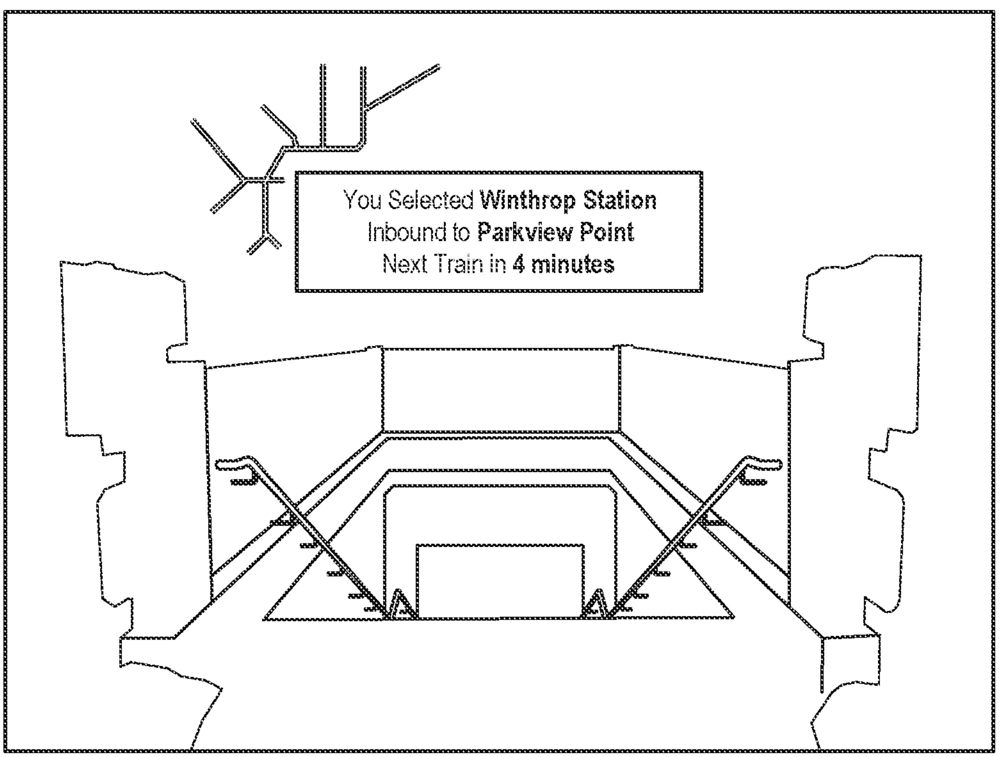
FIG. 36 illustrates virtual highlighting of content within a field of view with select information presented as a virtual display element according to some embodiments.
Figure 37:
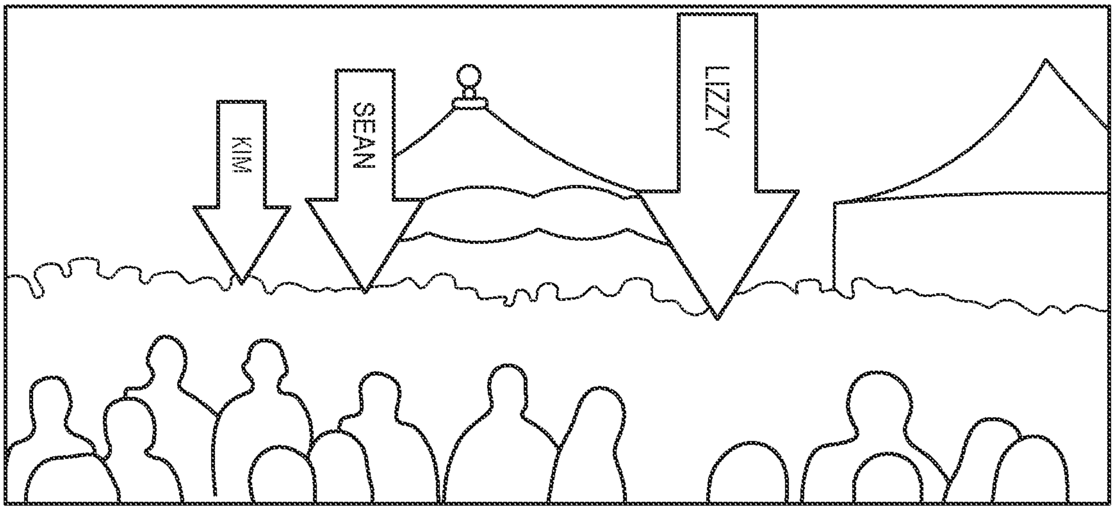
FIG. 37 illustrates virtual location assistance pertinent to identify within settings that are difficult to visualize according to some embodiments.
Figure 38A:
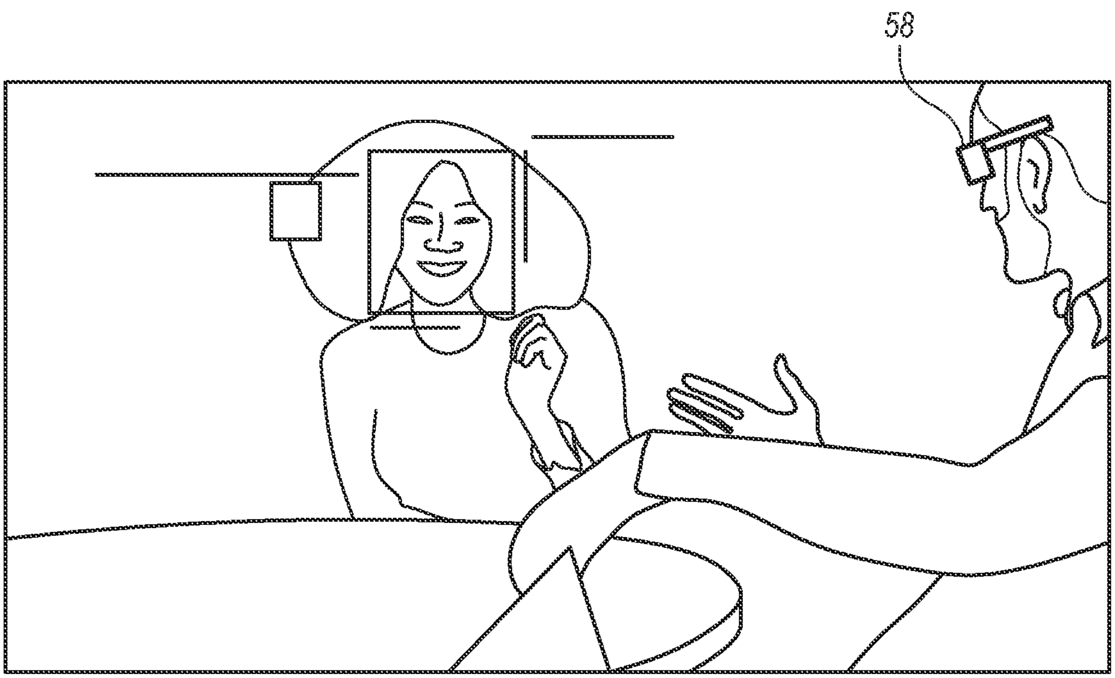
FIGS. 38A-38D illustrates various internal settings with placement of virtual content according to some embodiments.
Figure 38B:
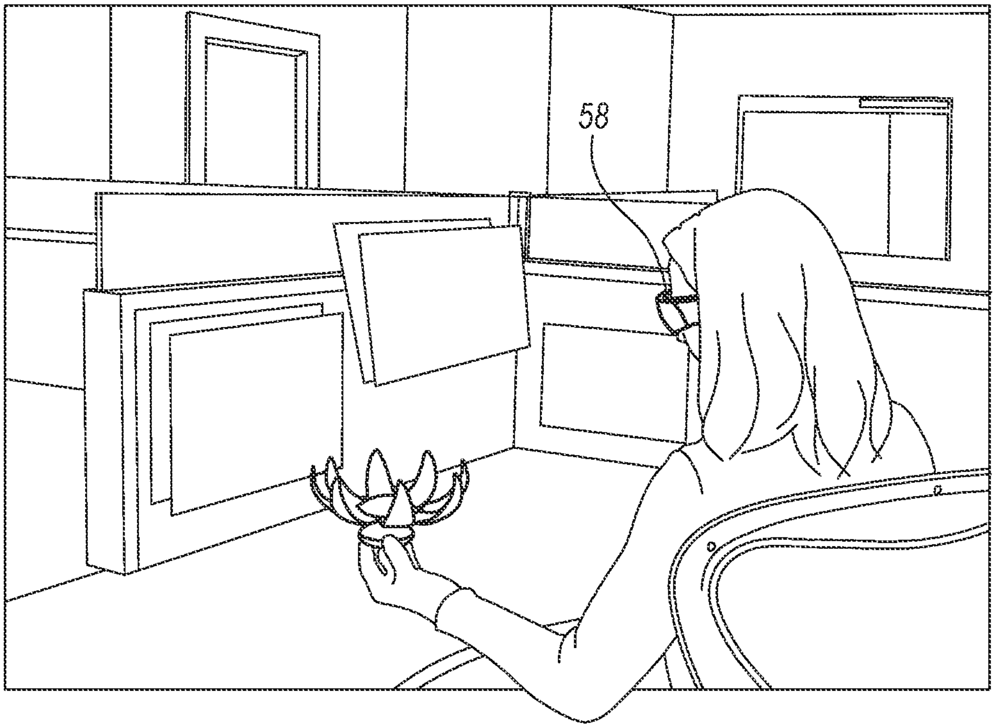
Figure 38C:
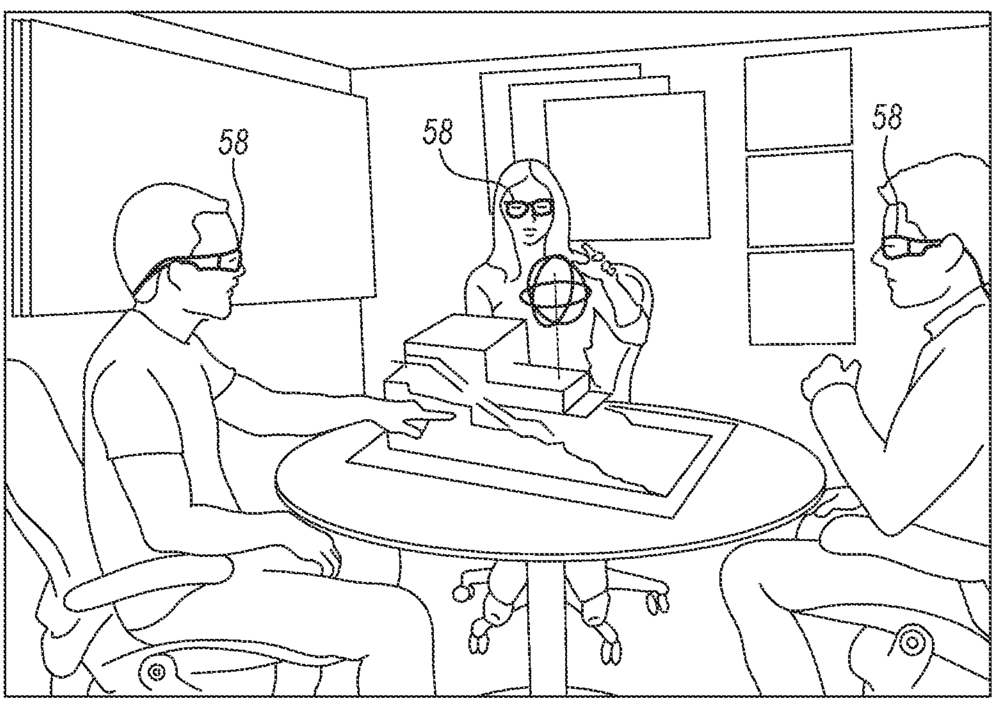
Figure 38D:
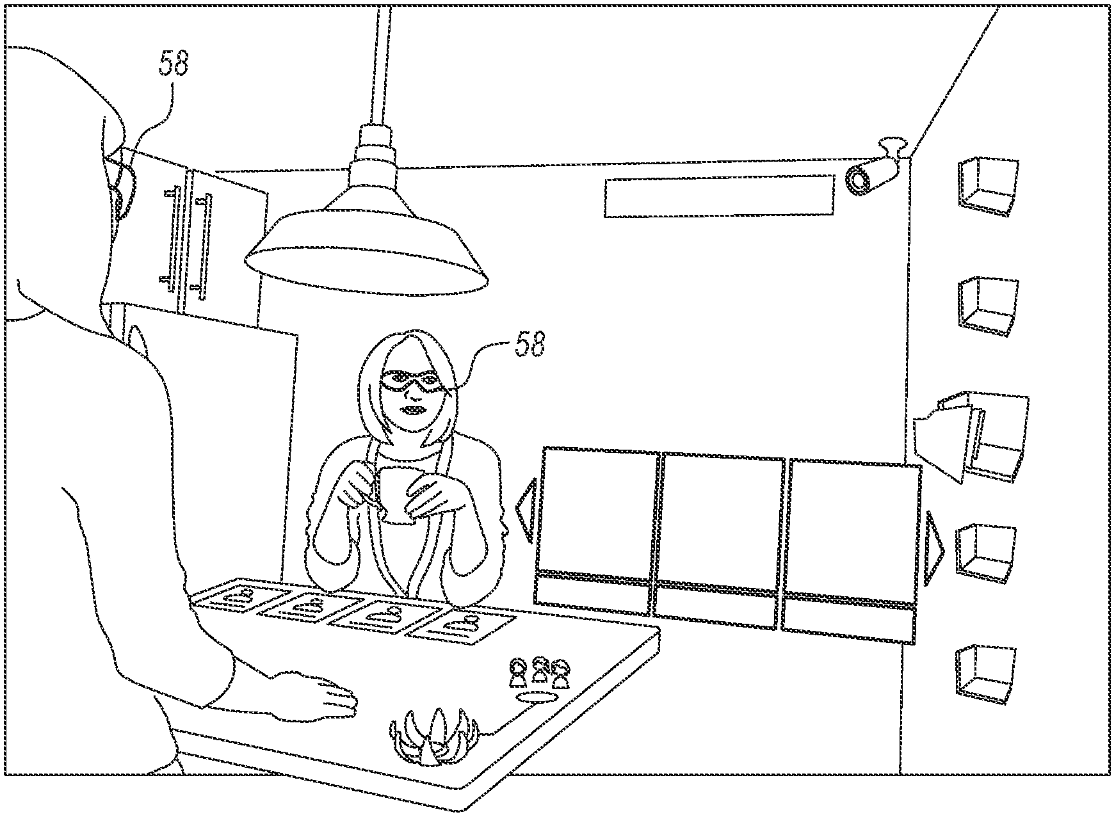

For example, referring to FIG. 33, in one embodiment, a subject system may be configured to assist a user in virtually experiencing a map of the solar system in an indoor environment. Such a configuration may be used for mapping, teaching, navigation, and the like. Similar configurations are shown in FIGS. 34A-34D and may be utilized for mapping, teaching, and "street view"® type of functionalities, amongst many others. FIG. 35 illustrates various features of example driving assistance configurations, with virtual presentation of vehicle, music control, and other functionalities. FIG. 36 illustrates an embodiment featuring virtual highlighting (i.e., by presenting a haze upon other viewable items) of a selected route, along with navigation information presented as a virtual display element in the augmented reality system configuration. FIG. 37 illustrates an embodiment featuring virtual location assistance pertinent to identified friends of a user who may be in a crowd and otherwise difficult to visualize.

FIGS. 38A-38D illustrate various users wearing head mounted components (58) in indoor environments to be able to utilize computing to experience enhanced visualization and collaboration, such as by presentation of various virtual features, such as planar displays, three-dimensional virtual objects, passable world components (i.e., such as portions of a room or hand held objects), avatars of specific persons, and the like.

Figure 39:
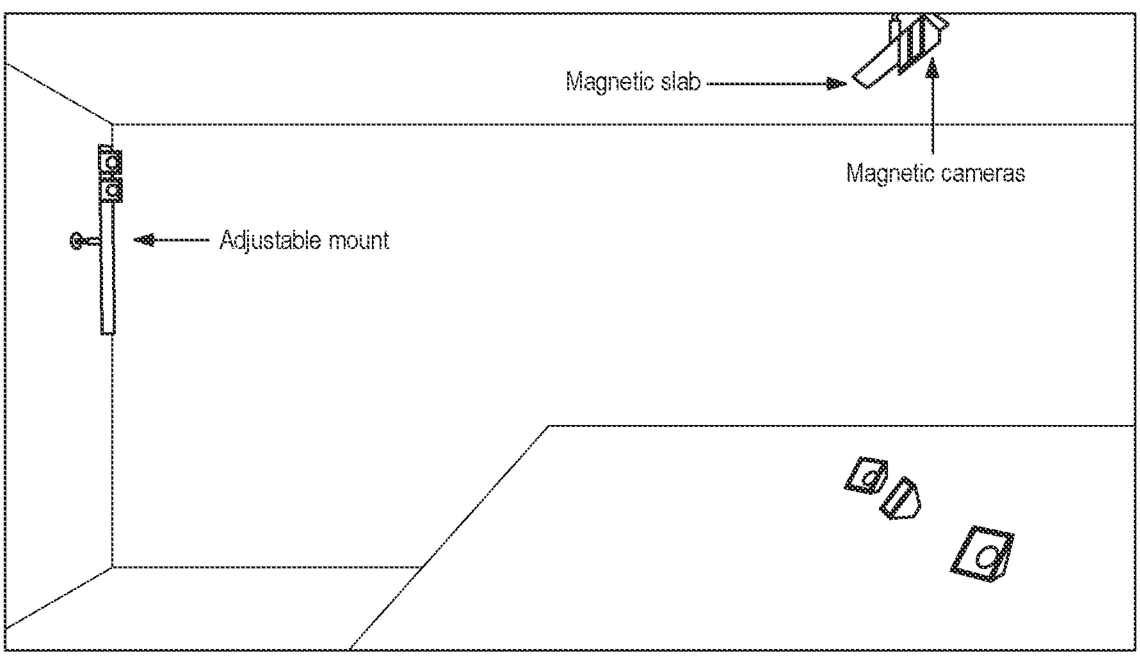
FIG. 39 illustrates various external sensors of a visual display system according to some embodiments.

Referring to FIG. 39, certain aspects of a given indoor environment may be configured to feature various sensors, such as cameras, in various locations within a space, to assist in locating and monitoring a person or other objects. Certain embodiments feature adjustable mounting devices which may incorporate magnetic mounting interfaces for cameras and other devices.

Figure 40A:
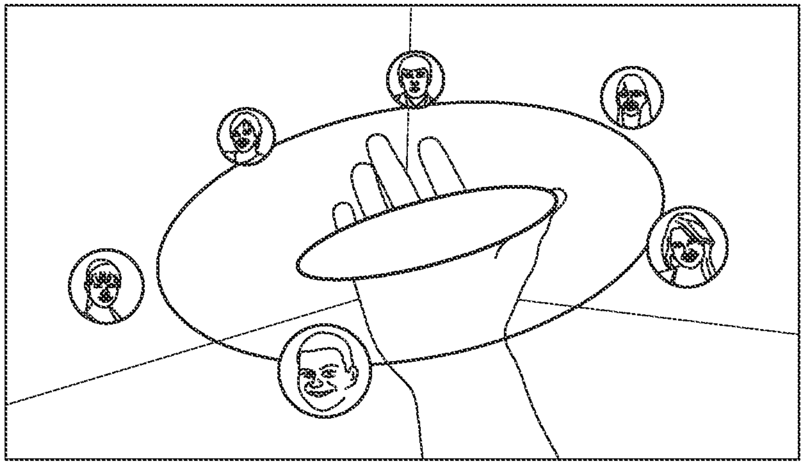
FIGS. 40A-40C illustrate teleconferencing interfaces according to some embodiments.
Figure 40B:
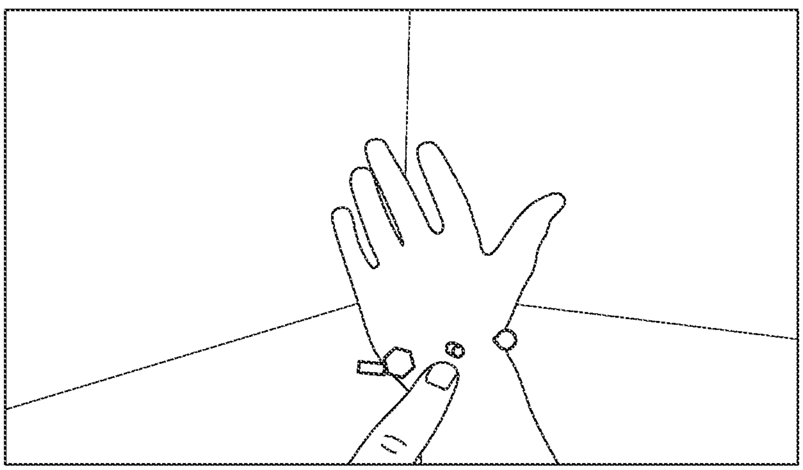
Figure 40C:
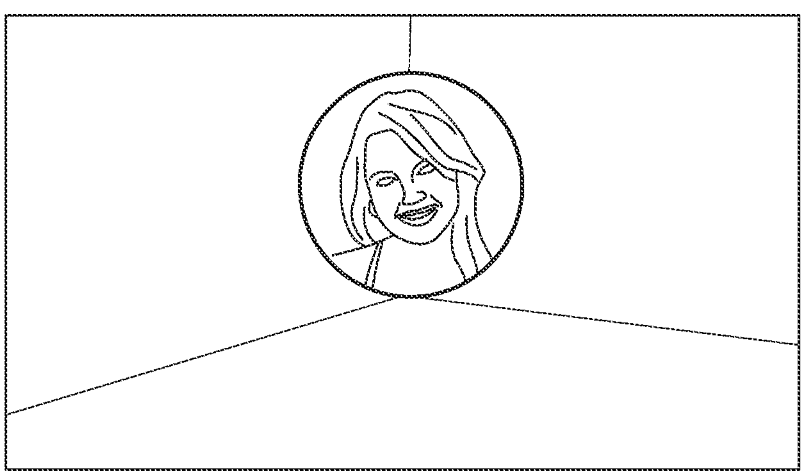
Figure 41A:
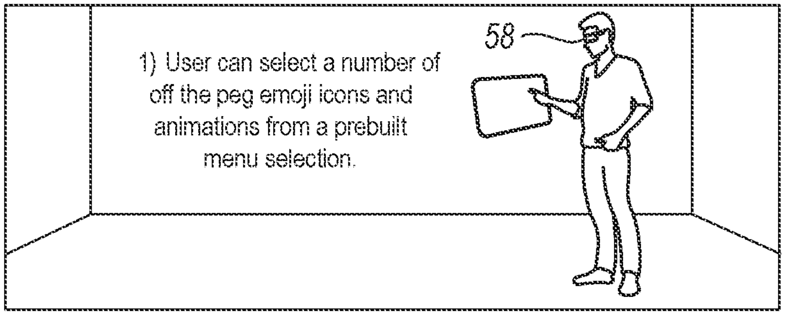
FIGS. 41A-45D illustrate delivery of an "emojibomb" of various visual icons according to some embodiments.
Figure 41B:
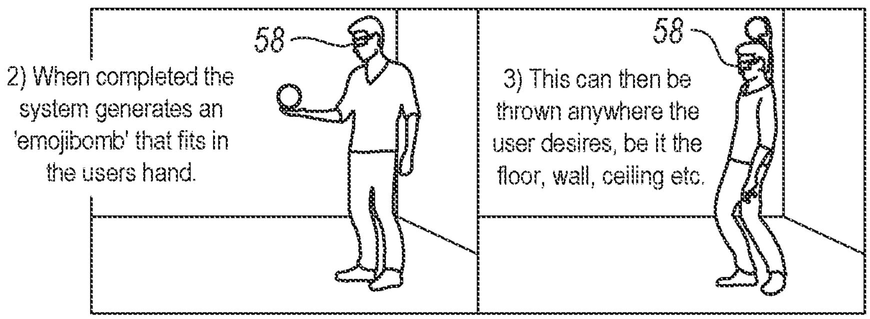
Figure 41C:
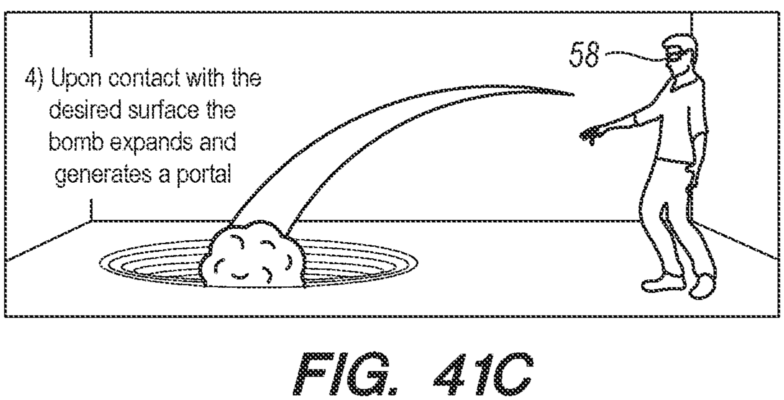
Figure 41D:
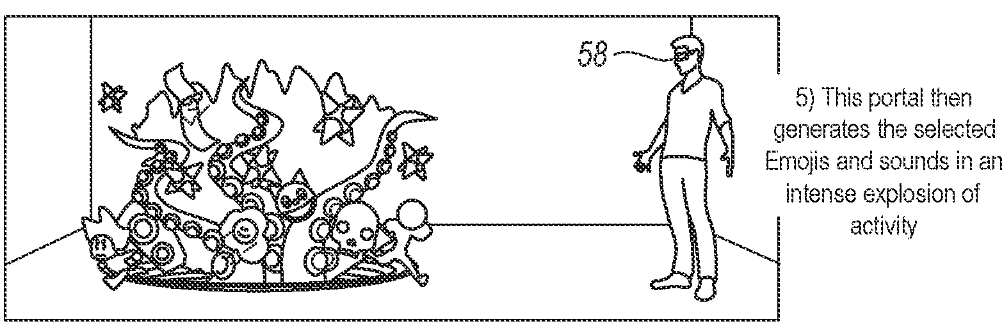
Figure 42A:
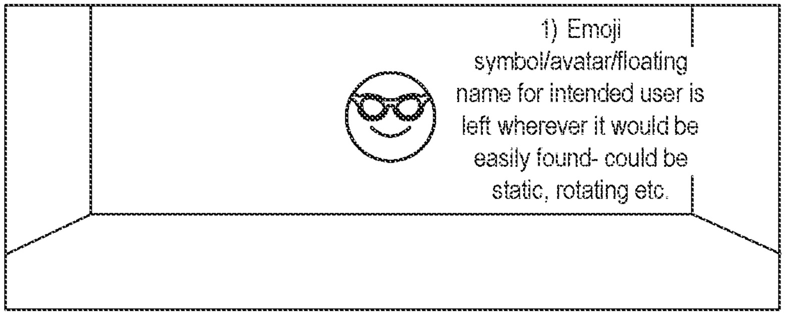
Figure 42B:
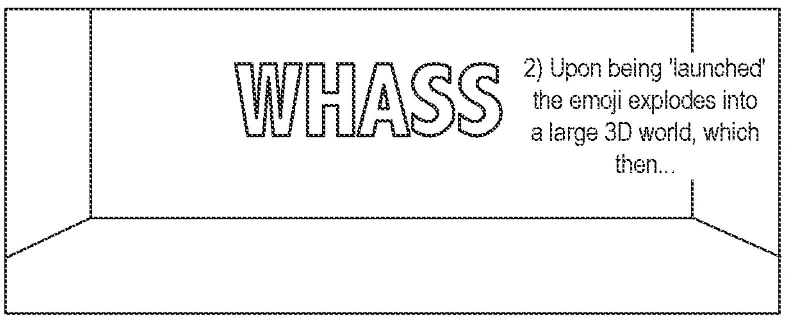
Figure 42C:
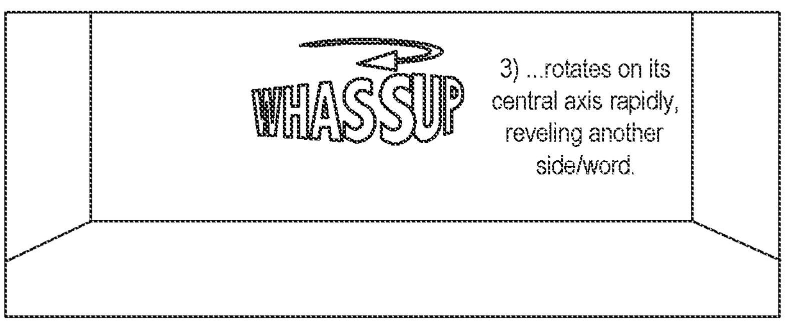
Figure 42D:
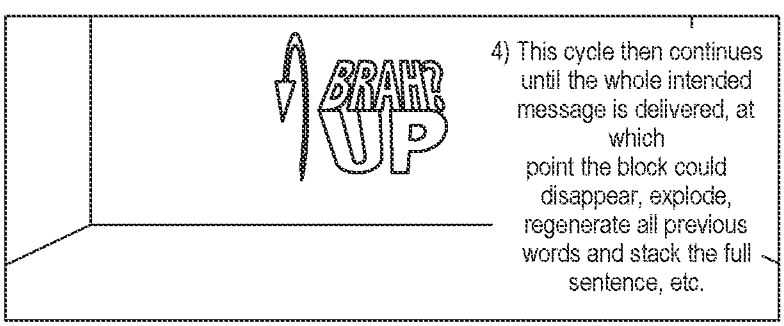
Figure 43A:
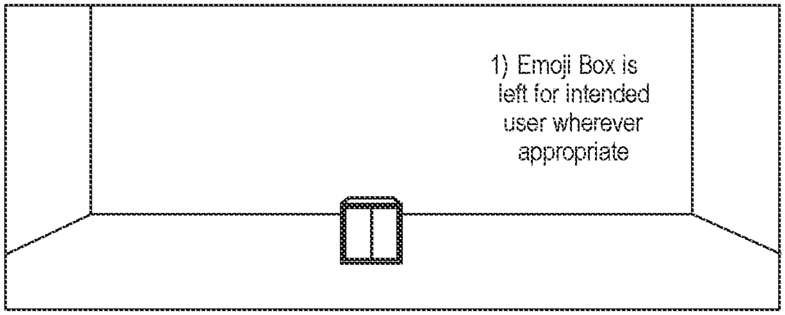
Figure 43B:
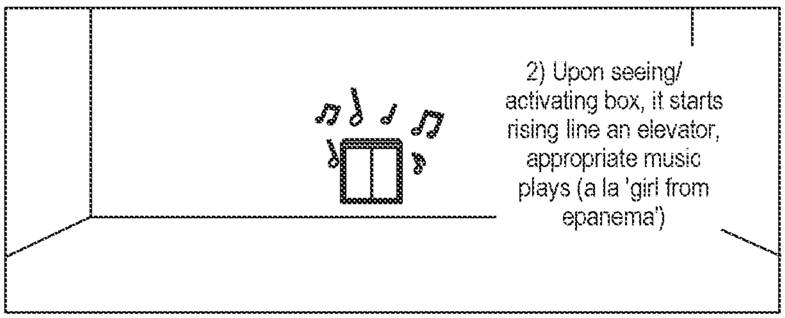
Figure 43C:
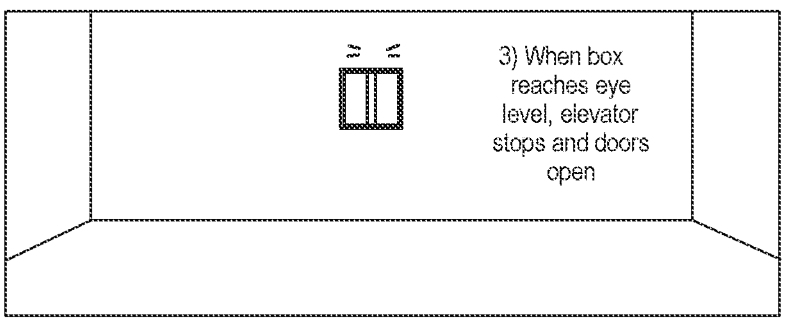
Figure 43D:
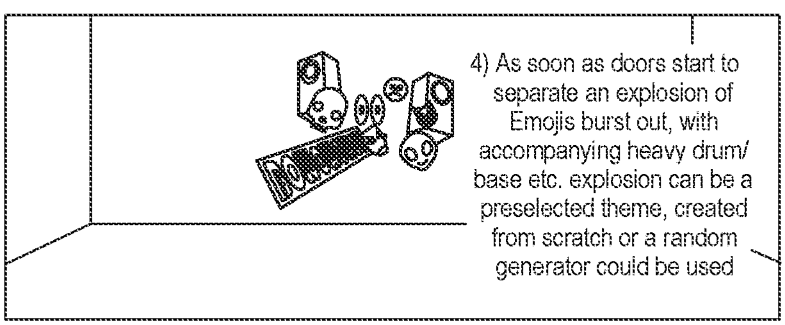
Figure 44A:
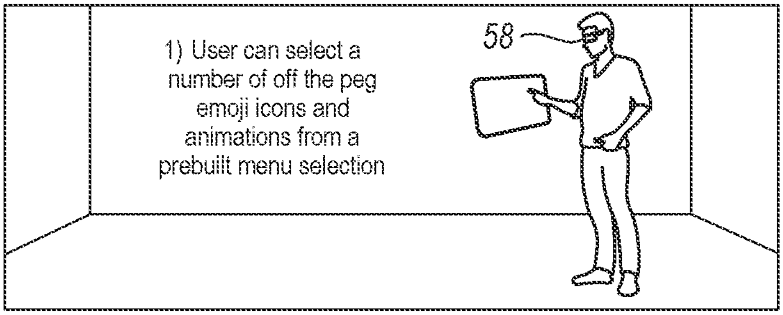
Figure 44B:
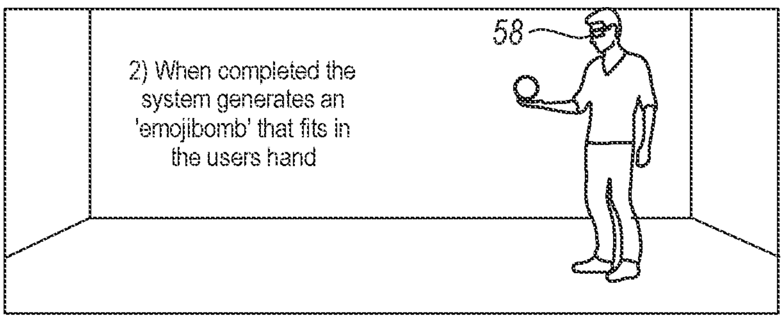
Figure 44C:
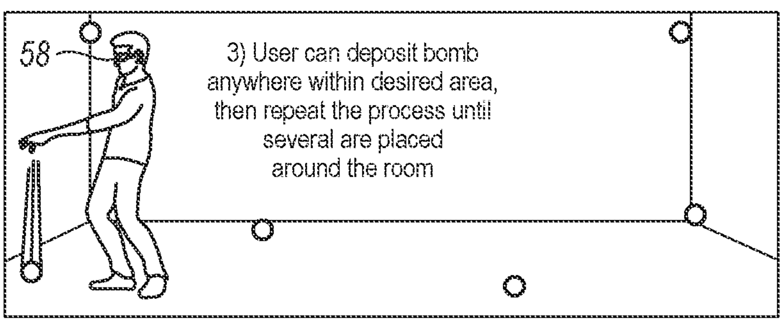
Figure 44D:
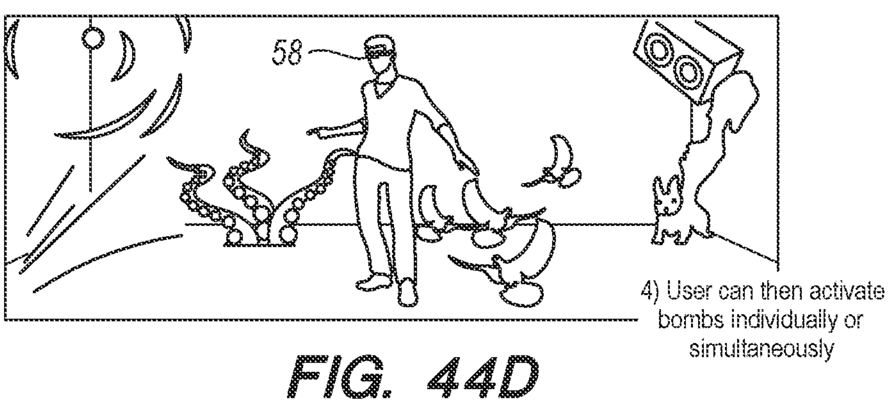
Figure 45A:
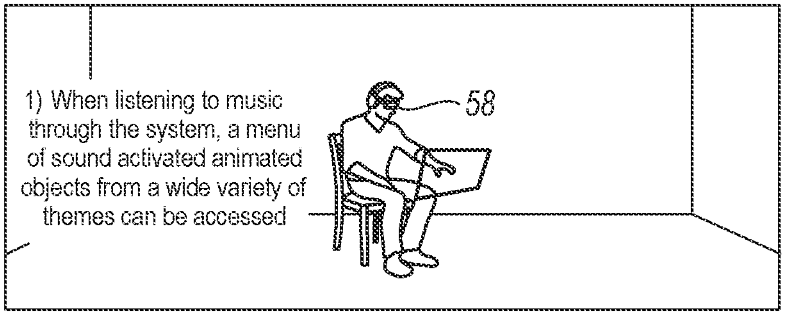
Figure 45B:
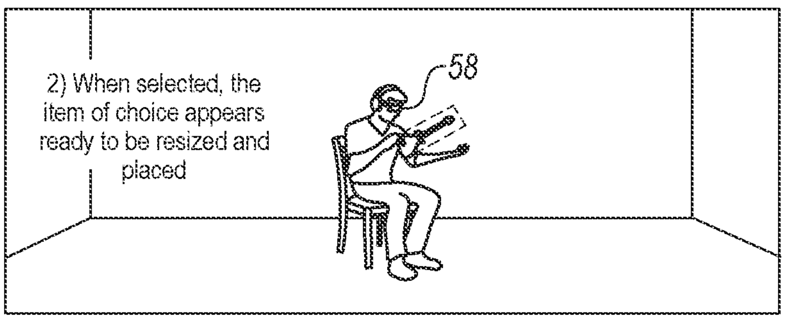
Figure 45C:
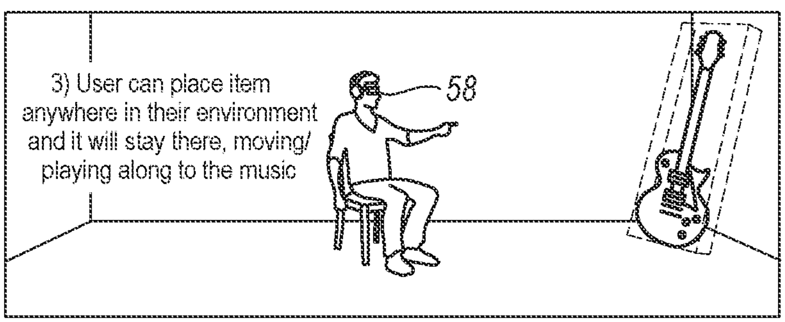
Figure 45D:
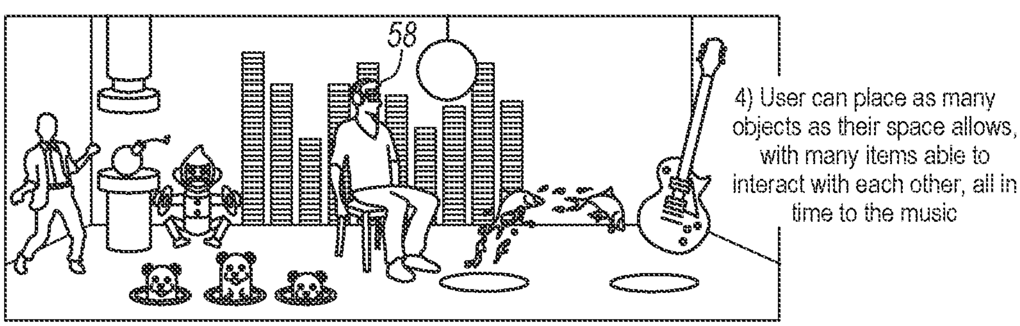
Figure 46A:
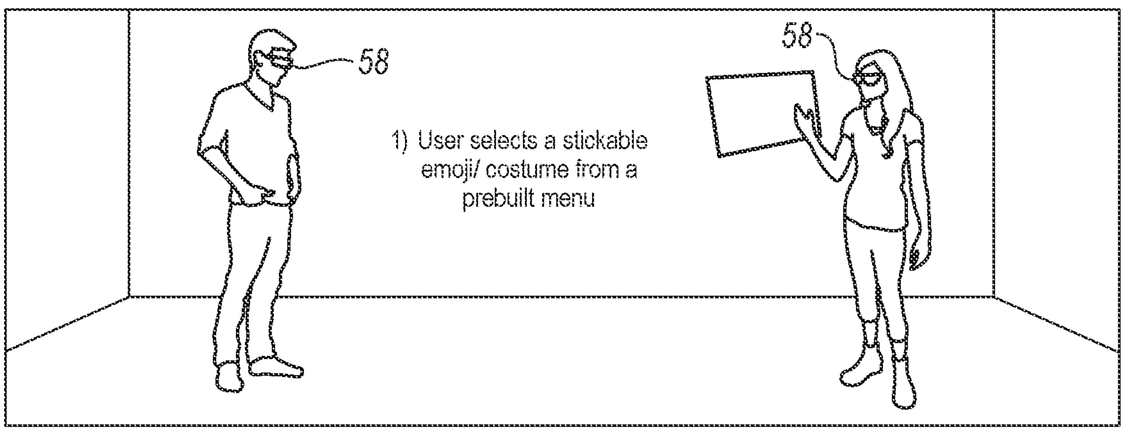
FIGS. 46A-46D illustrate depiction of visual themes applied to a third person according to some embodiments.
Figure 46B:
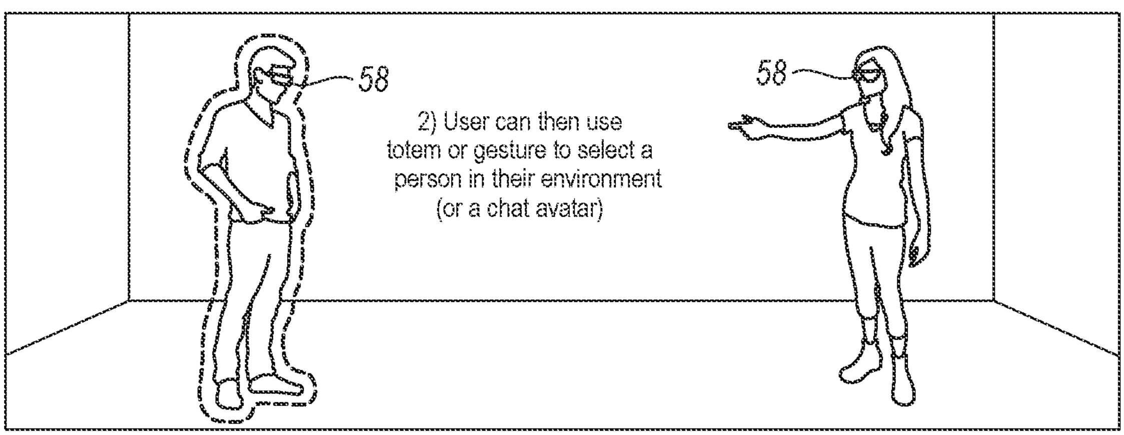
Figure 46C:
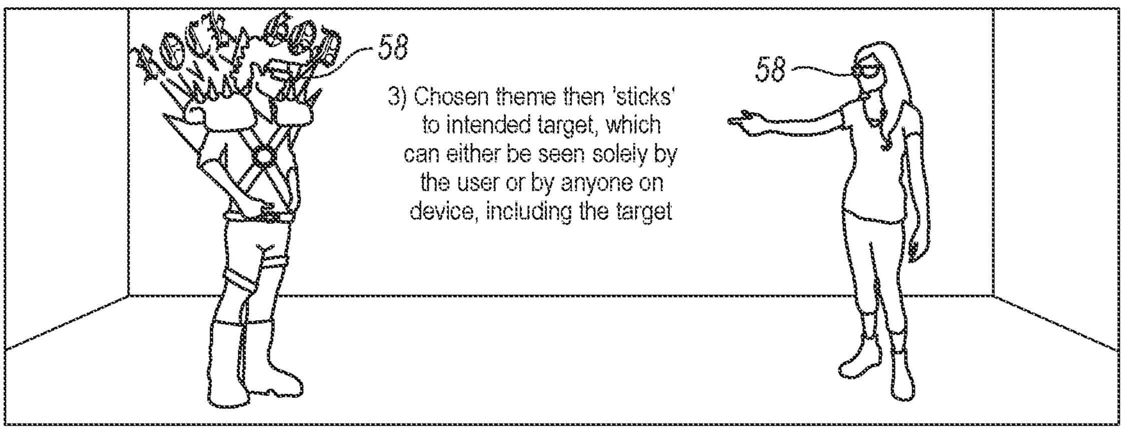
Figure 46D:
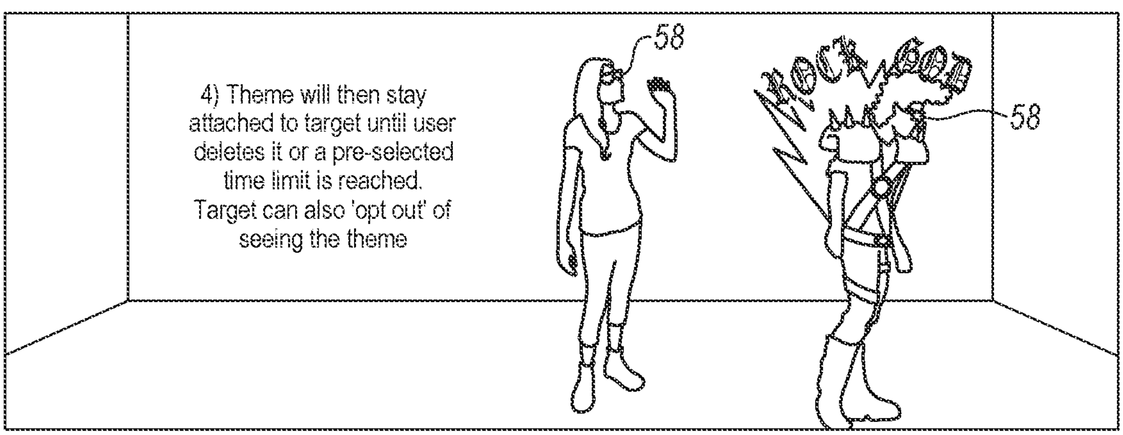

FIGS. 40A-40C illustrate embodiments of audio and/or video conferencing configurations which may be operated by a user having a head mounted system to start a conferencing app, select a conferencing counterparty, and engaging in a discussion, all through the subject wearable system configuration.

FIGS. 41A-41D illustrate aspects of an "emojibomb" functionality which may be utilized for entertainment, collaboration, or the like. Referring to FIGS. 42A-42D, various images or feature thereof, such as emojis, may be configured to be presented in three dimensions to users, and also be dynamic (i.e., to move, rotate, change size, change color, etc). FIGS. 43A-43D illustrate aspects of an "emojibomb" functionality which may be utilized for entertainment, collaboration, or the like. FIGS. 44A-44D illustrate aspects of a "multiple emojibomb" functionality which may be utilized for entertainment, collaboration, or the like.

FIGS. 45A-45D illustrate aspects of a music listening and engagement functionality which may be utilized for entertainment, collaboration, or the like.

Referring to FIGS. 46A-46D, in some embodiments, one user may be able to select another person and virtually associate or "stick" certain images or artwork to that person, as shown in FIGS. 48A-48D.

Figure 47:
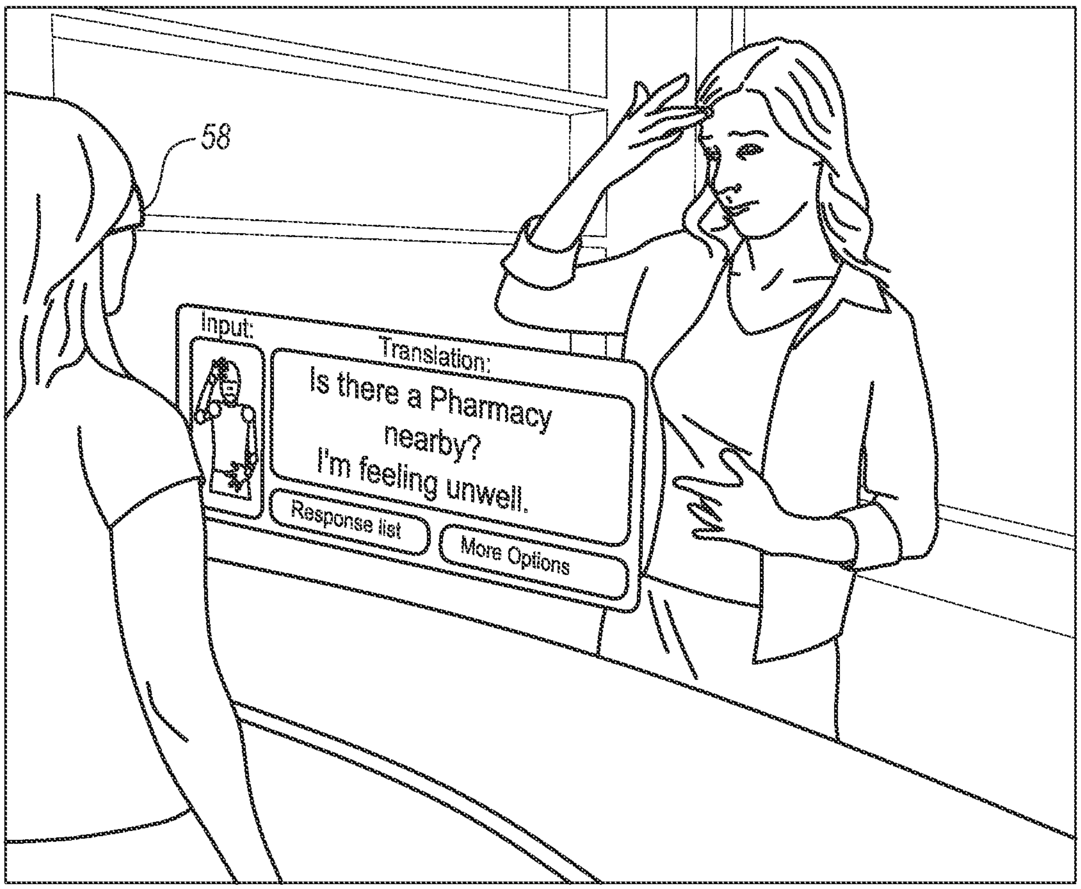
FIGS. 47-48B illustrates translations of external inputs into readable formats according to some embodiments.
Figure 48A:
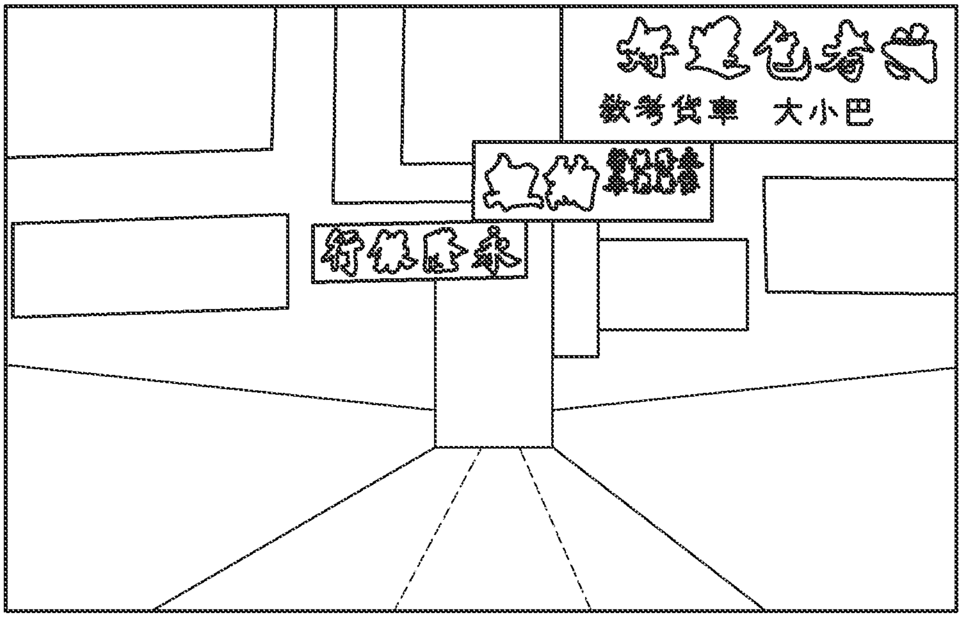
Figure 48B:
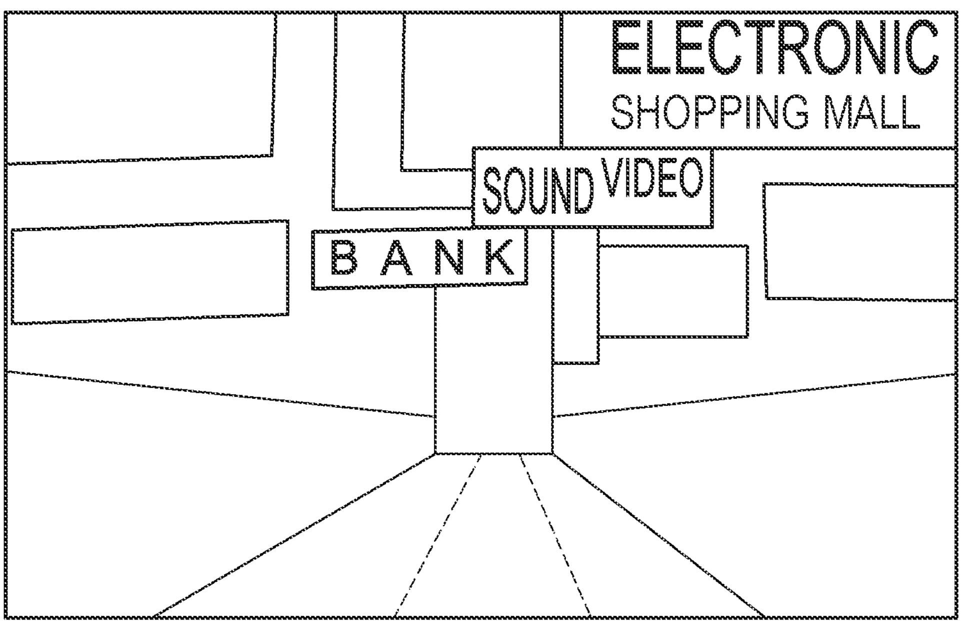

Referring to FIG. 47, a user wearing a head mounted component (58) may benefit from system functionality configured to interpret and translate sign language presented in front of the user, such as by a person approaching at a counter in a hotel concierge environment. As shown in FIGS. 48A-48B, translation may also be utilized to assist a user in understanding signage in the local environment.

Figure 49:
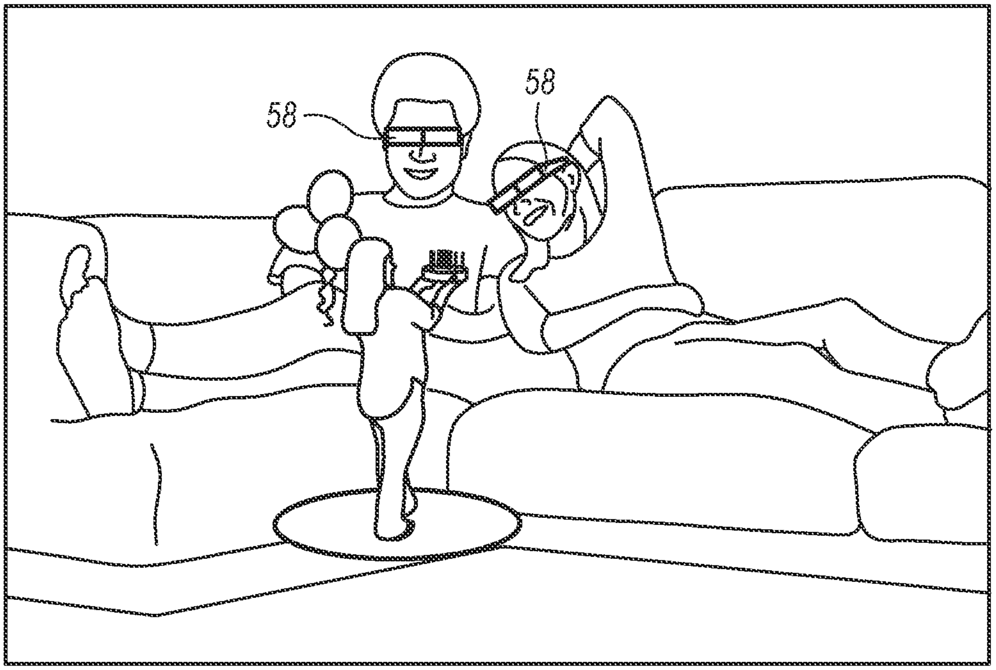
FIG. 49 illustrates two users observing virtual content according to some embodiments.
Figure 50A:
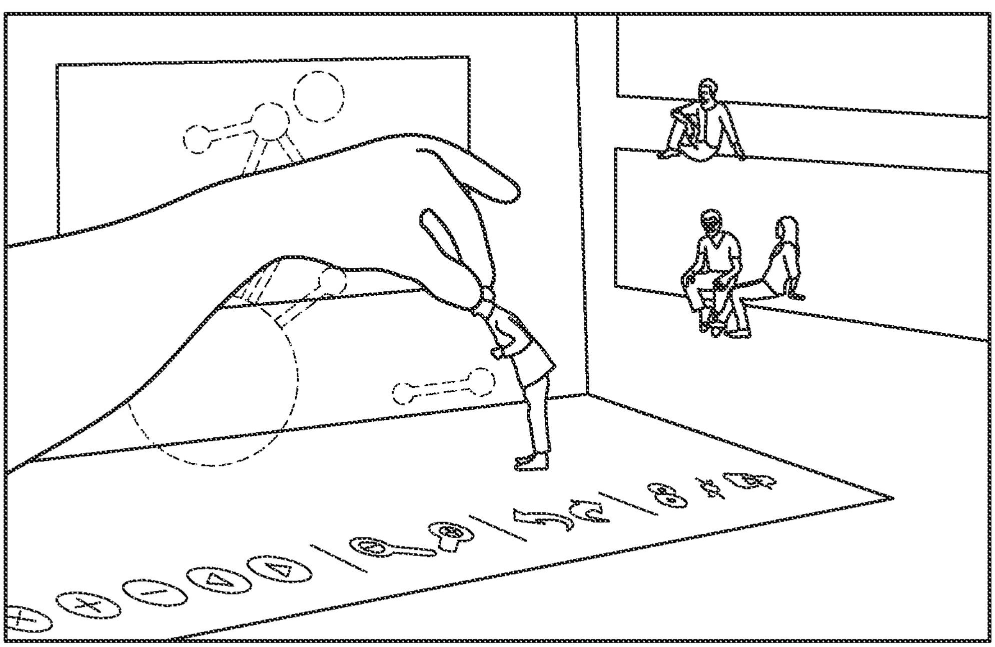
FIGS. 50A-50G illustrate various entertainment uses of a visual display system according to some embodiments.
Figure 50B:
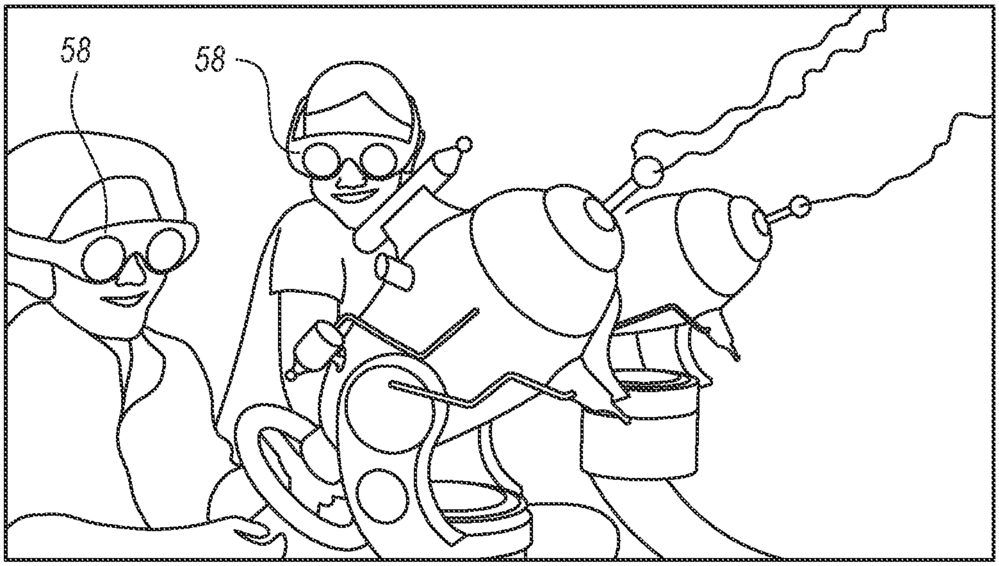
Figure 50C:
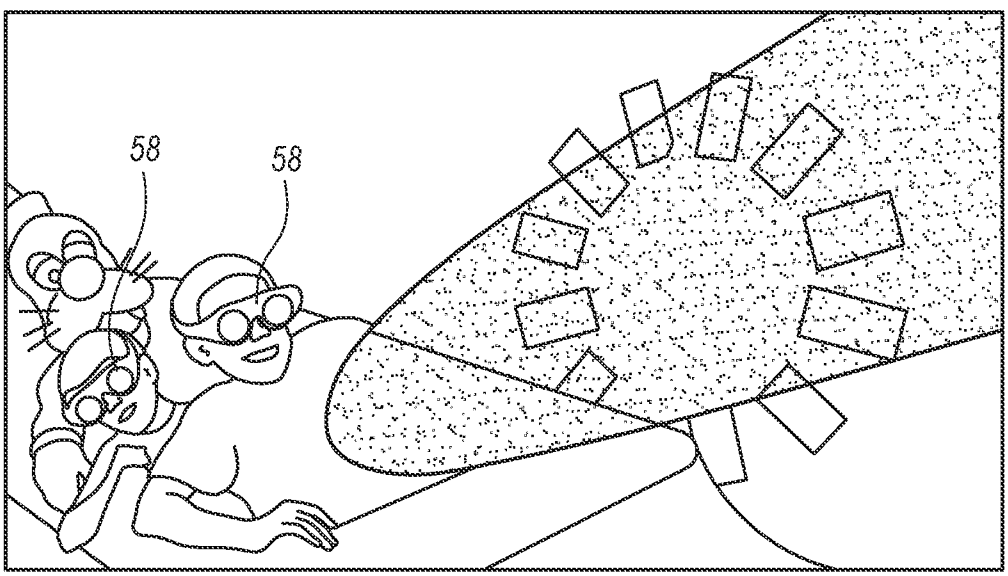
Figure 50D:
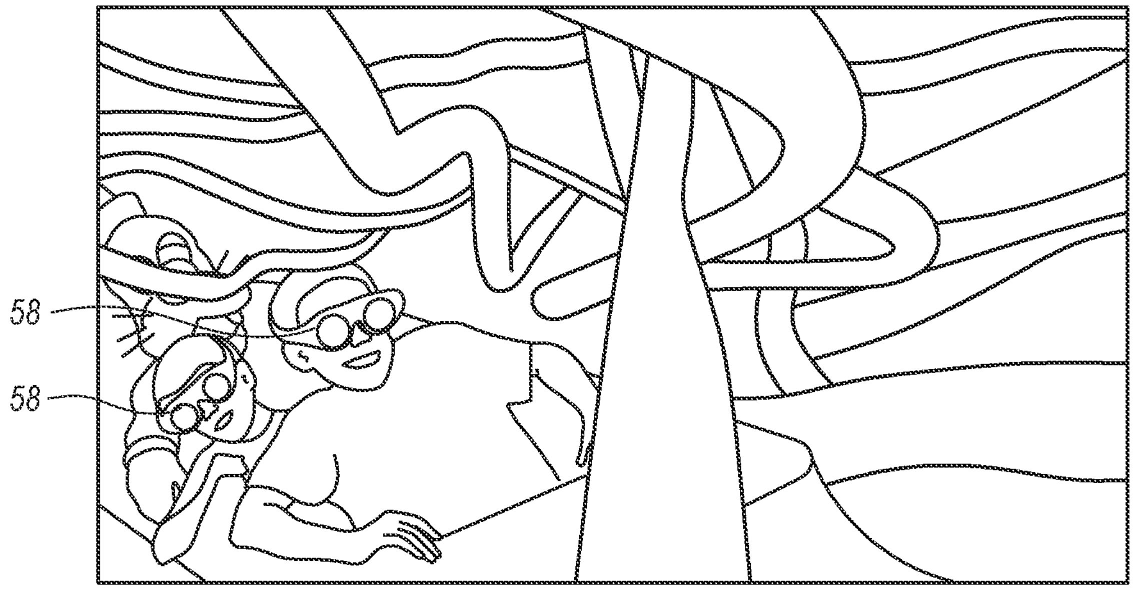
Figure 50E:
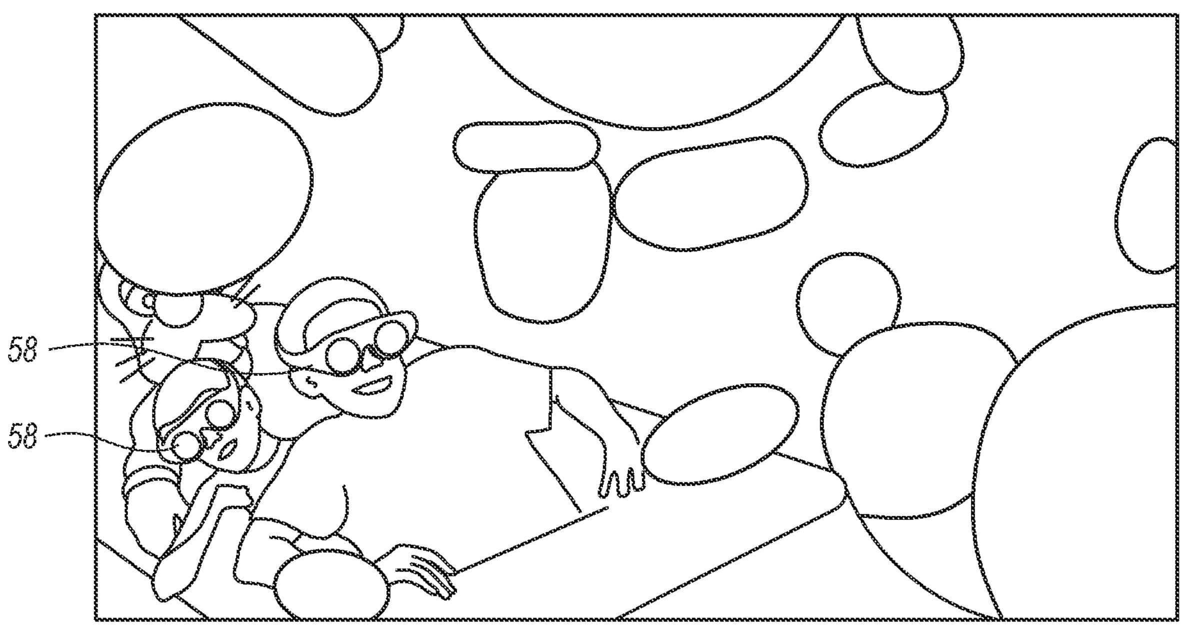
Figure 50F:
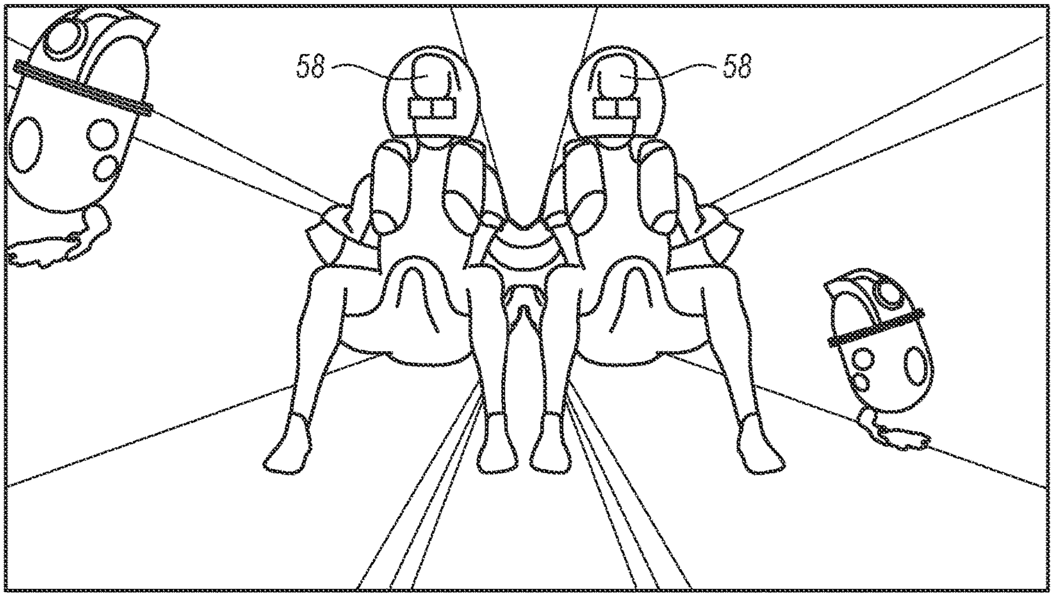

Referring to FIG. 49, a pair of users wearing their head mounted components (58) are able to experience a virtually-presented three-dimensional movie presentation, such as a birthday song for one of the users. FIGS. 50A-illustrate embodiments wherein users wearing head mounted components (58) are able to experience highly augmented visual presentations, such as in tabletop gaming, theme park, roller coaster, and many other environments for entertainment, learning, and other types of information-rich experiences. FIG. 50F illustrates a theme park configuration wherein head mounted components (58) are configured to be utilized by each user that occupies a seat on the ride, for maximum augmented reality entertainment presentation and experience.

Figure 50G:
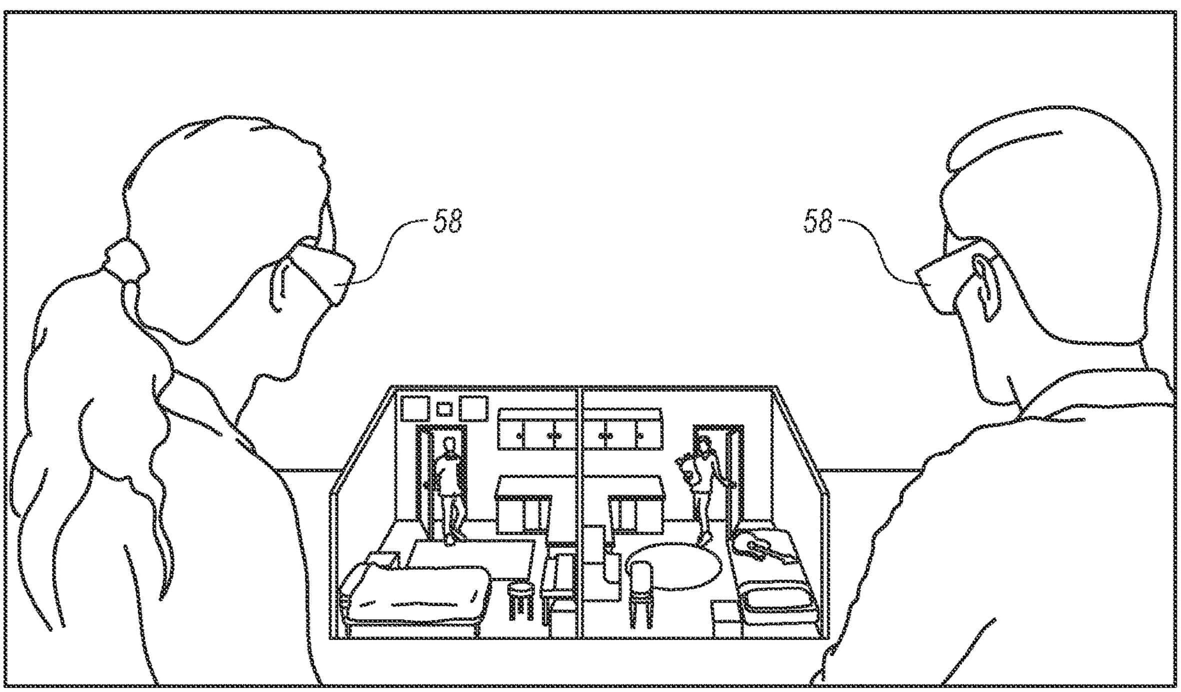
Figure 51A:
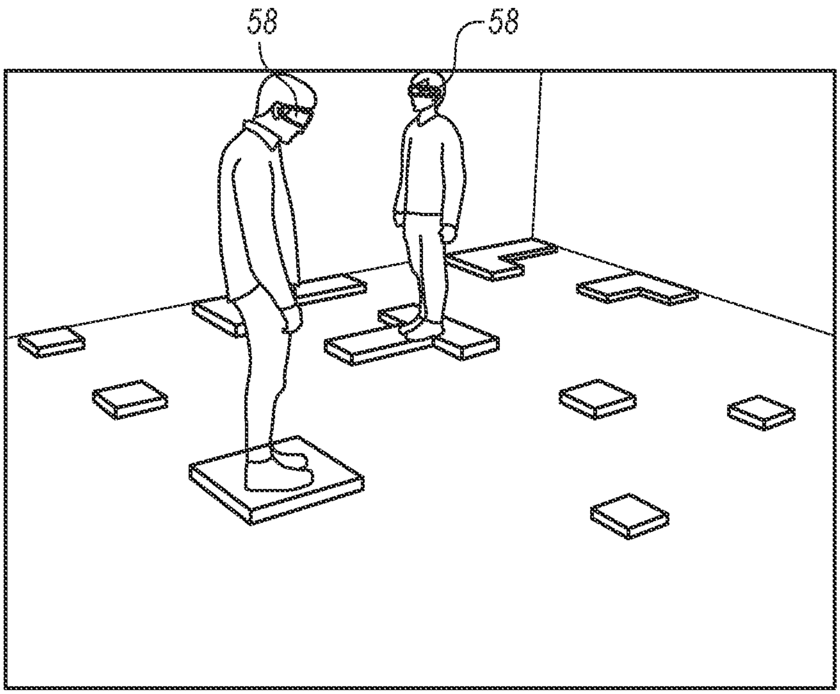
FIGS. 51A-51J illustrate various gaming environments through the aid of a visual display system according to some embodiments.
Figure 51B:
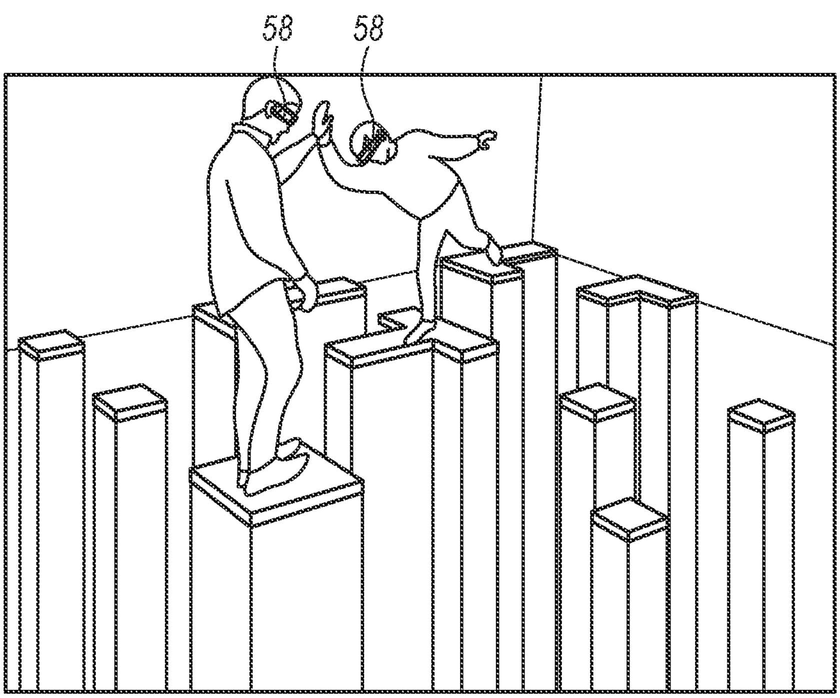
Figure 51C:
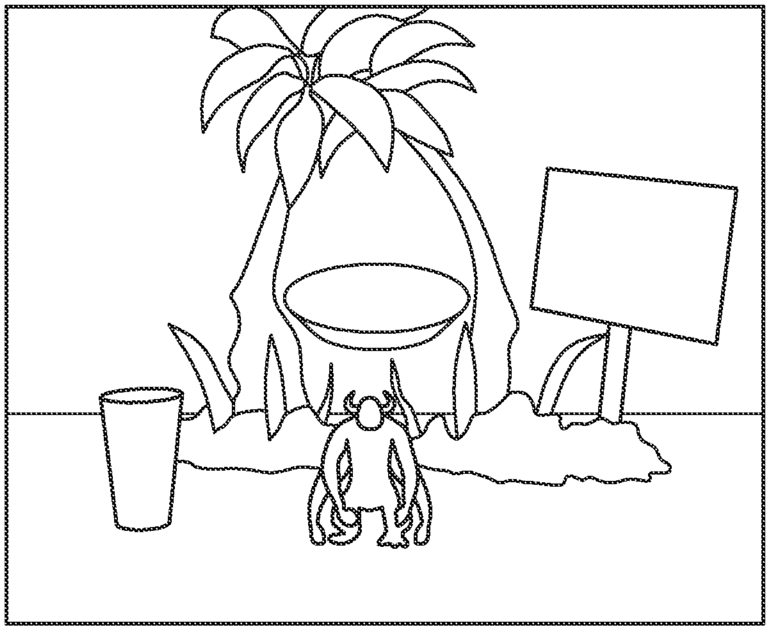
Figure 51D:
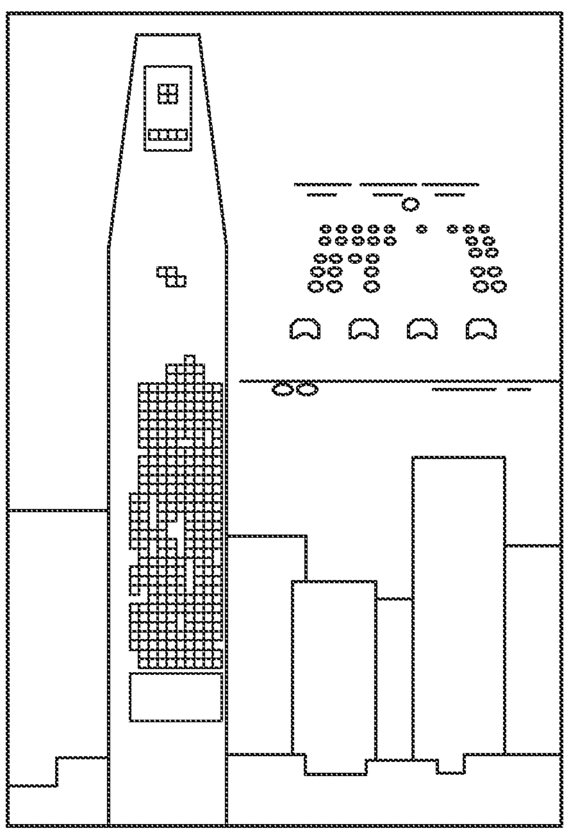
Figure 51E:
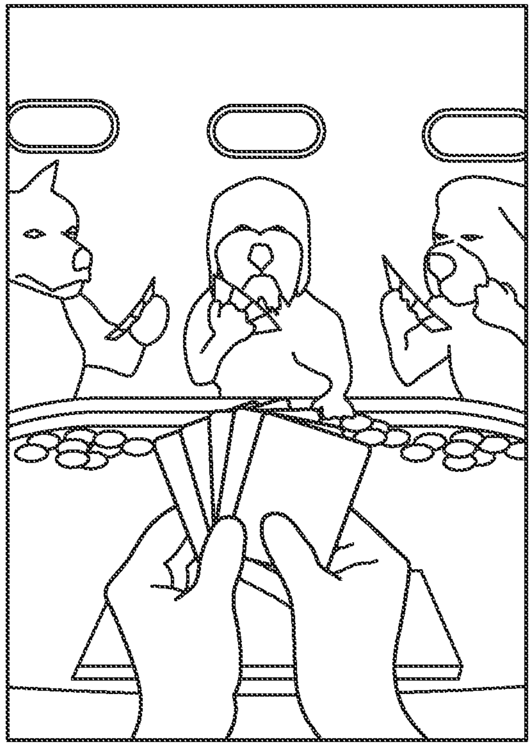
Figure 51F:
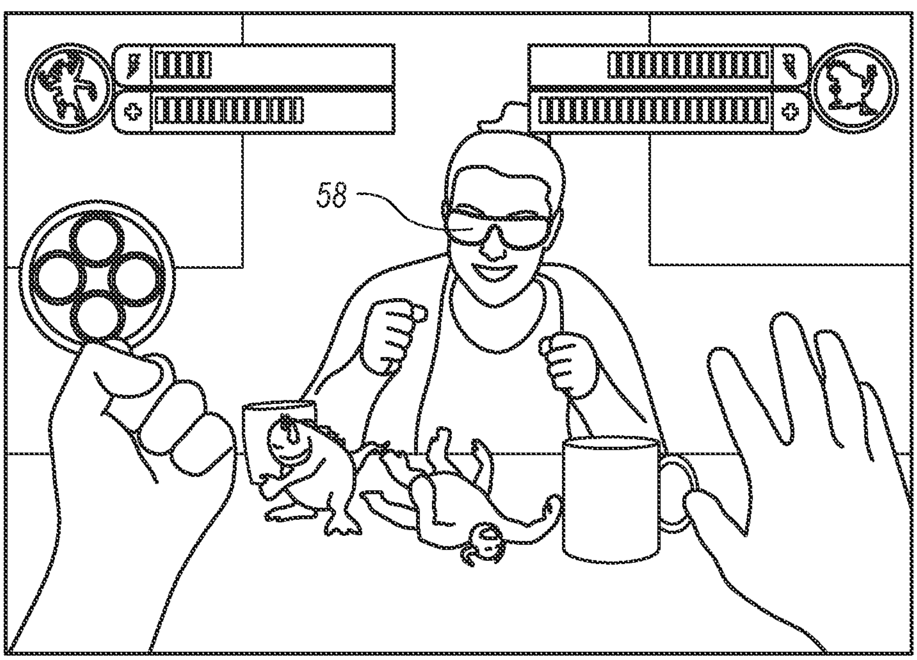
Figure 51G:
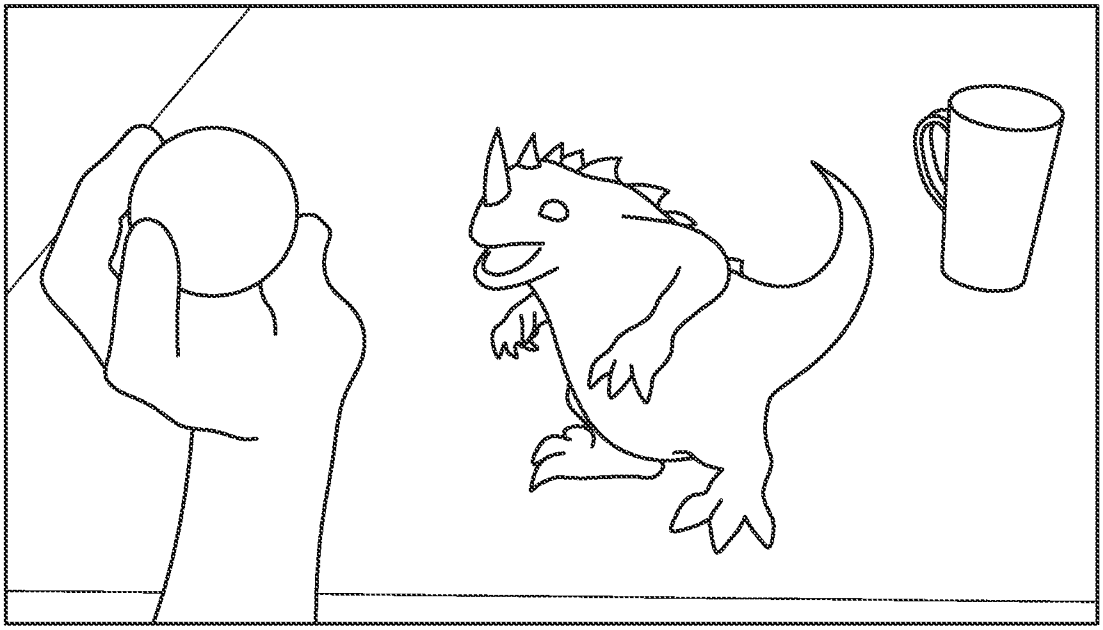
Figure 51H:
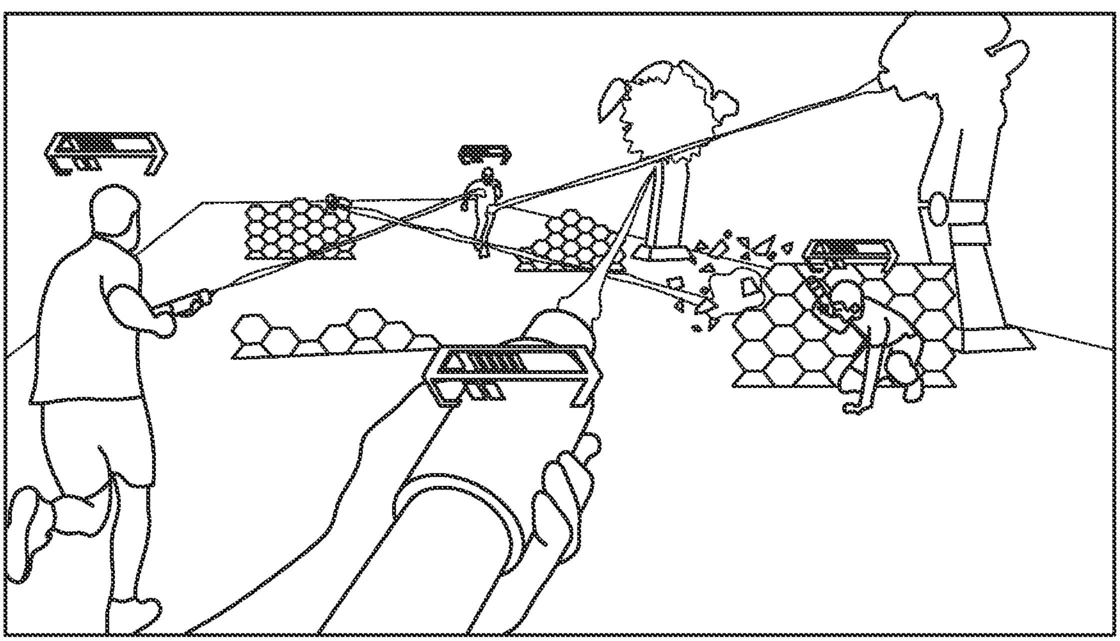
Figure 51I:
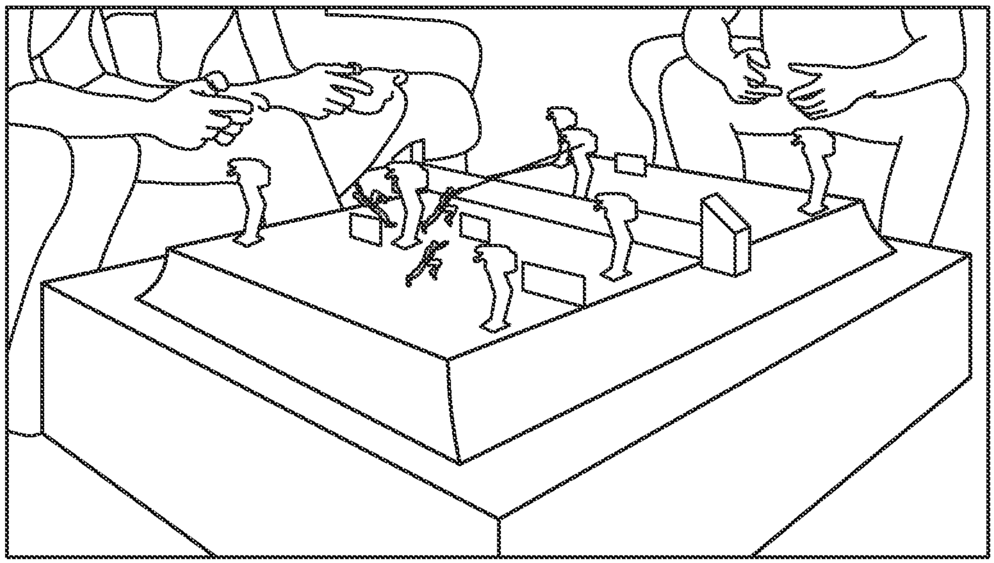
Figure 51J:
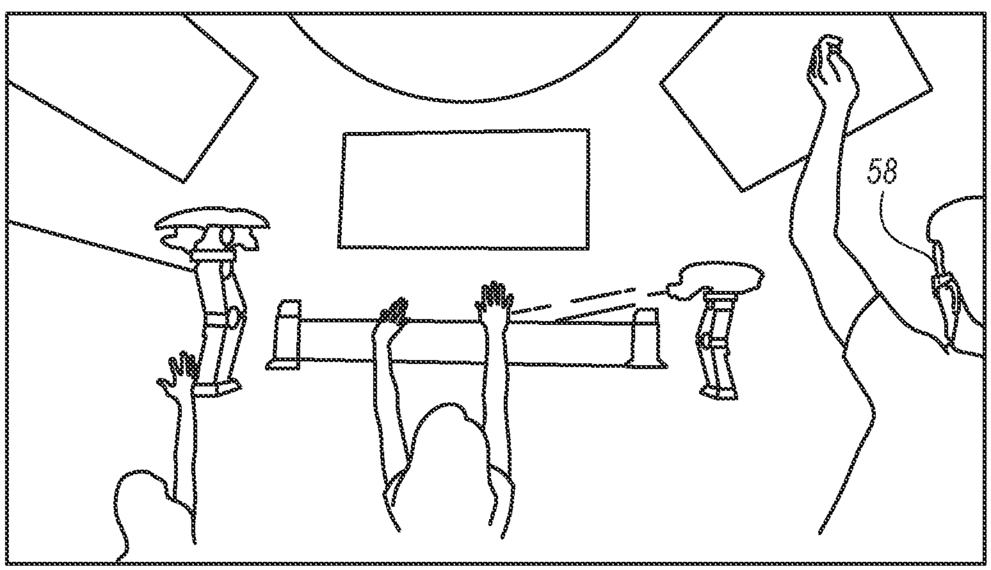
Figure 52A:
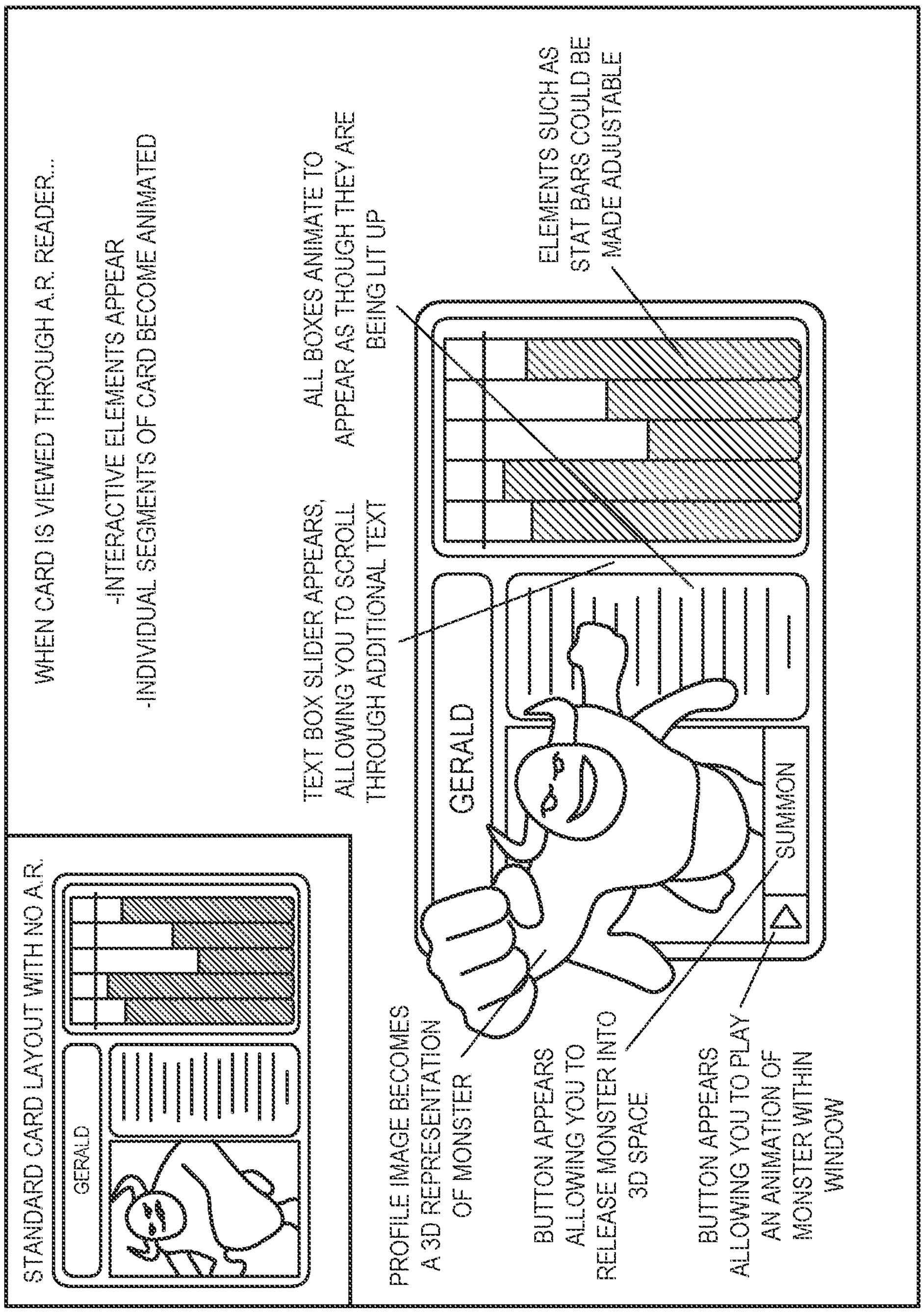
FIGS. 52A-52I illustrate a two dimensional or three dimensional gaming instantiation according to some embodiments.
Figure 52B:
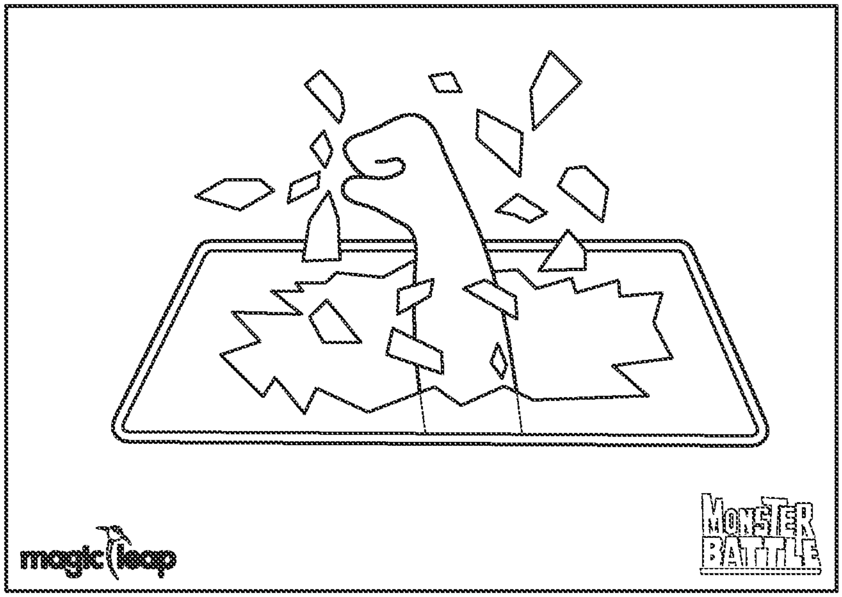
Figure 52C:
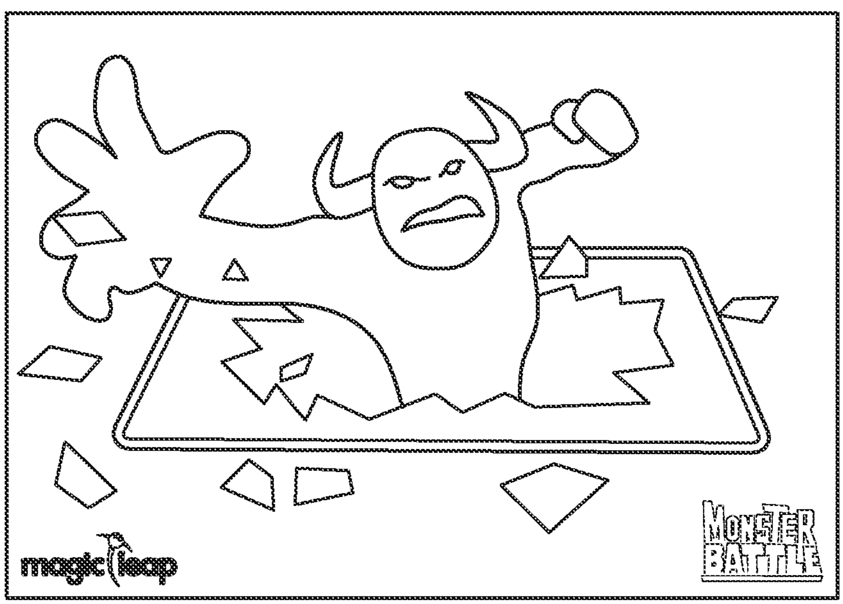
Figure 52E:
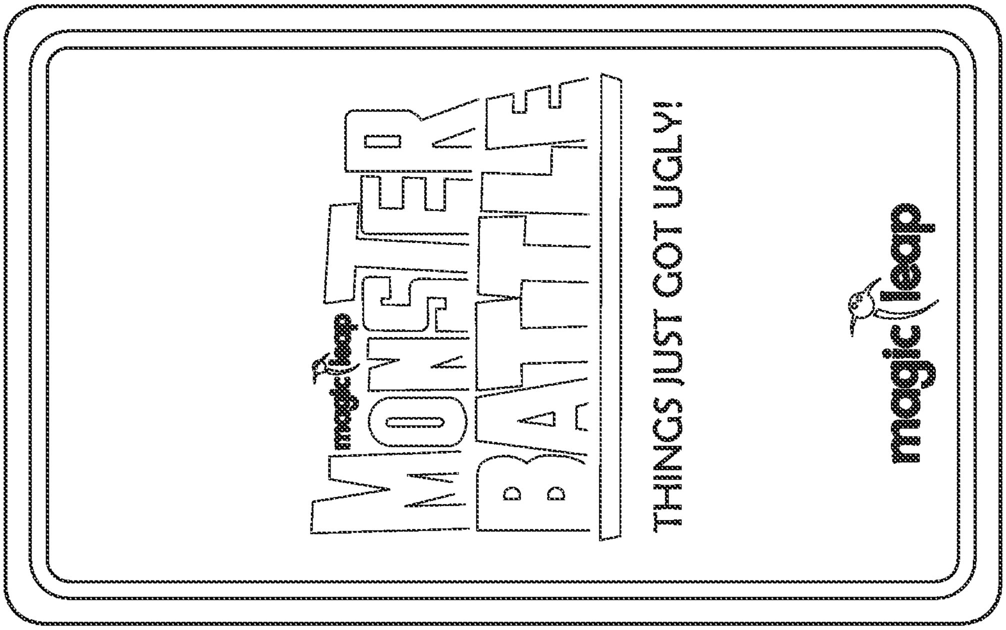
Figure 52D:
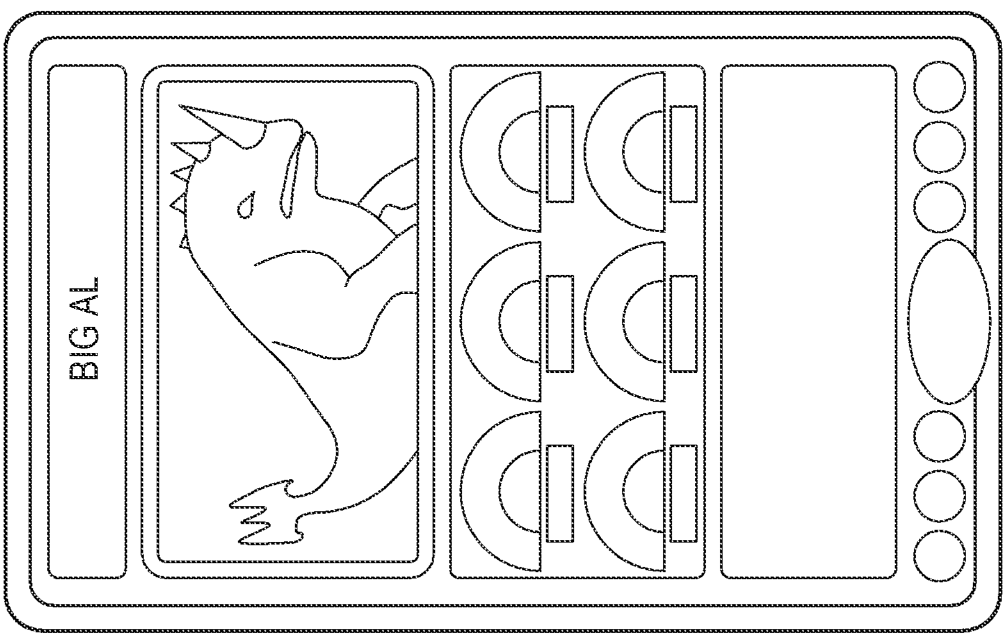
Figure 52F:
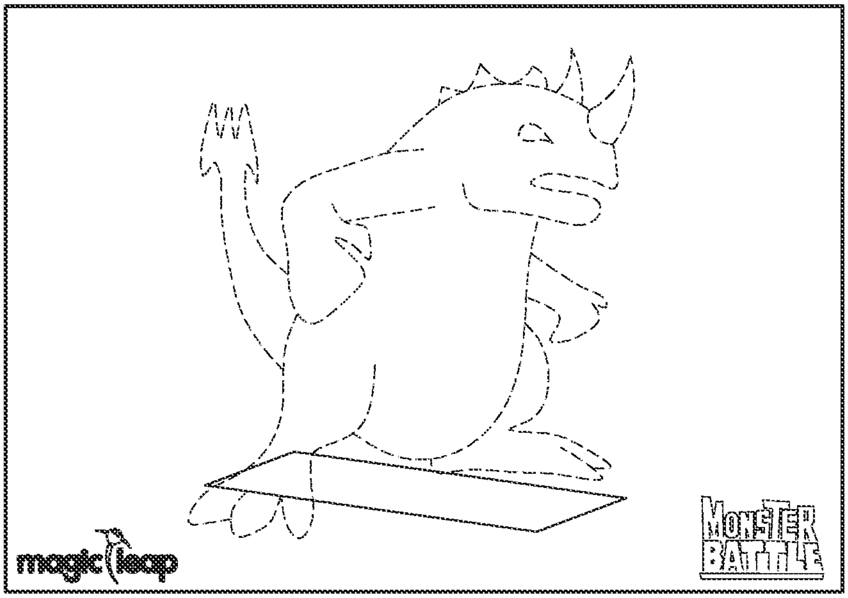
Figure 52G:
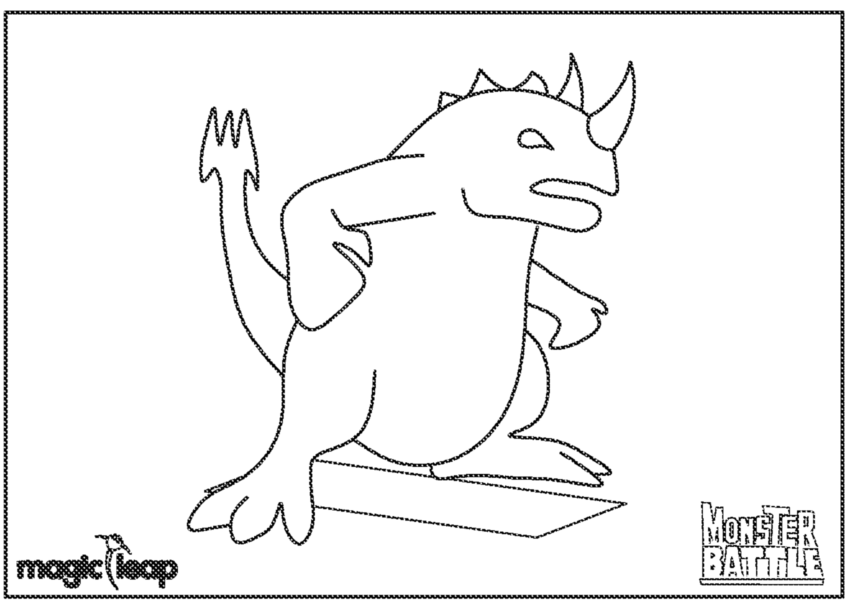
Figure 52H:
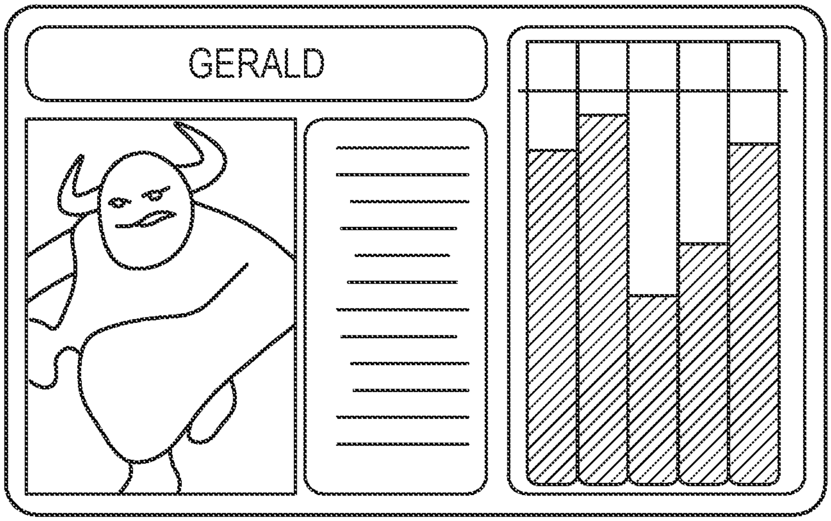
Figure 52I:
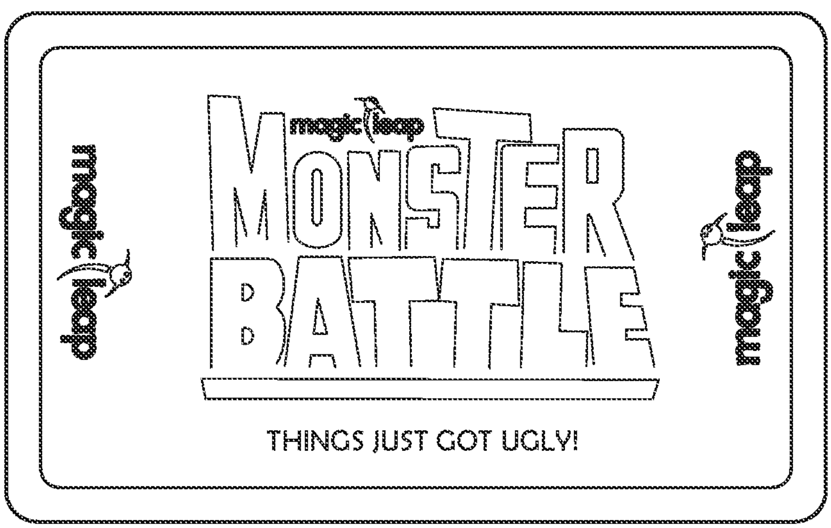

Referring to FIG. 50G, a couple wearing head mounted components (58) is able to enjoy a tabletop presentation of a theater show in three dimensions. FIGS. 51A-51L illustrate a various configurations of gaming instantiations; such as wherein users with their head mounted components (58) are able to step between actual room features (such as floor mats) and experience dramatic virtual features below, as shown in FIGS. 51A-51B. FIGS. 51C-51J illustrate additional various gaming instantiations, with users able to observe virtual features in three dimensions, and remote spectators also able to experience certain aspects of the scenario, depending upon the connectivity and capture capabilities of the local scenario. For example, in one embodiment, the persons shown in FIG. 51F are able to virtually observe and participate in certain aspects of the game being played in three dimensions in FIG. 51F.

Referring to FIGS. 52A-52I, a game, such as "Monster Battle" ® may be configured and played, in a two dimensional and/or three dimensional presentation to the user with the subject configurations.

Figure 53A:
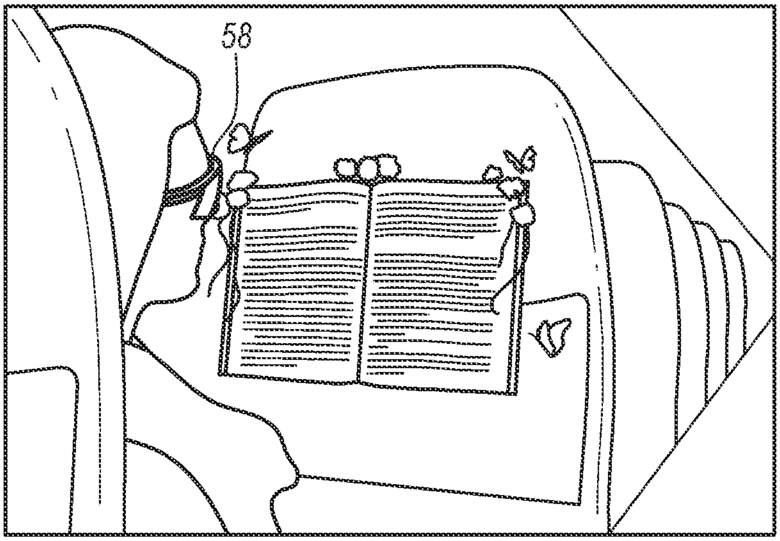
FIGS. 53A-53C illustrate various interaction modes according to some embodiments.
Figure 53B:
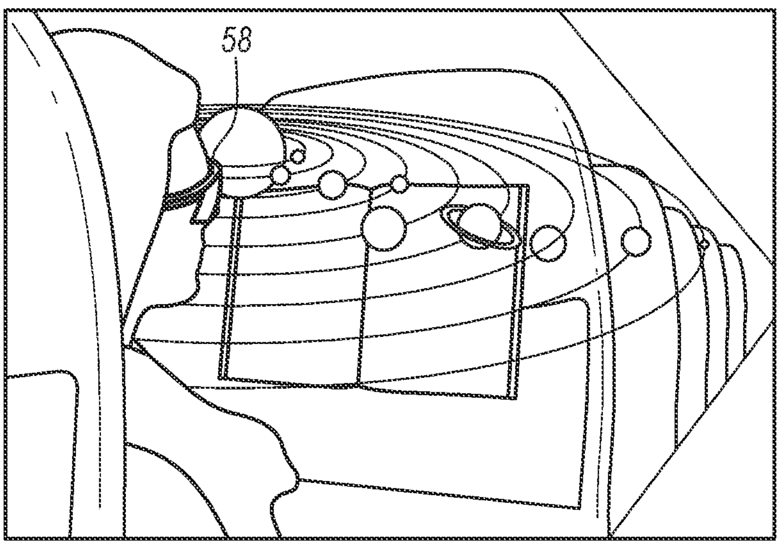
Figure 53C:
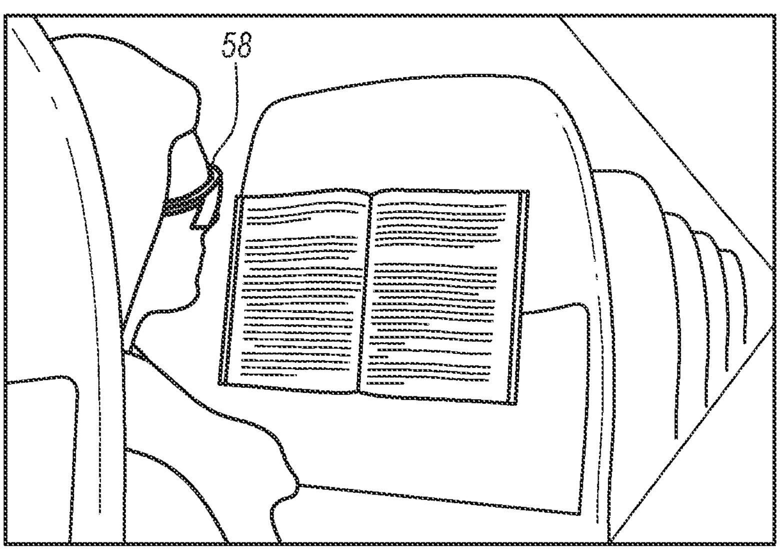

FIGS. 53A-53C illustrate a user scenario wherein a person utilizing a head mounted component (58) may read and configure presentation of a book on an airplane through a virtual presentation in two and/or three dimensions (i.e., certain aspects may desirably be presented within a plane, while other features may or may not be presented in the same plane).

Figure 54:
FIG. 54 illustrates an interaction content according to some embodiments.

FIG. 54 illustrates an augmented birthday card configuration wherein upon opening an actual birthday card, a user wearing his or her head mounted component (58) may experience additional virtual presentation.

Figure 55A:
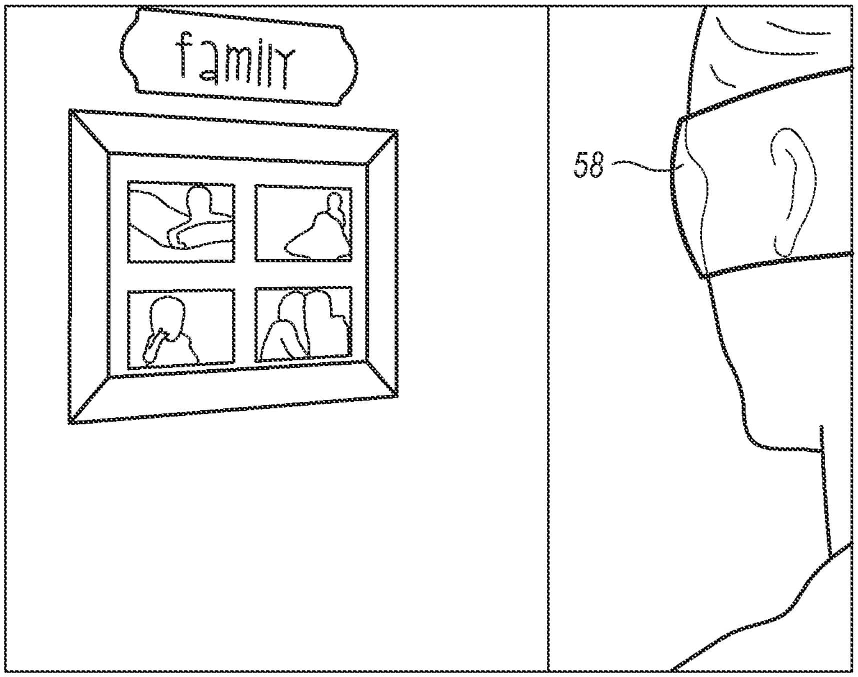
FIGS. 55A-55F illustrate various image presentation arrangements according to some embodiments.
Figure 55B:
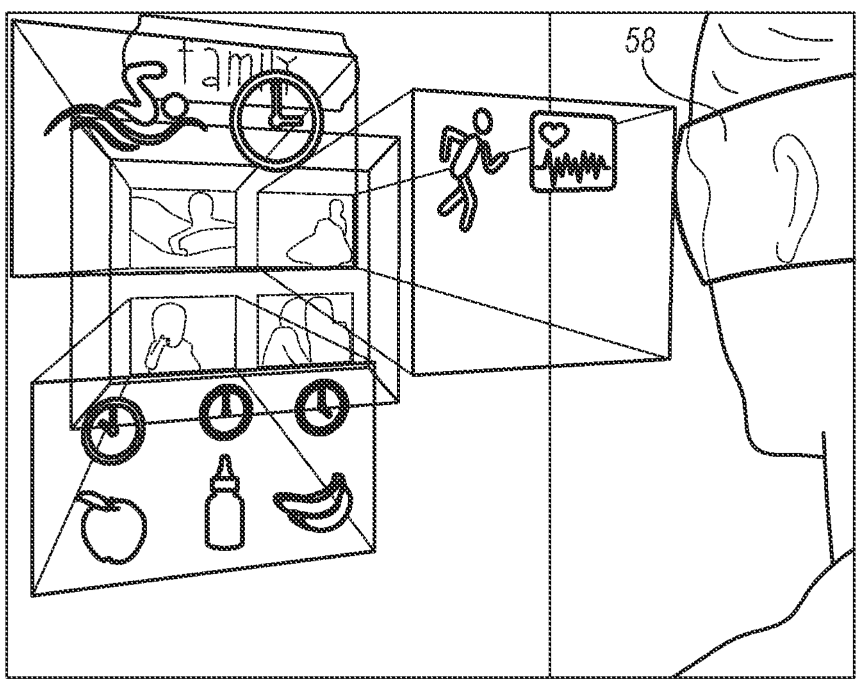
Figure 55C:
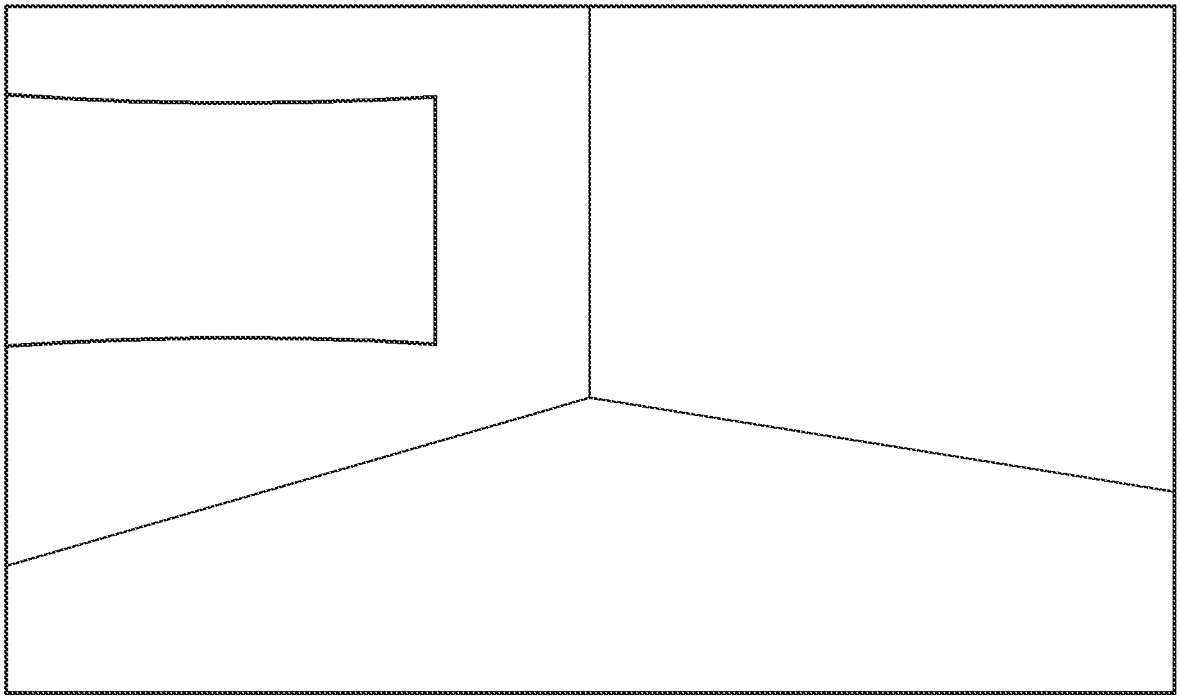
Figure 55D:
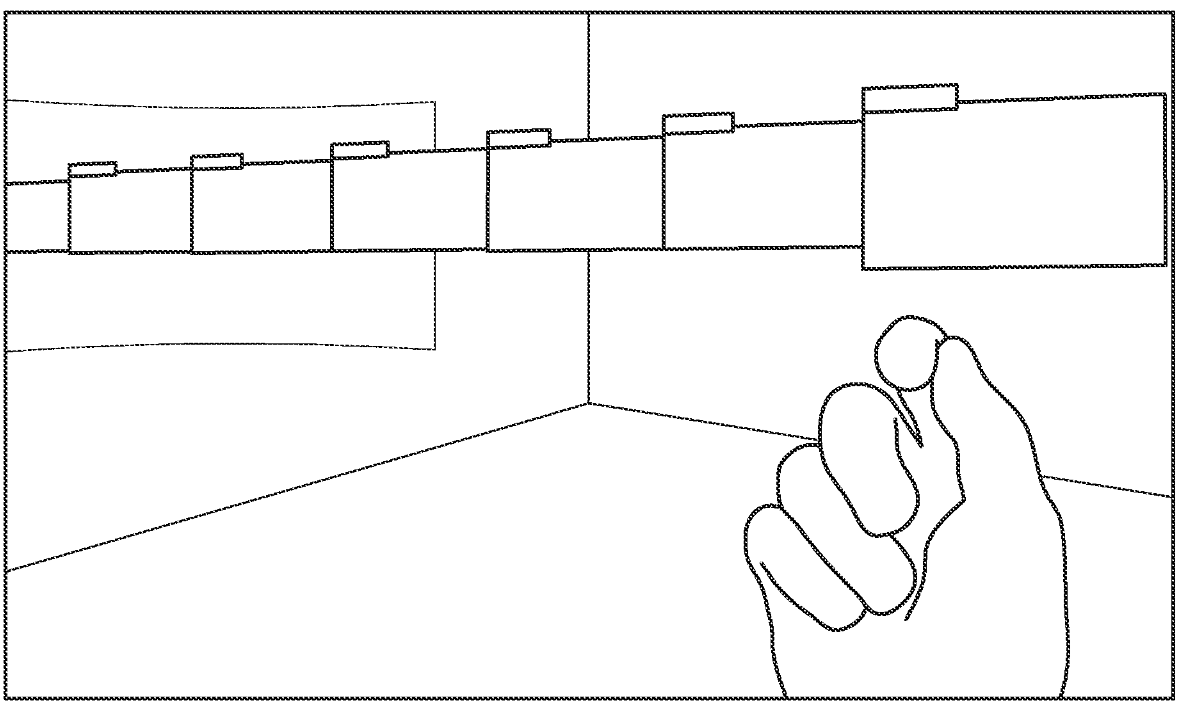
Figure 55E:
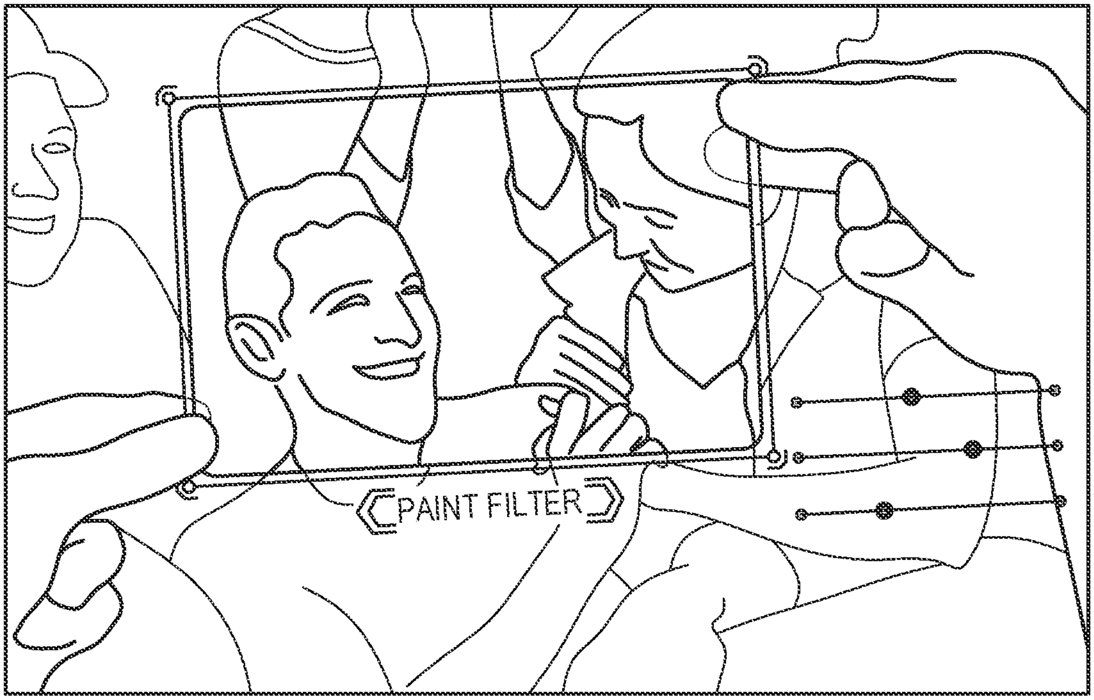
Figure 55F:
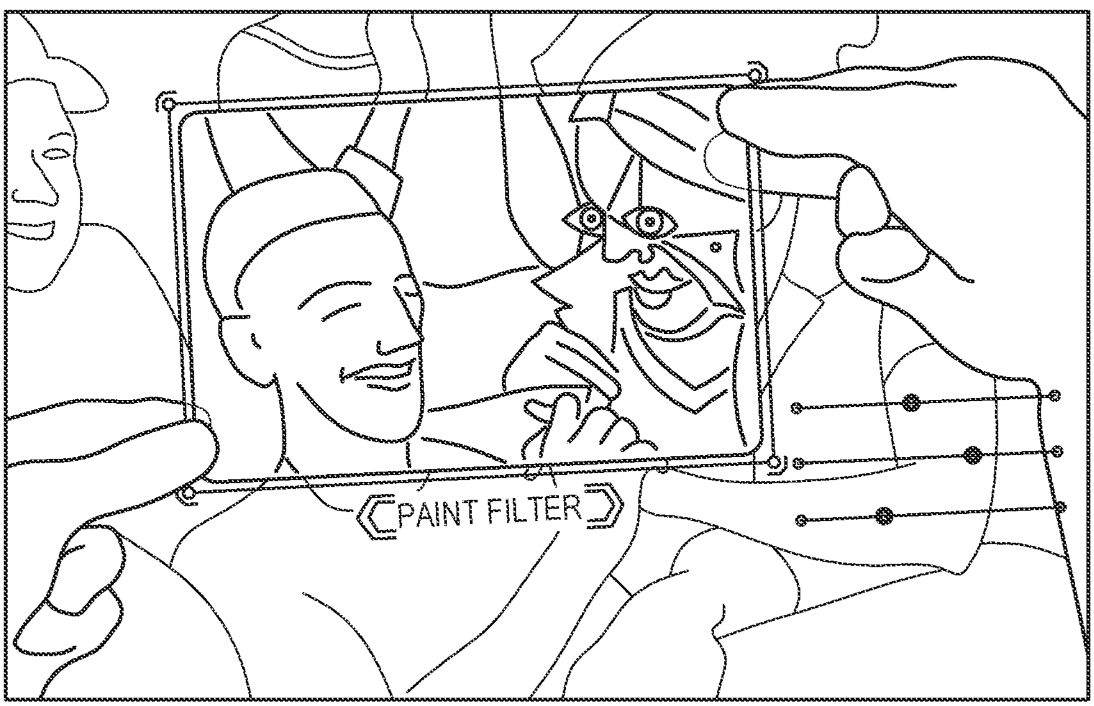
Figure 56A:
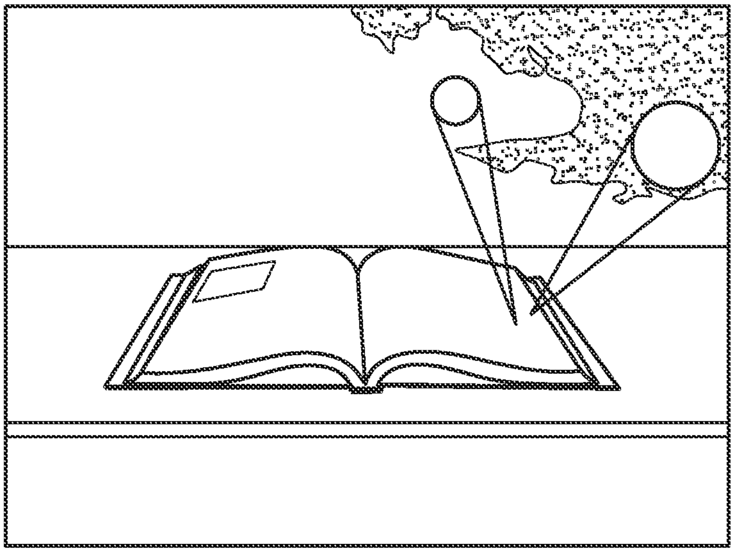
FIGS. 56A-56E illustrate various planar oriented three dimensional content interaction according to some embodiments.
Figure 56B:
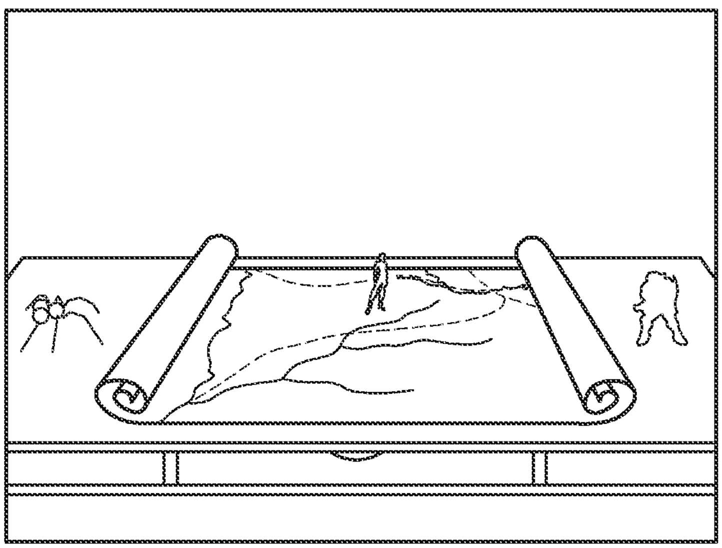
Figure 56C:
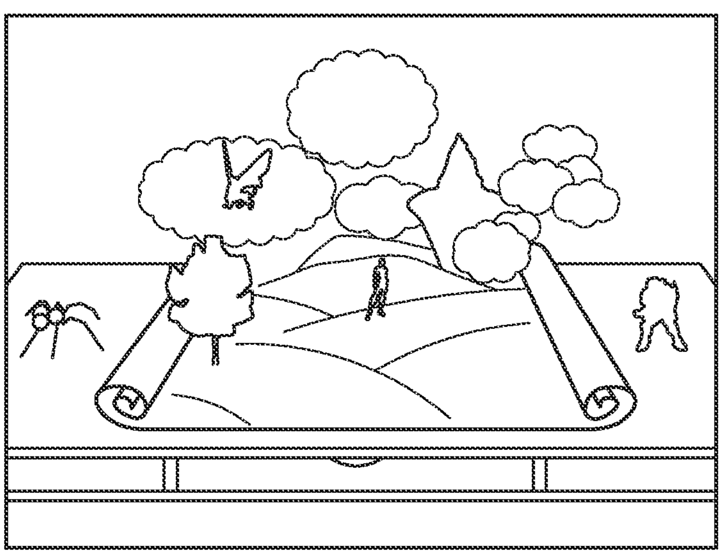
Figure 56D:
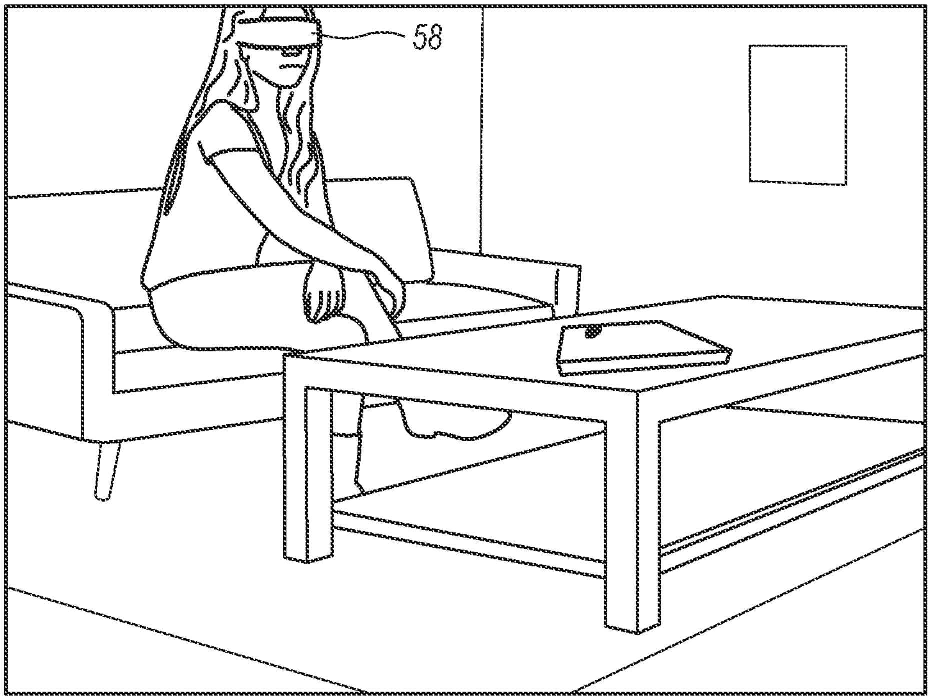
Figure 56E:
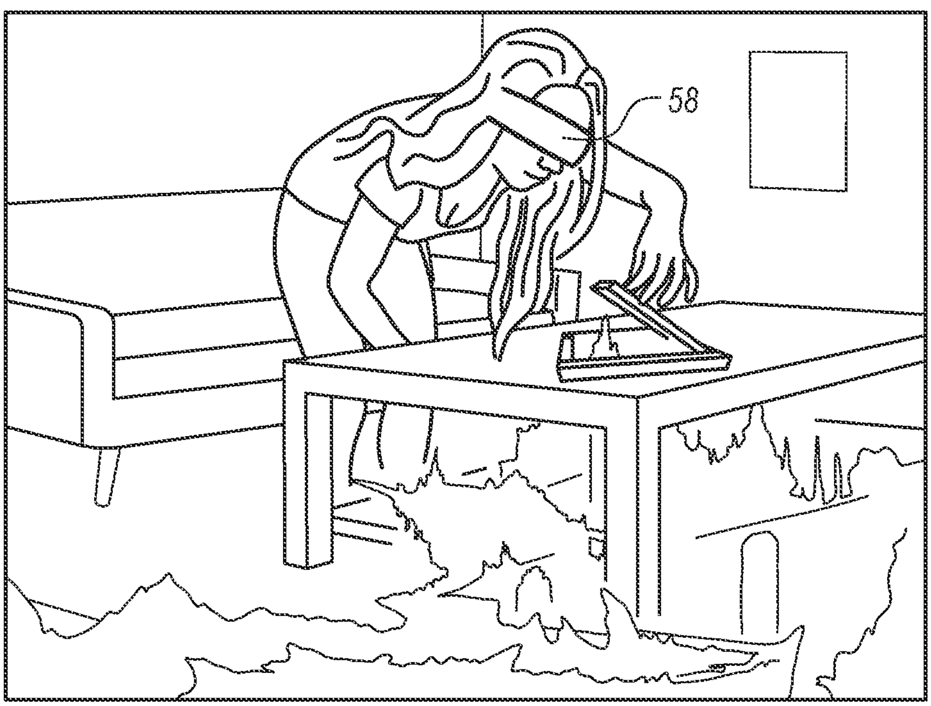
Figure 57A:
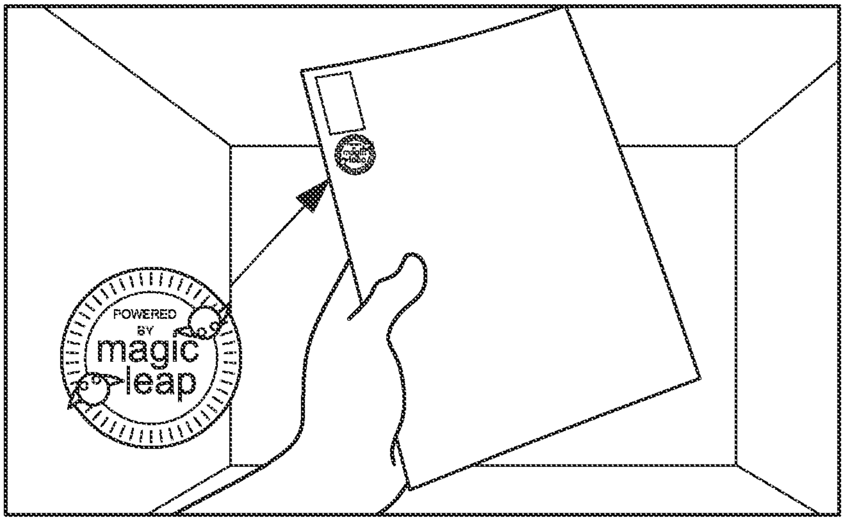
FIGS. 57A-57F illustrate various aspects of augmented reality document examination according to some embodiments.
Figure 57B:
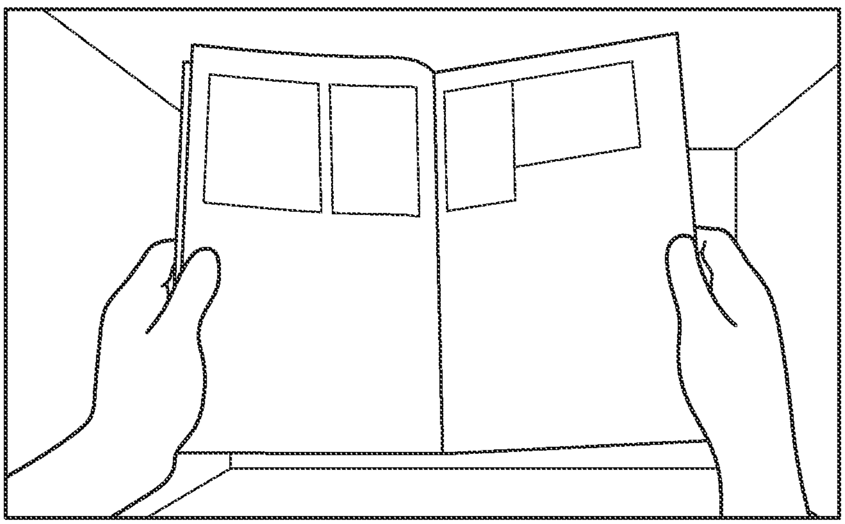
Figure 57C:
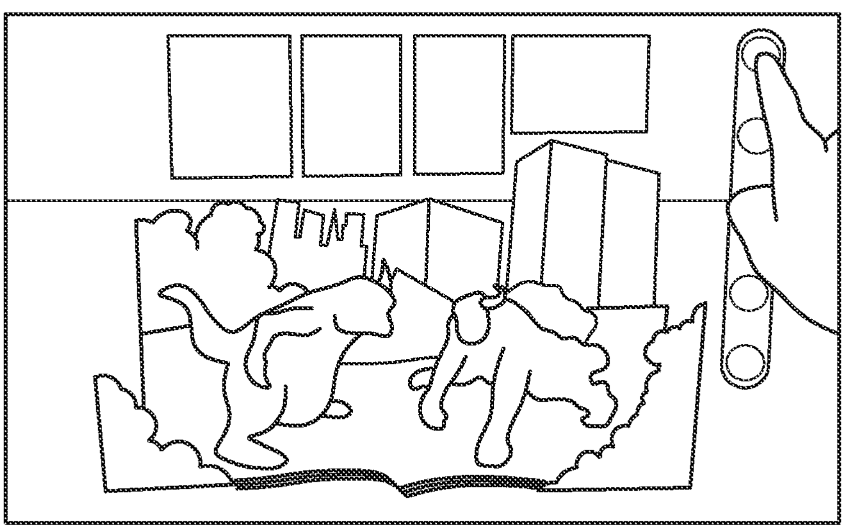
Figure 57D:
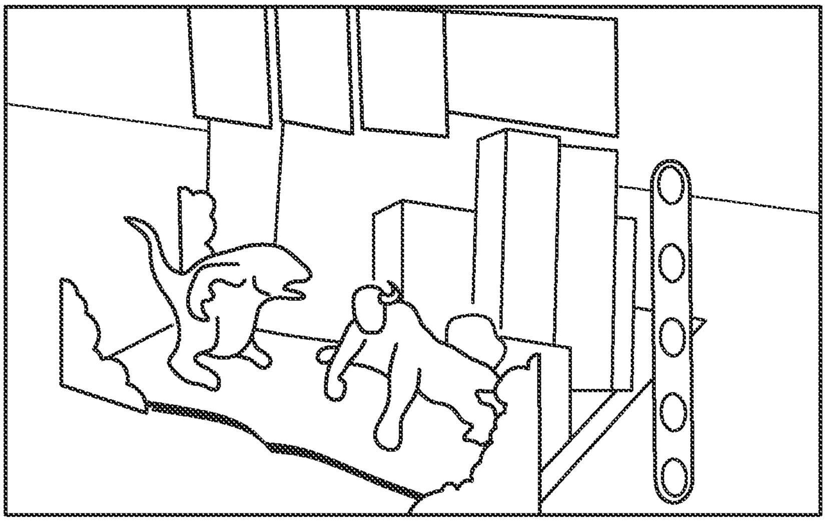
Figure 57E:
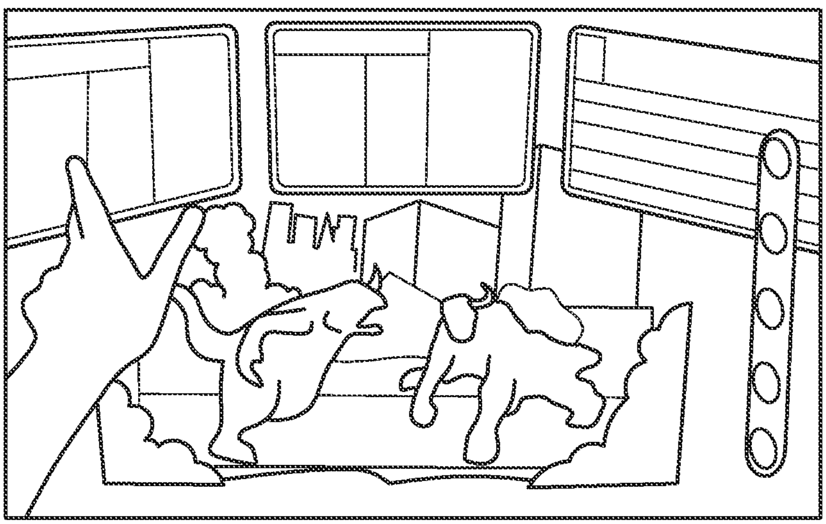
Figure 57F:
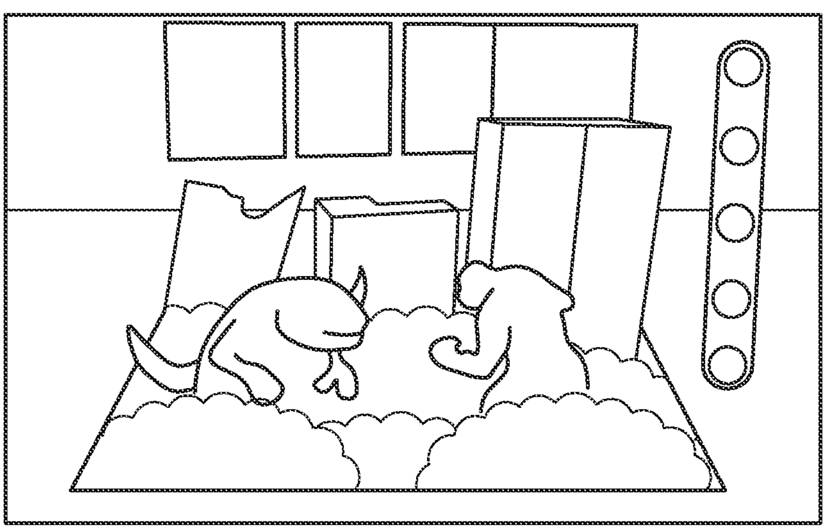
Figure 58A:
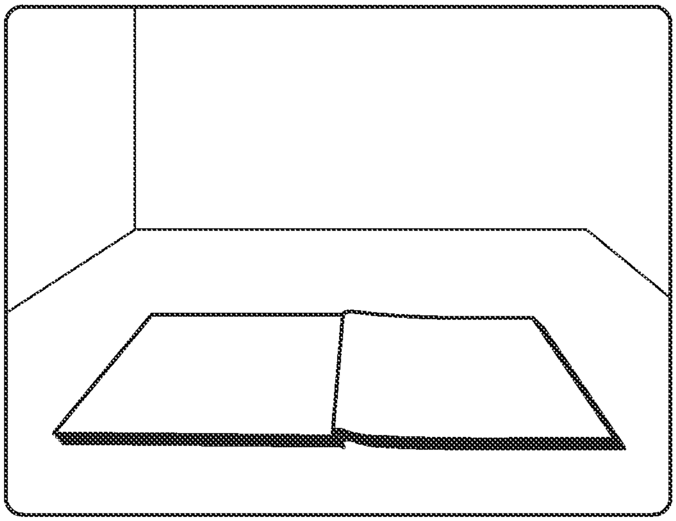
FIGS. 58A-58C illustrate various gaming scenarios featuring three dimensional virtual presentation according to some embodiments.
Figure 58B:
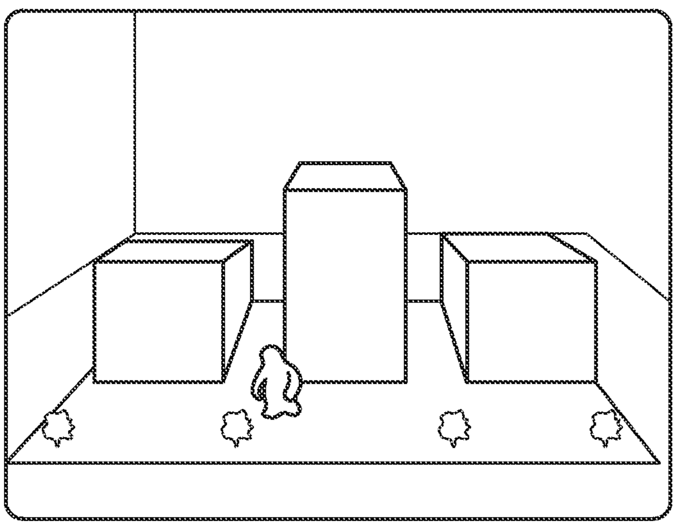
Figure 58C:
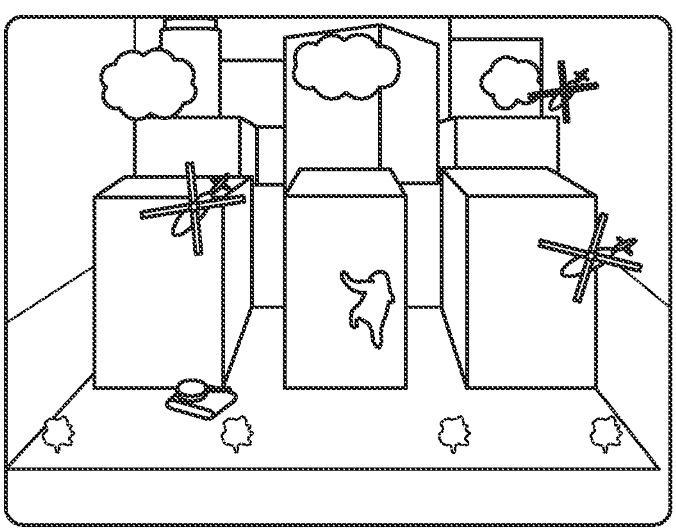

FIGS. 55A-55F illustrate various image selection, presentation, and filters for use with a head mounted component (58). FIGS. 55A-55B illustrate various aspects of a configuration wherein a user may customize presentation of images within an actual (i.e., it may actually be an empty frame mounted on the wall in reality) picture frame for persons in the vicinity of the frame who are wearing head mounted components (58).

FIGS. 56A-56E illustrate various aspects of tabletop or desktop presentation of augmented reality to users wearing head mounted components (58) who may be reading a book, examining a tabletop item, etc.

FIGS. 57A-57F and 58A-58C illustrate various aspects of an example augmented reality document examination and/or gaming scenario featuring three dimensional virtual presentation of objects to a user.

Figure 59A:
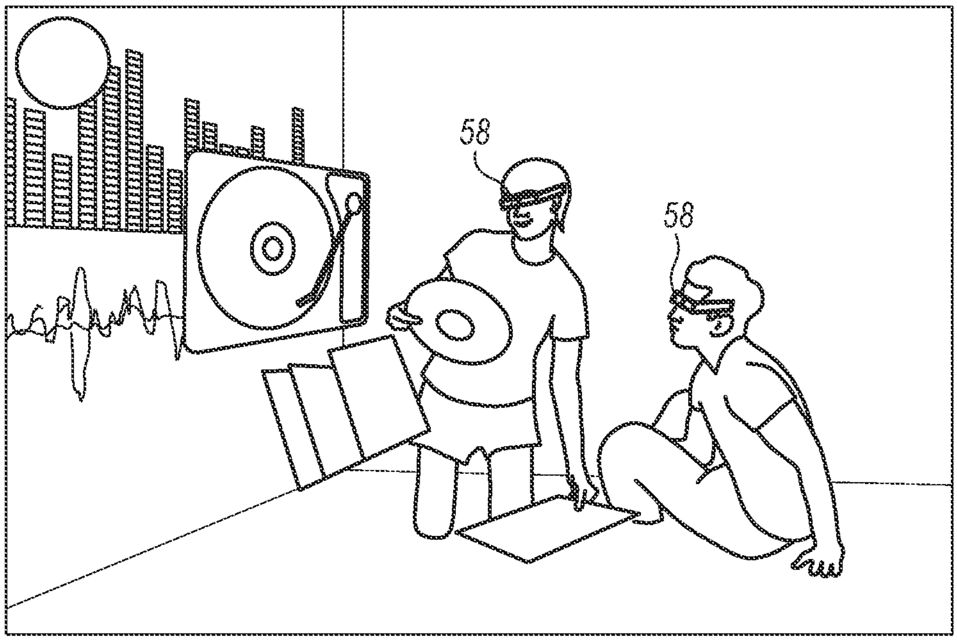
FIGS. 59A-59C illustrate various viewing scenarios according to some embodiments.
Figure 59B:
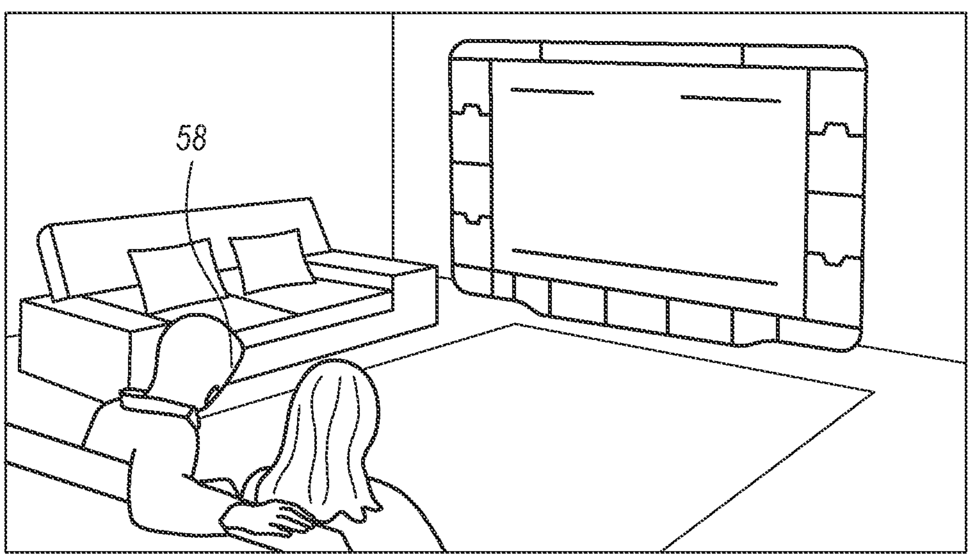
Figure 59C:
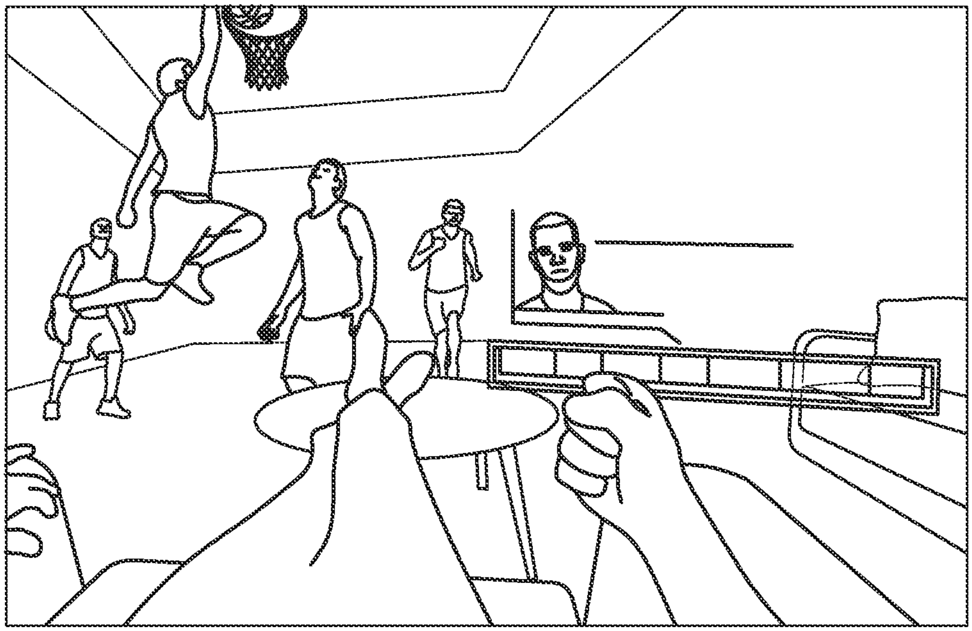

FIGS. 59A-59C illustrate various views of embodiments of the subject system wherein users wearing head mounted components (58) are able to engage with music, television, movies, sports viewing, and other activities in highly enhanced ways from their environments.

Figure 60A:
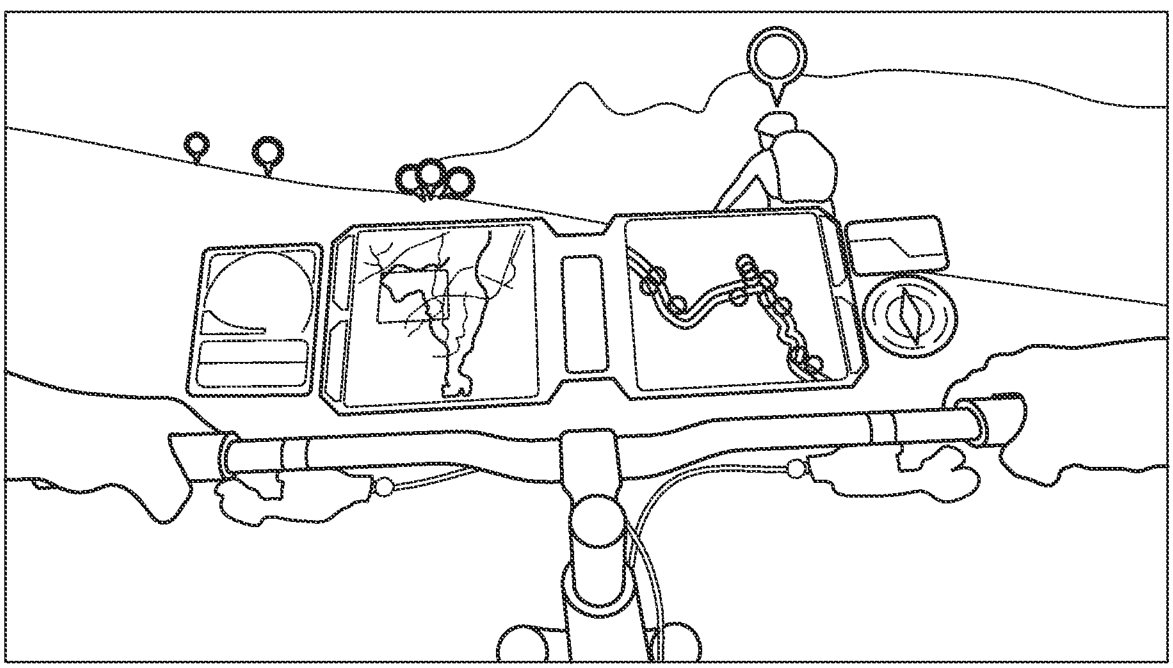
FIGS. 60A-60C illustrate various sporting activity enhancements according to some embodiments.
Figure 60B:
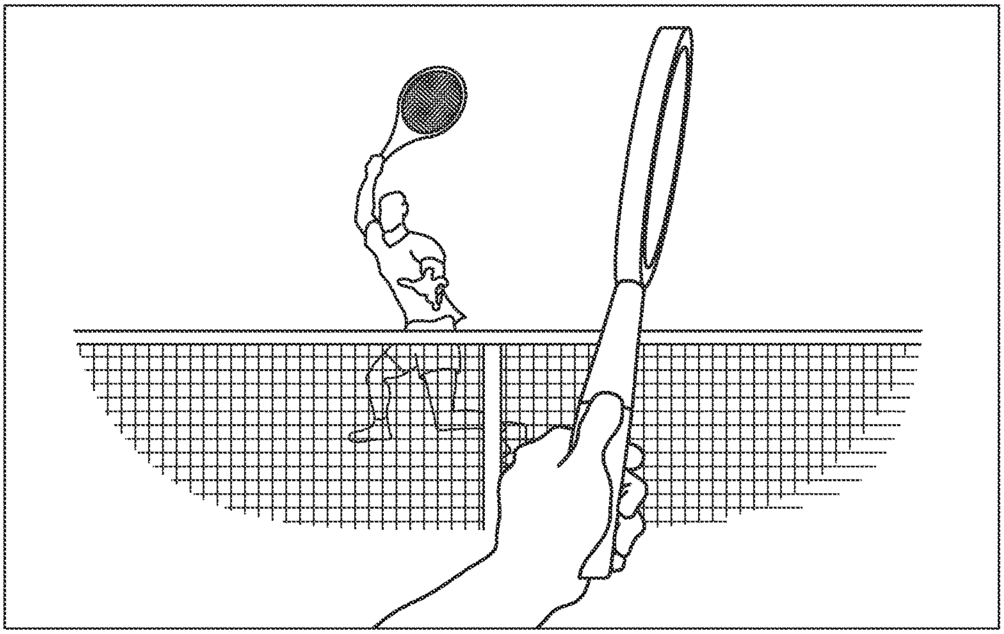
Figure 60C:
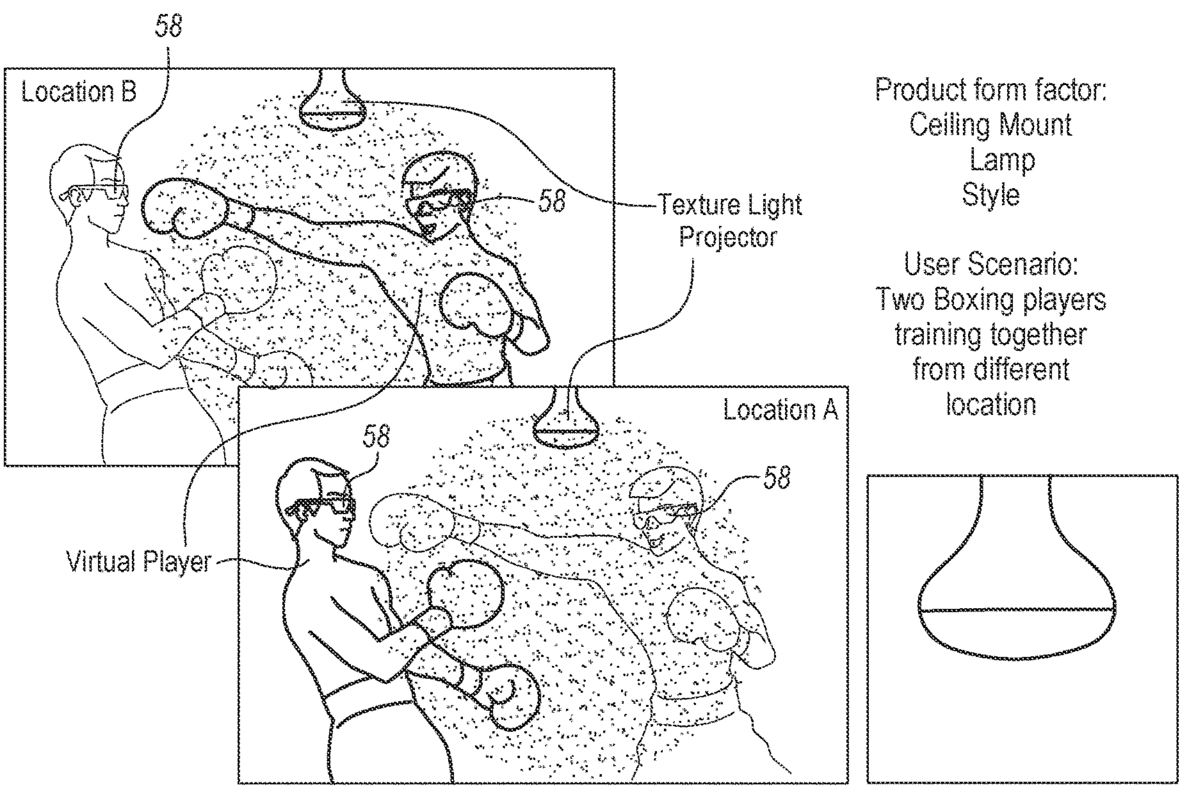
Figure 61A:
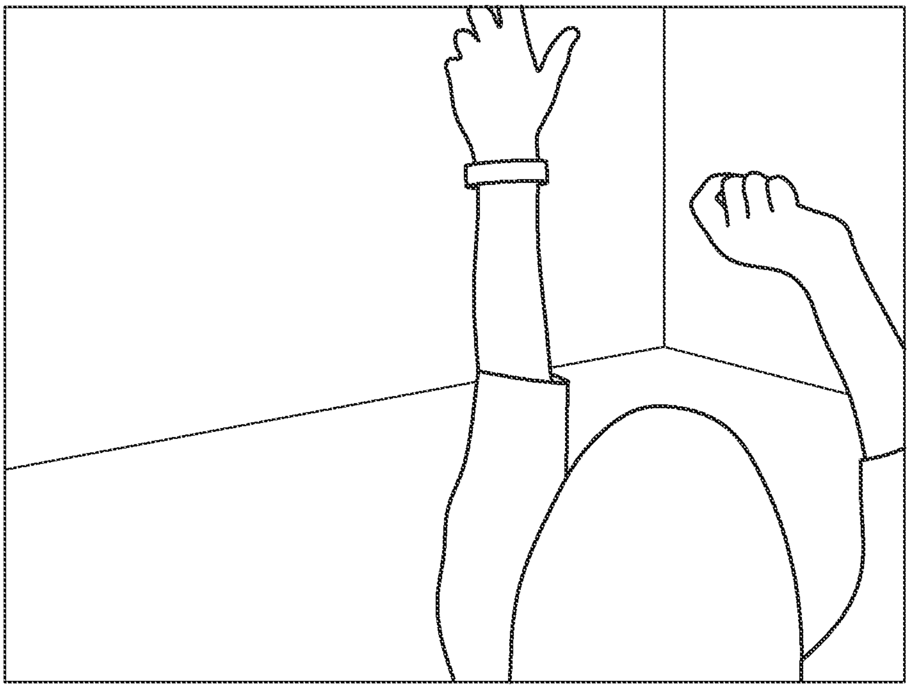
FIGS. 61A-61F illustrate various interactions of artistic elements according to some embodiments.
Figure 61B:
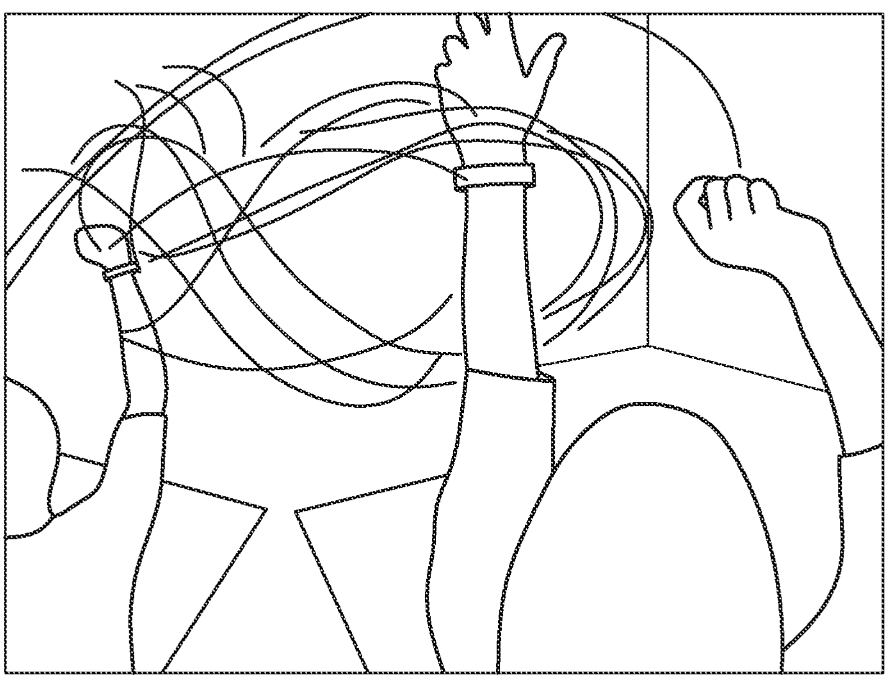
Figure 61C:
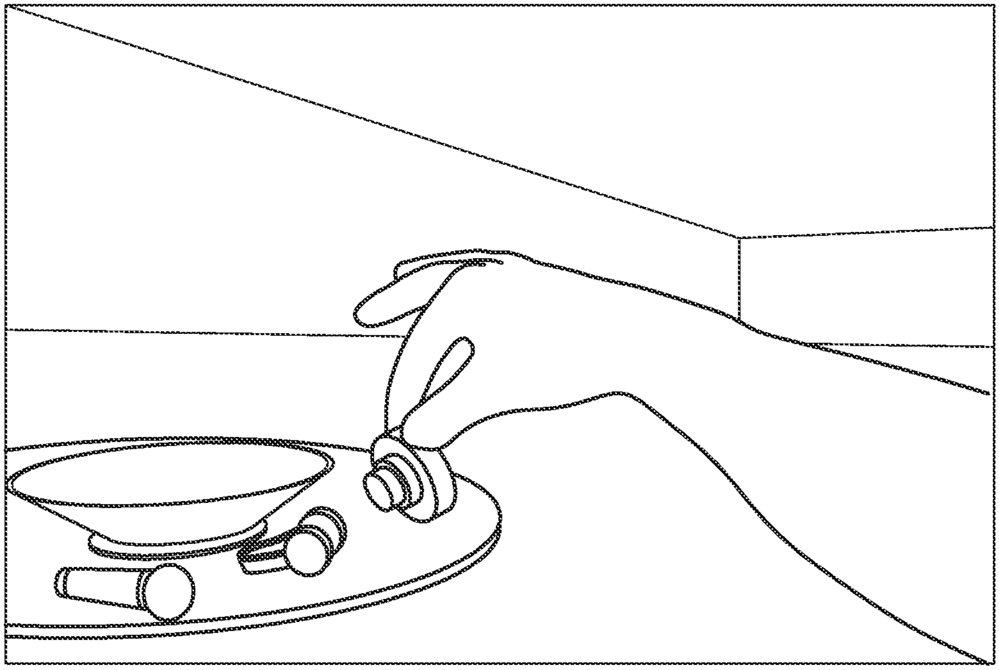
Figure 61D:
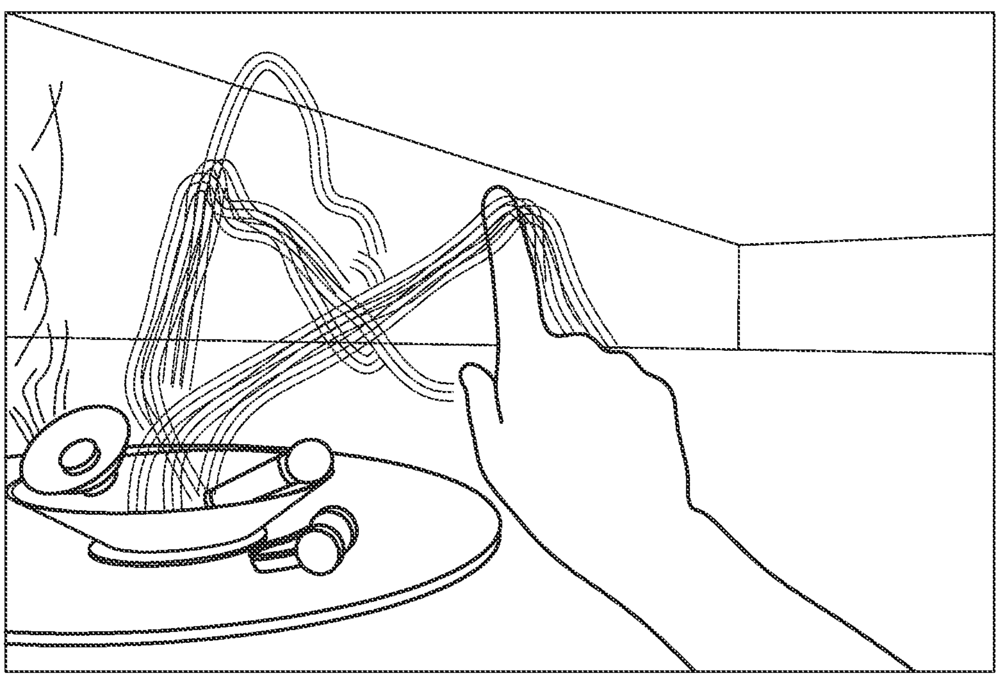
Figure 61E:
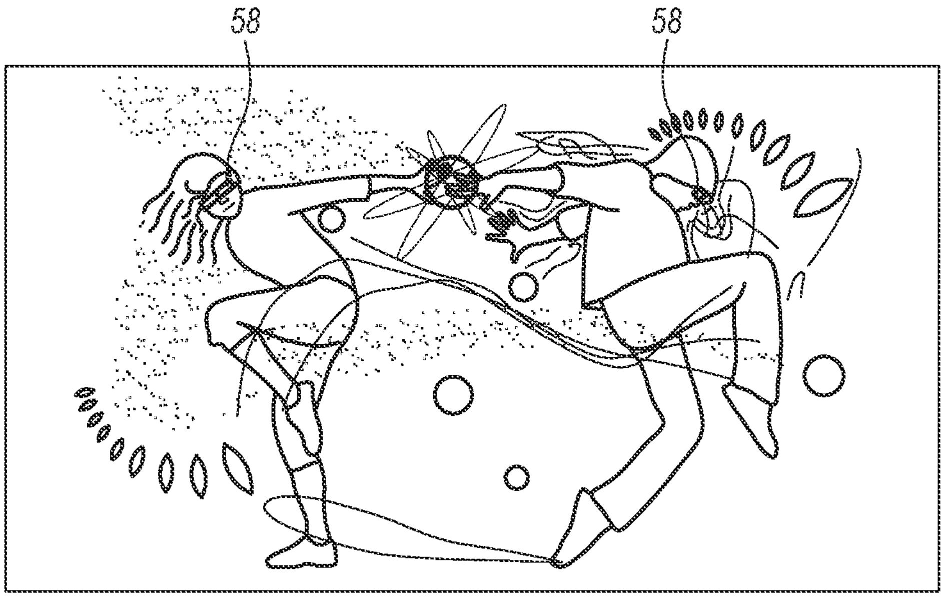
Figure 61F:
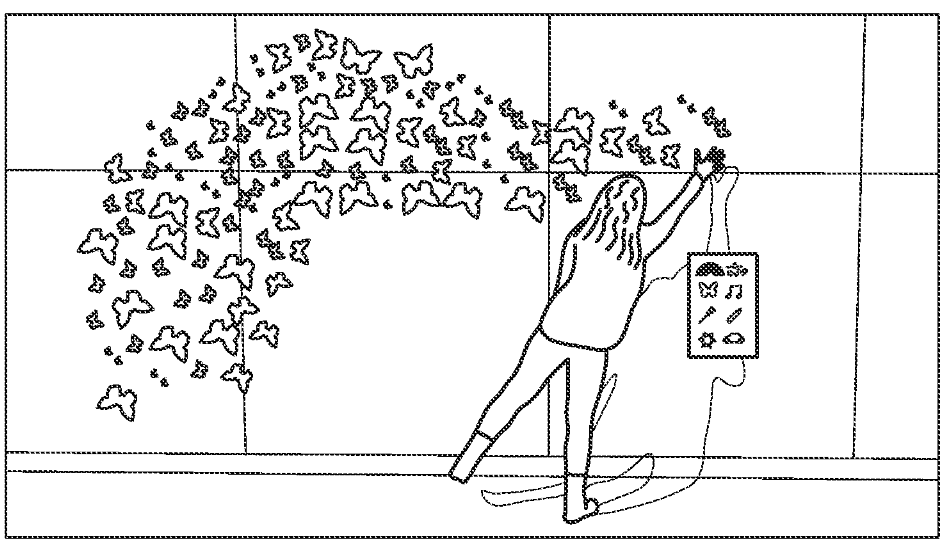

FIGS. 60A-60C illustrate that embodiments of the subject technology may be utilized to assist with and enhance the participation in sports, such as mountain biking, tennis, or boxing (FIG. 60C illustrates an embodiment featuring texture projection to monitor the dynamics/movement of each player in their environment, location A and location B).

FIGS. 61A-61F illustrate that users with head mounted components (58) may participate in artistic activities using virtual components, such as art observation and creation functionality features. Such users may also experience the creations of others, such as in museums, rock concerts (FIGS. 61A-61B), and other presentations live or virtual, using the enhanced presentation through their head mounted components (58).

Figure 62A:
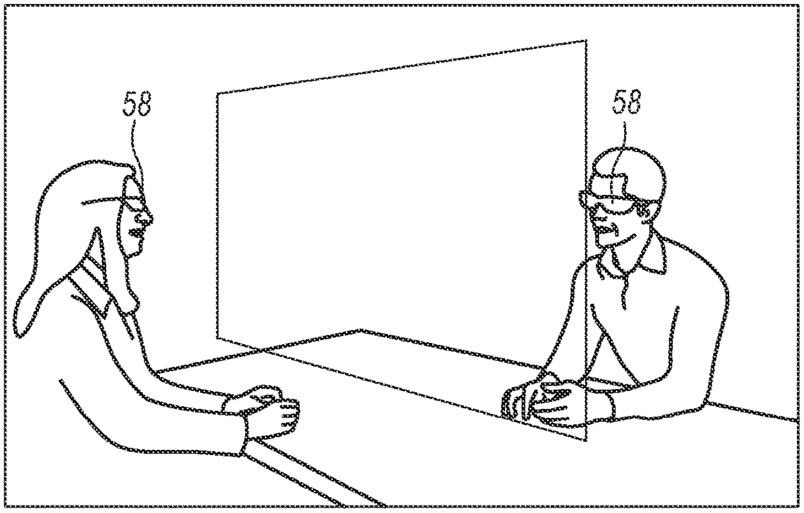
FIGS. 62A-62G illustrate various interactions in a work setting according to some embodiments.
Figure 62B:
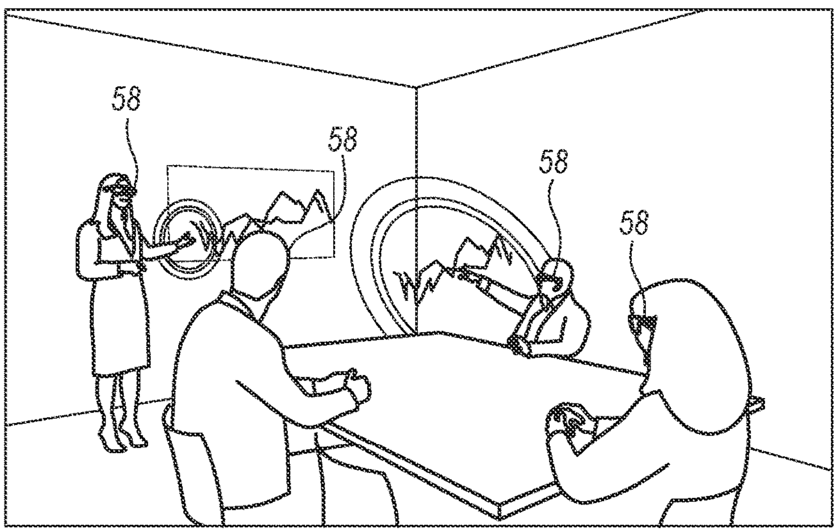
Figure 62C:
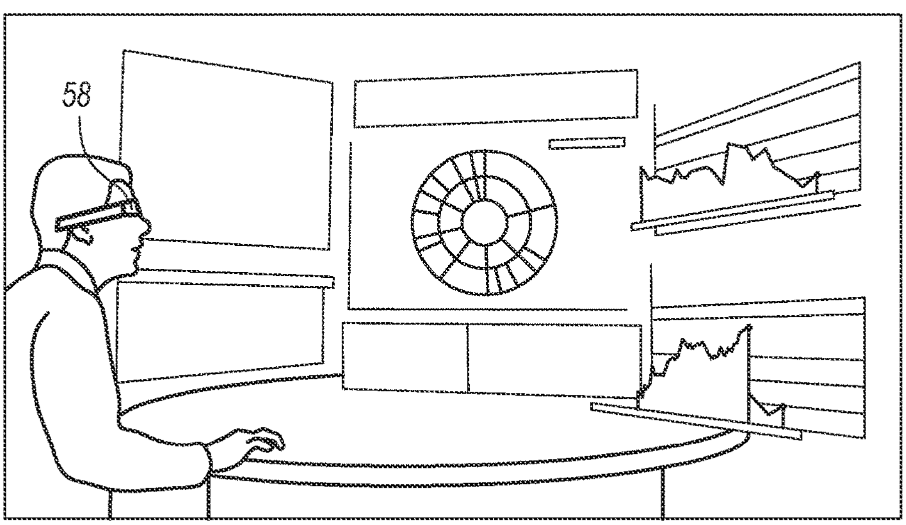
Figure 62D:
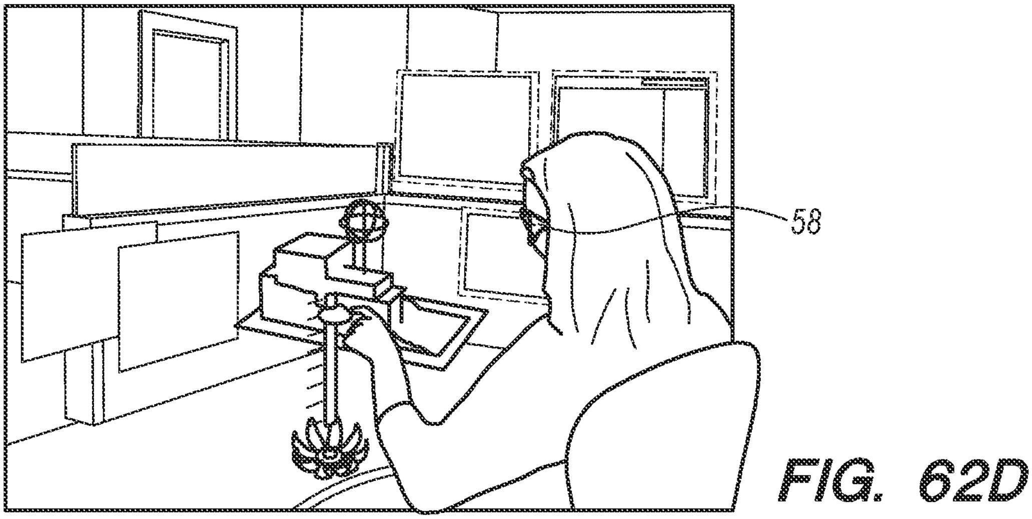
Figure 62E:
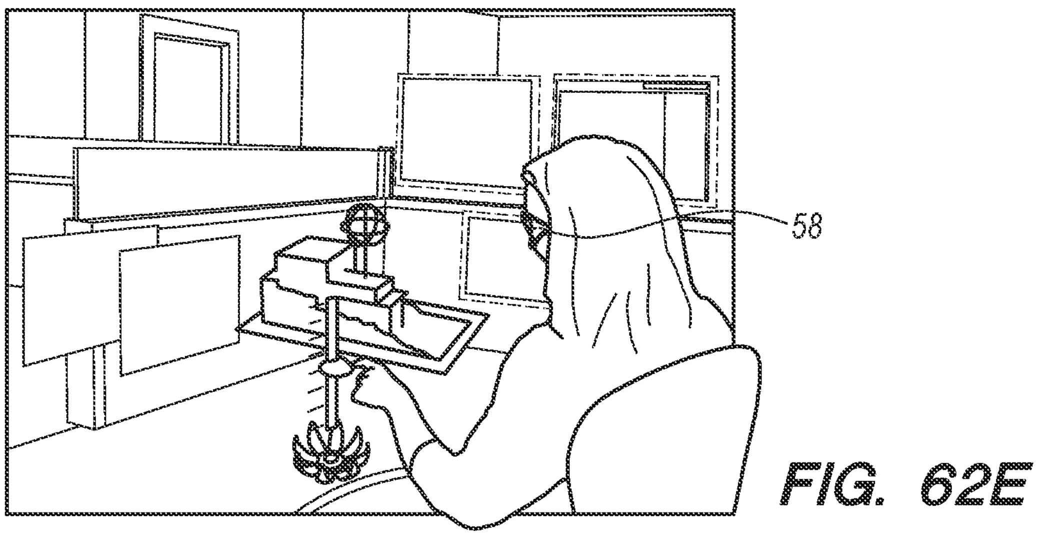
Figure 62F:
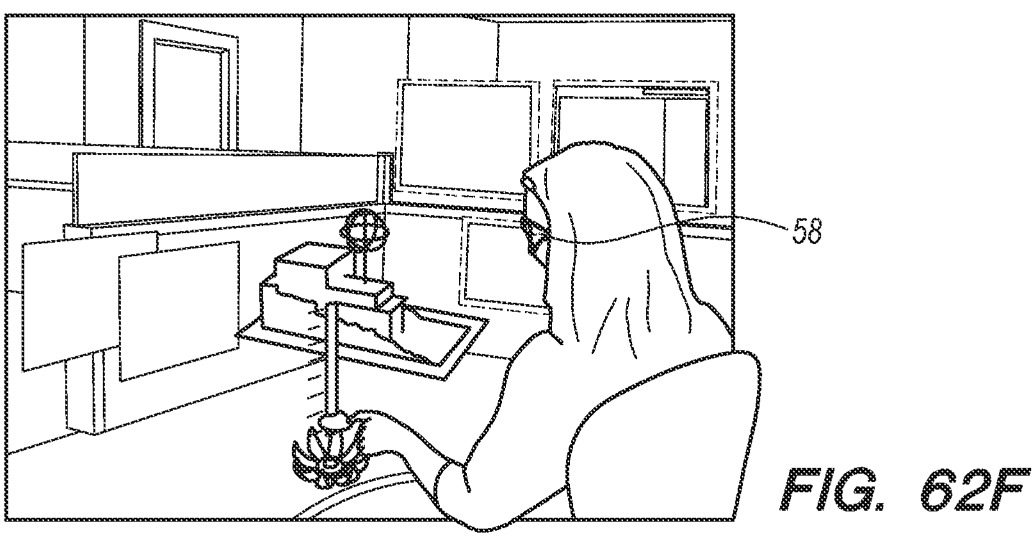
Figure 62G:
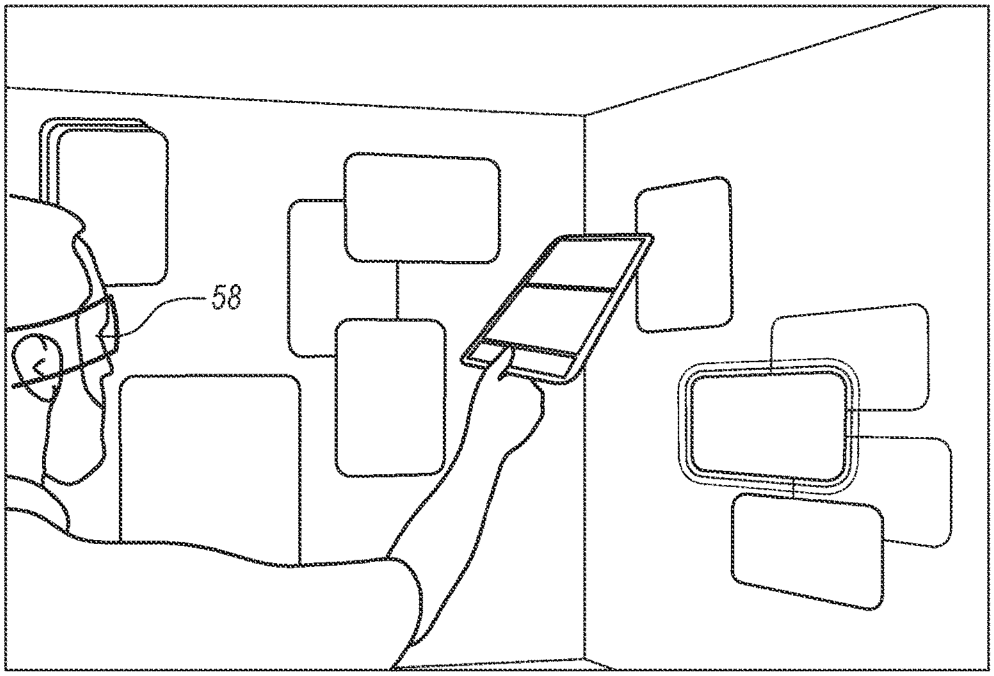

Referring to FIGS. 62A-62G, virtual presentation with an augmented reality system for users with head mounted components (58) may be very helpful for workers in various work environments who are examining data of various types, objects, images, etc—whether such presentation is planar and/or nonplanar. FIG. 62G illustrates one embodiment of an augmented reality whiteboard configuration which may be shared.

Figure 63A:
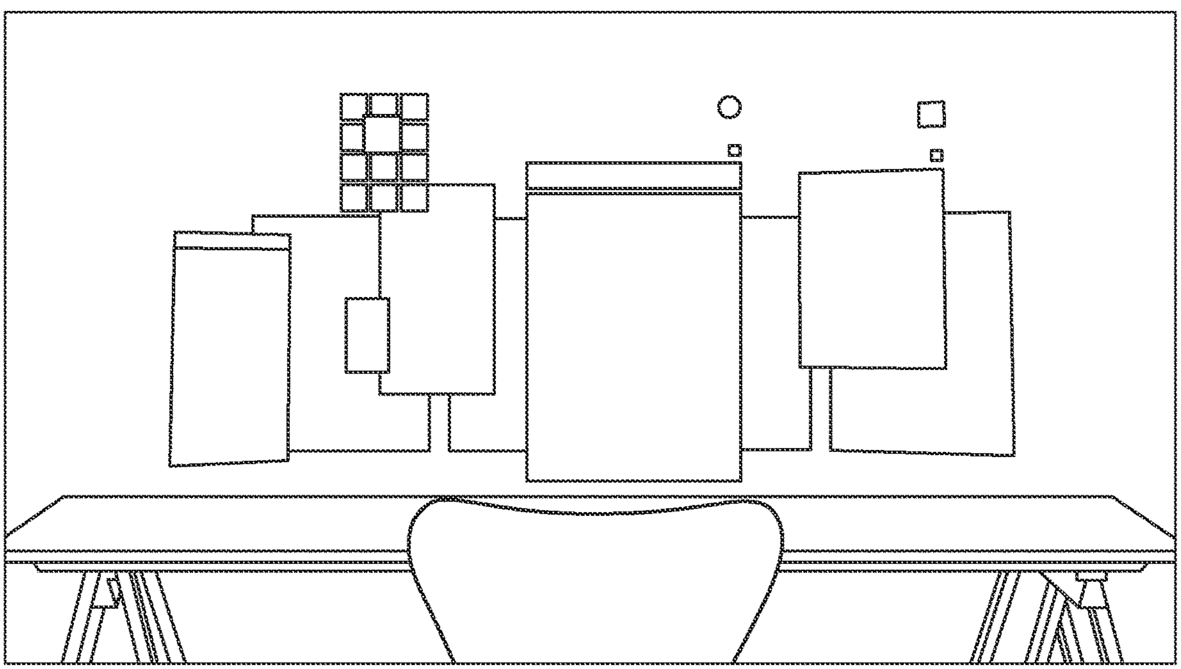
FIGS. 63A-63D illustrate customizable interfaces according to some embodiments.
Figure 63B:
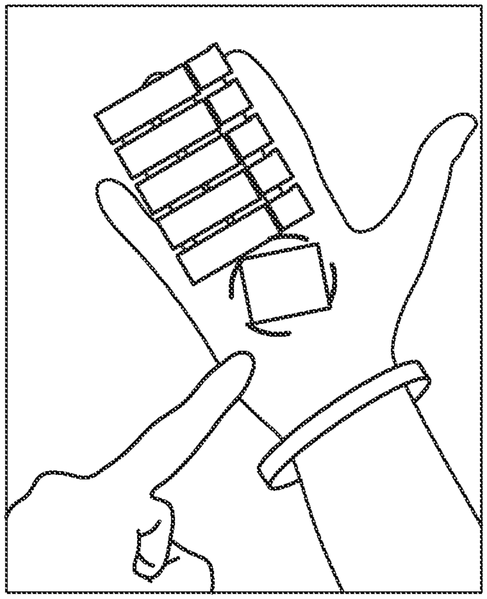
Figure 63C:
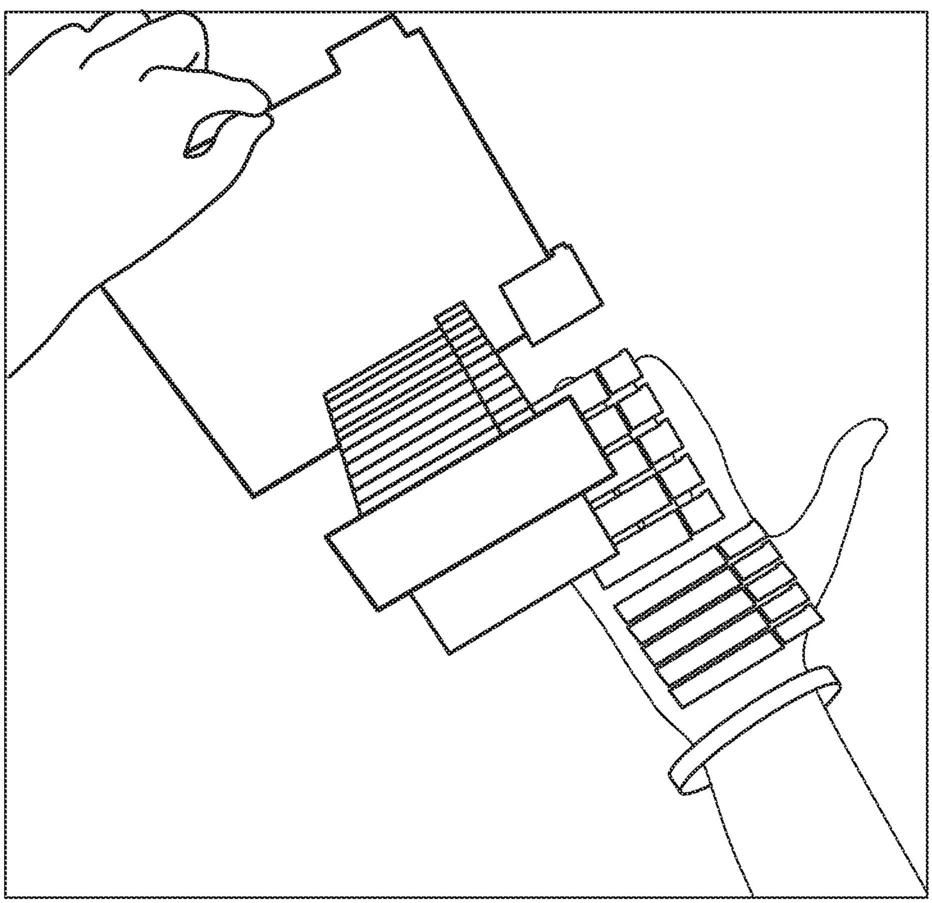
Figure 63D:
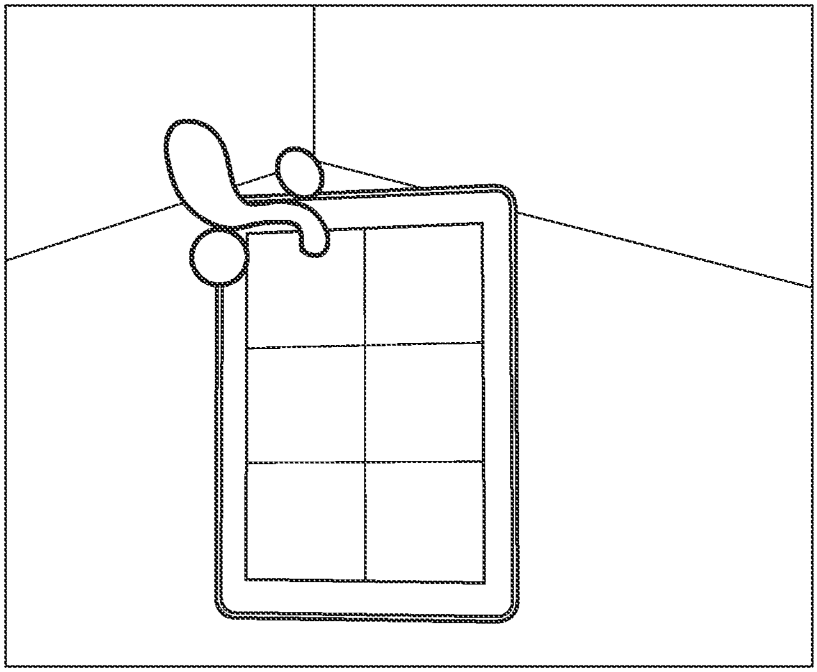

FIG. 63A illustrates an augmented view of one embodiment of a particular user's computing desktop. FIGS. 63B-63C illustrate one embodiment of a file manipulation configuration. Referring to FIG. 63D, certain two or three dimensional virtual objects may be augmented to presentation of information through a conventional means, such as through the display of a tablet computer.

Figure 64:
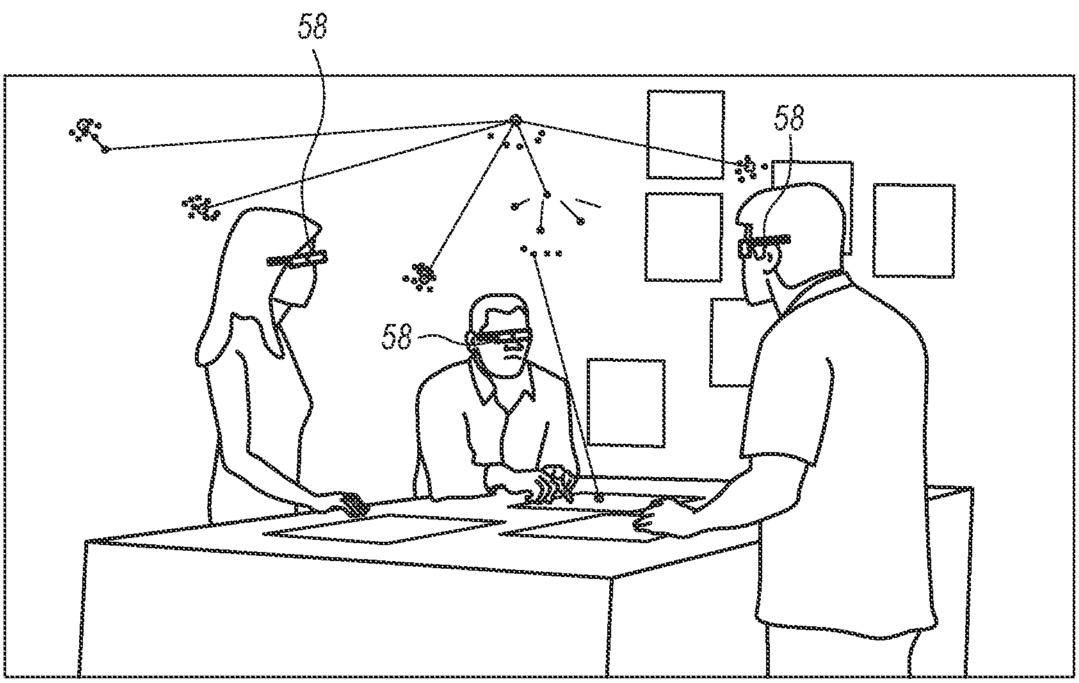
FIG. 64 illustrates a collaborative augmented reality session according to some embodiments.
Figure 65A:
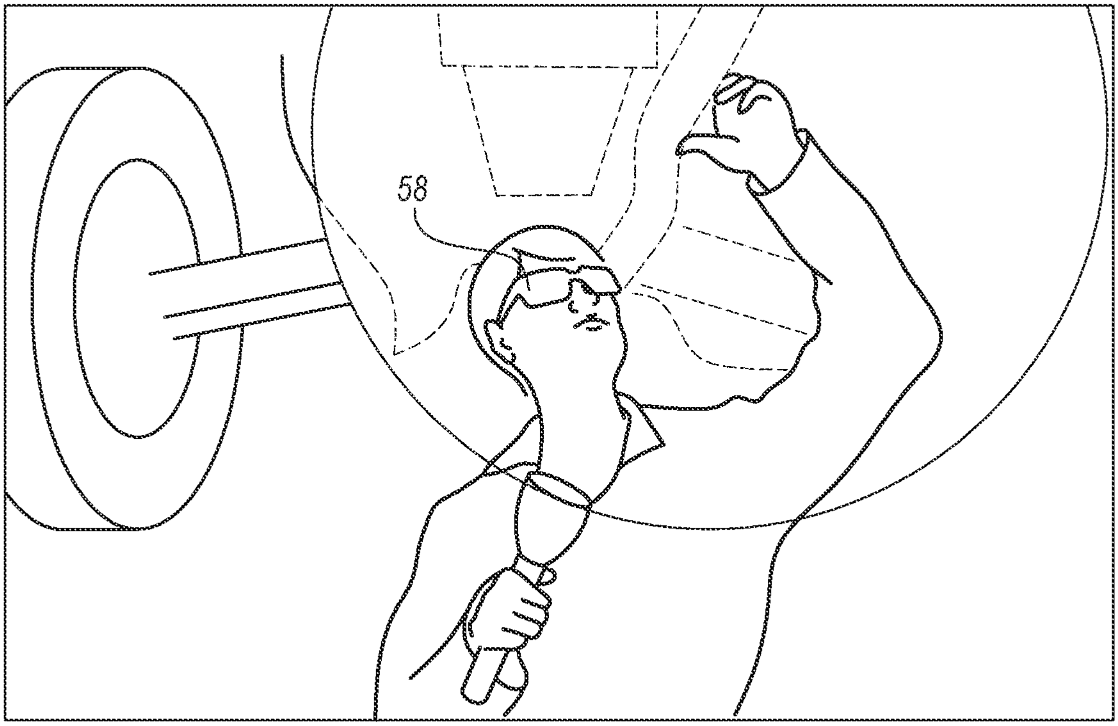
FIGS. 65A-65J illustrate enhanced visualizations for a workplace according to some embodiments.
Figure 65B:
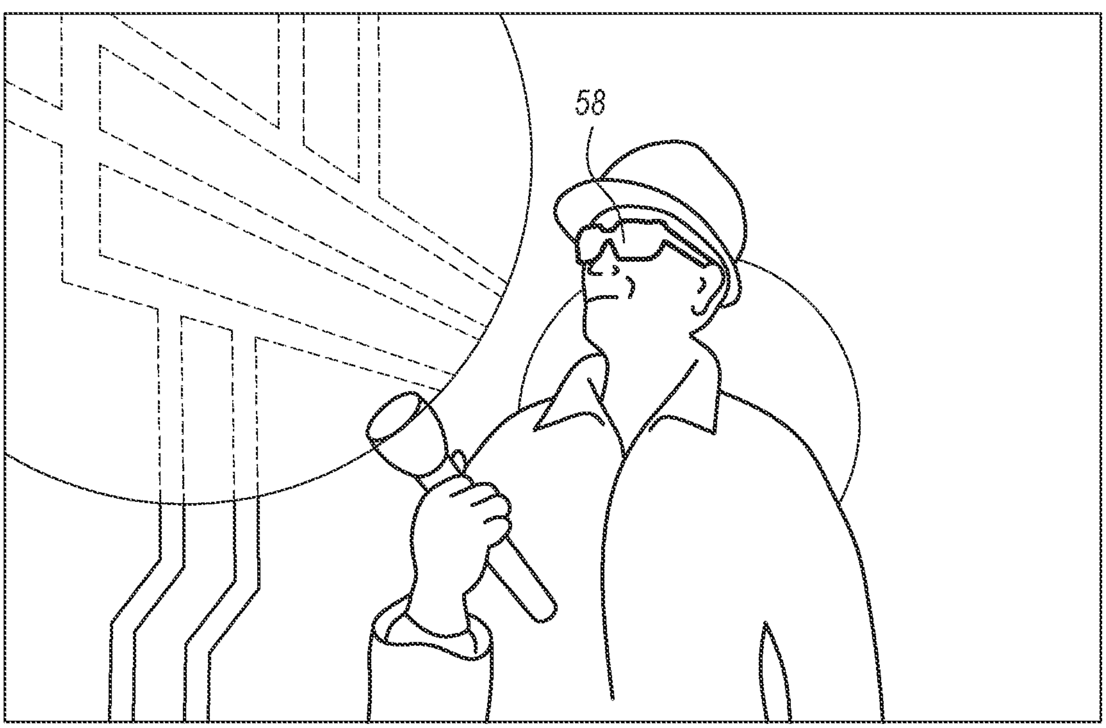
Figure 65C:
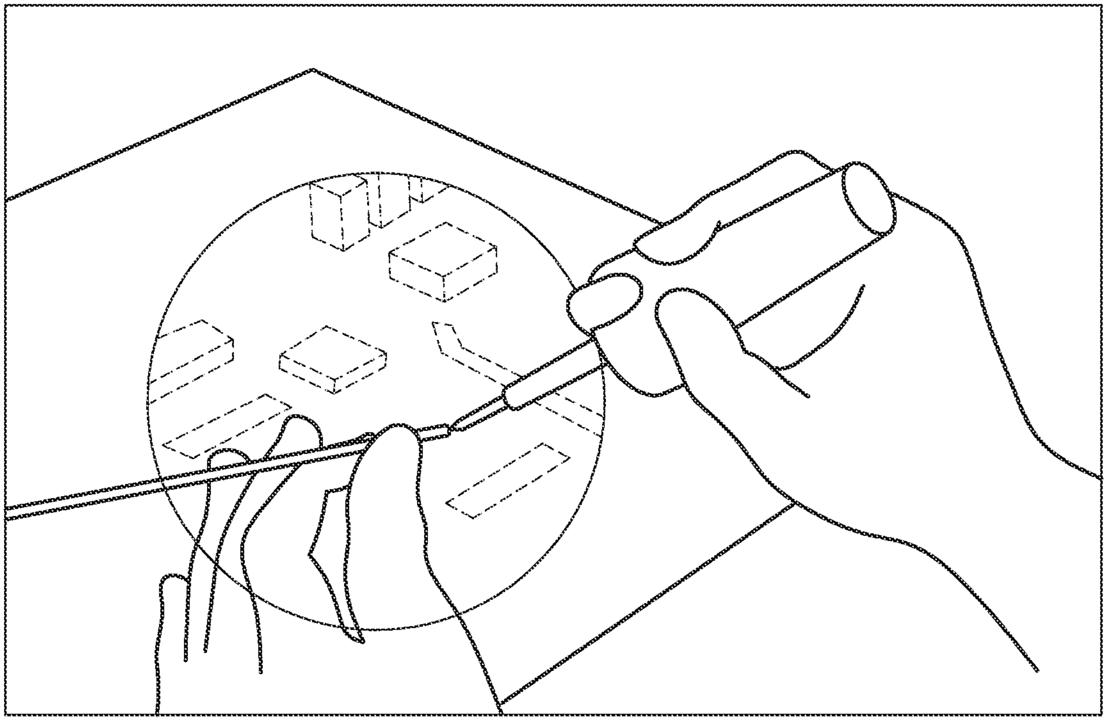
Figure 65D:
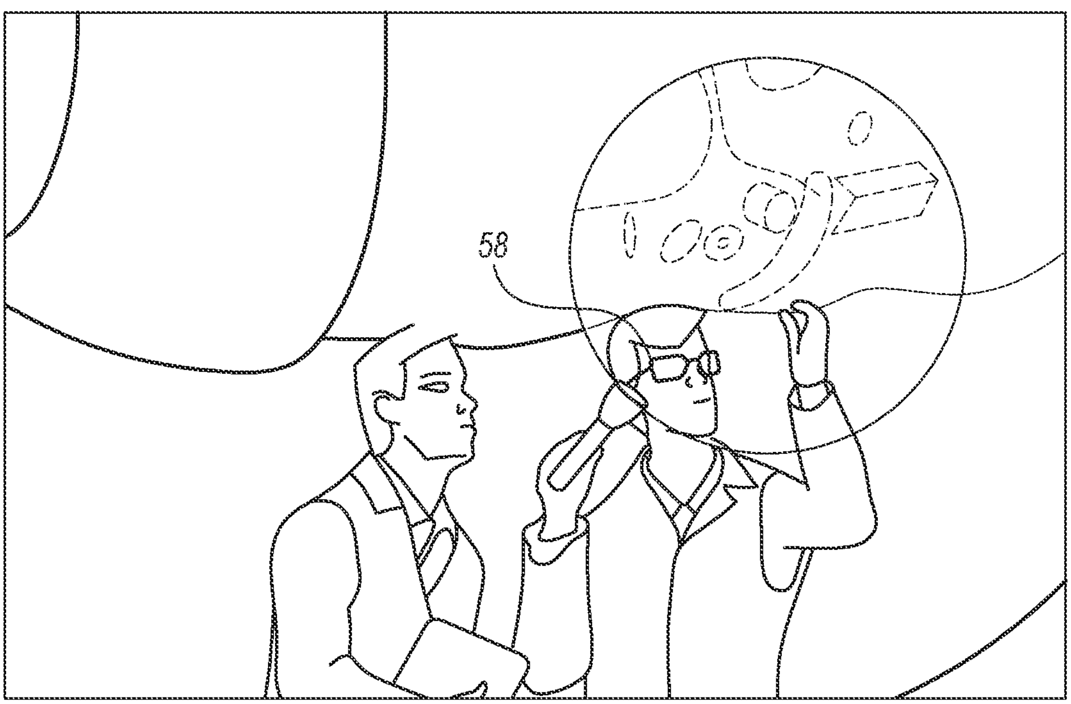
Figure 65E:
Figure 65F:
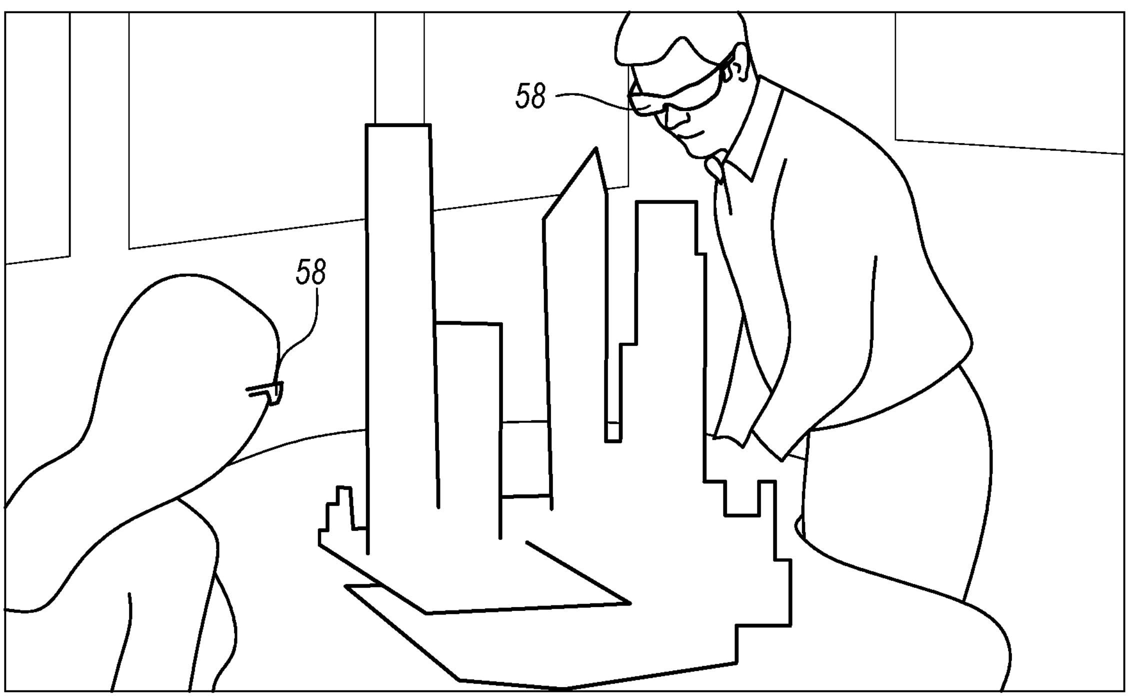
Figure 65G:
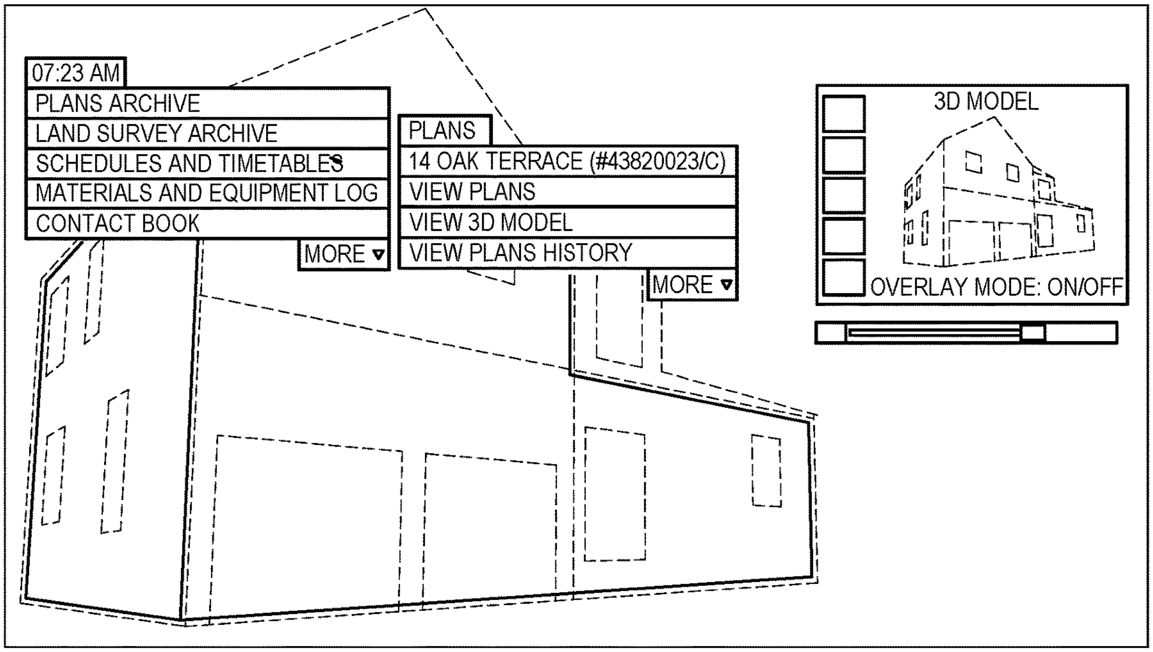
Figure 65H:
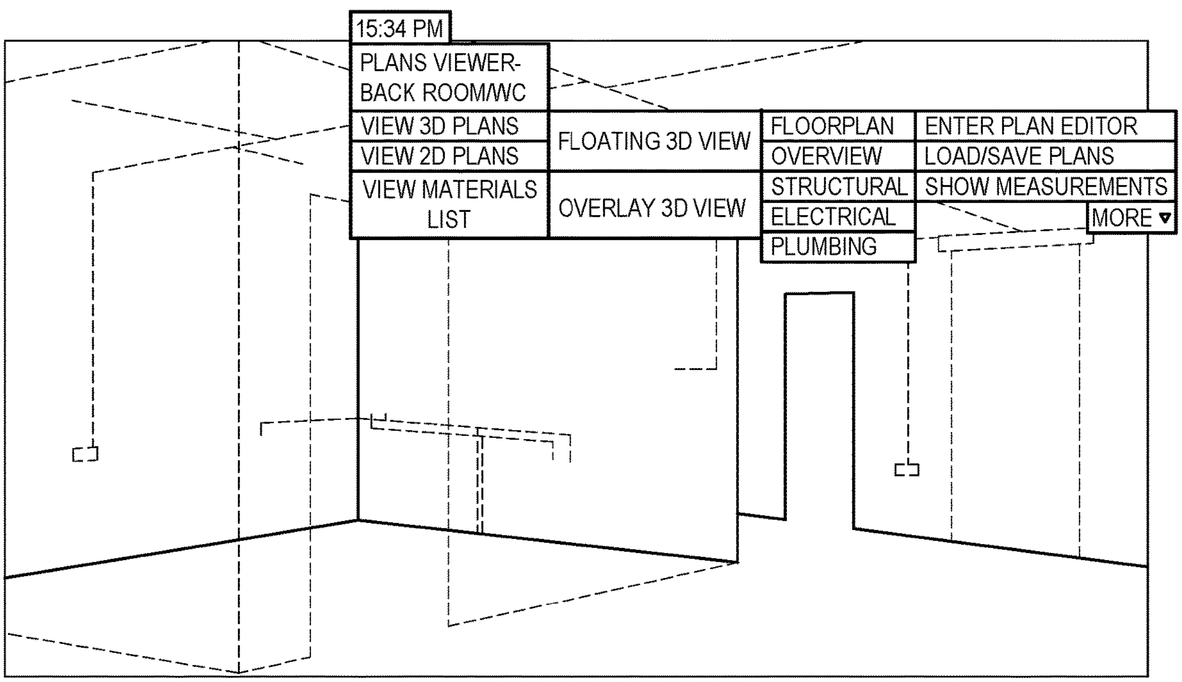
Figure 65I:
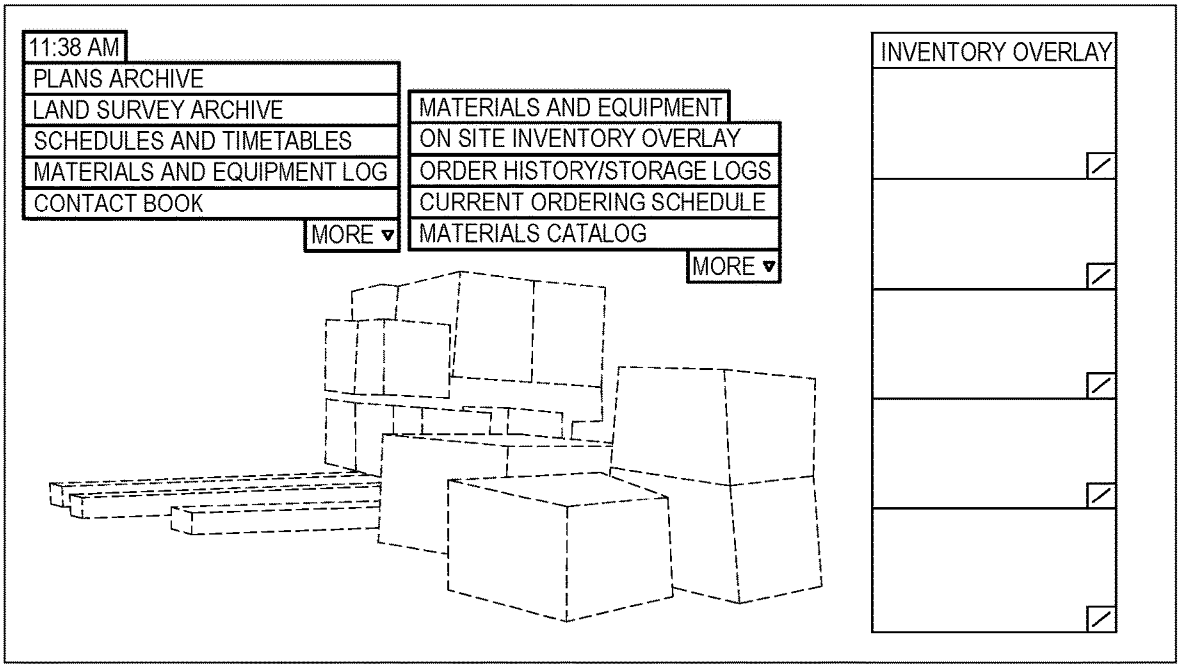
Figure 65J:
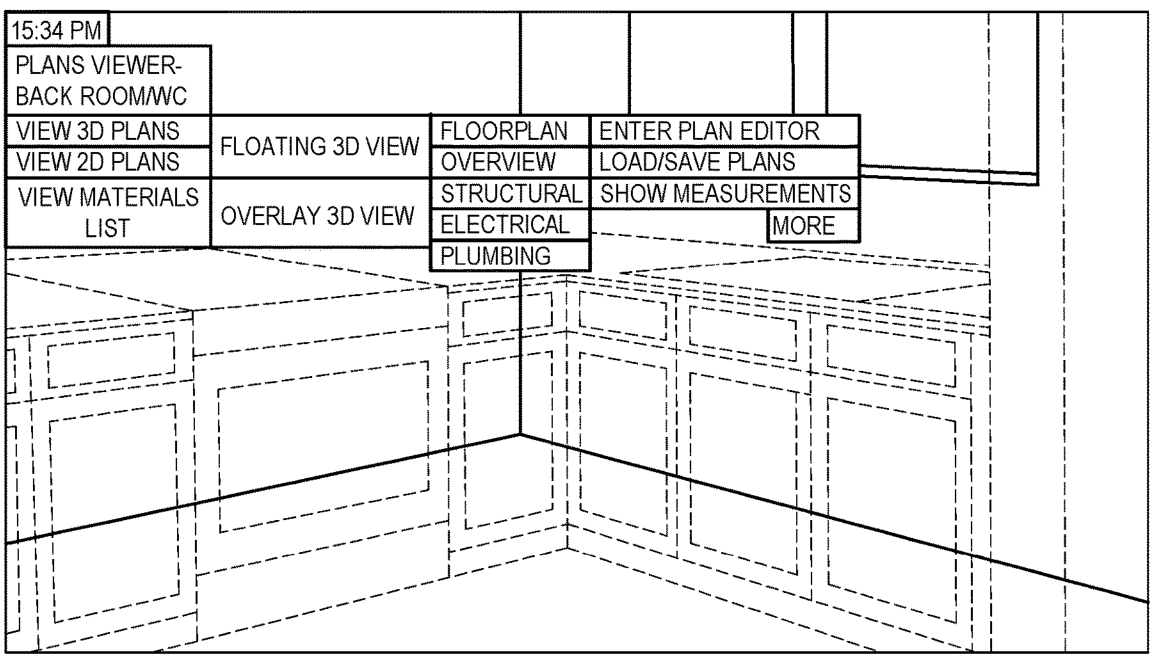

FIG. 64 illustrates collaborators visualizing certain aspects of a challenge virtually through their head mounted components (58) from the same room.

FIGS. 65A-65J illustrate further embodiments of augmented reality configurations for the workplace or homes setting to enhance visualization and problem solving through the use of head mounted components (58) and connected computing resources, such as architectural evaluations work place tasks through the use of head mounted components (58) and connected computing resources.

Figure 66A:
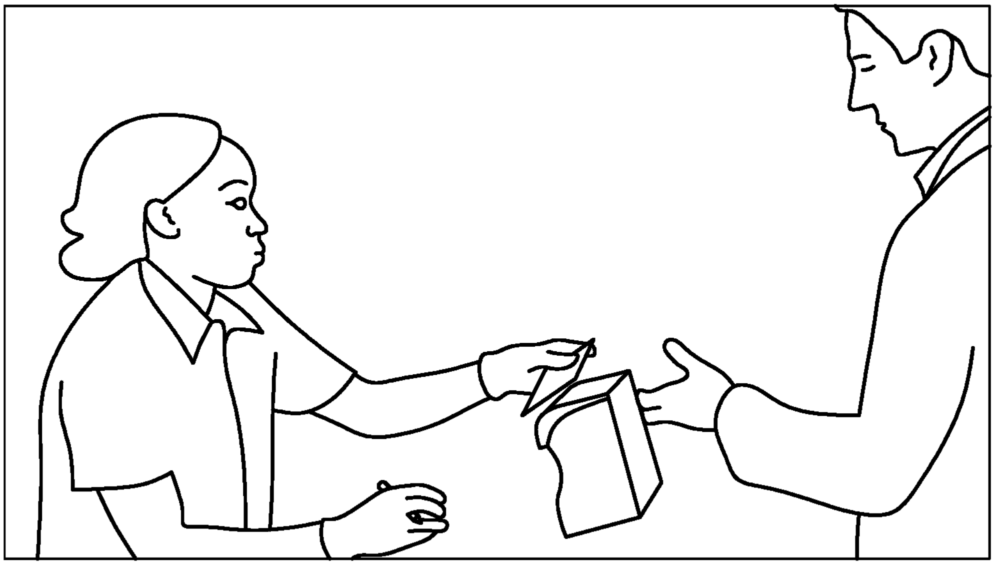
FIGS. 66A-66B illustrate augmented reality security interactions according to some embodiments.
Figure 66B:
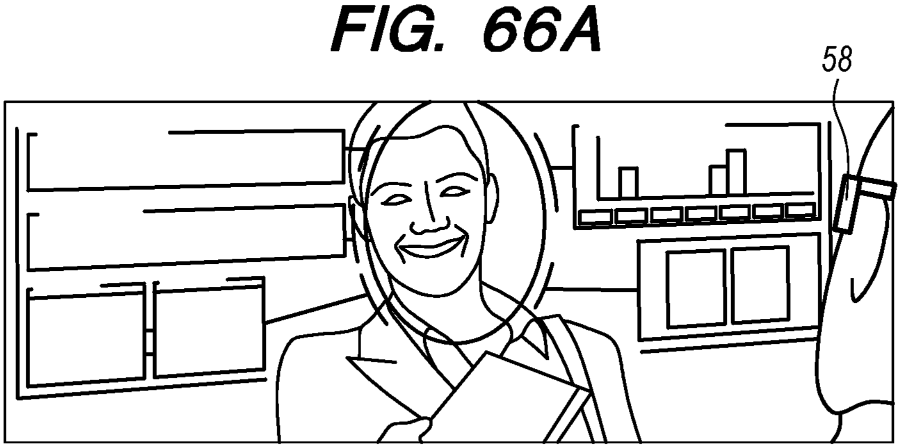

FIG. 66A illustrates a conventional security checkpoint engagement, while FIG. 66B illustrates that a user may gain significant advantage through the user of augmented reality display of connected information using a head mounted component (58).

Figure 67A:
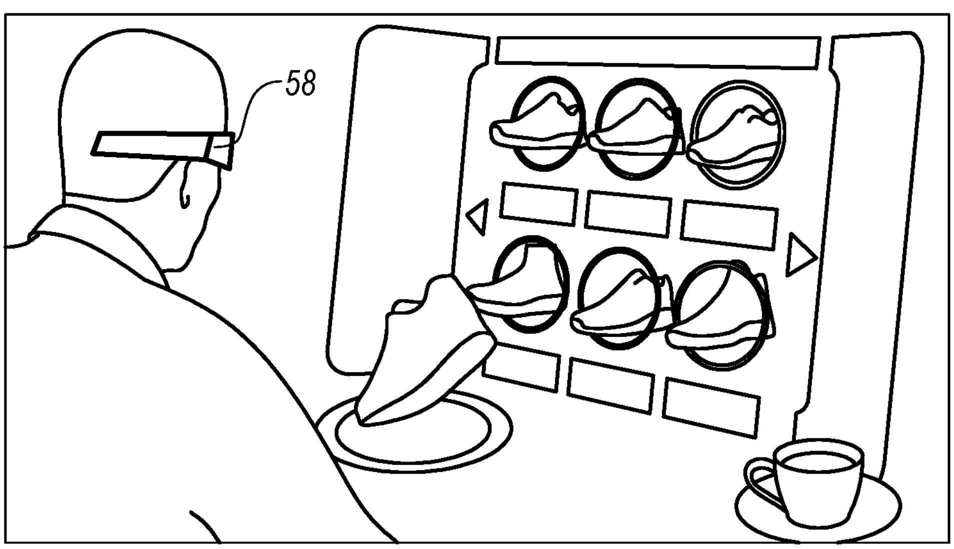
FIGS. 67A-67N illustrate various purchasing environments through augmented reality according to some embodiments.
Figure 67B:
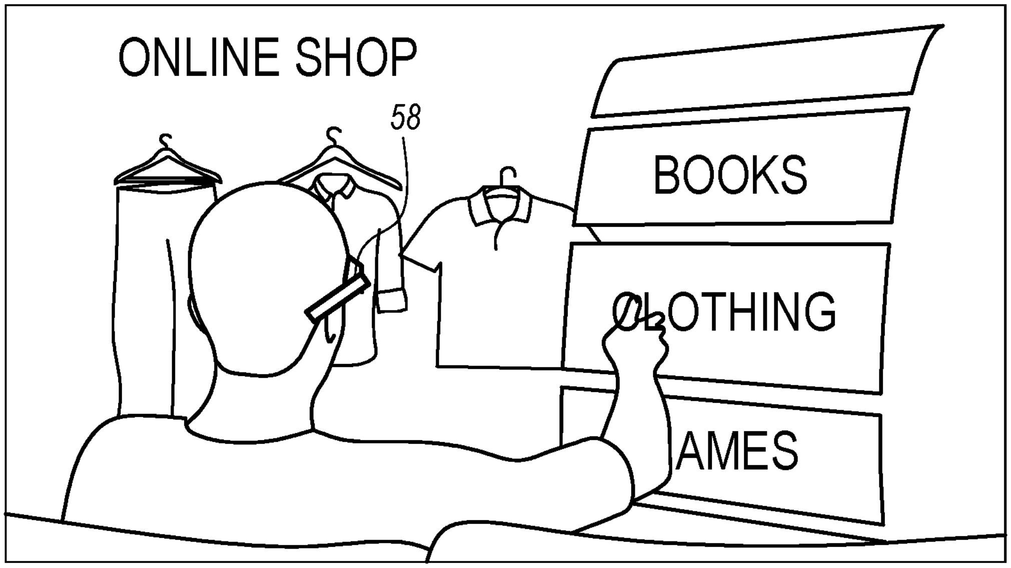
Figure 67C:
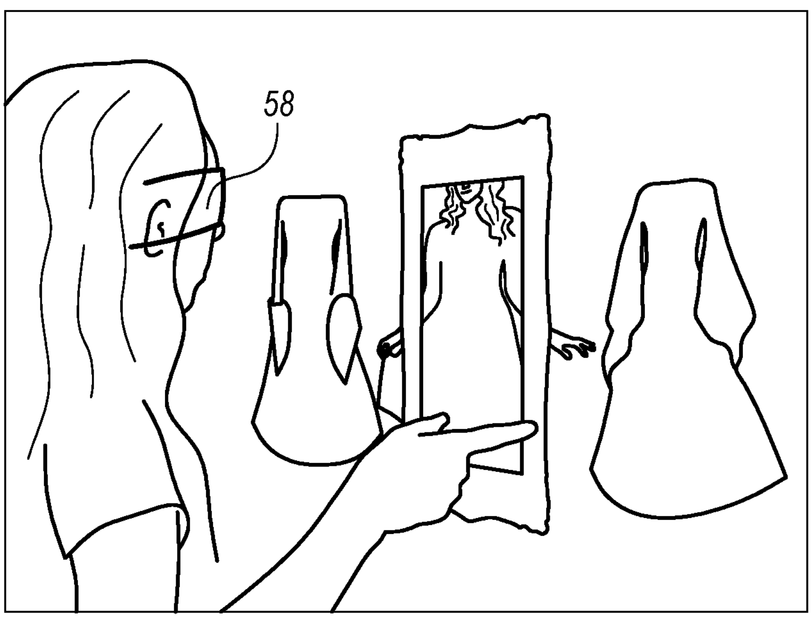
Figure 67D:
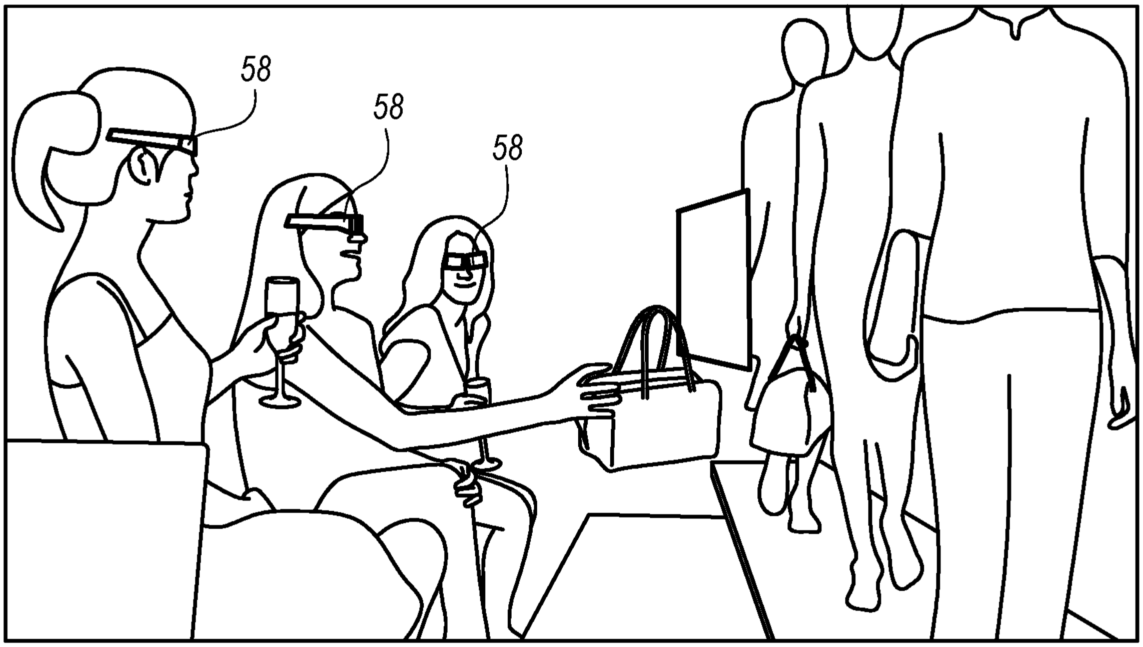
Figure 67E:
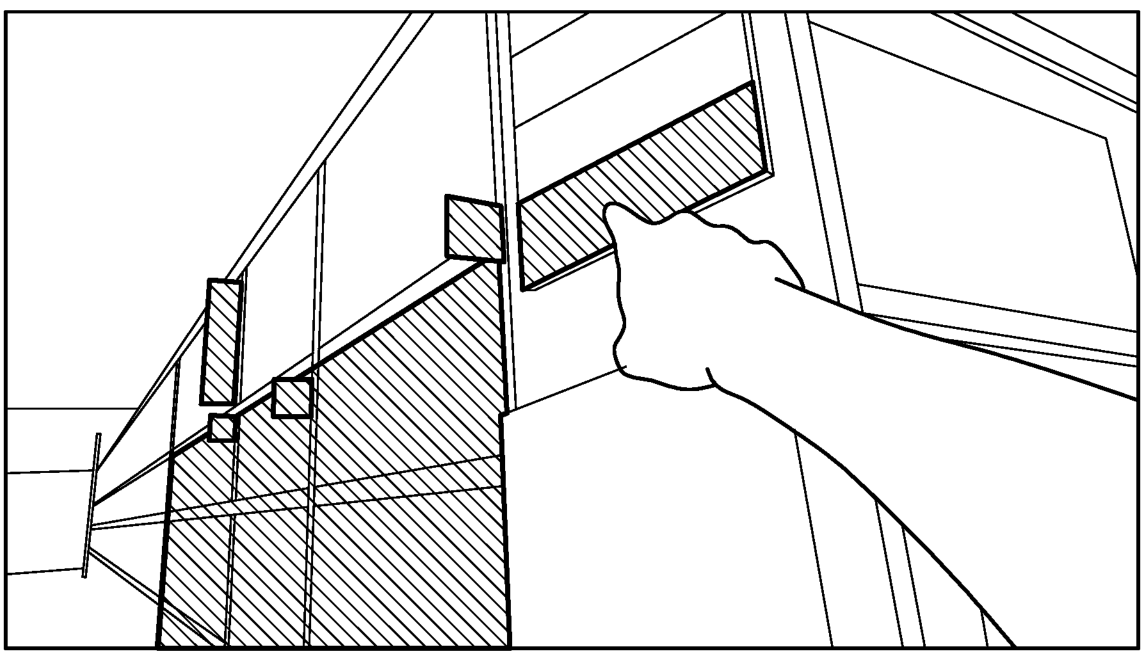
Figure 67F:
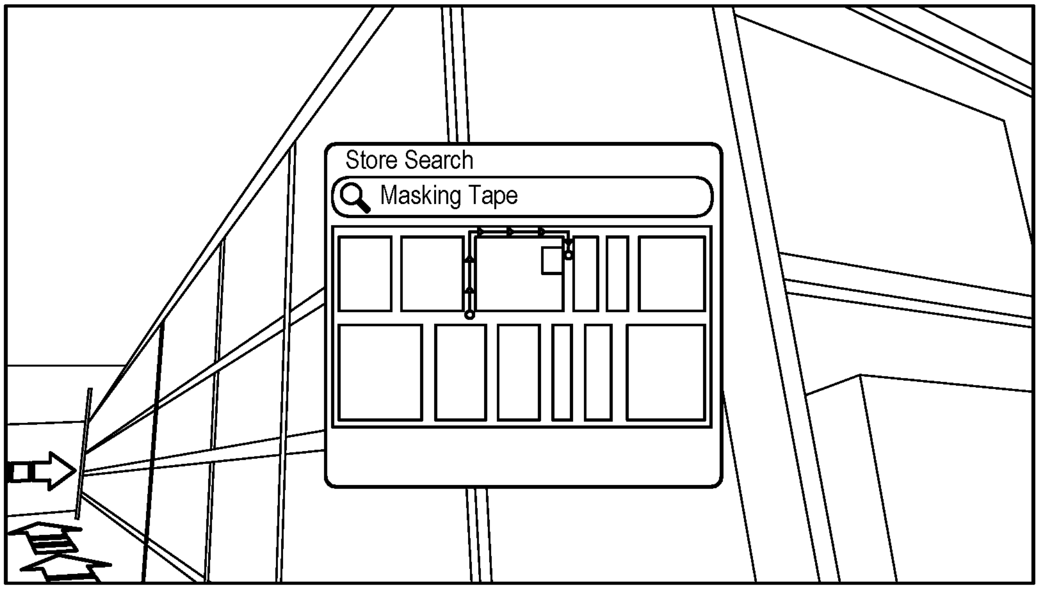
Figure 67G:
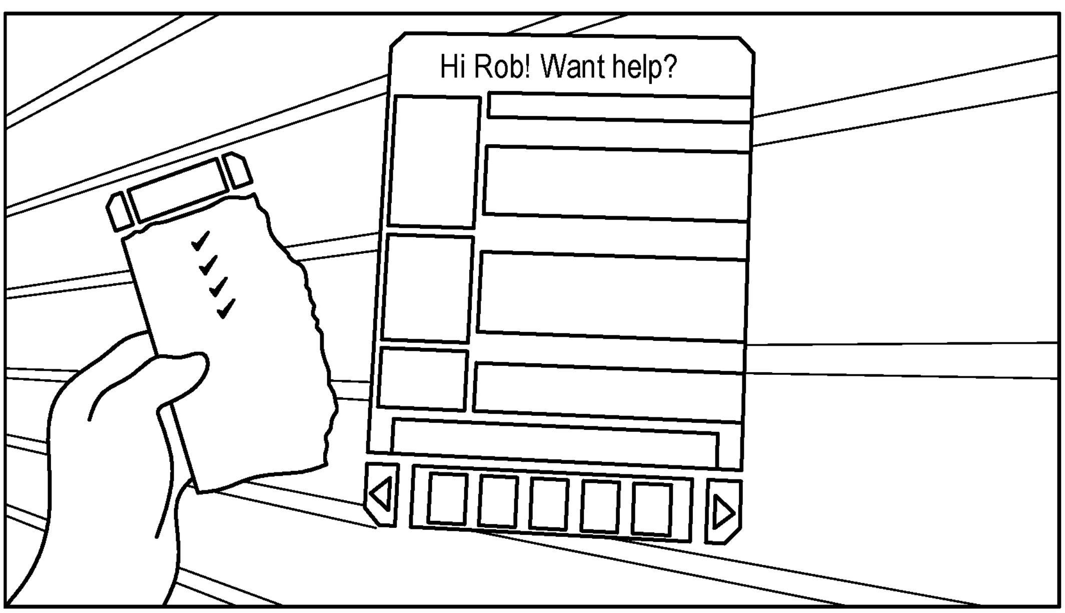
Figure 67H:
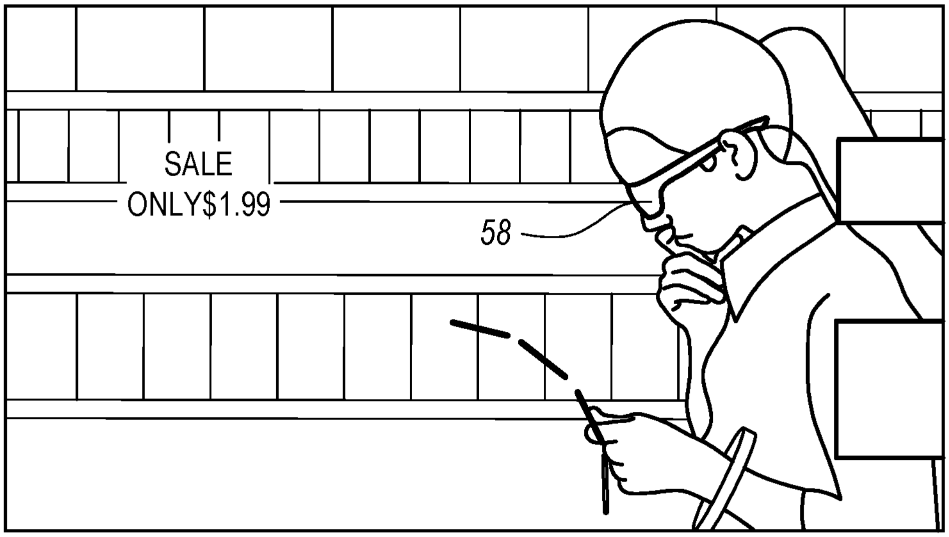
Figure 67I:
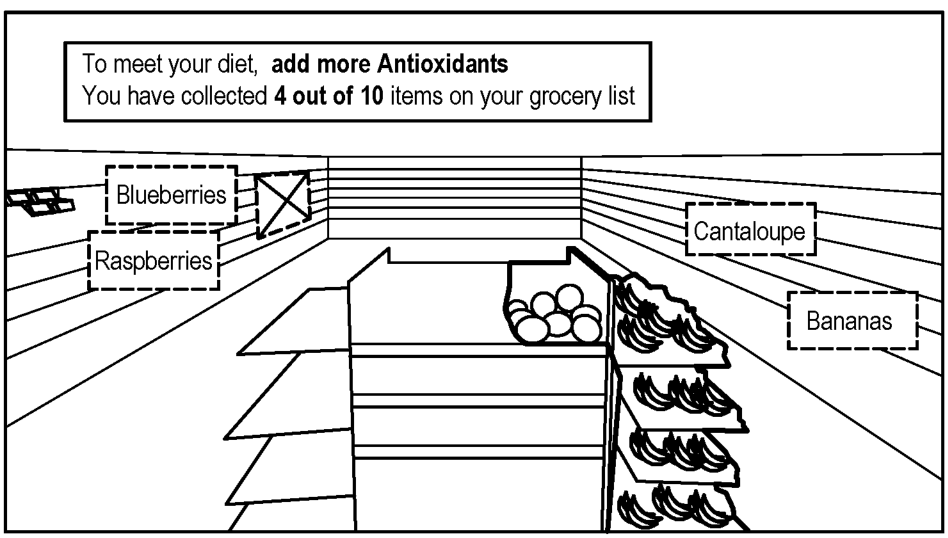
Figure 67J:
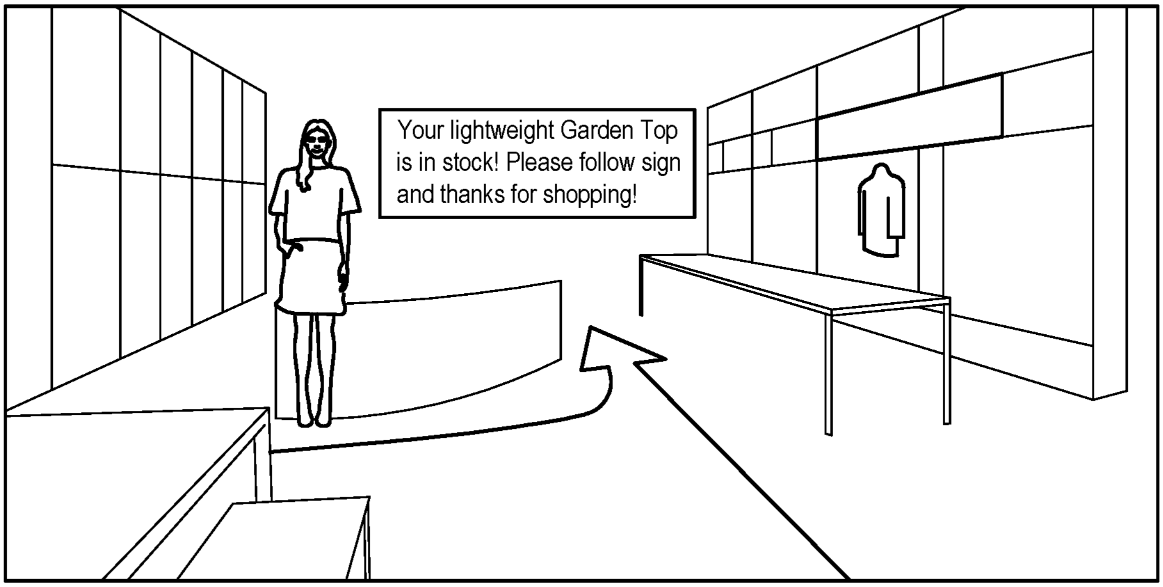
Figure 67K:
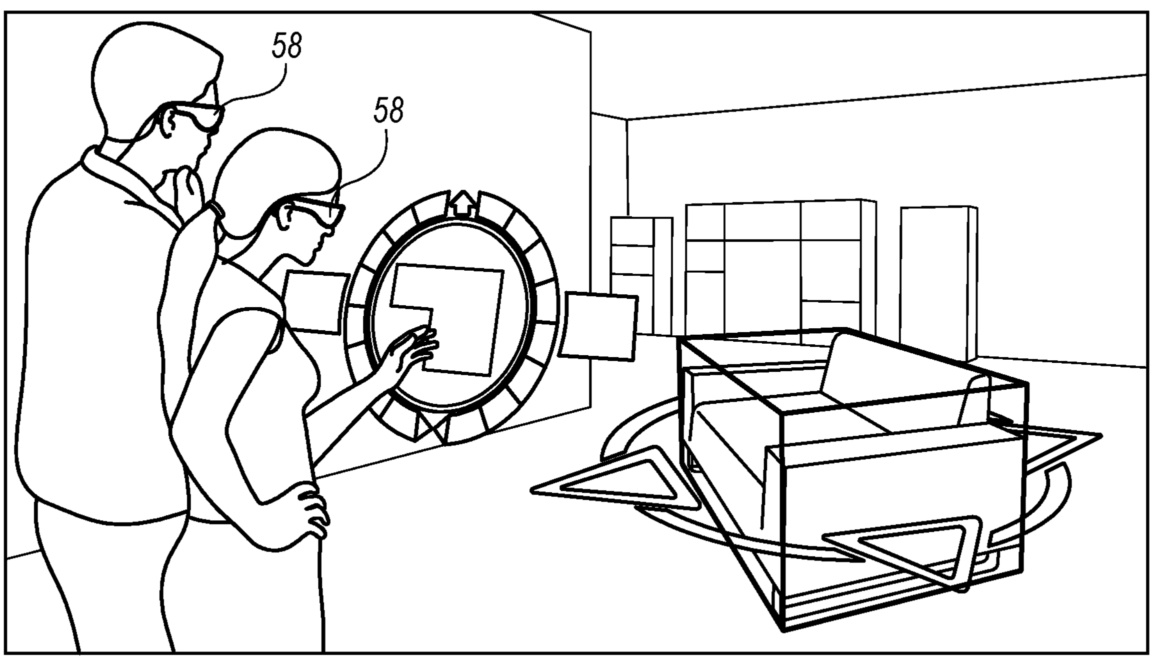
Figure 67L:
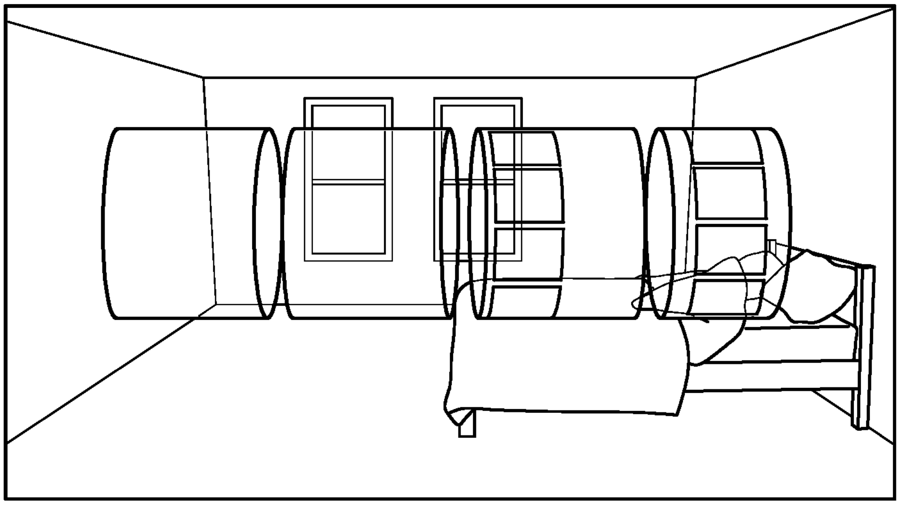
Figure 67M:
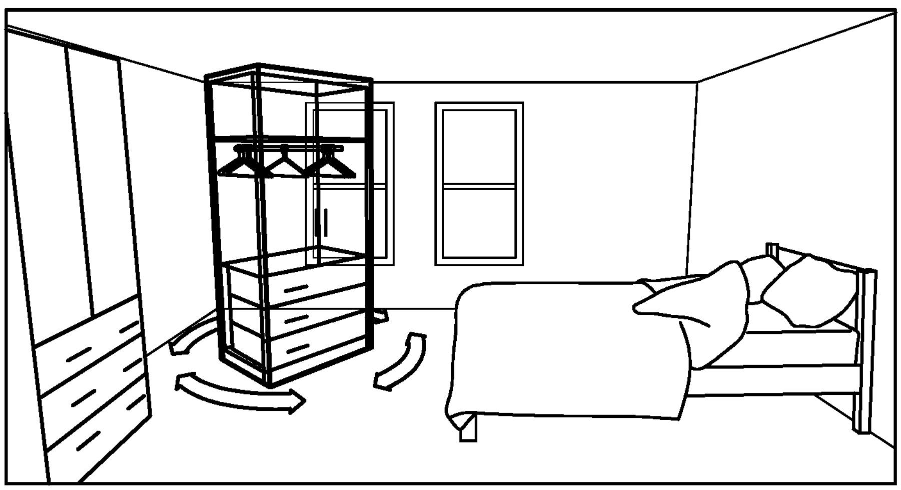
Figure 67N:
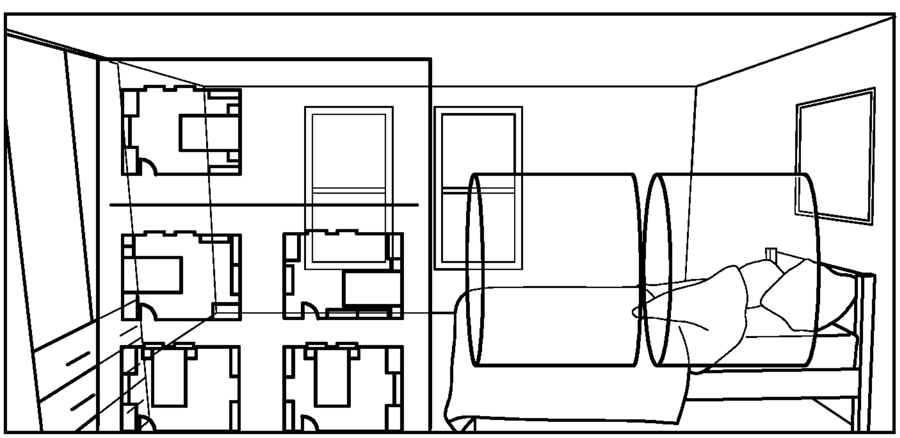

FIGS. 67A-67N illustrate various aspects of augmented reality shopping configurations, or in various aspects of their daily life and associated tasks.

Figure 68A:
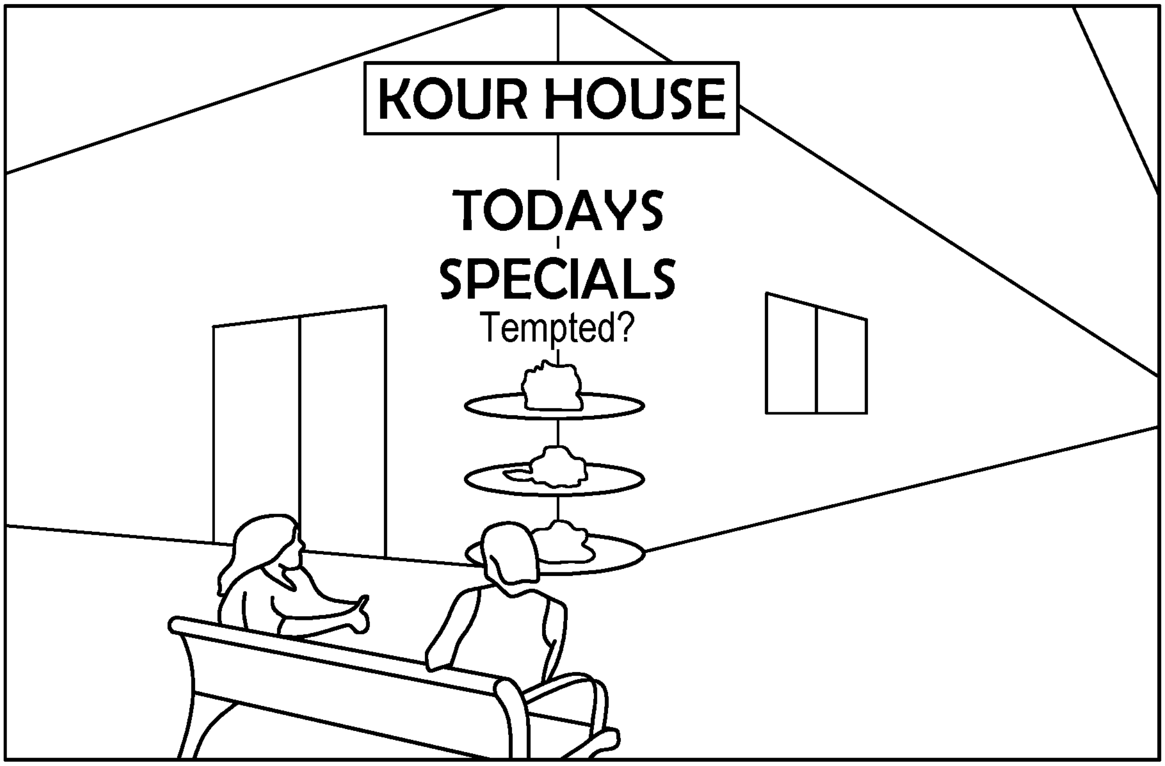
FIGS. 68A-68B illustrate augmented reality in a restaurant environment according to some embodiments.
Figure 68B:
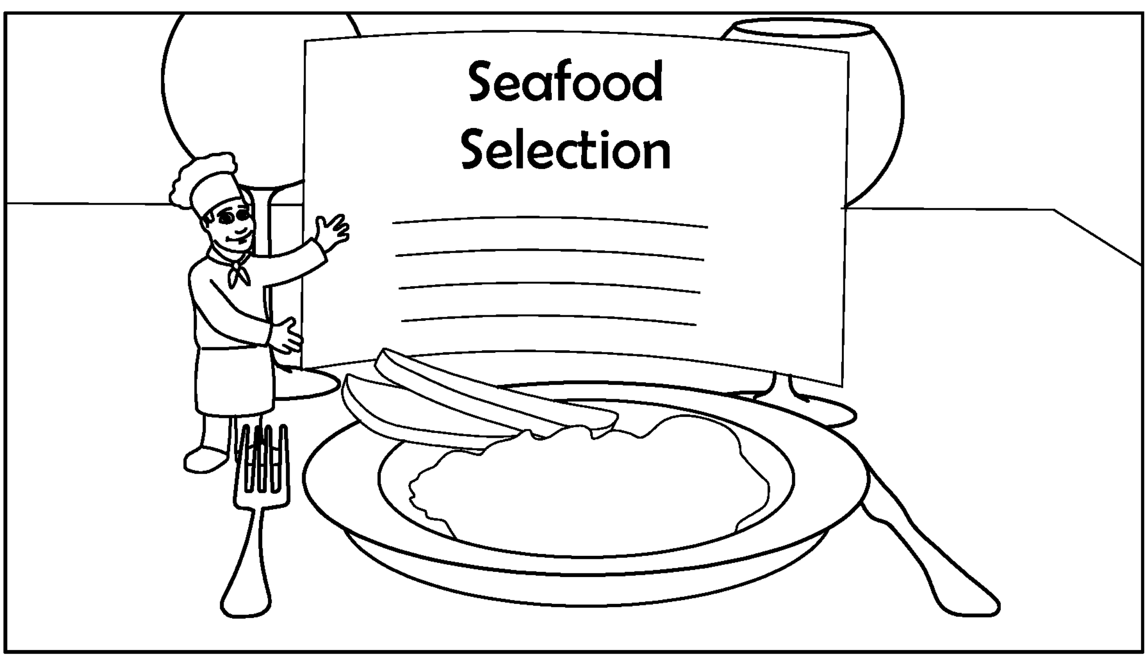

Referring to FIGS. 68A-68B, augmented reality presentation may be very desirable in a restaurant environment, to gain customers and work with them once they are in the restaurant.

Figure 69A:
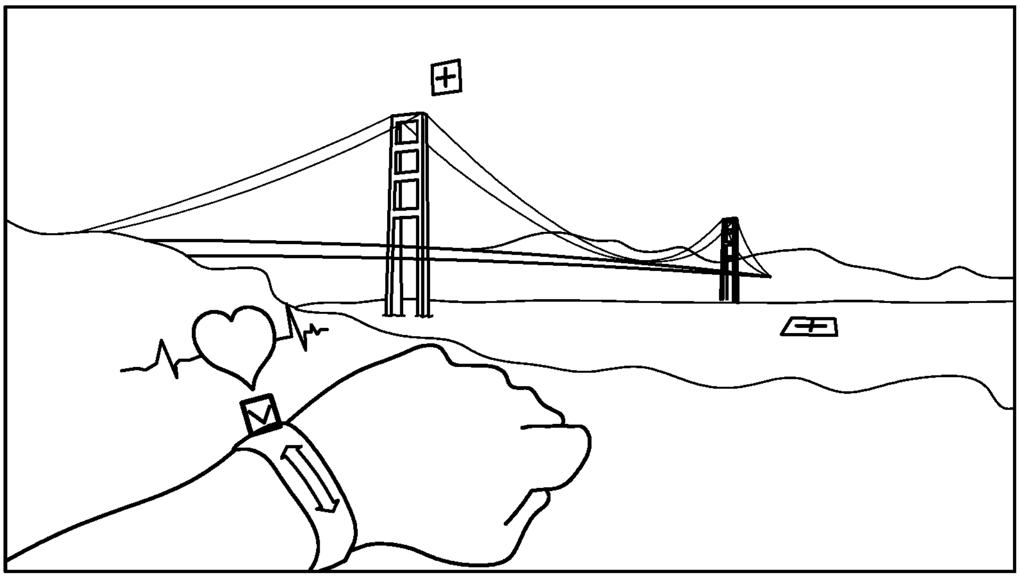
FIGS. 69A-69B illustrate an auxiliary wrist band coupled to an augmented reality system to display certain information according to some embodiments.
Figure 69B:
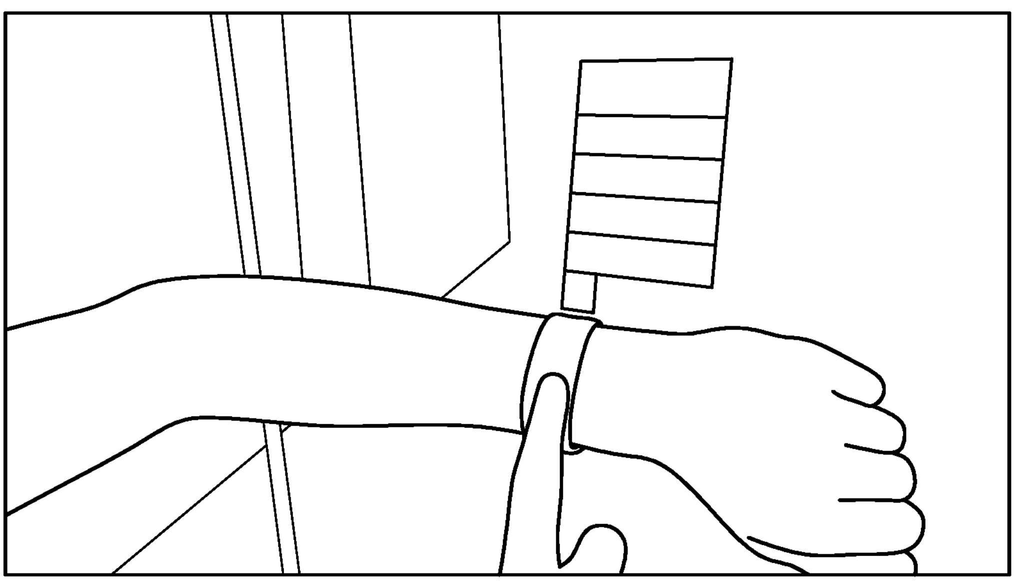

FIGS. 69A-69B illustrate a user wearing a band on her wrist, and a system configured to utilize engagement with the wrist band to present various augmented objects, such as menus, heart rate, mapped locations, and the like.

Figure 70:
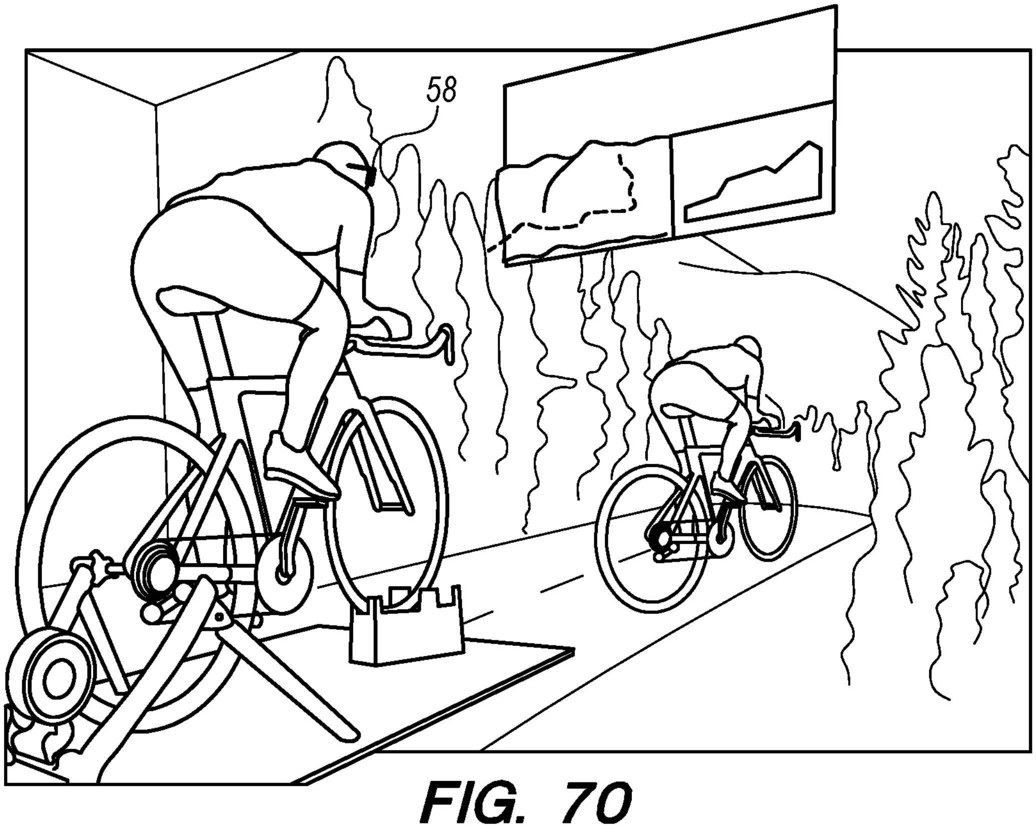
FIG. 70 illustrates exercise conditions depicted as augmented reality to a physical setting according to some embodiments.

FIG. 70 illustrates a user operating an actual exercise bike, but wearing a connected head mounted component (58) to experience an augmented reality presentation of environmental factors (such as virtual reality scenery, a presentation of herself in front of her clocked at her personal best time so that she can try to keep up or pass that performance, etc).

Figure 71:
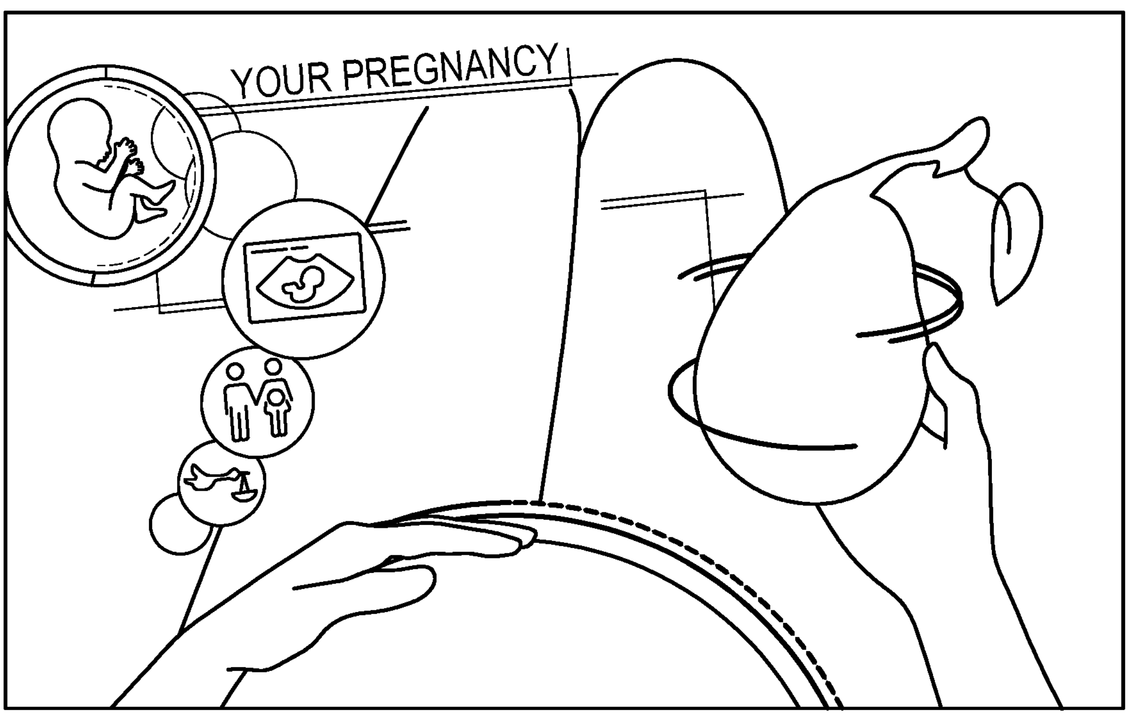
FIGS. 71-77 illustrate various medical settings enhanced by augmented reality according to some embodiments.
Figure 72:
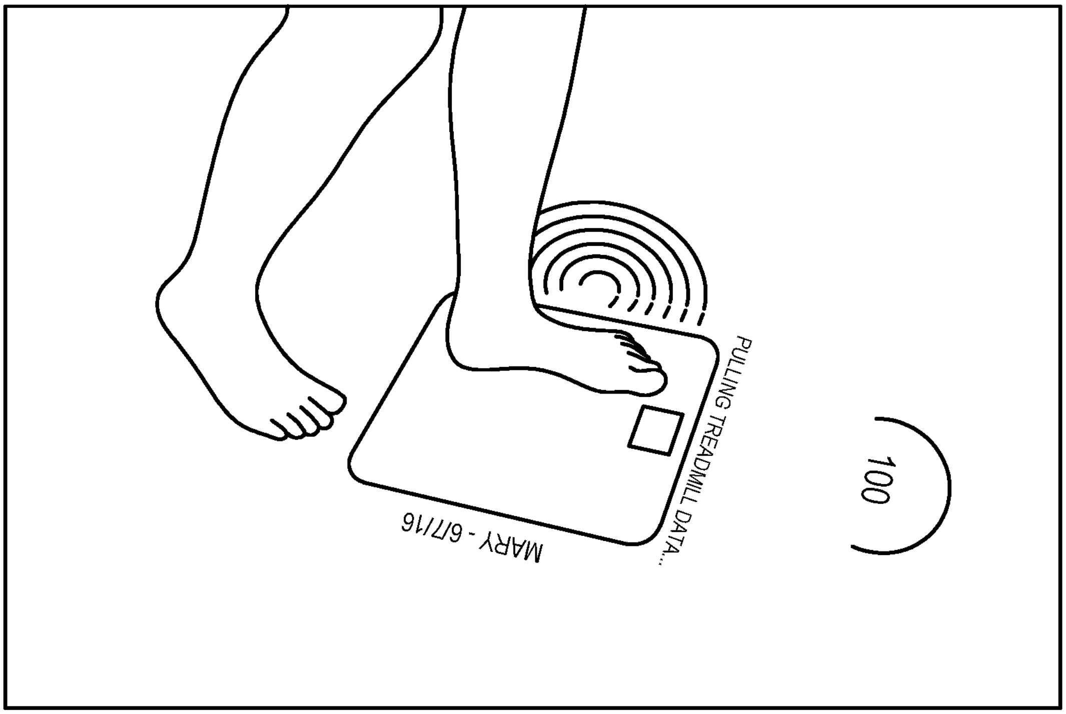
Figure 73:
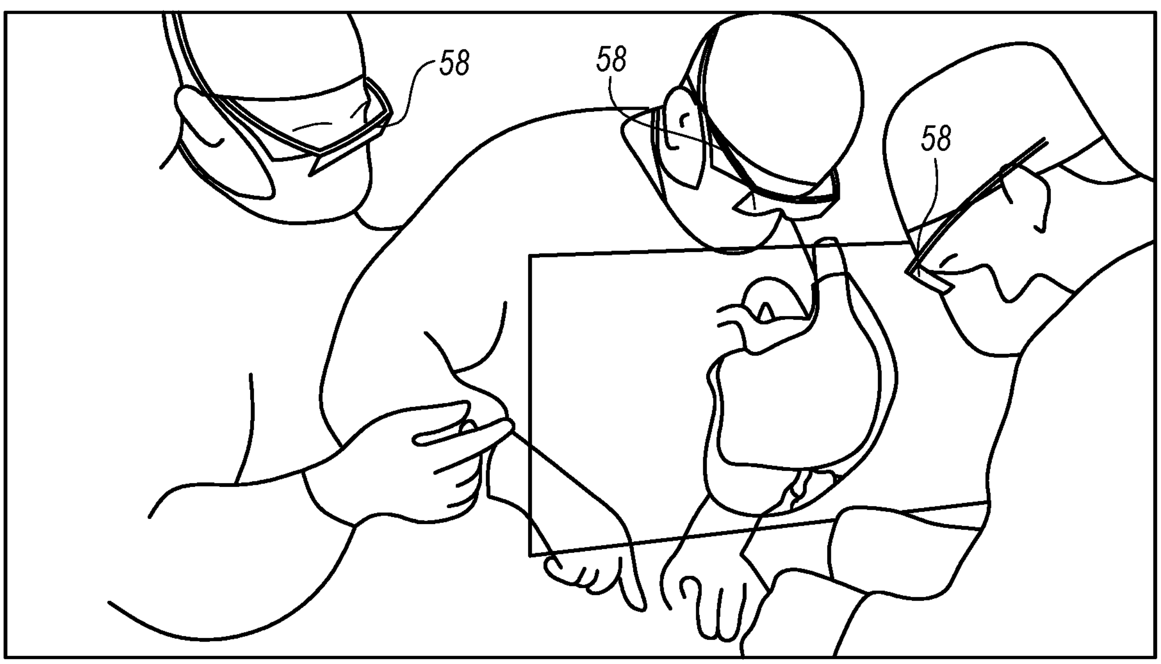
Figure 74:
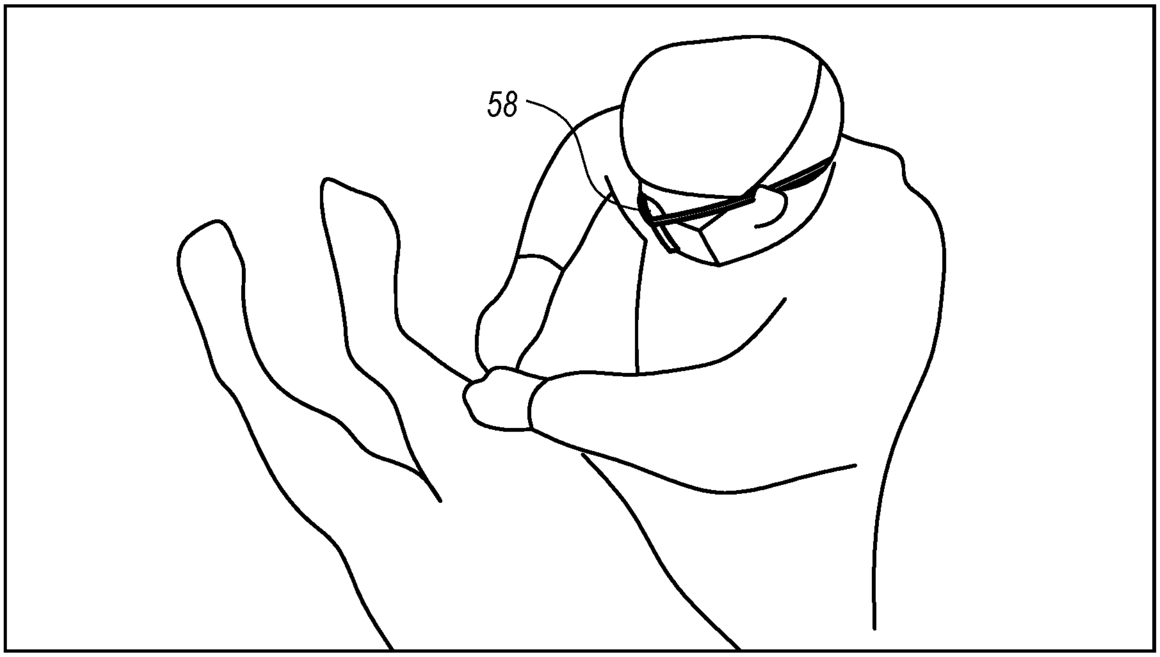
Figure 75:
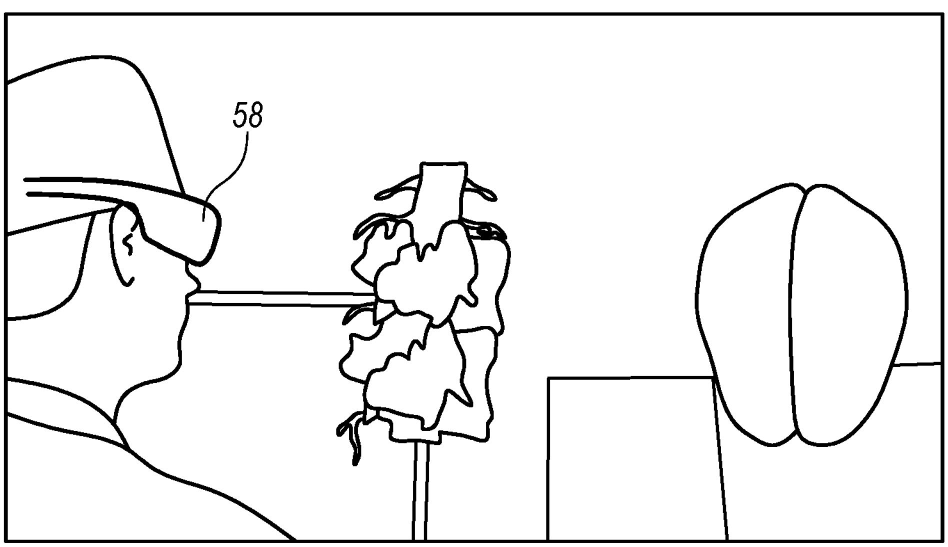
Figure 76:
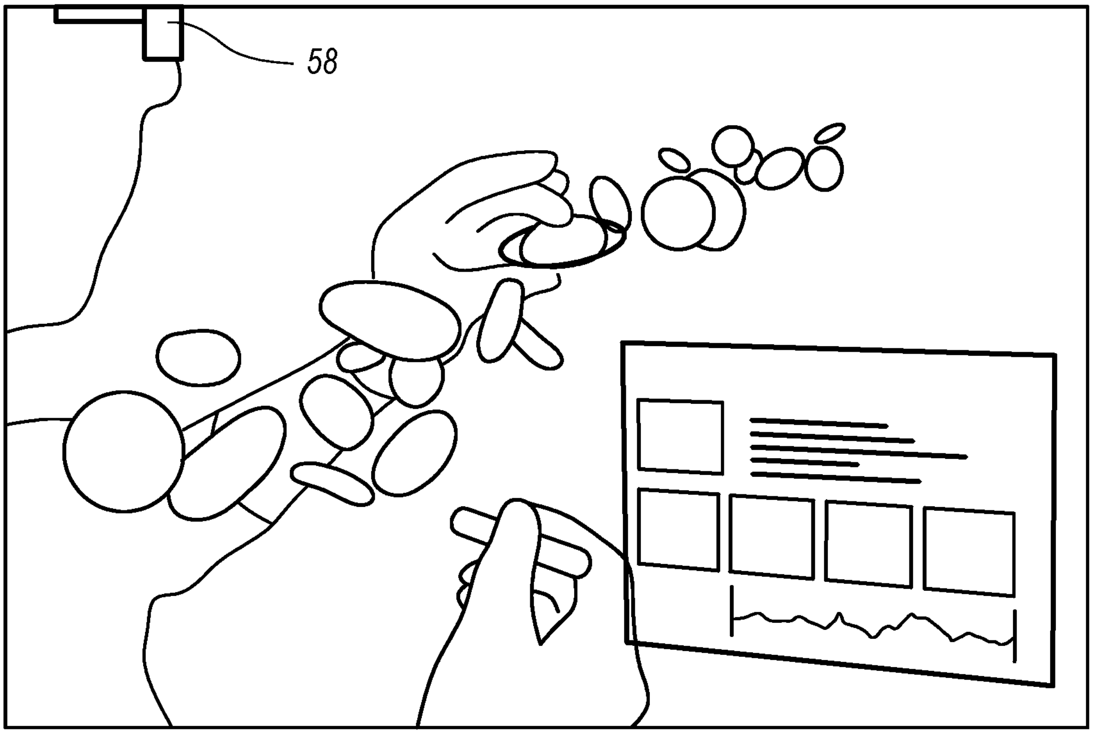
Figure 77:
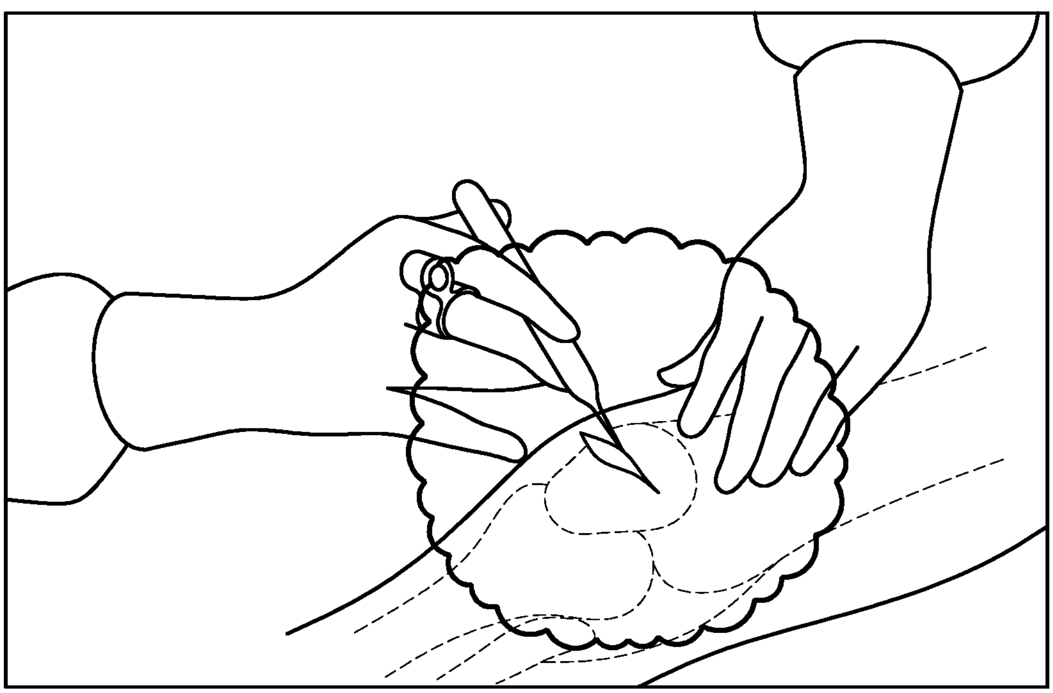

FIGS. 71-77 illustrate various healthcare-related configurations wherein augmented reality embodiments may enhance a user's experiences. FIG. 71 illustrates a pregnant user visualizing information regarding her fetus and other related information. FIG. 72 illustrates presentation of virtual information in association with an actual scale in the room of the user. FIGS. 73-77 illustrate healthcare participants using an augmented reality head mounted component (58) to visualize certain aspects of anatomy or other information pertinent to care of a patient. FIG. 74 illustrates a configuration wherein a surgeon uses an augmented reality system to conduct remotely-located manipulations (i.e., remotely manipulated by a robot or other remote actuation system) on a remote patient by visualizing the patient's anatomy and the surgical tools and manipulation locally.

Figure 78:
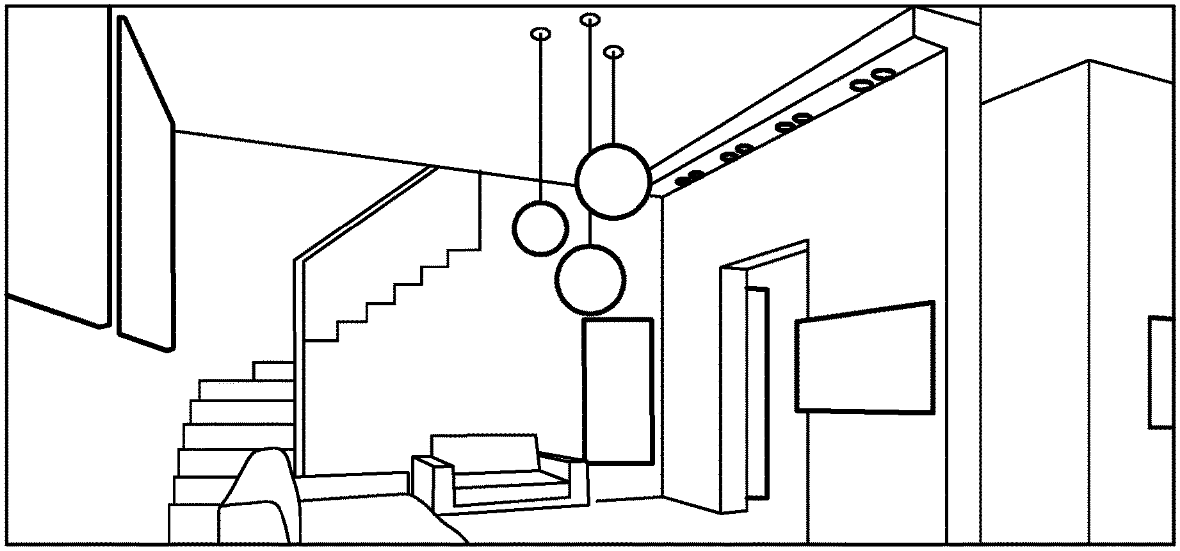
FIG. 78 illustrates an augmented reality home control setting interface according to some embodiments.

FIG. 78 illustrates presentation of virtual features in an augmented reality viewing system environment that are configured to allow the user to efficiently control and operate aspects of his or her home, such as lighting, security, blinds, entertainment, and cooking systems which may be connected through the internet.

Figure 79:
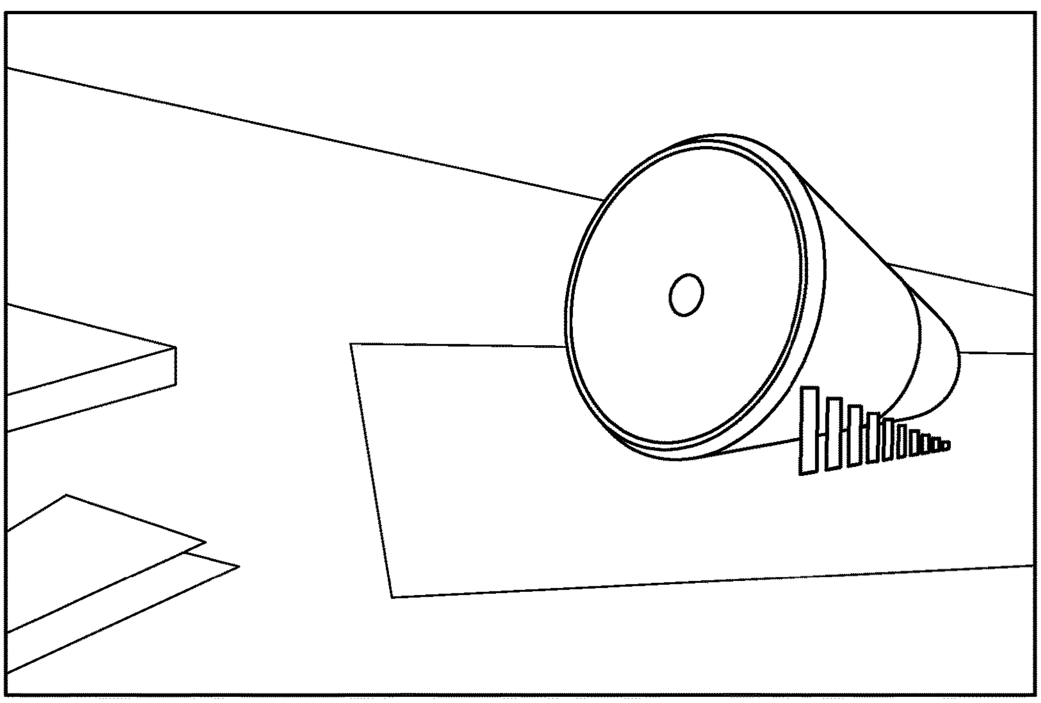
FIG. 79 illustrates virtual representation of output of an audio device according to some embodiments.
Figure 80A:
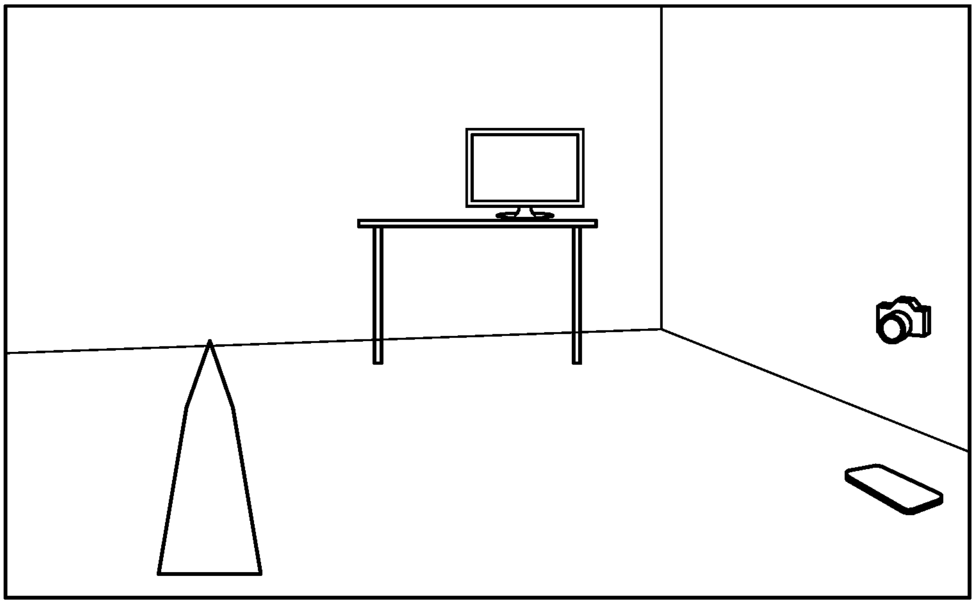
FIGS. 80A-80K illustrate various augmented reality presentations to a user through variations of the subject system to visualize and utilize various types of information through the portable computing capability of the subject system according to some embodiments.
Figure 80B:
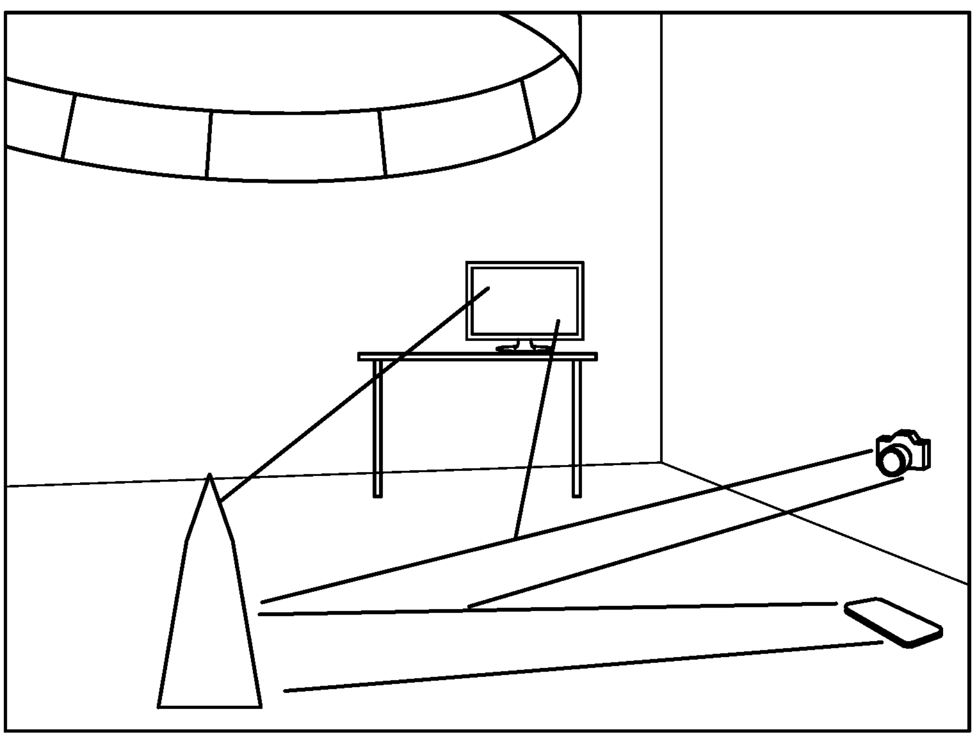
Figure 80C:
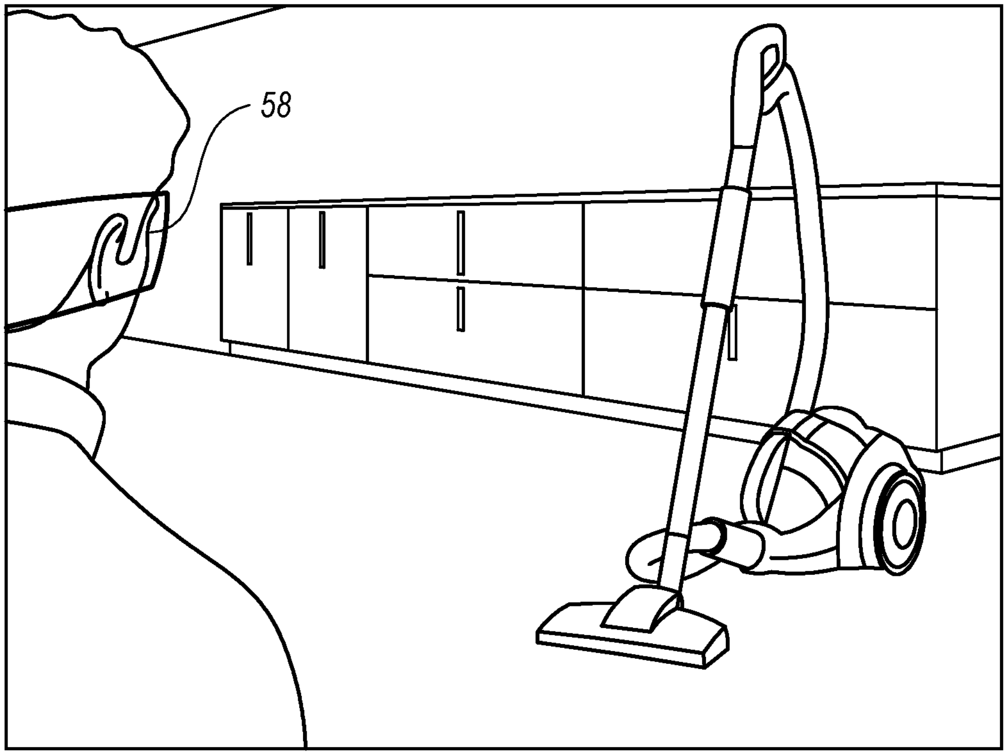
Figure 80D:
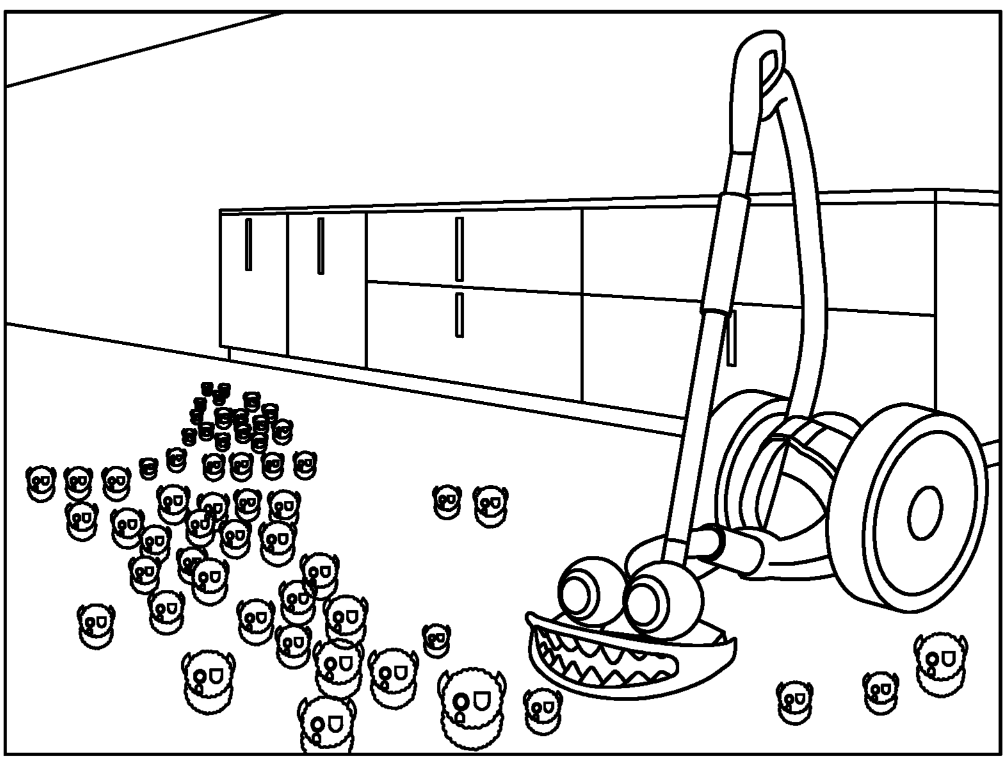
Figure 80E:
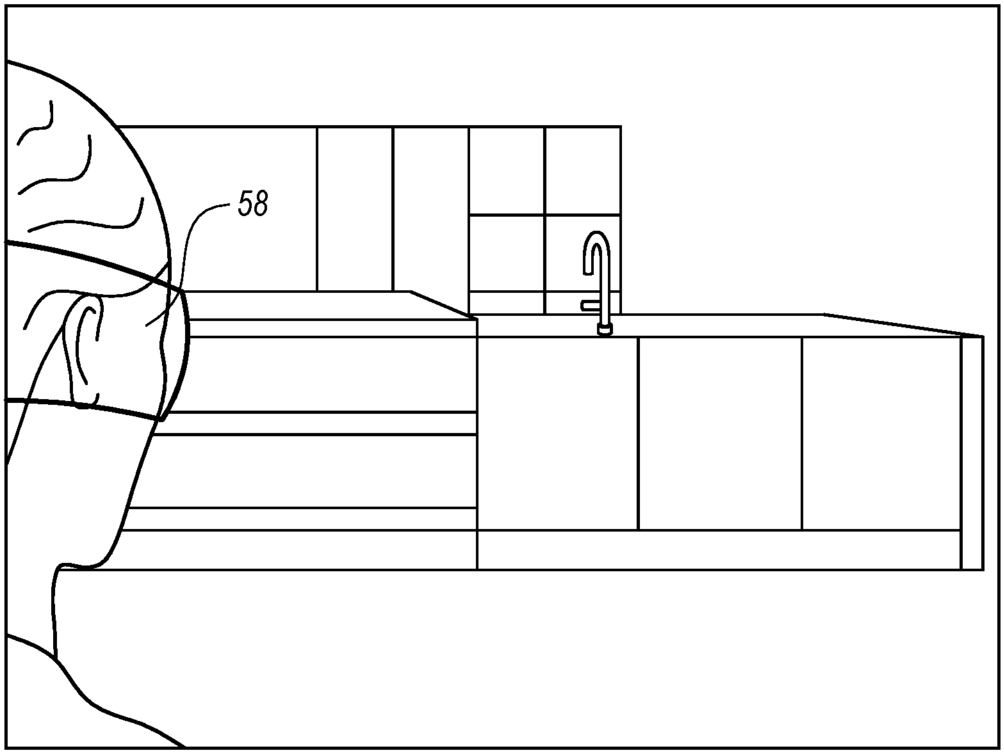
Figure 80F:
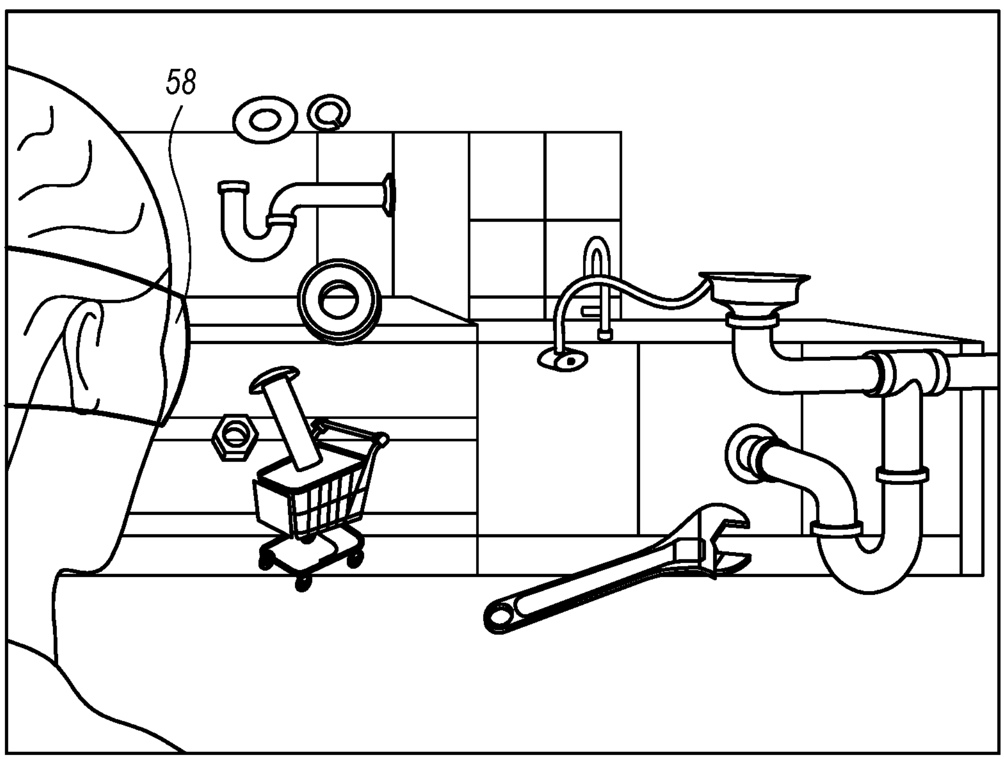
Figure 80G:
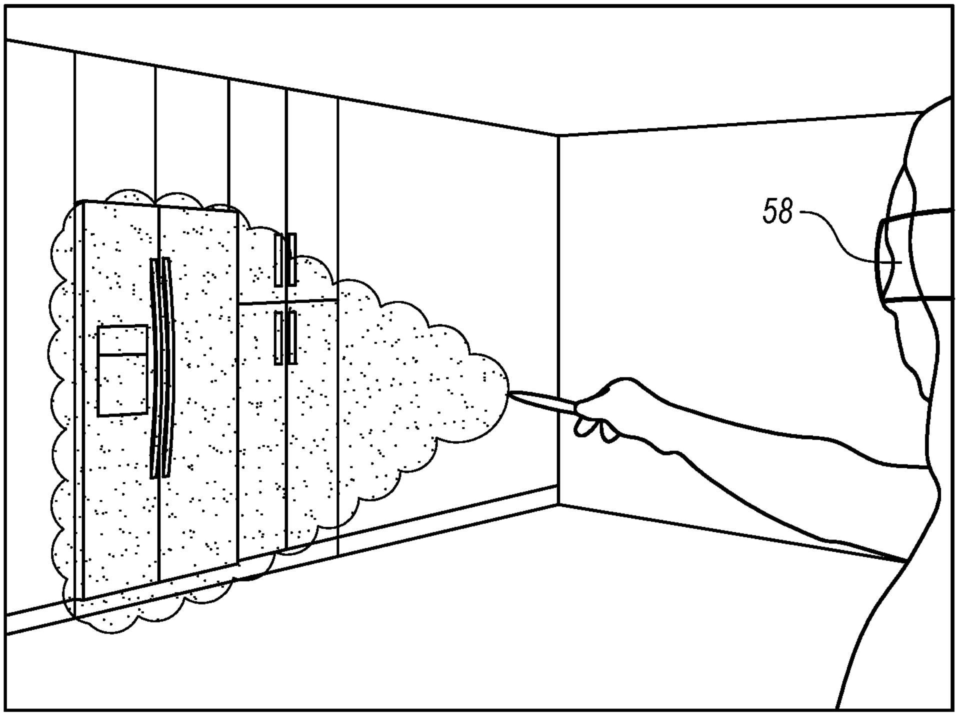
Figure 80H:
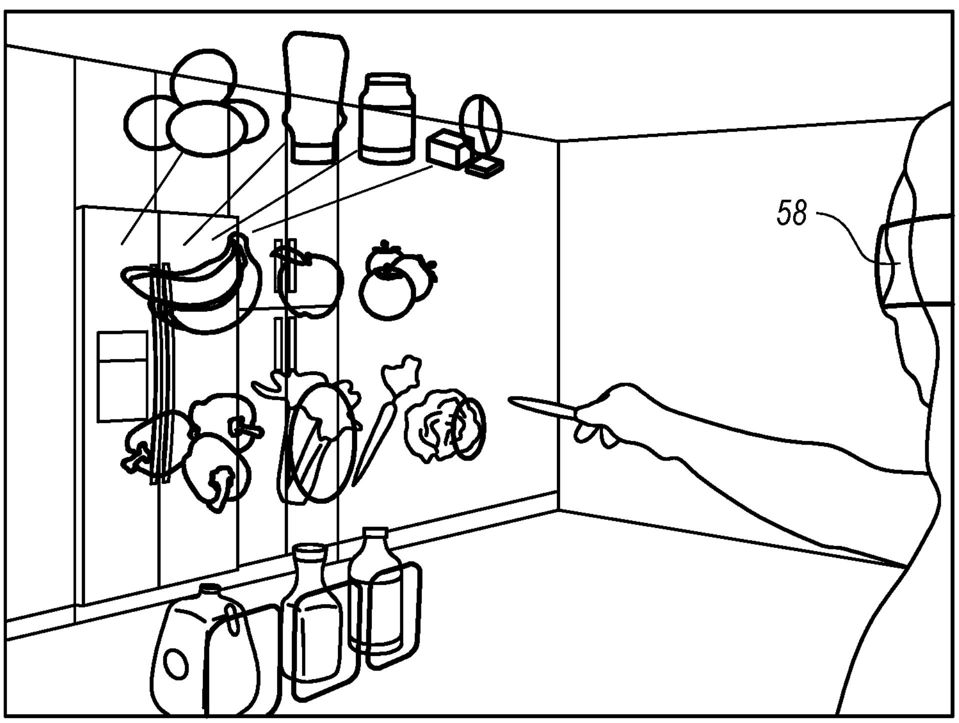
Figure 80I:
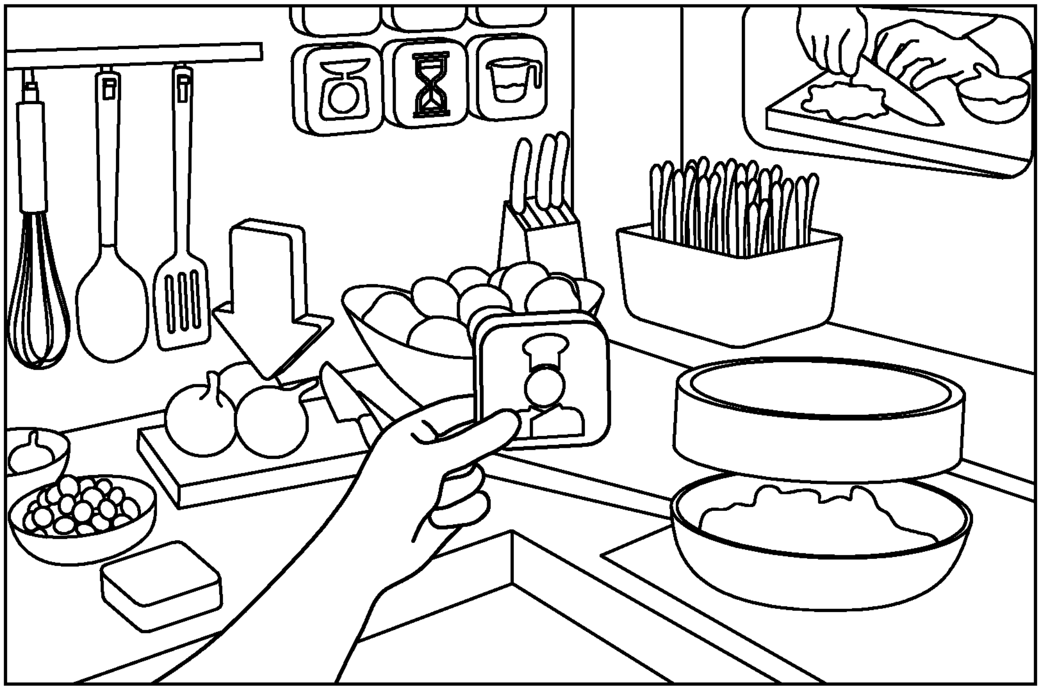
Figure 80J:
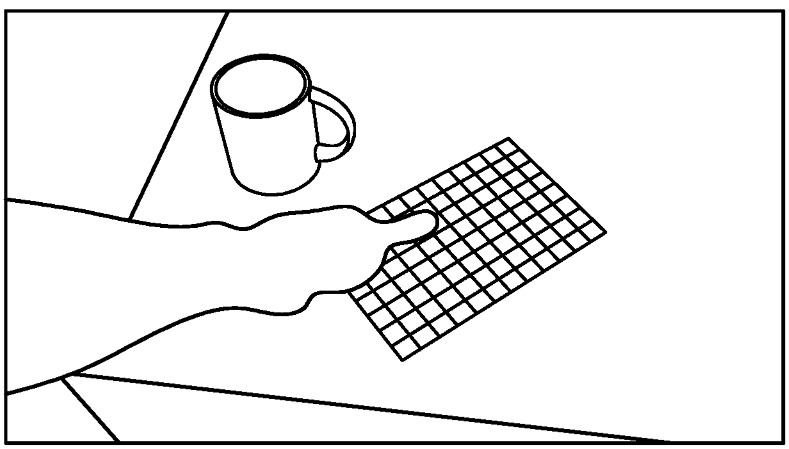
Figure 80K:
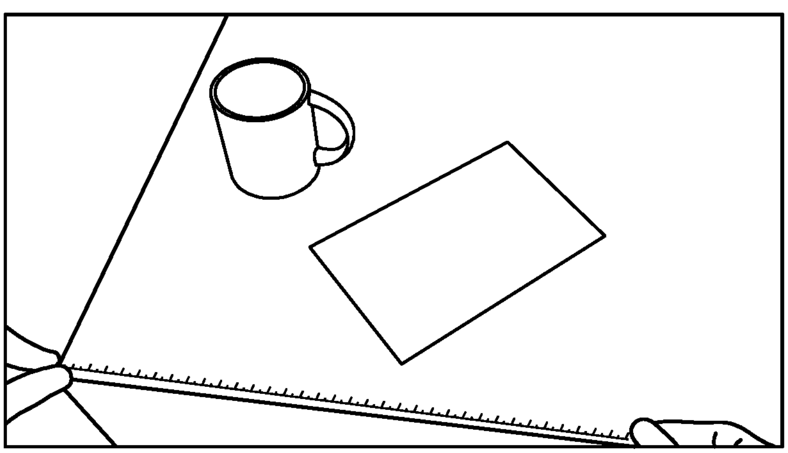

FIG. 79 illustrates an embodiment wherein a virtual representation of the volume of an actual speaker is presented alongside the speaker, along with a virtual control interface so that the user may turn up or turn down the volume, for example, using such virtual visualization and control features.

FIGS. 80A-80K illustrate various embodiments of augmented reality presentation to the user through variations of the subject system to visualize and utilize various types of information through the portable computing capability of the subject system.

Figure 81A:
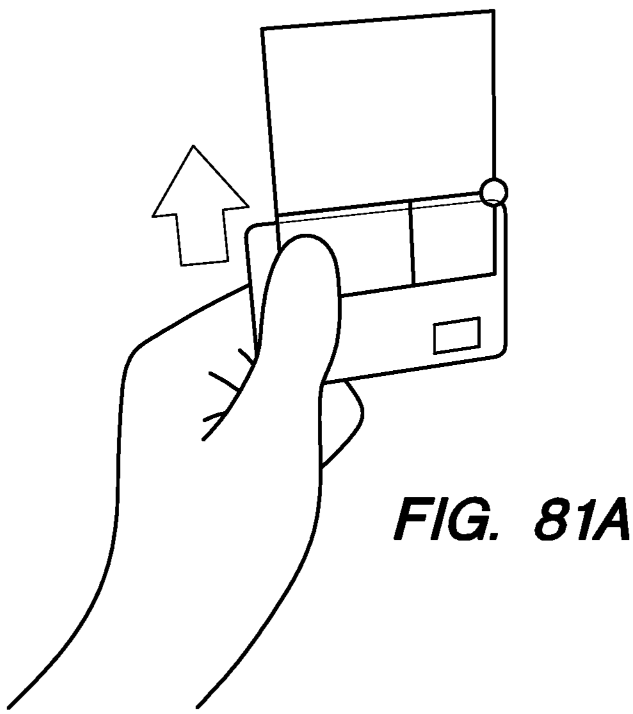
FIGS. 81A-81B illustrate enhancement of physical objects by augmented reality according to some embodiments.
Figure 81B:
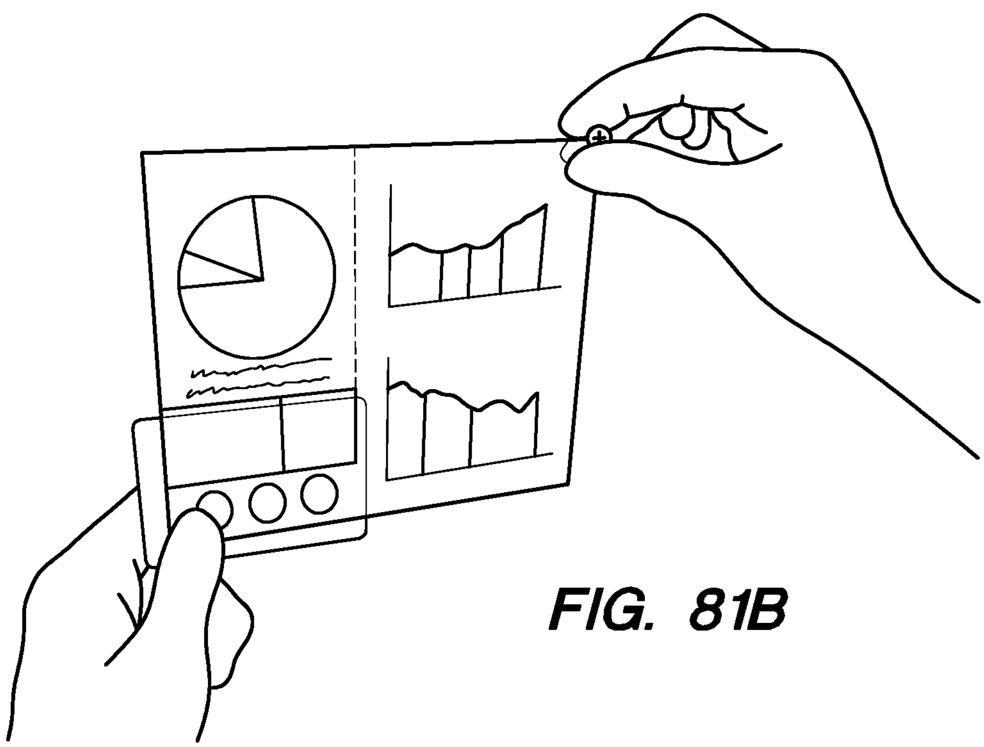

FIGS. 81A-81B illustrate that virtual presentation of information may enhance the use of actual objects such as credit cards.

Figure 82A:
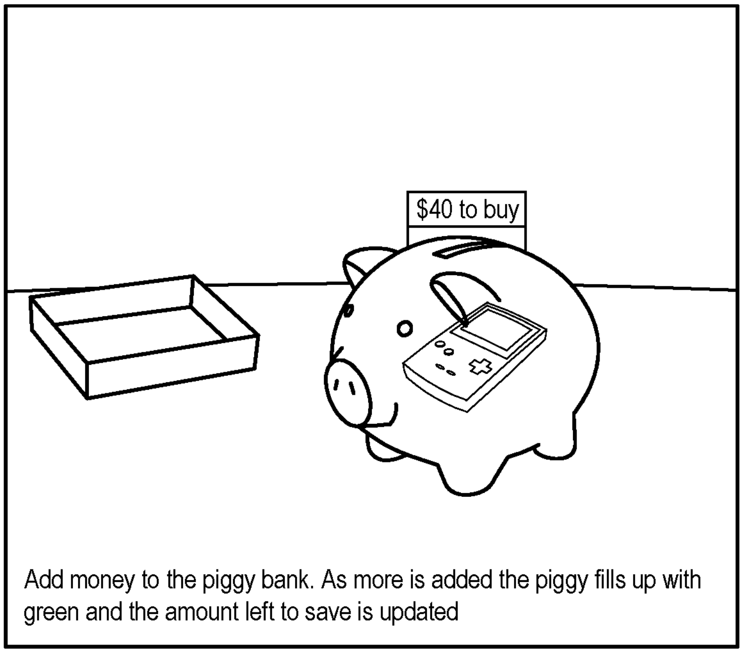
FIG. 82A-82B illustrate financial metrics interaction by augmented reality according to some embodiments.
Figure 82B:
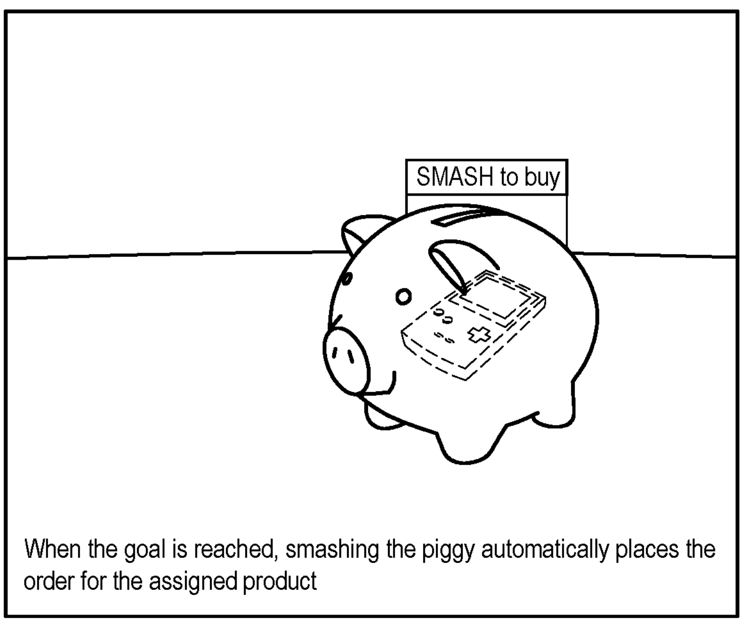
Figure 83A:
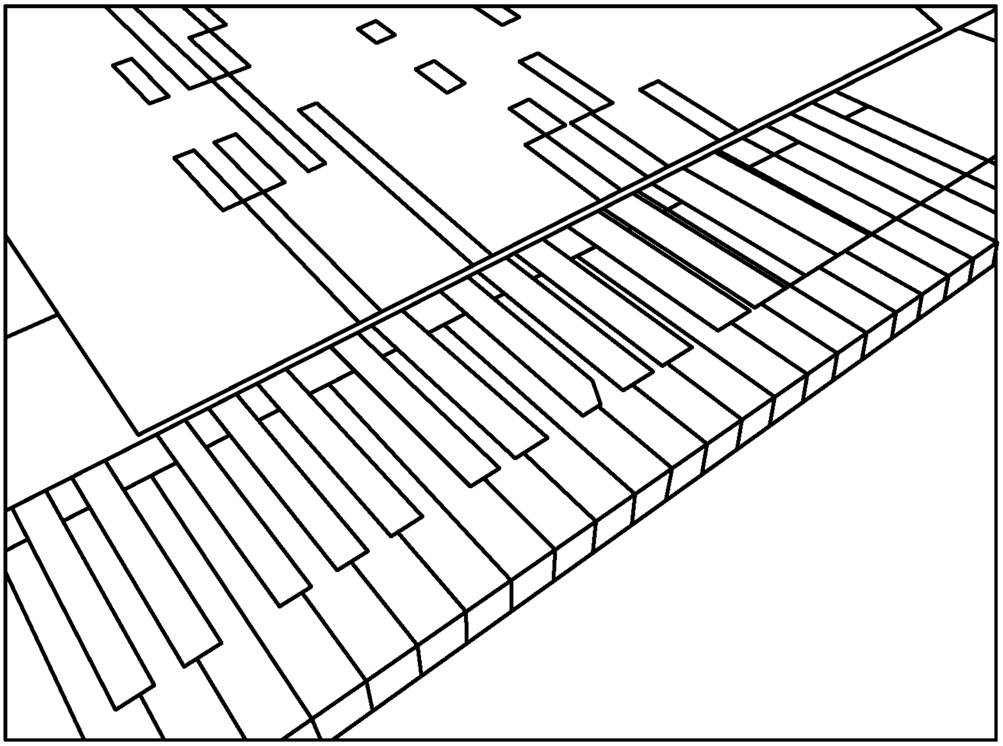
FIG. 83A-83H illustrate various teaching environments by augmented reality according to some embodiments.
Figure 83B:
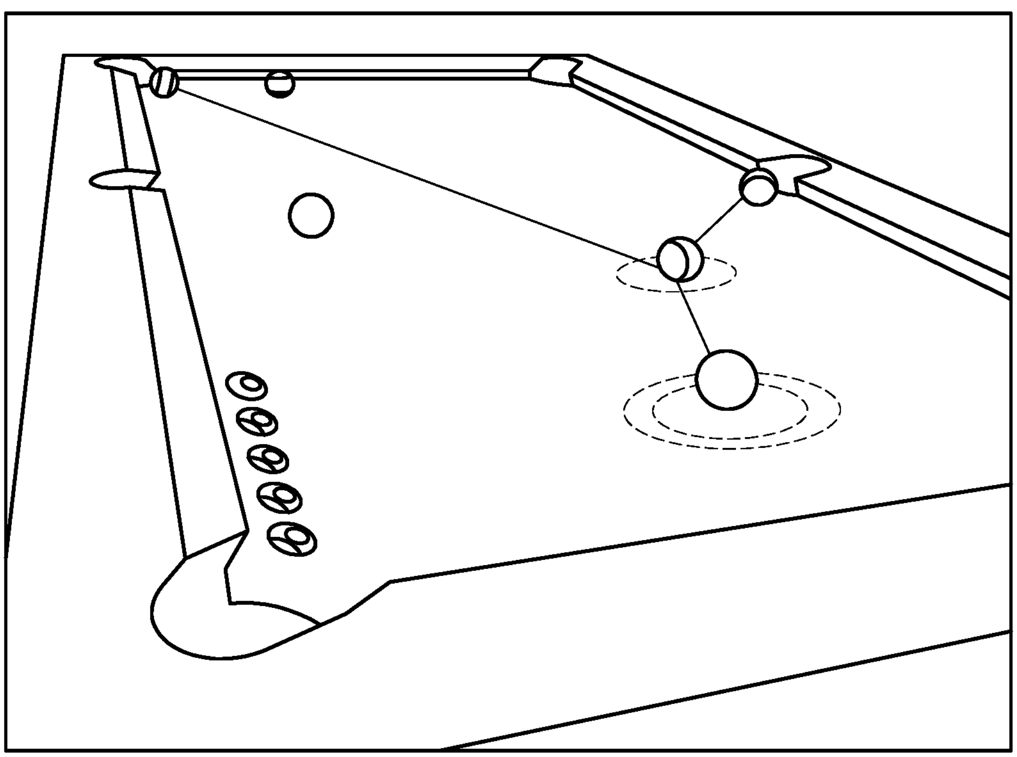
Figure 83C:
Figure 83D:
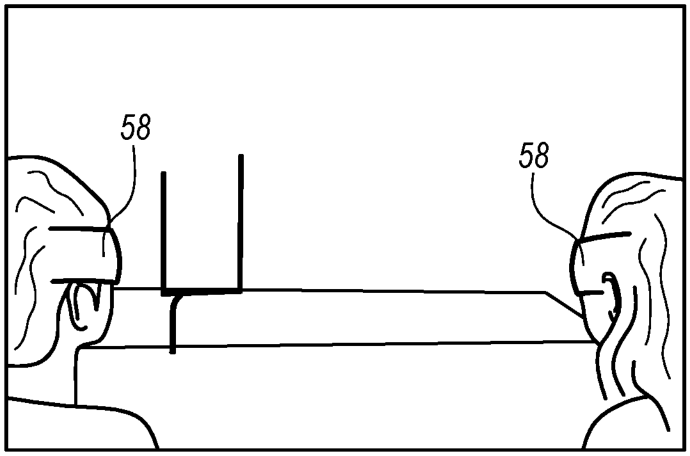
Figure 83E:
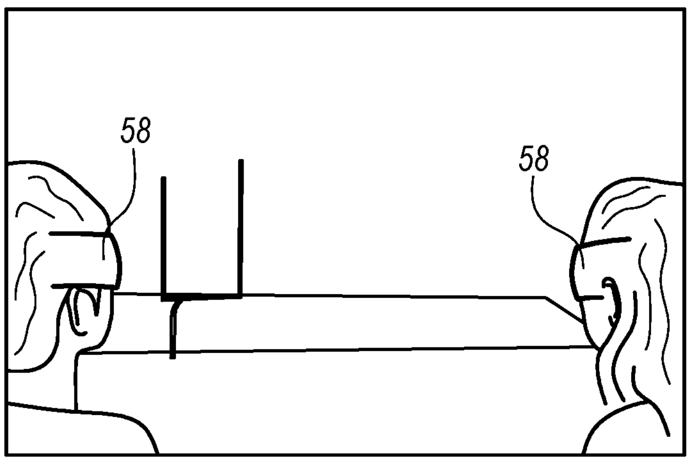
Figure 83F:
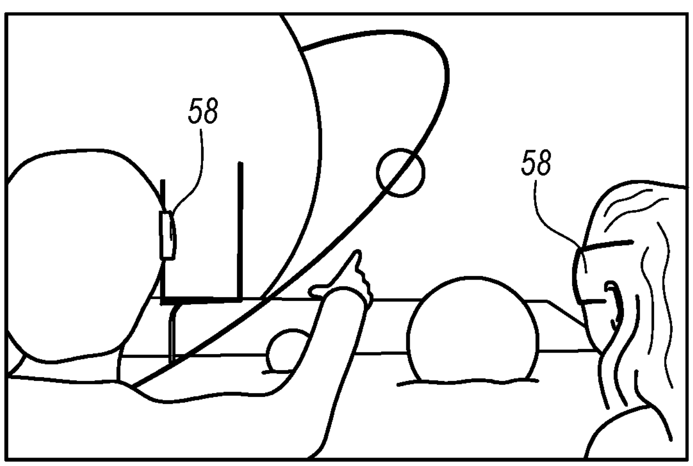
Figure 83G:
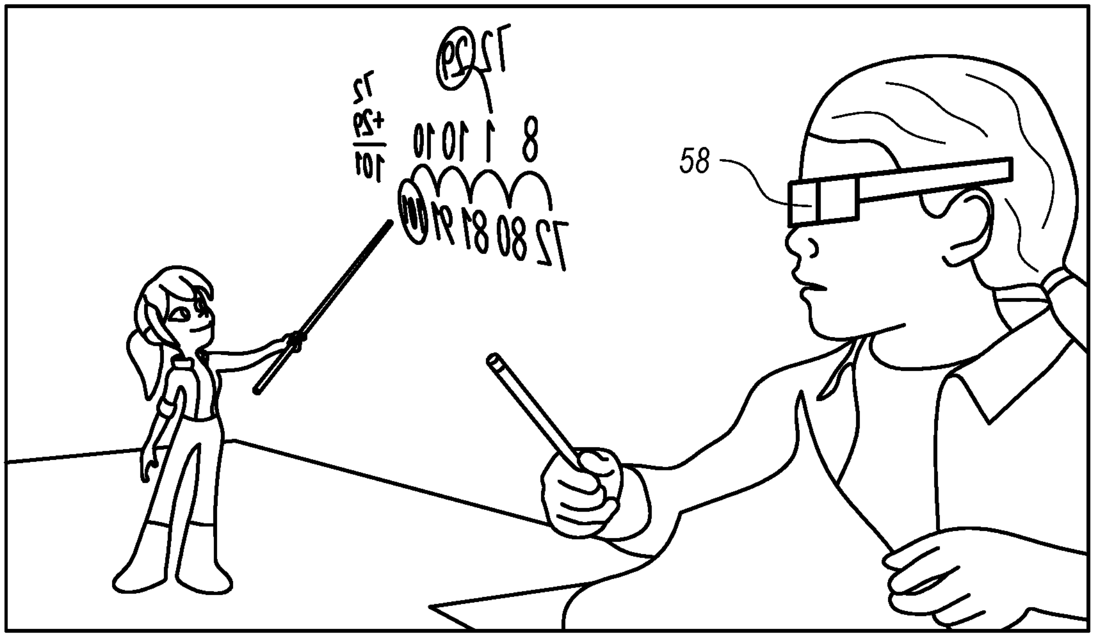
Figure 83H:
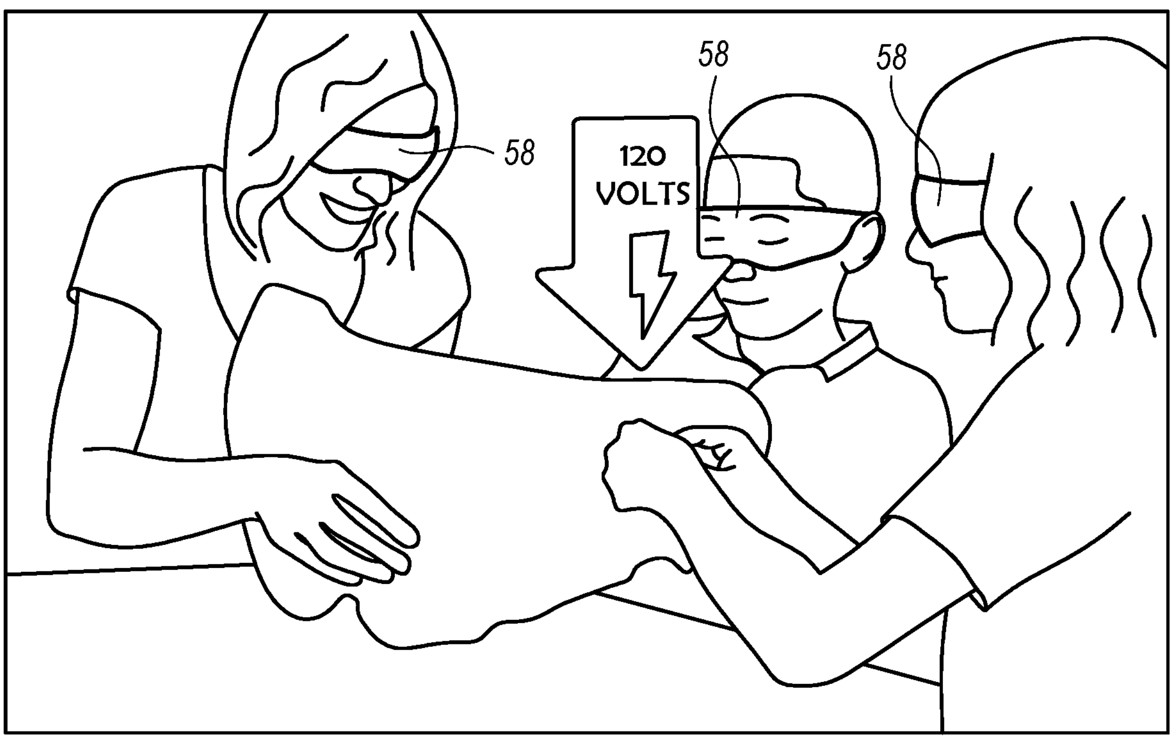

FIGS. 82A-82B illustrate an embodiment of an virtual reality assisted savings system configured to automatically order something that a user wants once enough money has been saved, with visual presentation of status and success with a piggy bank type of object.

FIGS. 83A-83H illustrate various teaching embodiments, such as how to play an instrument (such as FIG. 83A and indicating which piano key to press), or astronomy, or cooking.

Figure 84A:
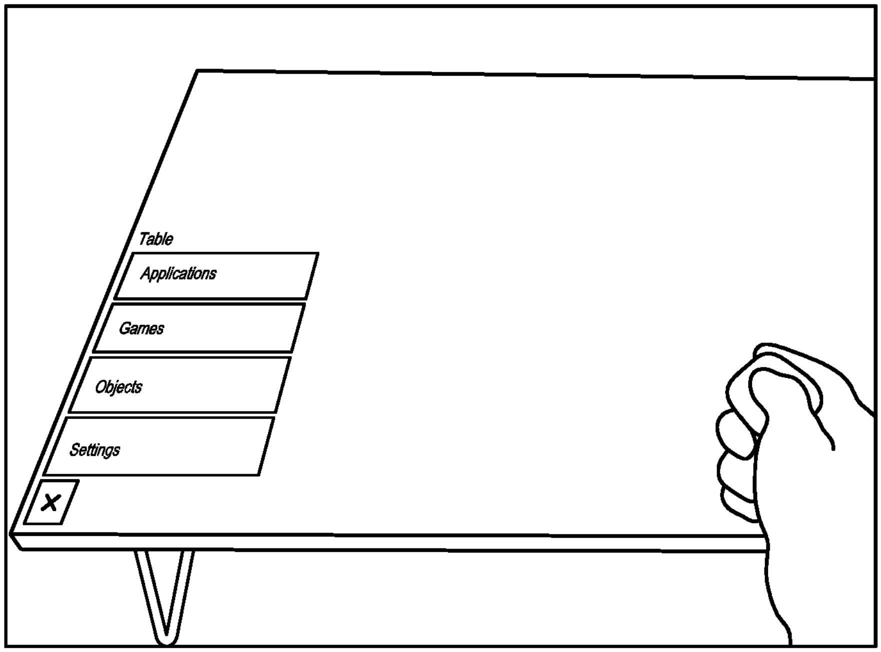
FIGS. 84A-84B illustrate geometric alignment of virtual content according to some embodiments.
Figure 84B:
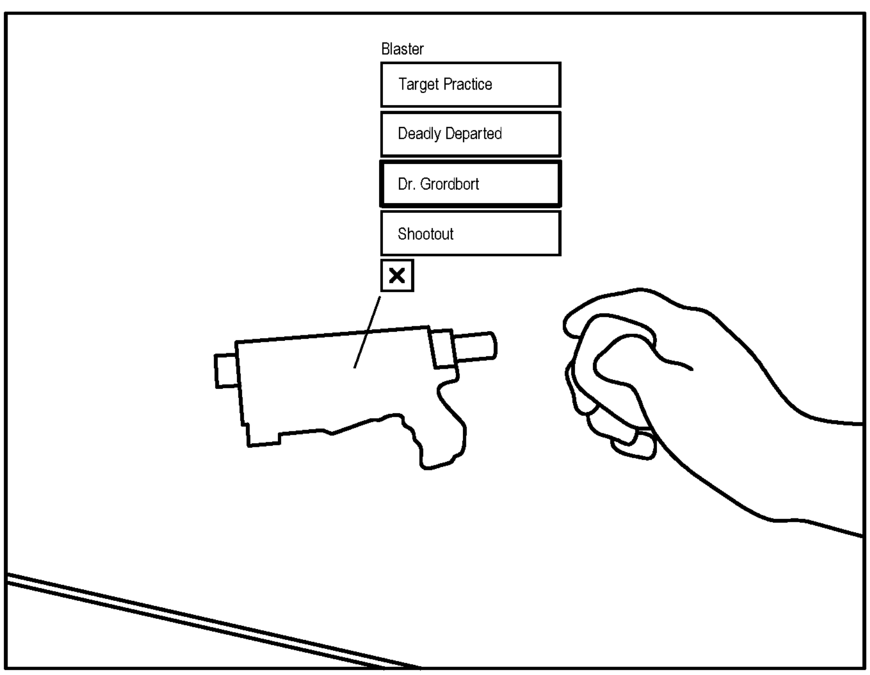

FIGS. 84A and 84B illustrate that certain menus may be geometrically tied to certain elements (for example, a toy gun gaming menu may be tied to the physical location of a toy gun; or certain home-control or media related menus may be configured to be tied to a certain coffee table location).

Figure 85A:
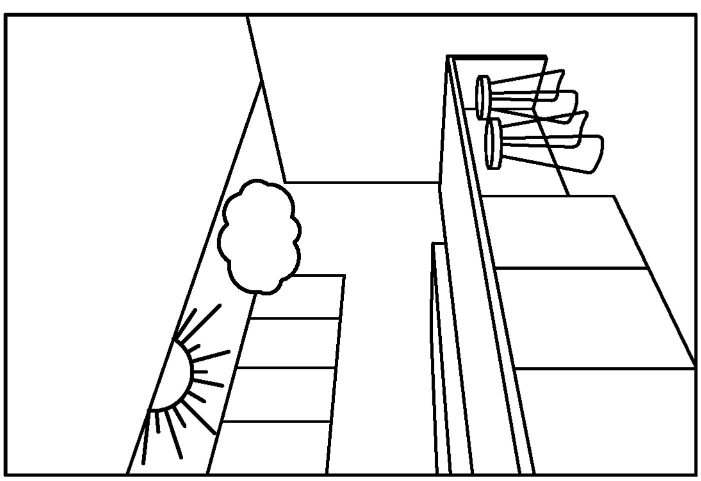
FIGS. 85A-85C illustrate display of remote live conditions according to some embodiments.
Figure 85B:
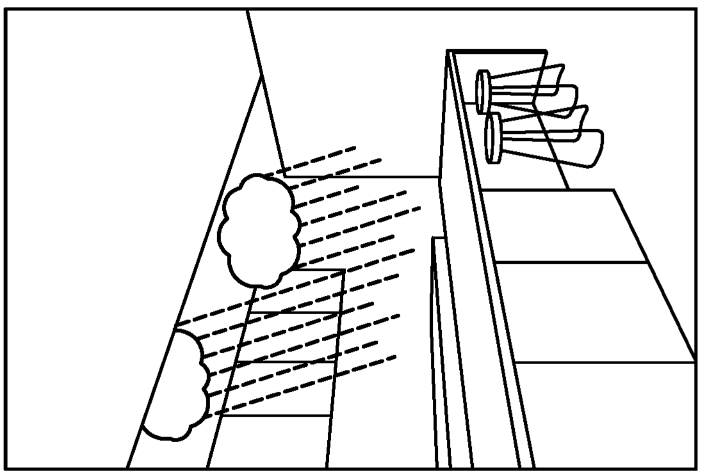
Figure 85C:
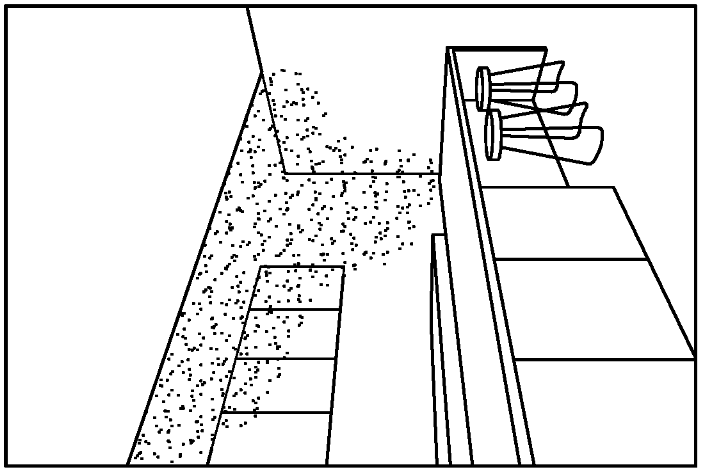

FIGS. 85A-85C illustrate the presentation of various weather patterns within a user's kitchen (sunny, raining, snowing); these may be tied to the weather at a particular location, such as at the user's second home location.

Figure 86:
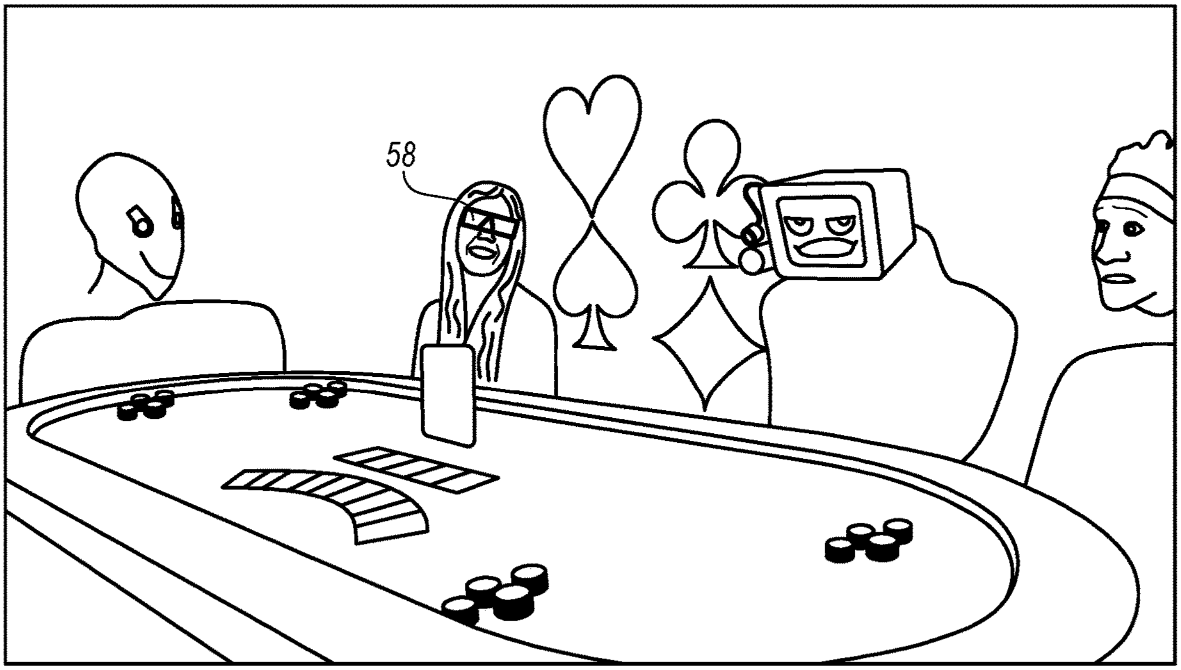
FIG. 86 illustrates an augmented reality gaming scenario according to some embodiments.
Figure 87:
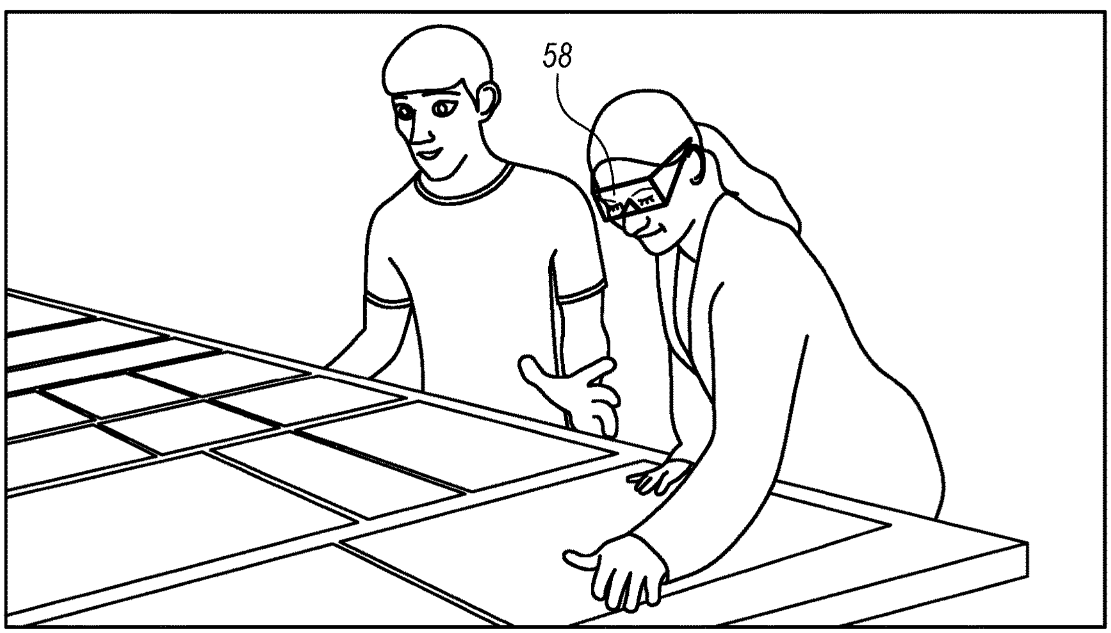
FIG. 87 illustrates a collaborative augmented reality scenario with an avatar according to some embodiments.

FIG. 86 illustrates a gaming environment which may be executed using the augmented reality aspects of certain embodiments of the subject system. FIG. 87 illustrates a collaborative work environment wherein a user is able to virtually "share" a work environment with a remote person represented locally by a selected avatar.

As noted above, system configurations such as those known as neural networks, deep networks, deep learning systems, and/or "artificial intelligence" systems may be utilized to assist in facilitating various functionalities of computing systems such as those described herein. Deep neural networks are universal function approximators. As such, the can be incorporated into any functional framework for visual environment understanding, perception, decision making, etc. In the framework of augmented or mixed reality, we may define a very sophisticated paradigm of computing interaction.

Referring to FIG. 88, in one paradigm a system embodiment may be envisioned as comprising six parts, each of which in turn in implemented with various implementations and formulations of deep neural networks, ranging from simpler convolutional neural networks, to recurrent networks capturing the dynamics of processes, to deep reinforcement learning to help train and guide intelligent virtual avatars or agents. The six components of the illustrated paradigm may be termed:

1. MRRE—mixed reality ready environment
2. AC_V1—intro to avatar computing
3. AC_V2—intelligent avatars
4. AC_V3—Touring-complete avatar
5. ICP—immersive co-presence
6. VI—visualization of invisible (visualization of signals within the brain, such as during unconscious periods of sleep, that may pertain to thoughts/dreams of the user)

In the following sections we will describe these components in further detail.

1. MRRE—Mixed Reality Ready Environment:

The mixed reality ready environment consists of the three dimensional semantic world understanding as well as the environment illumination estimation. This may be referred to as "hydra" type functionality, as noted in the descriptions above.

1.1 Semantic World

1. Object Detection
2. Semantic Segmentation
3. DSLAM
4. Dense Mesh/3d Reconstruction
5. Eye Tracking/Iris ID/User Emotions
6. People Context
7. Location Context 1.2 Environment Illumination In one embodiment, all of these tasks may be solved in a unifying model to realize computational, power, and speed constraints. For example, by solving all tasks jointly, the required resources may be amortized and an efficient (such as from computational and power perspectives) solution may be achieved. Furthermore, by sharing features, i.e. intermediate representations, the model may achieve robustness and be able to generalize to novel and unseen contexts. Such a model may be implemented using variations of recurrent convolutional neural networks.

2. AC_V1—Intro to Avatar Computing:

Upon completion of MRRE, the subject system embodiment is able to integrate knowledge of the visual world (MRRE), state of the user (MRRE), and universal knowledge (for example, information from sources such as Google®, Facebook®, etc). First the state of the user and associated avatar may be defined.

1. User state: What/how are you (user) feeling?
2. Avatar definition:
   a. Avatar Personality: Who is my avatar?
   b. Avatar Kinetics: How do we map the avatar personality into the MR world representation?
   c. Avatar reactions: How does the avatar answer your questions and assists your productivity?

3. Avatar Interaction:
   a. Interaction by attention: How do you interact with the avatar in the MR world? (touching, looking, speaking, moving, etc.)
   b. Programmatic interaction: How do applications/content interact with avatars in the MR world?

The above 3 formulations facilitate integrating the physical environment with its semantic attributes with the users reaction and/or intent to provide the foundations of avatar computing.

This may be achieved with both deep recurrent neural networks and deep reinforcement learning.

3. AC_V2—Intelligent Avatars.

1. Enhanced V1 avatar.
2. Avatar duplication: how avatars may copy themselves with different attributes and interact with each other.

In one embodiment there may be physics-based interactions between a visually coherent virtual avatar and the real world. Through deep reinforcement learning and game theory, the avatar may be configured to navigate the environment it is in. Avatar may interact with the user or other avatars.

4. AC_V3—Touring-Complete Avatar.

1. An avatar may be configured to learn by example. In one embodiment it may be preferred to have many users, such as over 10 million.

Using Generative models, the avatar may be configured to learn enough of the physical world that it is able to adjust its appearance and behavior such that it becomes indistinguishable from other humans in the real world, in one embodiment without haptic feedback (in other embodiments, various haptics may be presented, such as through hand-held device components).

5. ICP—Immersive Co-Presence

1. Telepresence and environment mapping.

Via remote sensors and deep generative models, even more sophisticated models of information transmission may be configured to provide deeper functionalities. For example, in one embodiment, recorded signals in a remote location may be the input to a generative model. The output may be a virtual representation of the remote physical content in the physical world of the user.

6. VI—Immersive Co-Presence.

1. Visualize and interact with the invisible. Replay thoughts and dreams.

In one embodiment, the ability to record and visualize thoughts, conscious and not (dreams), may be configured to greatly affect a user's cognitive abilities (both intelligence and creativity) Using both generative and discriminative deep learning models, activations of the human brain may be recorded with wearable sensors (EEG, MEG, wearable MRI), interpreted with discriminative models, and finally visualized by generative processes. Visual representation of various aspects of thoughts and dreams may be used to understand, share, and interact with a user's own thoughts and ideas.

We now provide some applications and examples of applying such a paradigm to the world; these may be applied to the aforementioned embodiments and configurations, such as those featured in FIGS. 33-88.

1. Navigation (inputs may include MRRE, GPS)
   Global mapping and "Street View" ® types of functionalities, driving functionalities, location marker functionalities, people marker functionalities.
2. Communication (inputs may include MRRE, ICP, VI)
   Telepresence, Translation (including but not limited to gesture-based sign language), Messaging, Emojis in mixed reality, Personal recognition, virtually "sticking" or anchoring things to people (such as virtual masks, sticky notes, comments, artwork, etc), Avatar chat functionalities.
3. Entertainment (inputs may include MRRE, AC_V1, AC_V2) Art, Media, Games, Theme Park, Theater, Music, 2d/3d mix Sports.
4. Work Environments (inputs may include MRRE, AC V2, VI)
   Mixed reality functionalities, such as those described above, pertinent to various work environments such as Architecture, Office, Engineering, Biology, Medicine, Technical (firefighters and other emergency responders, etc).
5. Shopping functionalities (inputs may include MRRE, AC_V1)
   Shopping functionalities for users at home, at the store, on the street (look-buy), Real Estate.
6. Advertising functionalities (inputs may include MRRE, AC_V1) In-Home advertising, Billboard (Street), Kiosk, Restaurant (advertising specials etc), in stores, (all contextual).
7. Health-related functionalities (inputs may include MRRE, AC_V1, AC_V3)
   Wellbeing, Medical, preventative
8. Efficiency functionalities for daily life of the user (inputs may include MRRE, AC_V1)
   Home management, Task management, Finance
9. Education related functionalities (inputs may include MRRE, AC_V2, VI)
   MR books, Music tuition, Game instruction, Cooking, Astronomy/Science/Art.
10. Additional avatar-related functionalities (inputs may include MRRE, AC_V3, VI)—as noted above and described in relation to FIG. 88 and others.
11. Visualizing things that previously were invisible, such as signals detectable within the central nervous system of the user: (inputs may include MRRE, AC_V1, AC_V2, AV_V3, VI)

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A visualization system comprising:
- a Helmholtz coil pair;
- a current control system to activate current through the Helmholtz coil pair in an alternating manner between current at a direct current level and current at an alternating current level;
- a magnetometer component positioned relative to the Helmholtz coil pair to produce a directly-readable output when the Helmholtz coil pair is activated at the direct current level;
- an electromagnetic localization receiver coil positioned relative to the Helmholtz coil pair to produce a directly-readable output when the Helmholtz coil pair is activated at the alternating current level; and
- a calibration system connected to the magnetometer component and the electromagnetic localization receiver coil and operable to characterize an orientation of the magnetometer component and the electromagnetic localization receiver coil relative to one another based on the directly readable outputs from the magnetometer component and the electromagnetic localization receiver coil.

2. The visualization system of claim 1, wherein the calibration system characterizes the orientation of the magnetometer component and the electromagnetic localization receiver coil relative to one another based on an assumption that an orientation of an electromagnetic field created by the Helmholtz coil pair remains the same when switching between the current at the direct current level and the current at the alternating current level.

3. The visualization system of claim 1, further comprising:
- a head-mounted component, wherein the magnetometer component and the electromagnetic localization receiver coil are mounted to the head-mounted component.

4. The visualization system of claim 3, further comprising:
- a head-mounted component reorientation device connected between the head-mounted component and the Helmholtz coil pair and operable to reorient the head-mounted component relative to the Helmholtz coil pair.

5. The visualization system of claim 4, wherein the head-mounted component reorientation device is an electromagnetic device.

6. The visualization system of claim 1, further comprising:
- fiducials connected to the Helmholtz coil pair; and
- a sensor that detects the fiducials, wherein the calibration system determines an orientation of the Helmholtz coil pair based on locations of the fiducials.

7. The visualization system of claim 6, wherein the fiducials are optical fiducials and the sensor is a camera sensor.

8. The visualization system of claim 1, further comprising:
- a first transmitter operable to transmit a first signal;
- an ultrasound transmitter operable to transmit an ultrasound signal;
- a first sensor operable to sense the first signal wherein the magnetometer component forms part of the first sensor;
- an ultrasound microphone operable to sense the ultrasound signal, wherein the electromagnetic localization receiver coil forms part of the ultrasound microphone;
- a delay measurement device connected between the first sensor and the ultrasound microphone and operable to determine a delay between receiving the first signal and receiving the ultrasound signal, wherein the calibration system is connected to the delay measurement device and operable to calibrate the first signal based on the delay; and
- a sensor digital processing unit connected to the first sensor to receive the first signal and operable to analyze the first signal to determine a location of the first transmitter and the first sensor relative to one another.

9. The visualization system of claim 7, further comprising:
- a head-mounted display unit; and
- a hand-held totem, wherein the first transmitter is located on the hand-held totem and the first sensor is located on the head-mounted display unit.

10. The visualization system of claim 9, wherein the second transmitter is located on the a hand-held totem and the second sensor is located on the head-mounted display unit.

11. The visualization system of claim 9, wherein the head-mounted display unit has a see-through display for a user to see the totem.

12. The visualization system of claim 1, further comprising:
- a head-mounted display unit; and
- a processing module that creates a display object though a display of the head-mounted display unit based on an output of the sensor digital processing unit.

13. A visualization system comprising:
- a head-mounted component;
- a Helmholtz coil pair;
- a current control system to activate current through the Helmholtz coil pair in an alternating manner between current at a direct current level and current at an alternating current level;
- a magnetometer component mounted to the head-mounted component and positioned relative to the Helmholtz coil pair to produce a directly-readable output when the Helmholtz coil pair is activated at the direct current level;
- an electromagnetic localization receiver coil mounted to the head-mounted component and positioned relative to the Helmholtz coil pair to produce a directly-readable output when the Helmholtz coil pair is activated at the alternating current level;
- a calibration system connected to the magnetometer component and the electromagnetic localization receiver coil and operable to characterize an orientation of the magnetometer component and the electromagnetic localization receiver coil relative to one another based on the directly readable outputs from the magnetometer component and the electromagnetic localization receiver coil, wherein the calibration system characterizes the orientation of the magnetometer component and the electromagnetic localization receiver coil relative to one another based on an assumption that an orientation of an electromagnetic field created by the Helmholtz coil pair remains the same when switching between the current at the direct current level and the current at the alternating current level;

an electromagnetic head-mounted component reorientation device connected between the head-mounted component and the Helmholtz coil pair and operable to reorient the head-mounted component relative to the Helmholtz coil pair.

14. A visualization method comprising:

activating current through a Helmholtz coil pair in an alternating manner between current at a direct current level and current at an alternating current level;

producing a directly-readable output from a magnetometer component positioned relative to the Helmholtz coil pair when the Helmholtz coil pair is activated at the direct current level;

producing a directly-readable output from an electromagnetic localization receiver coil positioned relative to the Helmholtz coil pair when the Helmholtz coil pair is activated at the alternating current level; and characterizing an orientation of the magnetometer component and the electromagnetic localization receiver coil relative to one another based on the directly readable outputs from the magnetometer component and the electromagnetic localization receiver coil.

15. The method of claim 14, wherein the orientation of the magnetometer component and the electromagnetic localization receiver coil relative to one another is characterized based on an assumption that an orientation of an electromagnetic field created by the Helmholtz coil pair remains the same when switching between the current at the direct current level and the current at the alternating current level.

* * * * *